(12) United States Patent
Bobbitt et al.

(10) Patent No.: US 7,526,487 B1
(45) Date of Patent: Apr. 28, 2009

(54) BUSINESS TRANSACTION PROCESSING SYSTEMS AND METHODS

(75) Inventors: Charles P. Bobbitt, Dallas, TX (US); Steven G. Doughty, Plano, TX (US); Robert Jay Shaw, Dallas, TX (US)

(73) Assignee: Computer Sciences Corporation, Austin, TX (US)

(*) Notice: Subject to any disclaimer, the term of this patent is extended or adjusted under 35 U.S.C. 154(b) by 1366 days.

(21) Appl. No.: 09/699,015

(22) Filed: Oct. 27, 2000

Related U.S. Application Data

(60) Provisional application No. 60/162,412, filed on Oct. 29, 1999, provisional application No. 60/162,411, filed on Oct. 29, 1999, provisional application No. 60/162,602, filed on Oct. 29, 1999, provisional application No. 60/162,509, filed on Oct. 29, 1999, provisional application No. 60/162,708, filed on Oct. 29, 1999, provisional application No. 60/162,567, filed on Oct. 29, 1999, provisional application No. 60/162,603, filed on Oct. 29, 1999.

(51) Int. Cl.
*G06F 7/00* (2006.01)
*G06Q 40/00* (2006.01)

(52) U.S. Cl. ............... 707/100; 707/103 R; 705/35; 705/39

(58) Field of Classification Search ............... 707/100, 707/103 R, 1; 705/1, 5, 35, 42–44, 38–40; 715/513, 533; 711/216, 217
See application file for complete search history.

(56) References Cited

U.S. PATENT DOCUMENTS 4,606,002 A 8/1986 Waisman et al.

(Continued)

FOREIGN PATENT DOCUMENTS

EP 0 280 773 9/1988

(Continued)

OTHER PUBLICATIONS

Shoshani, A.; "OLAP and statistical databases: similarities and differences"; ACM; May 12-14, 1997; p. 1.*

(Continued)

*Primary Examiner*—Ella Colbert
(74) *Attorney, Agent, or Firm*—Meyertons, Hood, Kivlin, Kowert & Goetzel, P.C.; Eric B. Meyertons

(57) ABSTRACT

A system, method and carrier medium for configuring processing relationships among entities of a Financial Service Organization (FSO). A system, method and carrier medium for configuring Financial Service Organization (FSO) application software. A method and system for the selective identification and execution of a specific processing task for one or more records contained in the one or more Financial Service Organization (FSO) data sets. A system and method for dynamic selection of a database identifier, associated with a database, based on application program requirements in a Financial Service Organization (FSO) business transaction processing system. A system and method for dynamic selection of a database identifier, associated with a database, based on application program requirements in a Financial Service Organization (FSO) business transaction processing system. A system, method and carrier medium for locating processing parameter values in a Financial Service Organization (FSO) computer system using pre-configured key definitions, key values, and key value search masks. A system and method for configuring key definitions, key values, and key value search masks for locating processing parameter values in a Financial Service Organization (FSO) computer system.

70 Claims, 97 Drawing Sheets

U.S. PATENT DOCUMENTS

| | | | |
|---|---|---|---|
| 4,878,167 A | | 10/1989 | Kapulka et al. |
| 5,099,422 A | | 3/1992 | Foresman et al. |
| 5,191,522 A | | 3/1993 | Bosco et al. |
| 5,201,044 A | | 4/1993 | Frey, Jr. et al. |
| 5,233,513 A | | 8/1993 | Doyle |
| 5,257,366 A | | 10/1993 | Adair et al. |
| 5,386,566 A | | 1/1995 | Hamanaka et al. |
| 5,394,555 A | | 2/1995 | Hunter et al. |
| 5,421,011 A | * | 5/1995 | Camillone et al. .......... 718/104 |
| 5,434,994 A | | 7/1995 | Shaheen et al. |
| 5,455,947 A | | 10/1995 | Suzuki et al. |
| 5,483,632 A | | 1/1996 | Kuwamoto et al. |
| 5,499,330 A | | 3/1996 | Lucas et al. |
| 5,504,674 A | | 4/1996 | Chen et al. |
| 5,513,348 A | | 4/1996 | Ryu et al. |
| 5,523,942 A | | 6/1996 | Tyler et al. |
| 5,524,205 A | | 6/1996 | Lomet et al. |
| 5,550,976 A | | 8/1996 | Henderson et al. |
| 5,586,310 A | | 12/1996 | Sharman |
| 5,615,309 A | | 3/1997 | Bezek et al. |
| 5,638,508 A | | 6/1997 | Kanai et al. |
| 5,689,706 A | | 11/1997 | Rao et al. |
| 5,710,915 A | | 1/1998 | McElhiney |
| 5,721,915 A | | 2/1998 | Sockut et al. |
| 5,732,397 A | | 3/1998 | De Tore et al. |
| 5,742,820 A | | 4/1998 | Perlman |
| 5,745,901 A | | 4/1998 | Entner et al. |
| 5,768,505 A | | 6/1998 | Gilchrist et al. |
| 5,768,506 A | | 6/1998 | Randell |
| 5,794,229 A | | 8/1998 | French et al. |
| 5,797,134 A | | 8/1998 | McMillan et al. |
| 5,832,481 A | | 11/1998 | Sheffield |
| 5,864,679 A | | 1/1999 | Kanai et al. |
| 5,867,494 A | | 2/1999 | Krishnaswamy et al. |
| 5,870,711 A | | 2/1999 | Huffman |
| 5,870,725 A | | 2/1999 | Bellinger et al. |
| 5,870,746 A | | 2/1999 | Knutson et al. |
| 5,873,066 A | | 2/1999 | Underwood et al. |
| 5,881,379 A | * | 3/1999 | Beier et al. ................. 707/101 |
| 5,892,905 A | | 4/1999 | Brandt et al. |
| 5,907,848 A | | 5/1999 | Zaiken et al. |
| 5,909,683 A | | 6/1999 | Miginiac et al. |
| 5,930,759 A | | 7/1999 | Moore et al. |
| 5,933,816 A | * | 8/1999 | Zeanah et al. ................. 705/35 |
| 5,937,189 A | | 8/1999 | Branson et al. |
| 5,940,809 A | | 8/1999 | Musmanno et al. |
| 5,950,169 A | | 9/1999 | Borghesi et al. |
| 5,950,192 A | | 9/1999 | Moore et al. |
| 5,956,719 A | | 9/1999 | Kudo et al. |
| 5,987,434 A | | 11/1999 | Libman |
| 5,991,733 A | | 11/1999 | Aleia et al. |
| 5,991,756 A | | 11/1999 | Wu |
| 5,995,971 A | | 11/1999 | Douceur et al. |
| 6,003,033 A | | 12/1999 | Amano et al. |
| 6,038,393 A | | 3/2000 | Iyengar et al. |
| 6,049,665 A | | 4/2000 | Branson et al. |
| 6,064,983 A | | 5/2000 | Koehler |
| 6,075,851 A | | 6/2000 | Pinard et al. |
| 6,081,832 A | | 6/2000 | Gilchrist et al. |
| 6,092,049 A | | 7/2000 | Chislenko et al. |
| 6,105,007 A | | 8/2000 | Norris |
| 6,112,209 A | * | 8/2000 | Gusack ....................... 707/101 |
| 6,115,690 A | | 9/2000 | Wong |
| 6,134,582 A | | 10/2000 | Kennedy |
| 6,163,770 A | | 12/2000 | Gamble et al. |
| 6,185,540 B1 | | 2/2001 | Schreitmueller et al. |
| 6,202,070 B1 | | 3/2001 | Nguyen et al. |
| 6,226,623 B1 | | 5/2001 | Schein et al. |
| 6,236,975 B1 | | 5/2001 | Boe et al. |
| 6,272,482 B1 | | 8/2001 | McKee et al. |
| 6,289,339 B1 | | 9/2001 | Weber |
| 6,336,096 B1 | | 1/2002 | Jernberg |
| 6,341,287 B1 | * | 1/2002 | Sziklai et al. ............... 707/102 |
| 6,385,612 B1 | | 5/2002 | Troisi |
| 6,393,386 B1 | * | 5/2002 | Zager et al. .................... 703/25 |
| 6,438,563 B1 | | 8/2002 | Kawagoe |
| 6,442,533 B1 | | 8/2002 | Hinkle |
| 6,446,086 B1 | | 9/2002 | Bartlett et al. |
| 6,473,740 B2 | | 10/2002 | Cockrill et al. |
| 6,557,752 B1 | | 5/2003 | Yacoob |
| 6,604,114 B1 | * | 8/2003 | Toong et al. ............. 707/104.1 |
| 6,662,164 B1 | * | 12/2003 | Koppelman et al. ........... 705/14 |
| 6,970,844 B1 | | 11/2005 | Bierenbaum |

FOREIGN PATENT DOCUMENTS

| | | |
|---|---|---|
| EP | 0 465 018 | 1/1992 |
| EP | 0 836 779 | 4/1998 |
| EP | 0 926 608 | 6/1999 |
| WO | WO 9858356 | * 12/1998 |

OTHER PUBLICATIONS

Johnson, M.; "Alinear temporal logic approach to objects with transactions"; Springer-Verlag, Berlin, Germany; Dec. 13-17, 1997; p. 1.*

"@ Fault A Commitment to Consistency," Computer Sciences Corporation, Copyright 2000, pp. 1-2.

Merlin, Jr., William F., "Colossus: What We Know Today," The Merlin Law Group, Aug. 2000, Tampa, FL, pp. 1-8.

Merlin, Jr., William F., "Collision Course With The Colossus Program: How To Deal With It," The Merlin Law Group, May 2000, Tampa, FL, pp. 1-17.

Merlin, Jr., William F., "Overcoming Allstate's Trade Secrets and Work-Product Objections," The Merlin Law Group, Mar. 2000, Tampa, FL, pp. 1-31.

Mead, Jay, Technical Communication, Aug. 1998, V. 45, N.3, p. 353-380.

Scopus Introduces World's Most Complete Call Center Solution for Financial Services; PR Newswire dated Nov. 5, 1997.

Borland, Russel; "Running Microsoft Outlook 97", Microsoft Press, 1997.

Juhl, Randy P., "The OTC Revolution"; Drugtopics.com; Mar. 3, 1997, pp. 1-9.

Continuum Connections, vol. I, No. 1, The Continuum Company, Inc., Nov. 1991, 16 pages.

Continuum Connections, vol. I, No. 2, The Continuum Company, Inc., Jan./Feb. 1992, 17 pages.

Continuum Connections, vol. I, No. 3, The Continuum Company, Inc., Mar./Apr. 1992, 16 pages.

Continuum Connections, vol. I, No. 4, The Continuum Company, Inc., Jul./Aug. 1992, 15 pages.

Continuum Connections, vol. II, No. 1, The Continuum Company, Inc., Oct./Nov. 1992, 16 pages.

Continuum Connections, vol. II, No. 2, The Continuum Company, Inc., Dec./Jan. 1993, 24 pages.

Continuum Connections, vol. II, No. 3, The Continuum Company, Inc., Mar./Apr. 1993, 16 pages.

Continuum Connections, vol. II, No. 4, The Continuum Company, Inc., Jul./Aug. 1993, 16 pages.

Continuum Connections, vol. II, No. 5, The Continuum Company, Inc., Nov./Dec. 1993, 20 pages.

Continuum Connections, vol. II, No. 6, The Continuum Company, Inc., Jan./Feb. 1994, 19 pages.

Continuum Connections, vol. III, No. 1, The Continuum Company, Inc., Mar./Apr. 1994, 24 pages.

Continuum Connections, vol. III, No. 2, The Continuum Company, Inc., Nov./Dec. 1994, 20 pages.

Continuum Connections, vol. III, No. 3, The Continuum Company, Inc., Mar./Apr. 1995, 16 pages.

Continuum Connections to the Americas, vol. 1, No. 1, The Continuum Company, Inc., Sep. 1995, 49 pages.

Continuum Connections, vol III, No. 4, The Continuum Company, Inc., Oct./Nov. 1995, 24 pages.

Continuum Connections to the Americas, vol. 2, No. 1, The Continuum Company, Inc., Jan. 1996, 59 pages.

Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
International search report application No. PCT/ US 00/18016, mailed Nov. 10, 2000.
International search report application No. PCT/US 00/18020 mailed Nov. 10, 2000.
International Preliminary Examination Report, PCT/US00/29978.
Written Opinion, PCT/US00/29978 mailed Mar. 25, 2002.

* cited by examiner

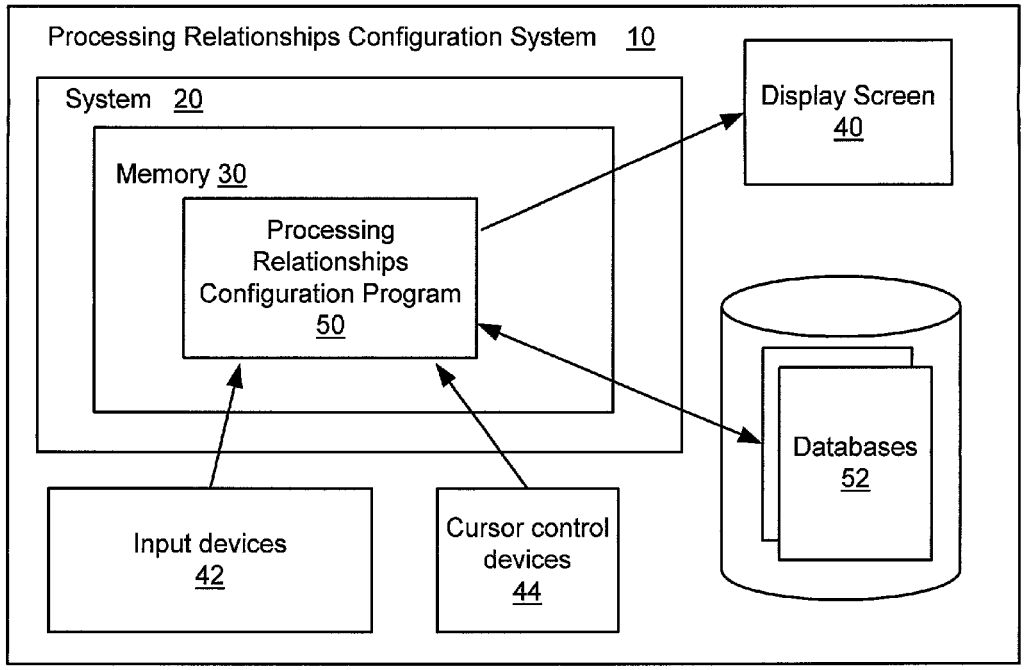
FIG. A-1a
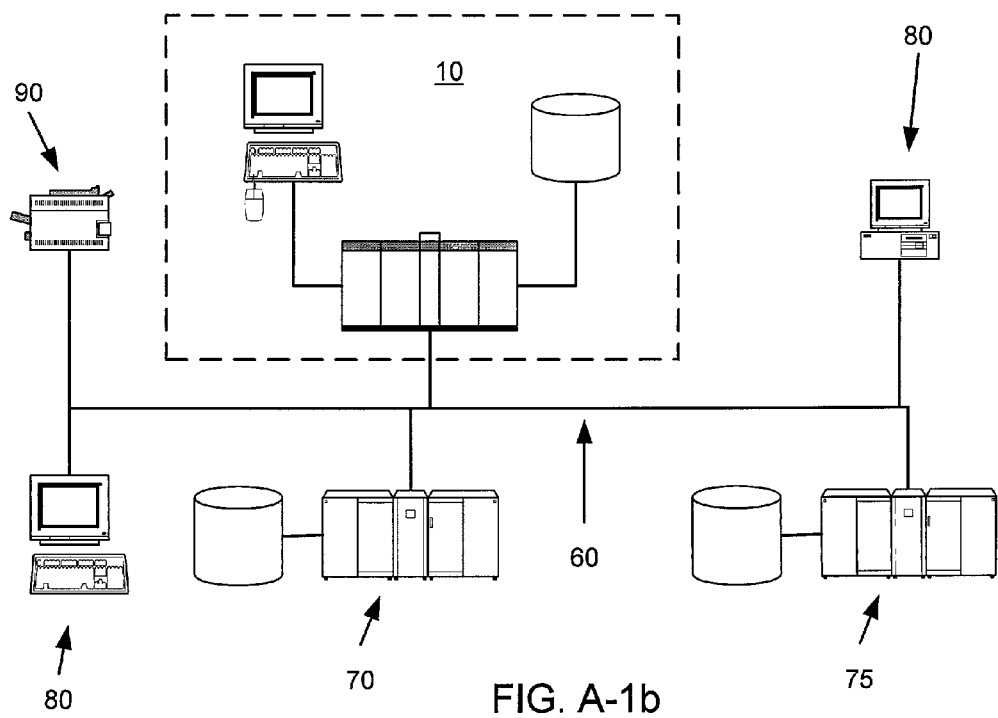
FIG. A-1b

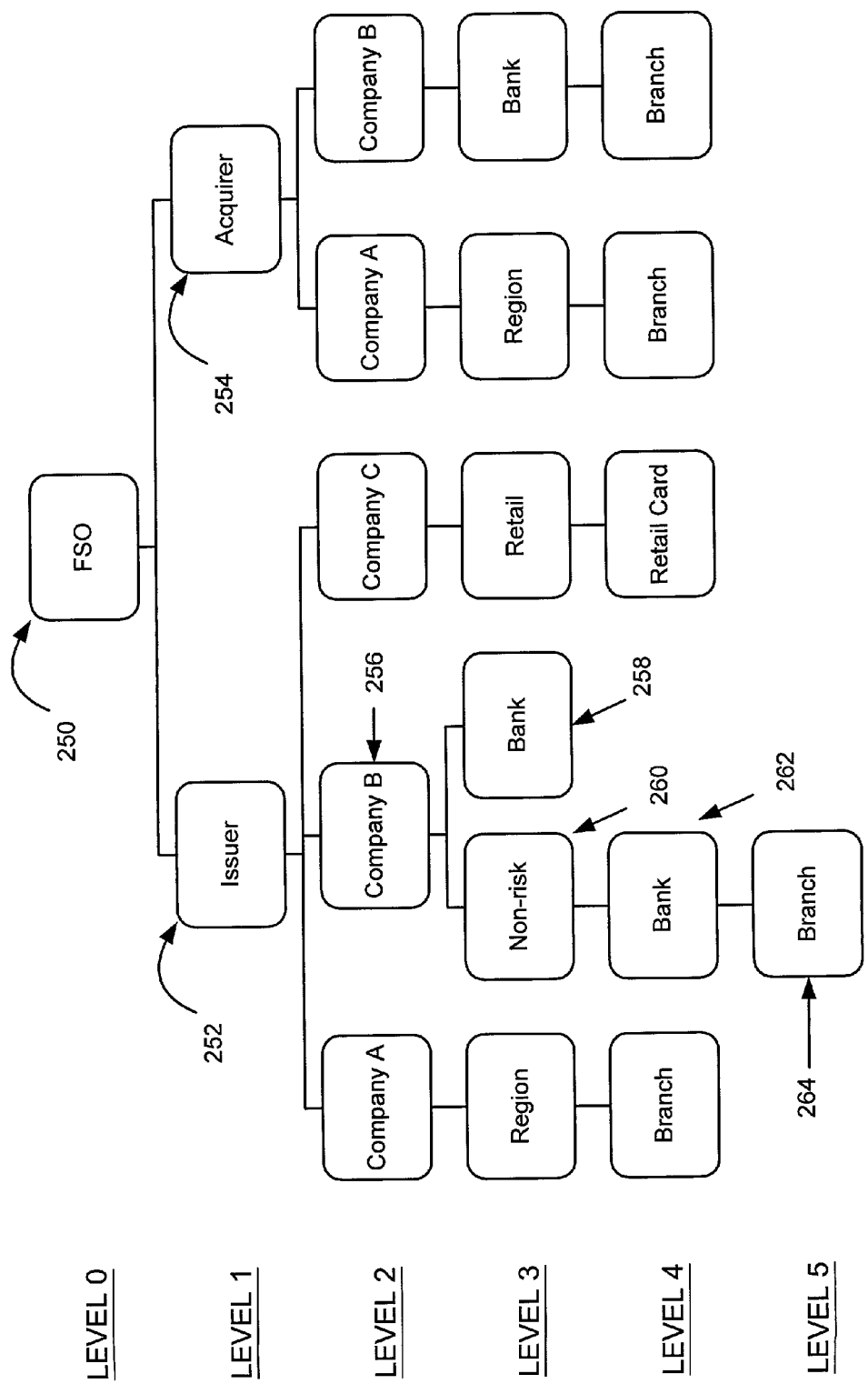
FIG. A-2

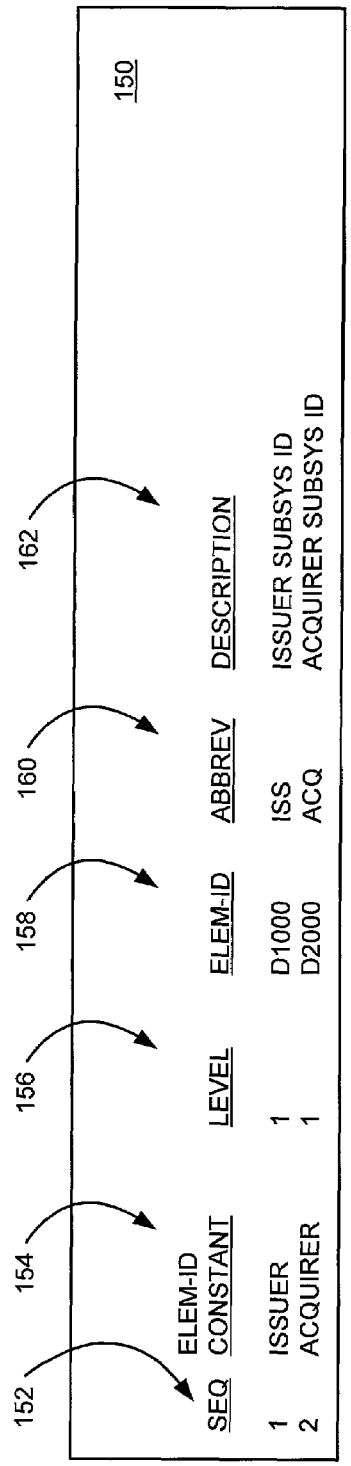
FIG. A-3
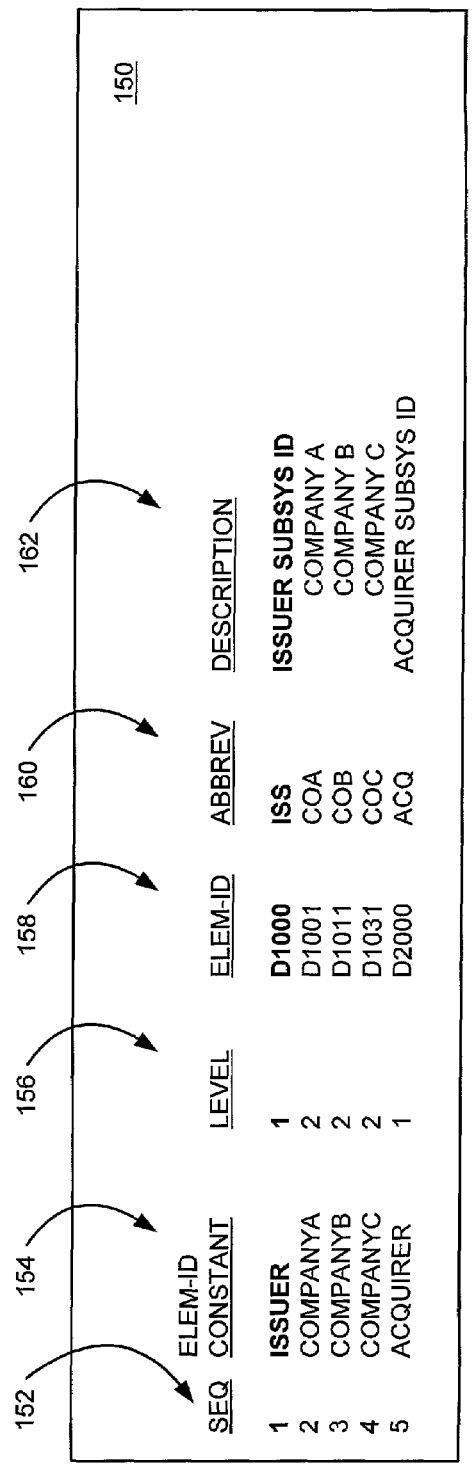
FIG. A-4

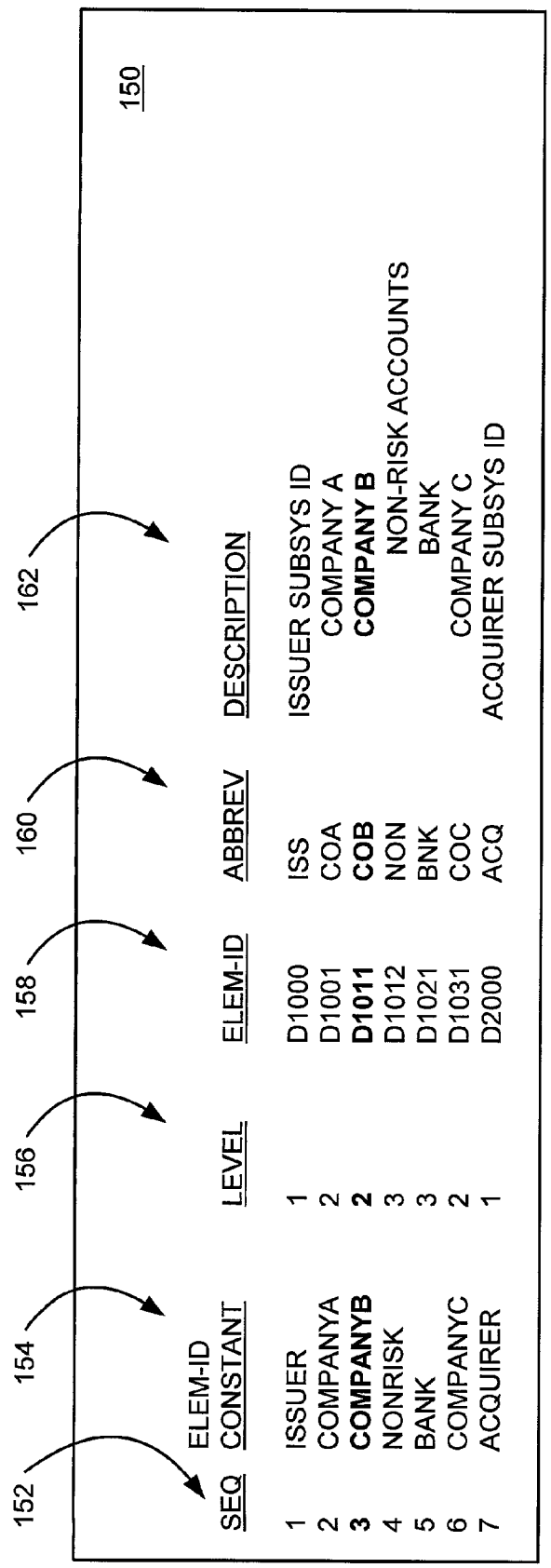
FIG. A-5

| SEQ | ELEM-ID CONSTANT | LEVEL | ELEM-ID | ABBREV | DESCRIPTION |
|---|---|---|---|---|---|
| 1 | ISSUER | 1 | D1000 | ISS | ISSUER SUBSYS ID |
| 2 | COMPANYA | 2 | D1001 | COA | COMPANY A |
| 3 | REGION | 3 | D1002 | RGN | REGIONAL OFFICE |
| 4 | BRANCH | 4 | D1003 | BRN | BRANCH OFFICE |
| 5 | COMPANYB | 2 | D1011 | COB | COMPANY B |
| 6 | NONRISK | 3 | D1012 | NON | NON-RISK ACCOUNTS |
| 7 | BANK | 4 | D1013 | BNK | NON-RISK BANK |
| 8 | BRANCH | 5 | D1014 | BRN | BANK BRANCH |
| 9 | BANK | 3 | D1021 | BNK | BANK |
| 10 | COMPANYC | 2 | D1031 | COC | COMPANY C |
| 11 | RETAIL | 3 | D1032 | RET | RETAIL STORE |
| 12 | RETAILCARD | 4 | D1033 | RTC | PRIVATE-LABEL CREDIT CARD |
| 13 | ACQUIRER | 1 | D2000 | ACQ | ACQUIRER SUBSYS ID |
| 14 | COMPANYA | 2 | D2001 | COA | COMPANY A |
| 15 | REGION | 3 | D2002 | RGN | REGIONAL OFFICE |
| 16 | BRANCH | 4 | D2003 | BRN | BRANCH OFFICE |
| 17 | COMPANYB | 2 | D2011 | COB | COMPANY B |
| 18 | BANK | 3 | D2012 | BNK | BANK |
| 19 | BRANCH | 4 | D2013 | BRN | BANK BRANCH |

FIG. A-6

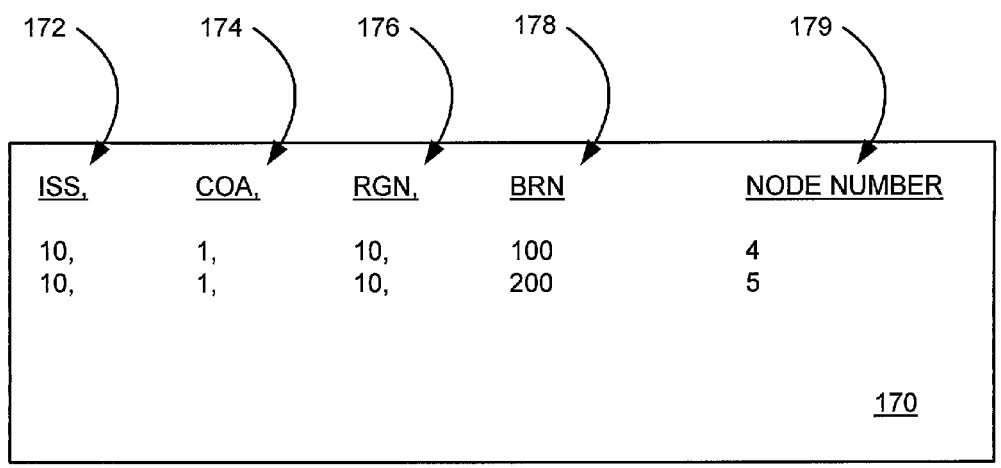
FIG. A-7
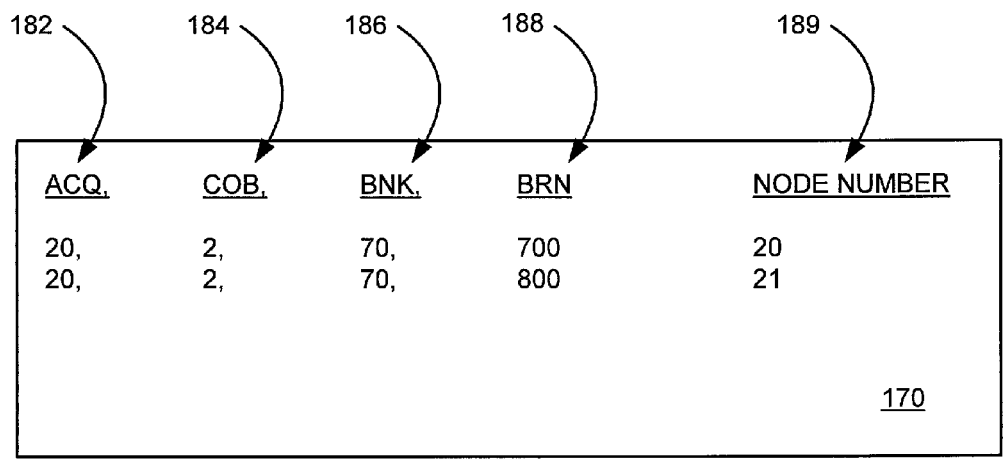
FIG. A-8

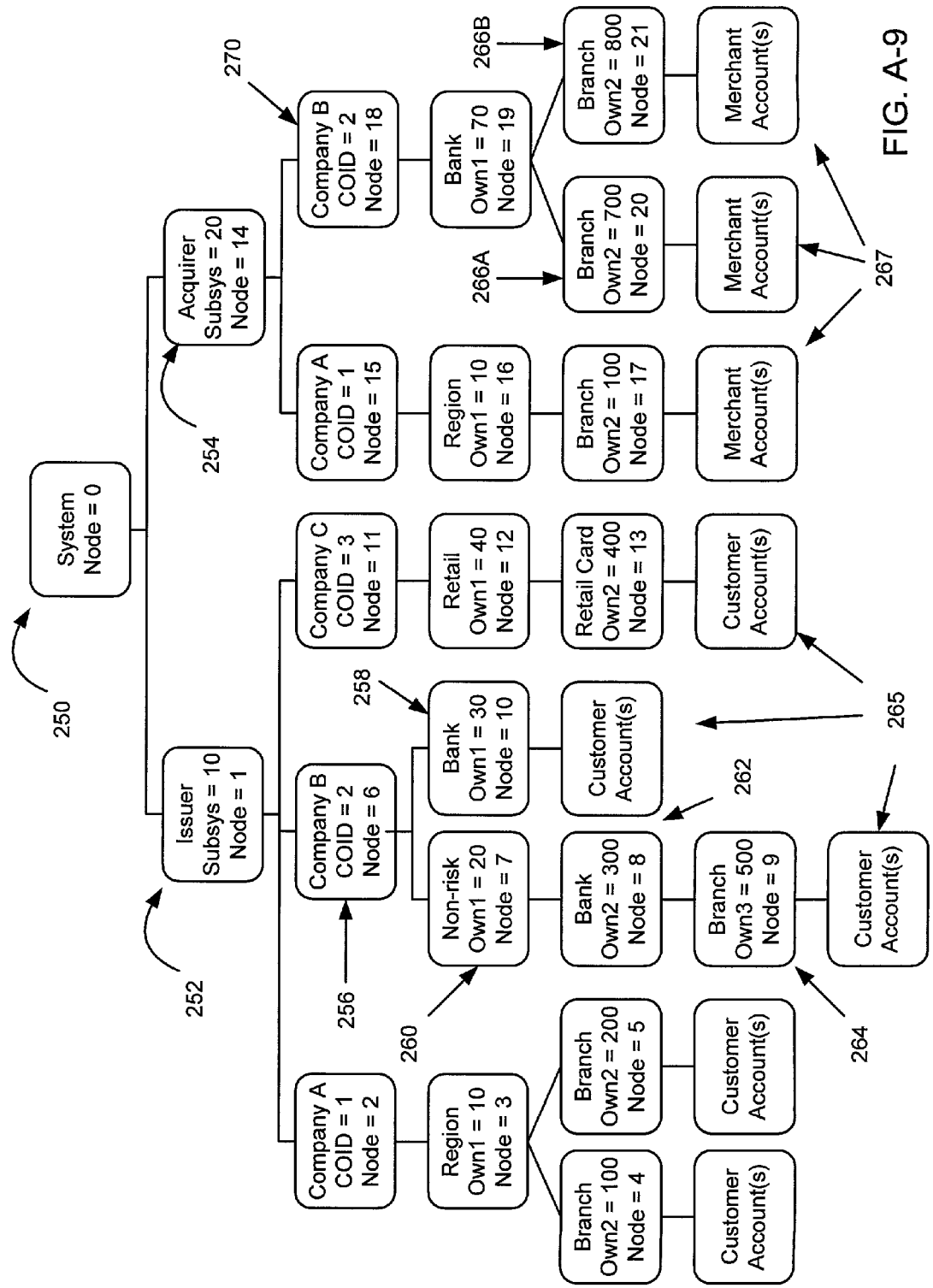
FIG. A-9

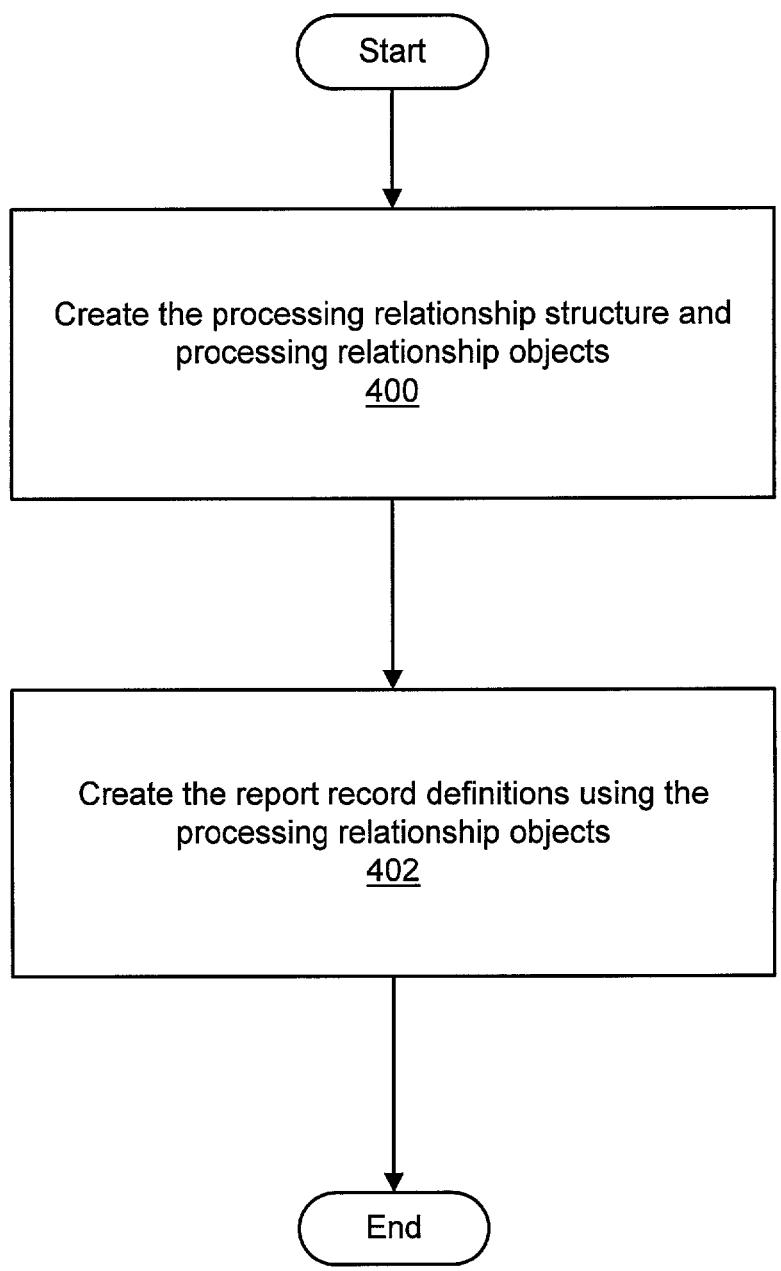
FIG. A-10a

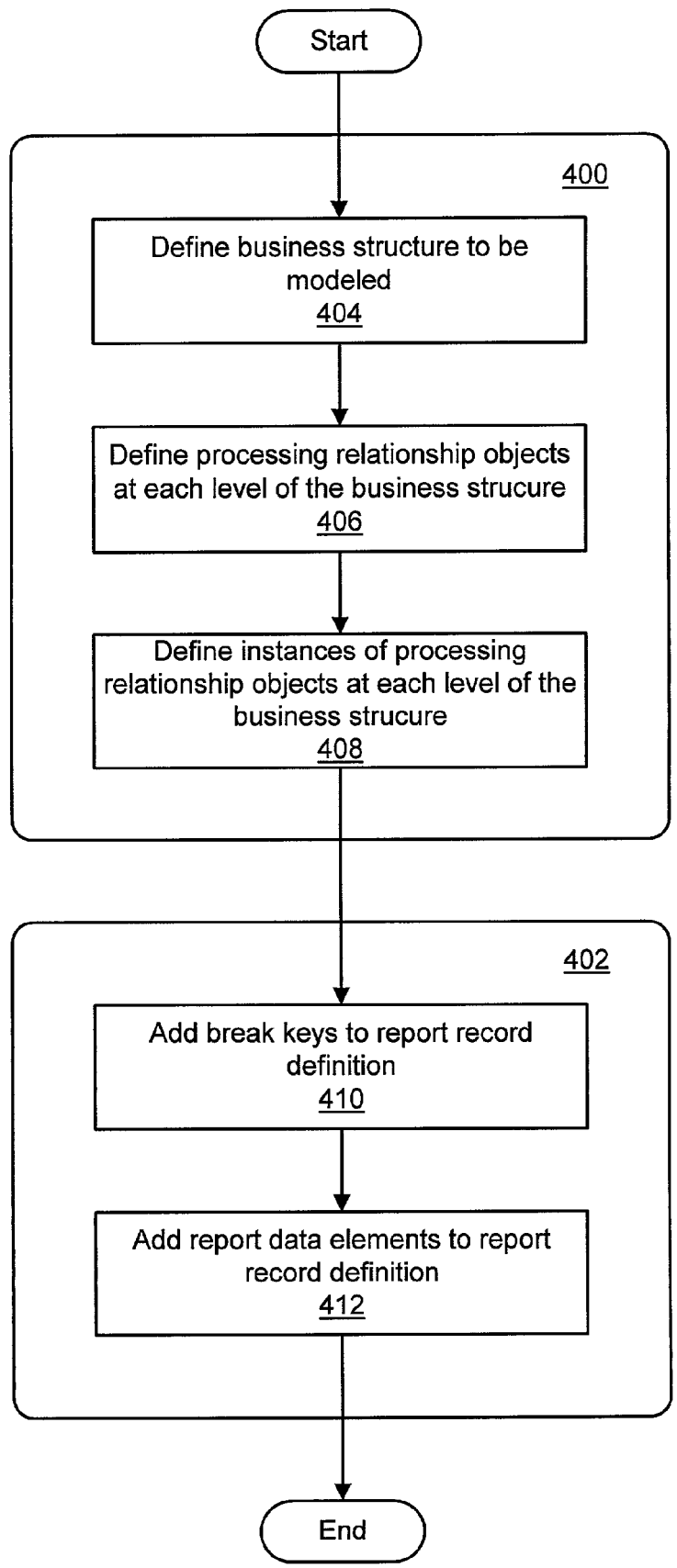
FIG. A-10b

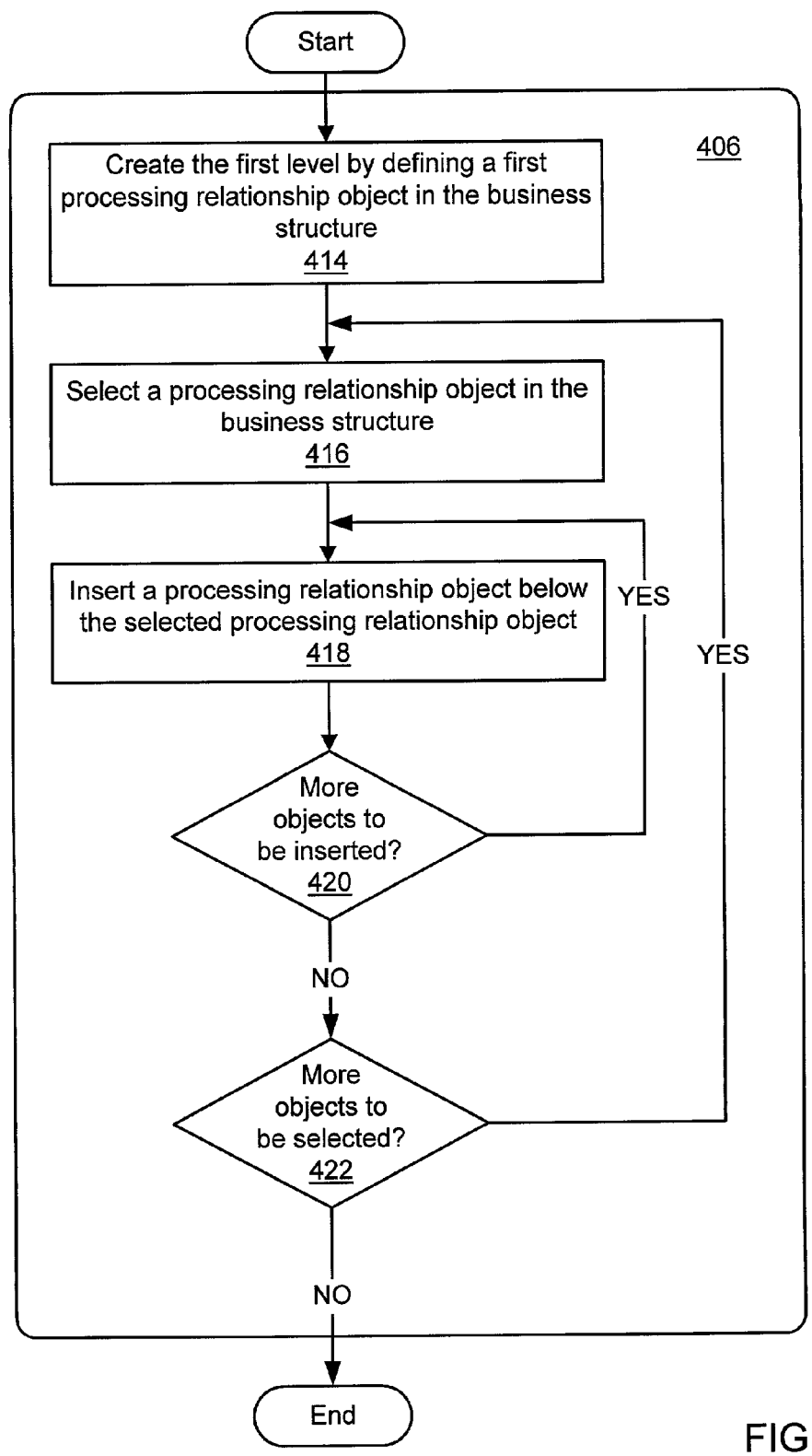
FIG. A-10c

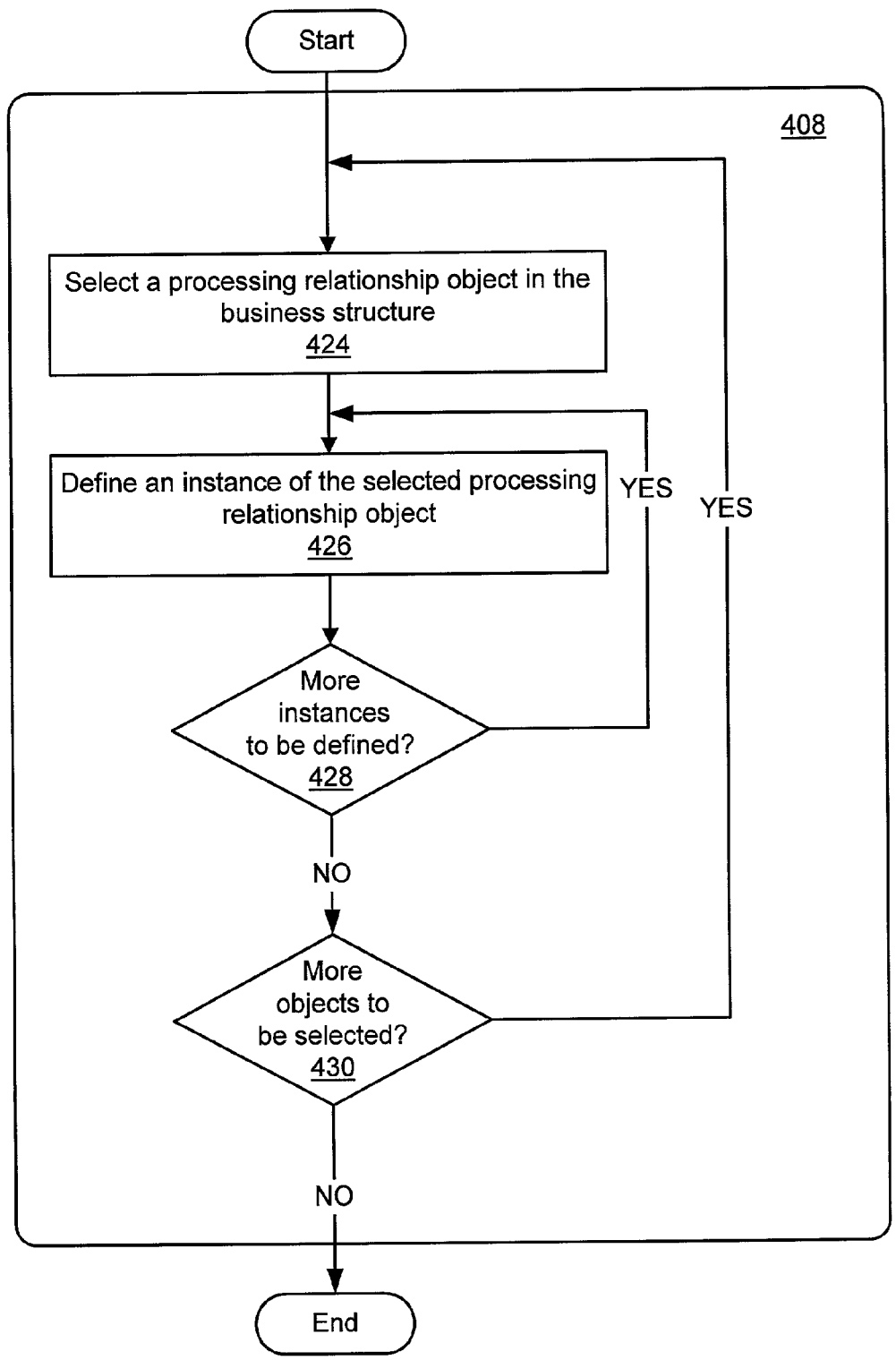
FIG. A-10d

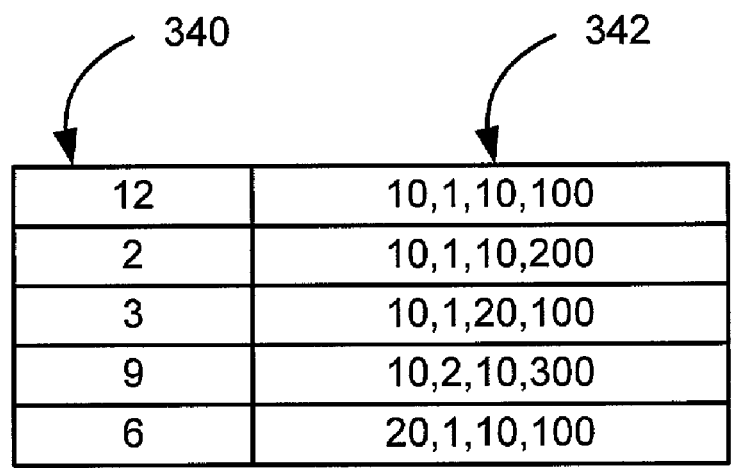
FIG. A-11

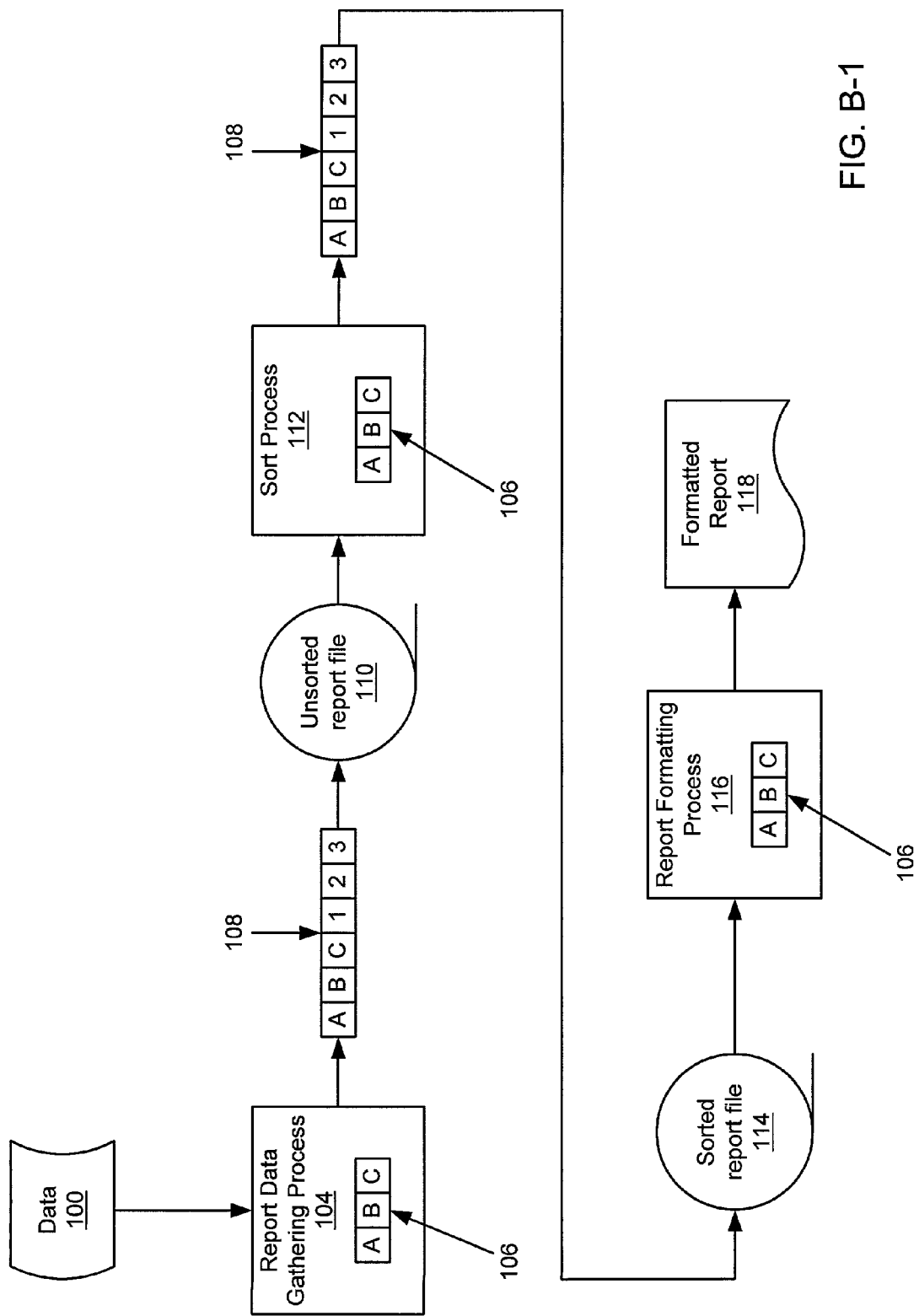
FIG. B-1

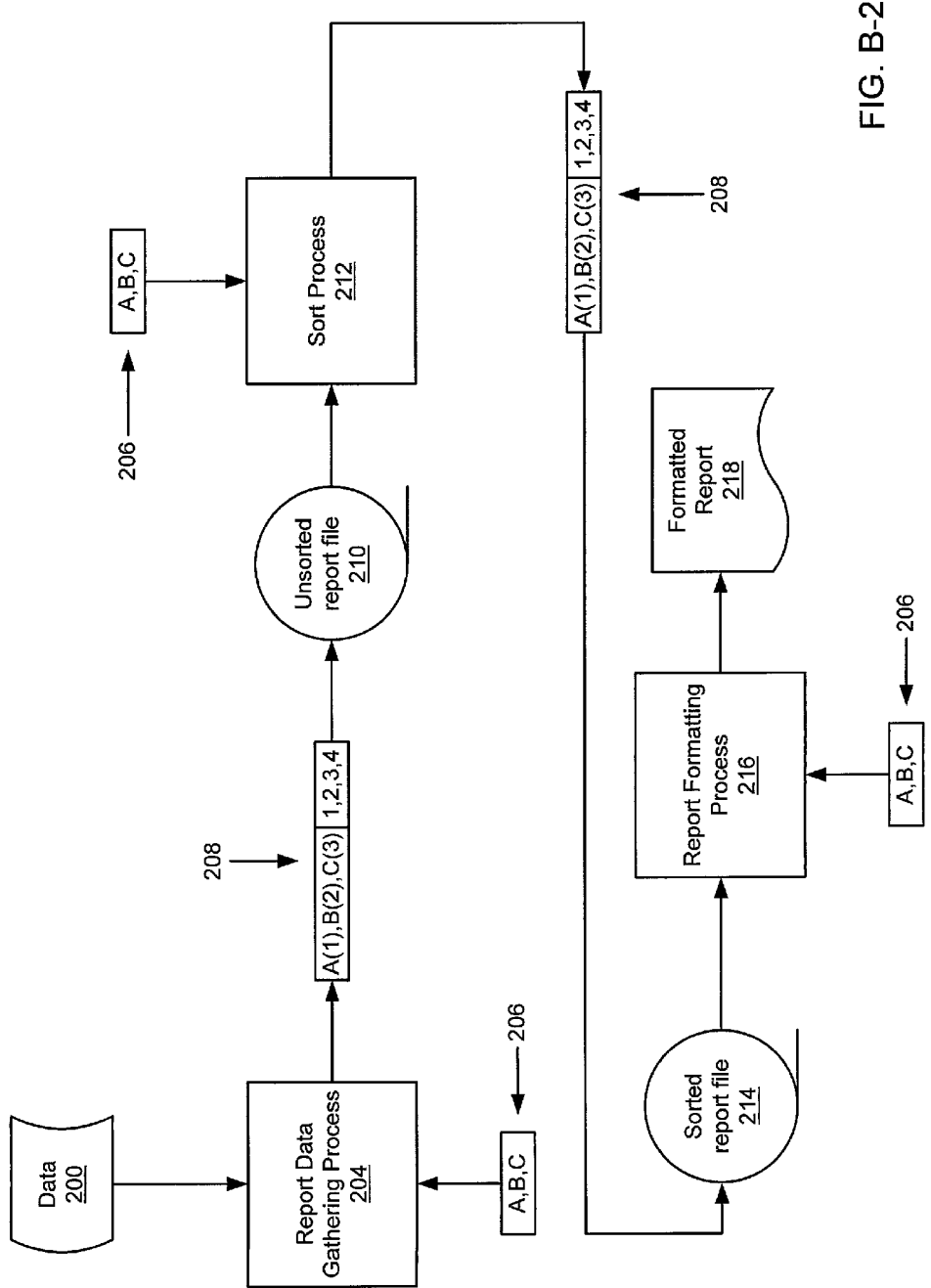
FIG. B-2

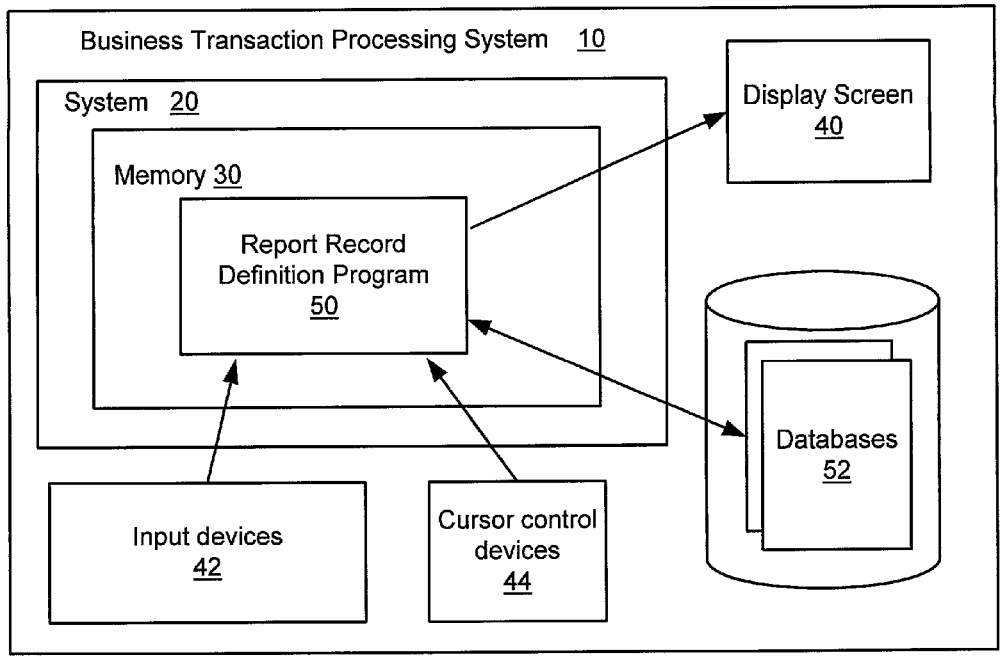
FIG. B-3a
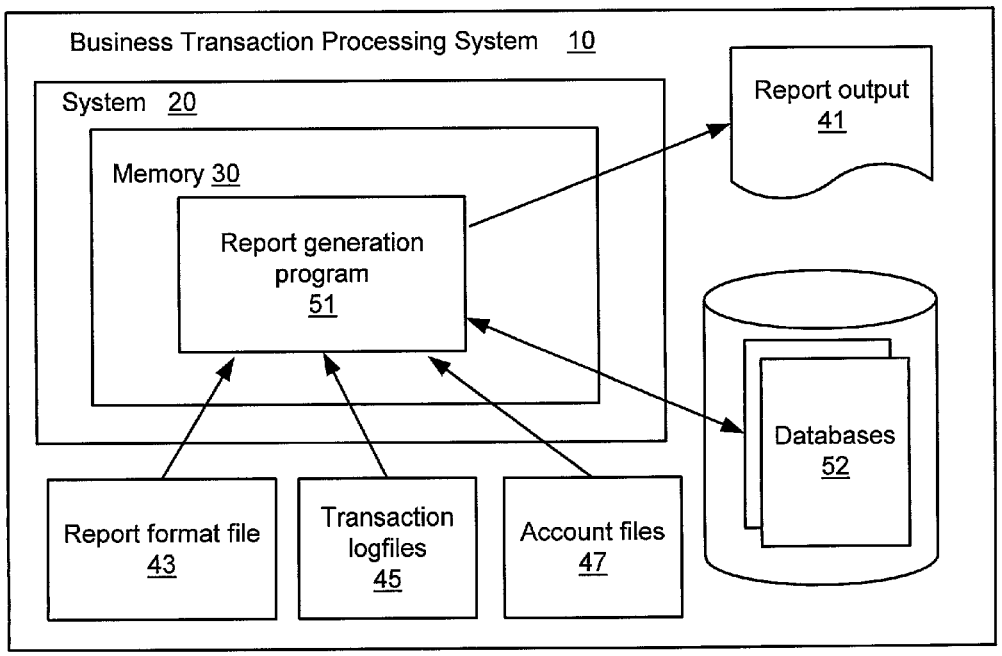
FIG. B-3b

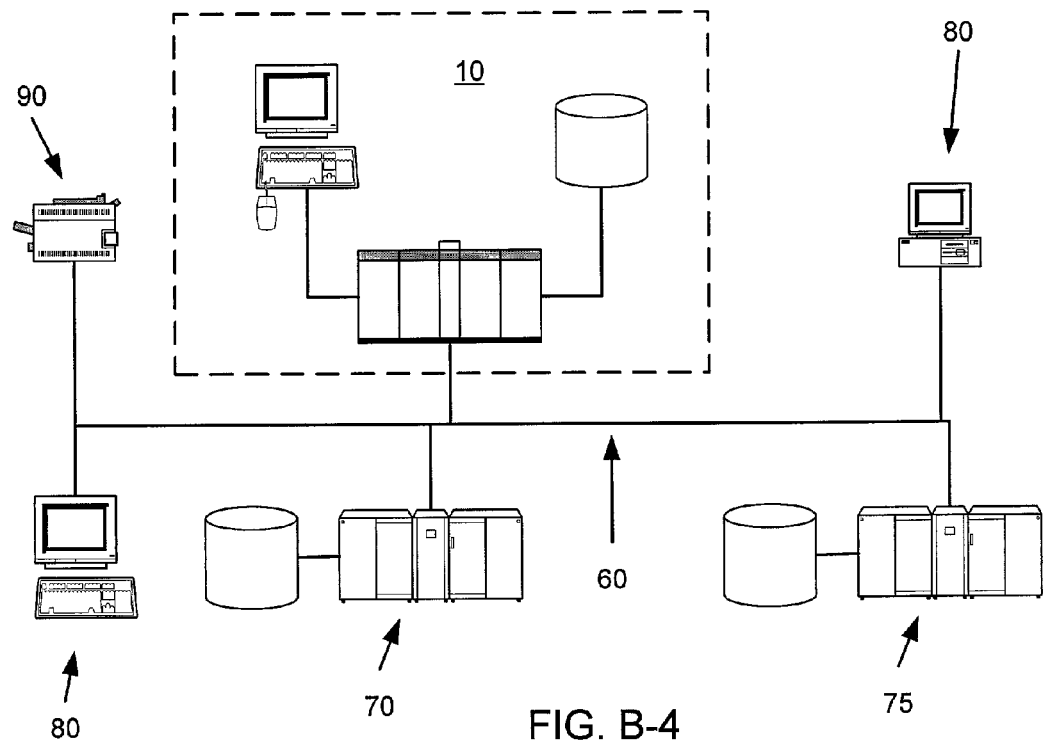
FIG. B-4

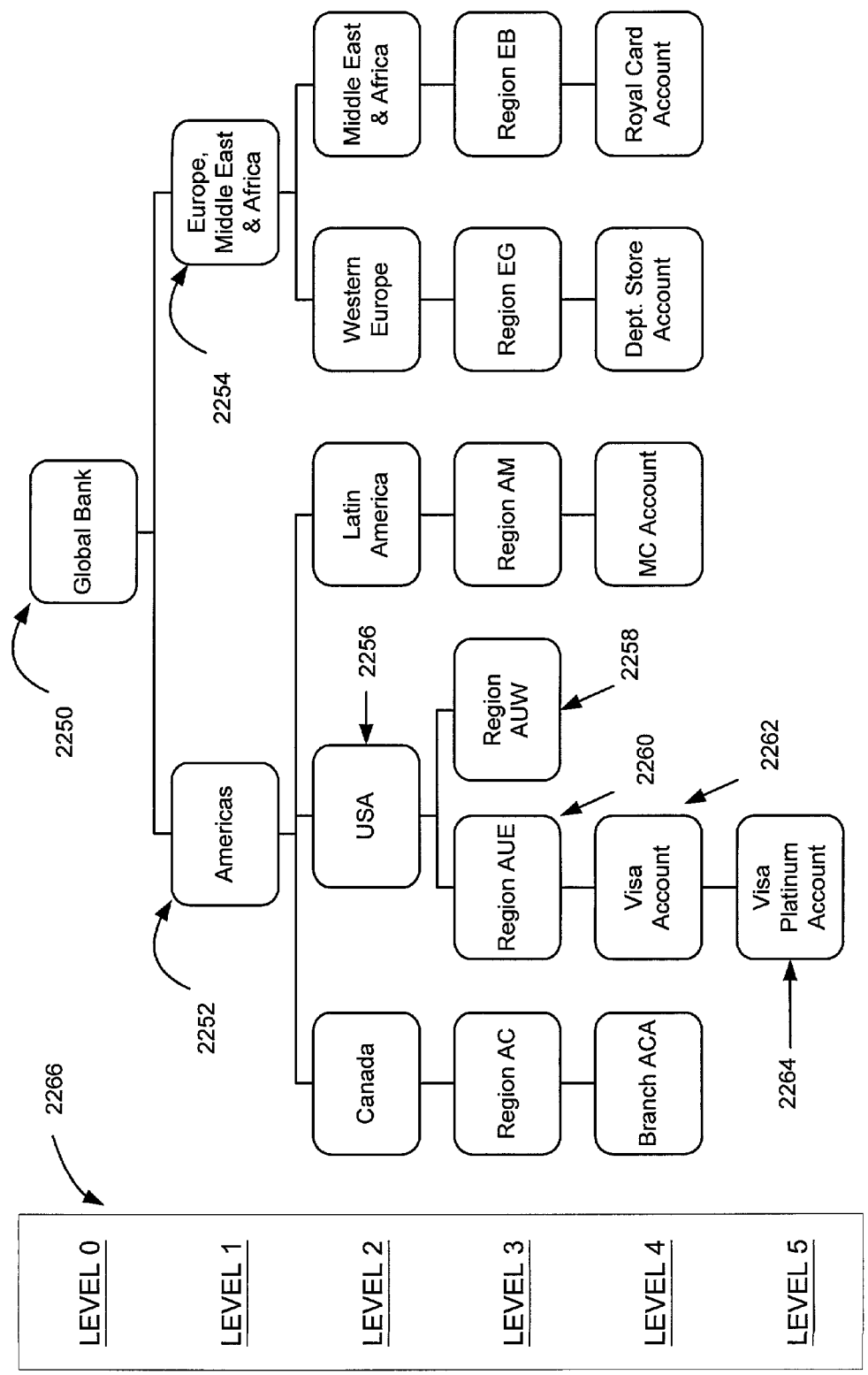
FIG. B-5a

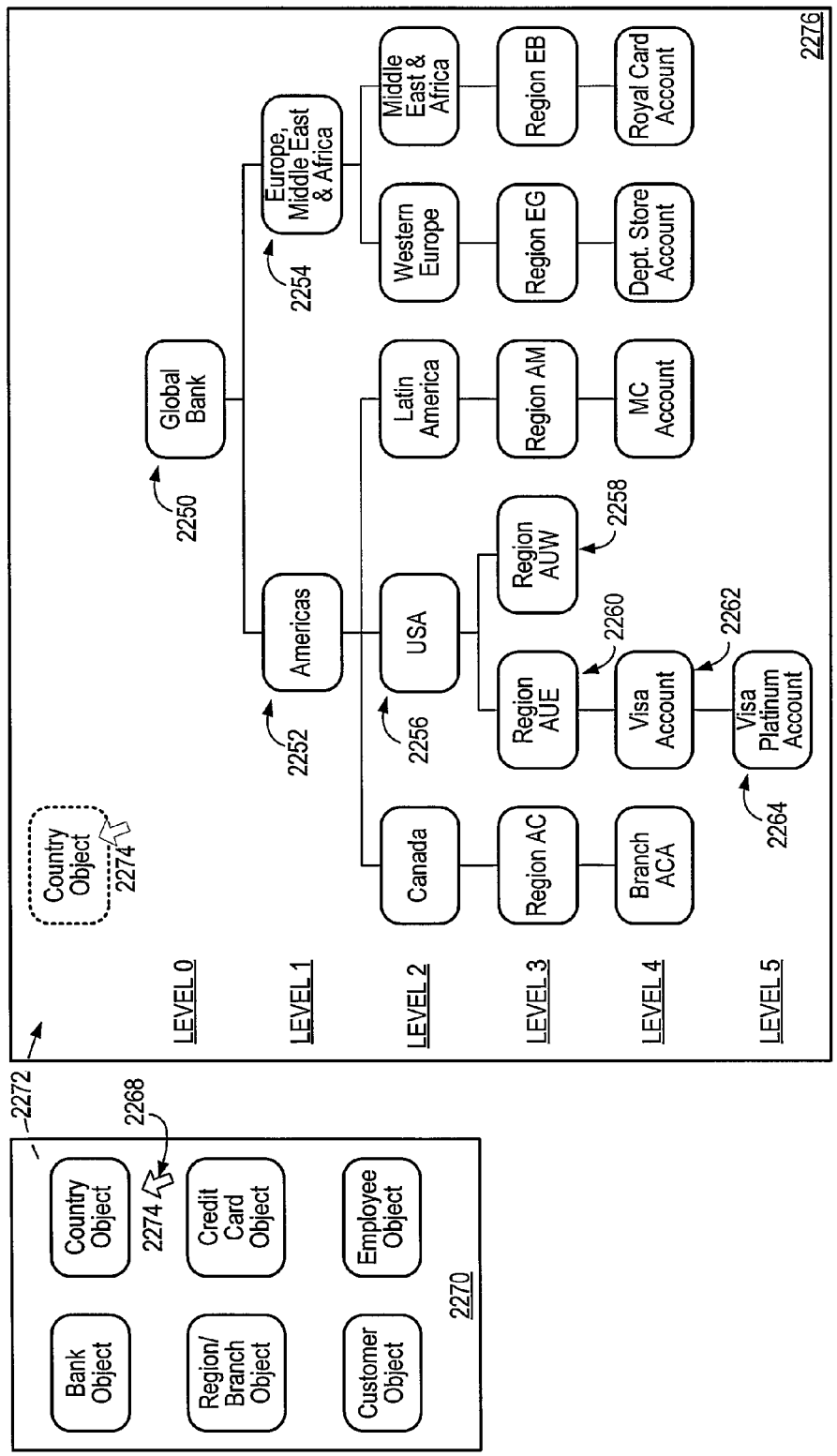
FIG. B-5b

| SEQ | ELEM-ID CONSTANT | LEVEL | ELEM-ID | ABBREV | DESCRIPTION |
|---|---|---|---|---|---|
| 0 | GBANK | 0 | D2250 | GBANK | GLOBAL BANK CORPORATION |

FIG. B-5c

| SEQ | ELEM-ID CONSTANT | LEVEL | ELEM-ID | ABBREV | DESCRIPTION |
|---|---|---|---|---|---|
| 0 | GBANK | 0 | D2250 | GBANK | GLOBAL BANK CORPORATION |
| 1 | AMERICA | 1 | D2252 | AMR | AMERICAS BUSINESS UNIT |

FIG. B-5d

| SEQ | ELEM-ID CONSTANT | LEVEL | ELEM-ID | ABBREV | DESCRIPTION |
|---|---|---|---|---|---|
| 0 | GBANK | 0 | D2250 | GBANK | GLOBAL BANK CORPORATION |
| 1 | AMERICA | 1 | D2252 | AMR | AMERICAS BUSINESS UNIT |
| 2 | EMA | 1 | D2254 | EMA | EUROPE, MID. EAST & AFRICA BUSINESS UNIT |

FIG. B-5e

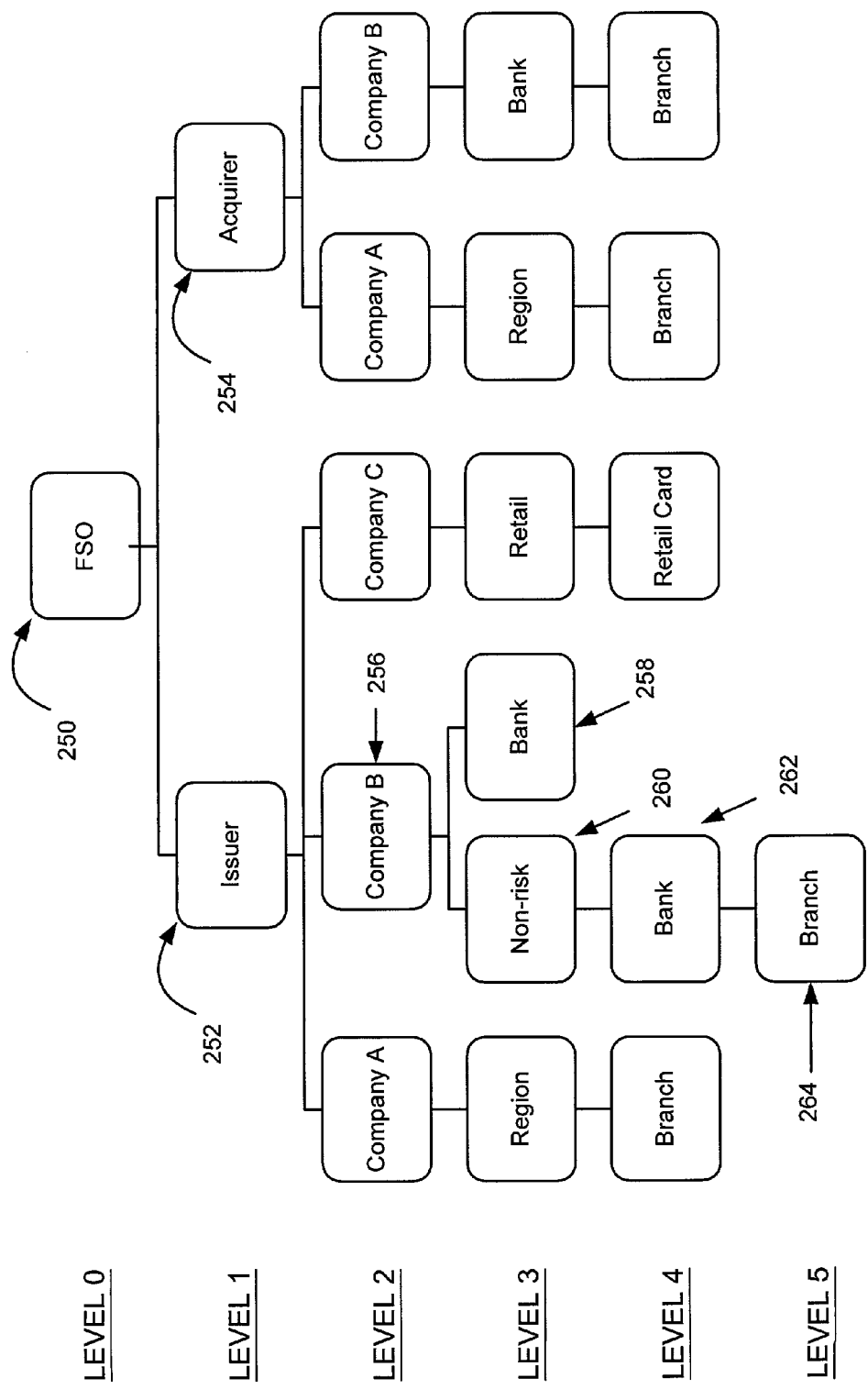
FIG. B-5f

| SEQ | ELEM-ID CONSTANT | LEVEL | ELEM-ID | ABBREV | DESCRIPTION |
|---|---|---|---|---|---|
| 1 | ISSUER | 1 | D1000 | ISS | ISSUER SUBSYS ID |
| 2 | COMPANYA | 2 | D1001 | COA | COMPANY A |
| 3 | REGION | 3 | D1002 | RGN | REGIONAL OFFICE |
| 4 | BRANCH | 4 | D1003 | BRN | BRANCH OFFICE |
| 5 | COMPANYB | 2 | D1011 | COB | COMPANY B |
| 6 | NONRISK | 3 | D1012 | NON | NON-RISK ACCOUNTS |
| 7 | BANK | 4 | D1013 | BNK | NON-RISK BANK |
| 8 | BRANCH | 5 | D1014 | BRN | BANK BRANCH |
| 9 | BANK | 3 | D1021 | BNK | BANK |
| 10 | COMPANYC | 2 | D1031 | COC | COMPANY C |
| 11 | RETAIL | 3 | D1032 | RET | RETAIL STORE |
| 12 | RETAILCARD | 4 | D1033 | RTC | PRIVATE-LABEL CREDIT CARD |
| 13 | ACQUIRER | 1 | D2000 | ACQ | ACQUIRER SUBSYS ID |
| 14 | COMPANYA | 2 | D2001 | COA | COMPANY A |
| 15 | REGION | 3 | D2002 | RGN | REGIONAL OFFICE |
| 16 | BRANCH | 4 | D2003 | BRN | BRANCH OFFICE |
| 17 | COMPANYB | 2 | D2011 | COB | COMPANY B |
| 18 | BANK | 3 | D2012 | BNK | BANK |
| 19 | BRANCH | 4 | D2013 | BRN | BANK BRANCH |

150

152 → SEQ
154 → ELEM-ID CONSTANT
156 → LEVEL
158 → ELEM-ID
160 → ABBREV
162 → DESCRIPTION

FIG. B-6

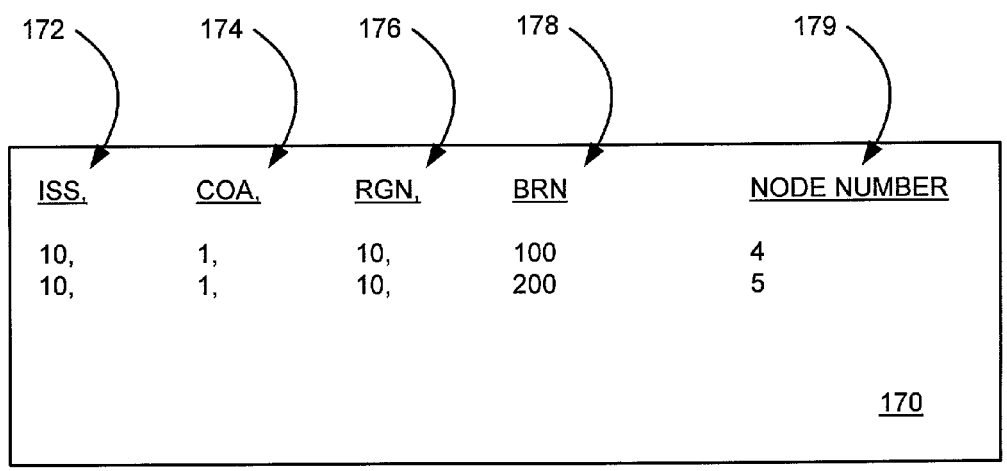
FIG. B-7

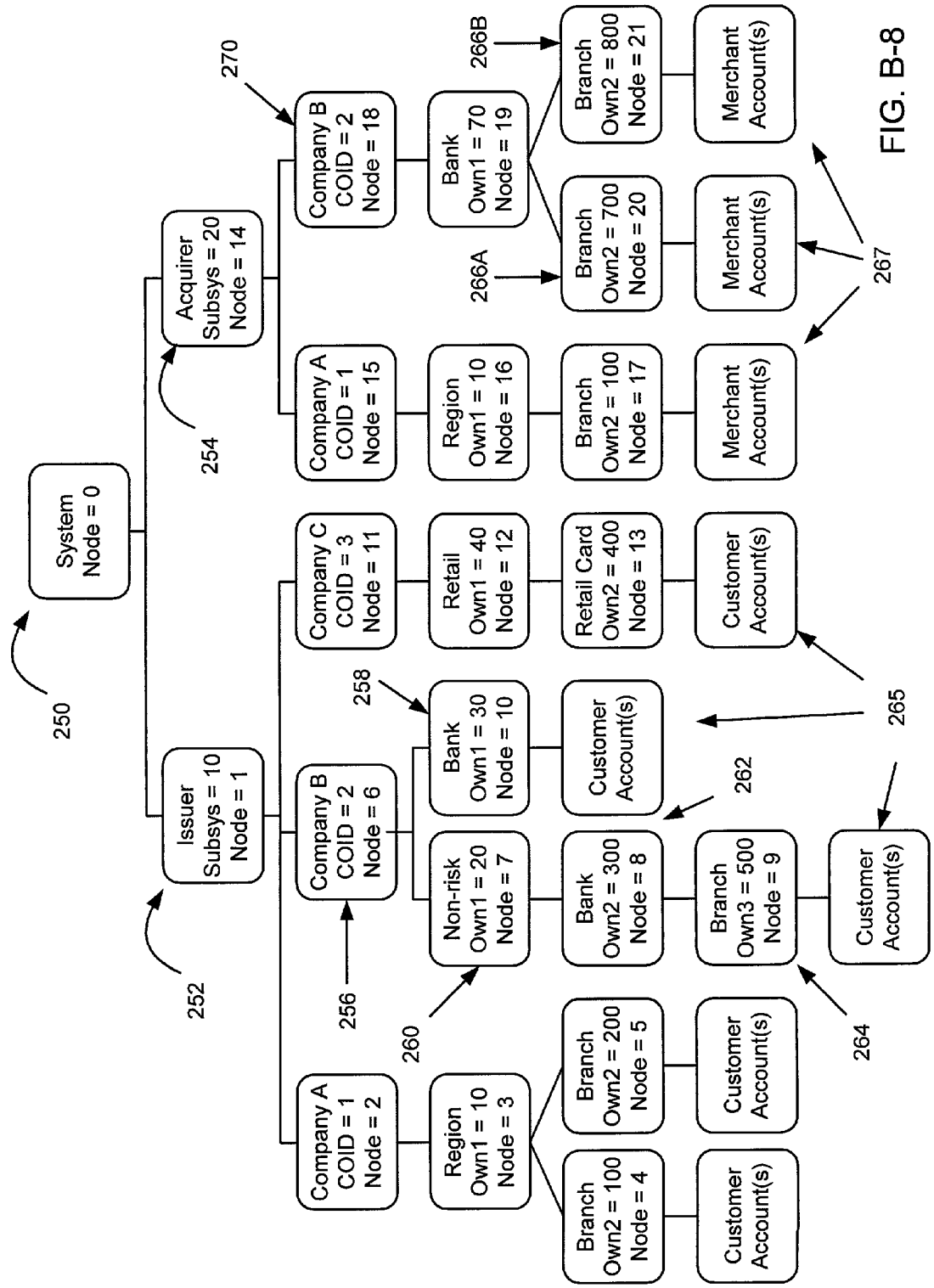
FIG. B-8

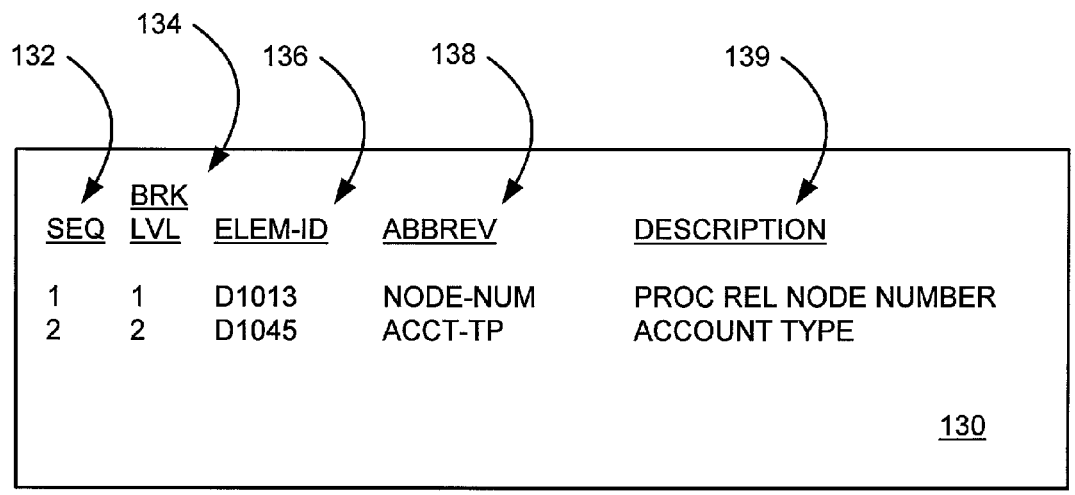
FIG. B-9

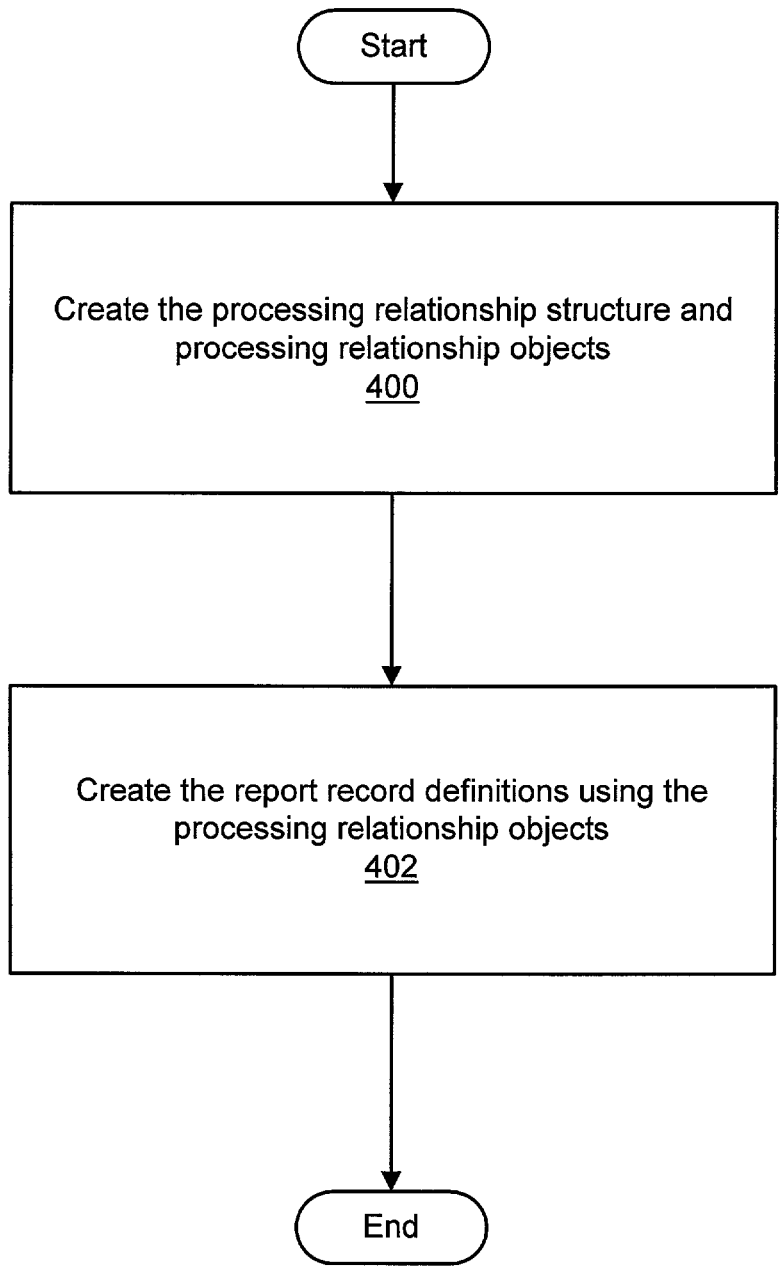
FIG. B-10a

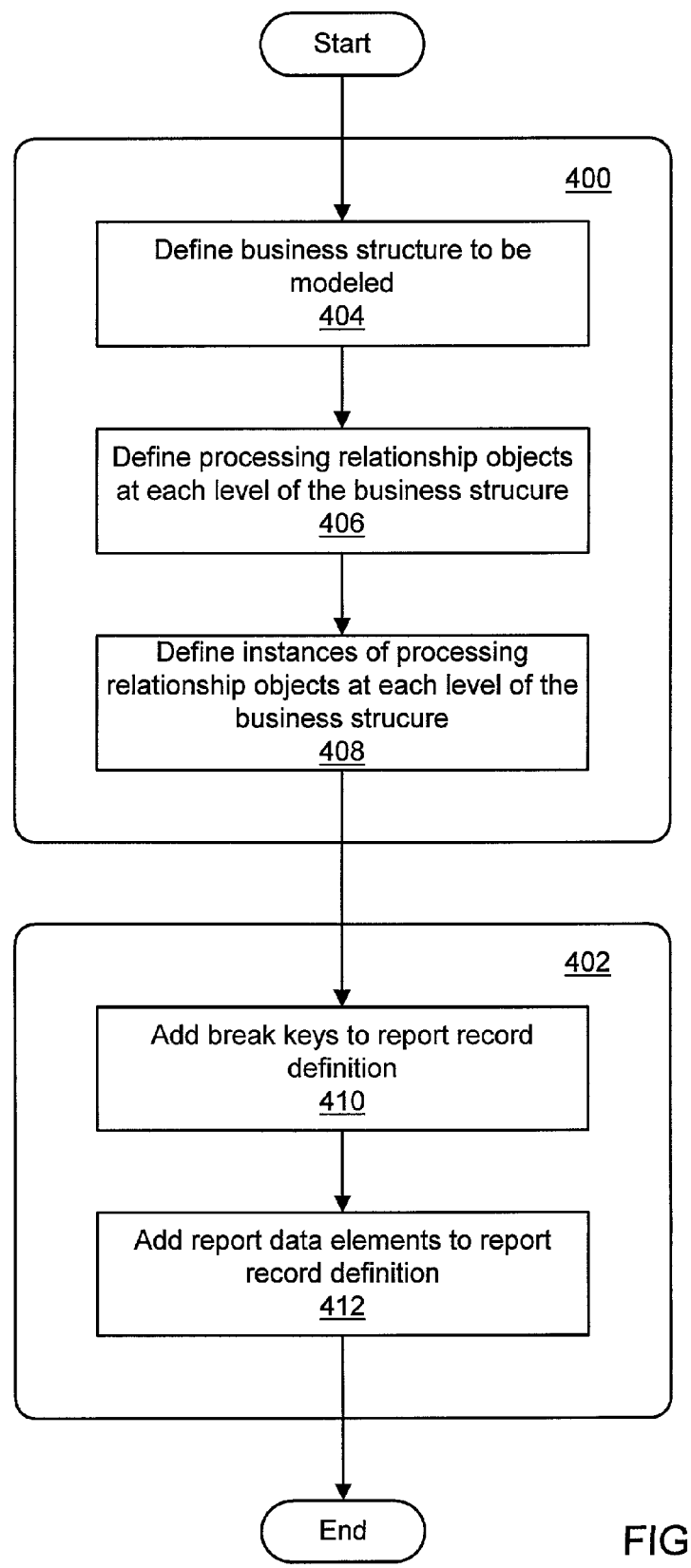
FIG. B-10b

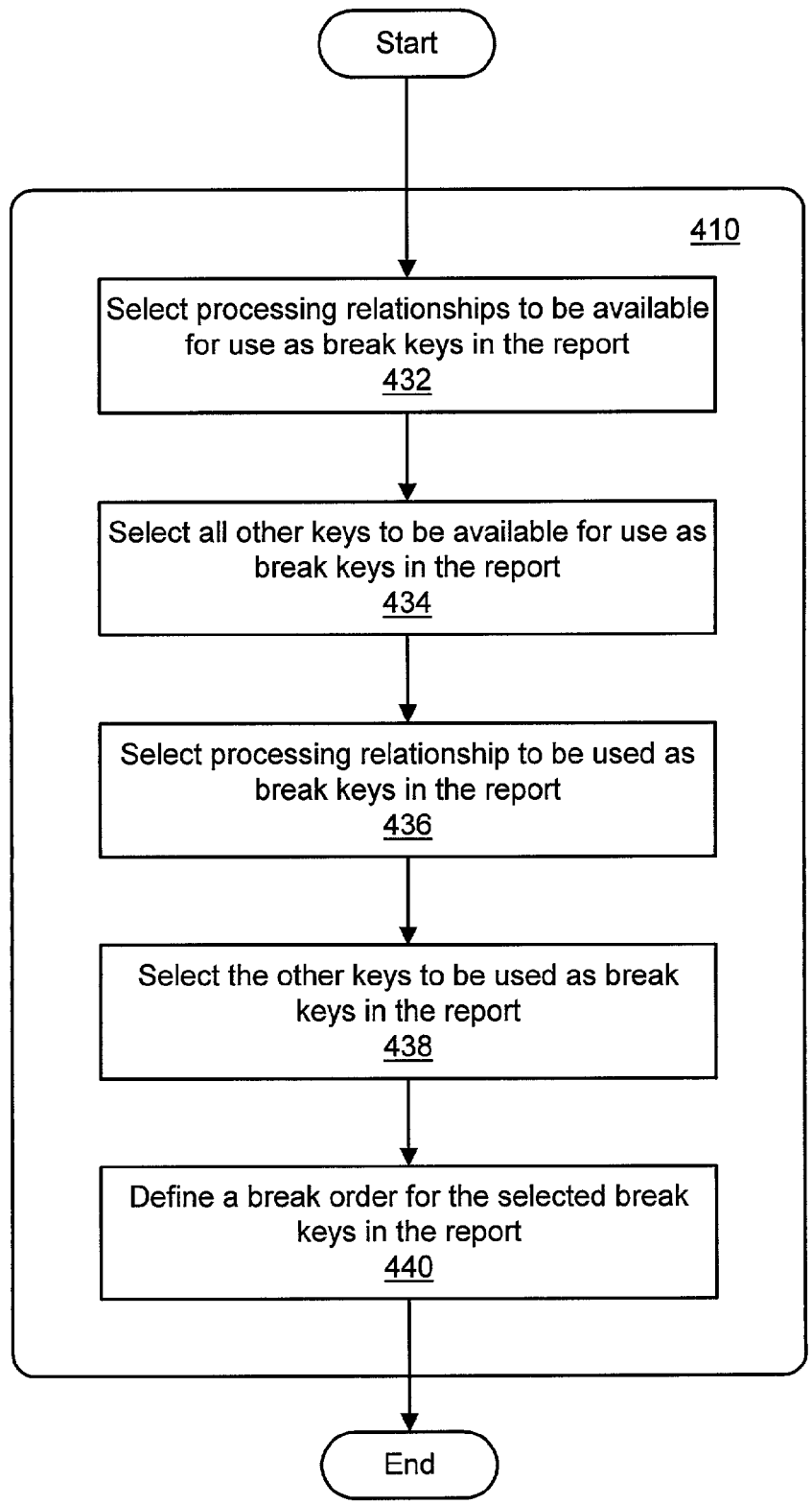
FIG. B-10c

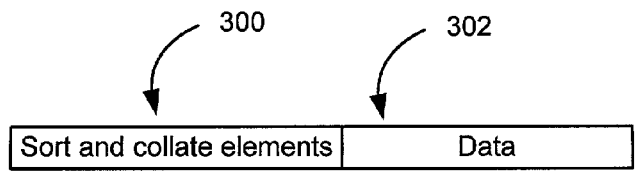
FIG. B-11a
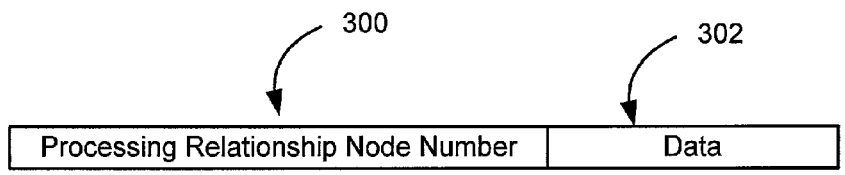
FIG. B-11b
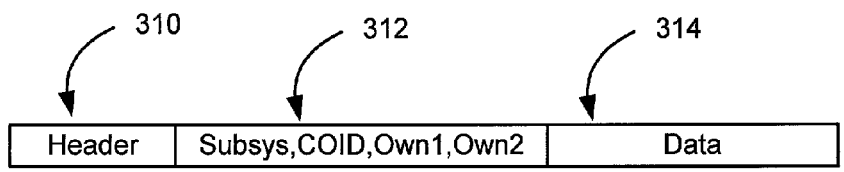
FIG. B-11c
| 310 | 312 | 314 | 304 |
|---|---|---|---|
| Header | 10,1,10,200 | Data | |
| Header | 10,1,10,100 | Data | |
| Header | 10,1,10,100 | Data | |
| Header | 10,1,20,100 | Data | |
| Header | 10,2,10,300 | Data | FIG. B-11d |
| Header | 10,1,10,200 | Data | |
| Header | 20,1,10,100 | Data | |
| Header | 10,1,10,100 | Data | |
| 310 | 312 | 314 |
|---|---|---|
| Header | 10,1,10,100 | Data |
| Header | 10,1,10,100 | Data |
| Header | 10,1,10,100 | Data |
| Header | 10,1,10,200 | Data |
| Header | 10,1,10,200 | Data |
| Header | 10,1,20,100 | Data |
| Header | 10,2,10,300 | Data |
| Header | 20,1,10,100 | Data |
FIG. B-11e

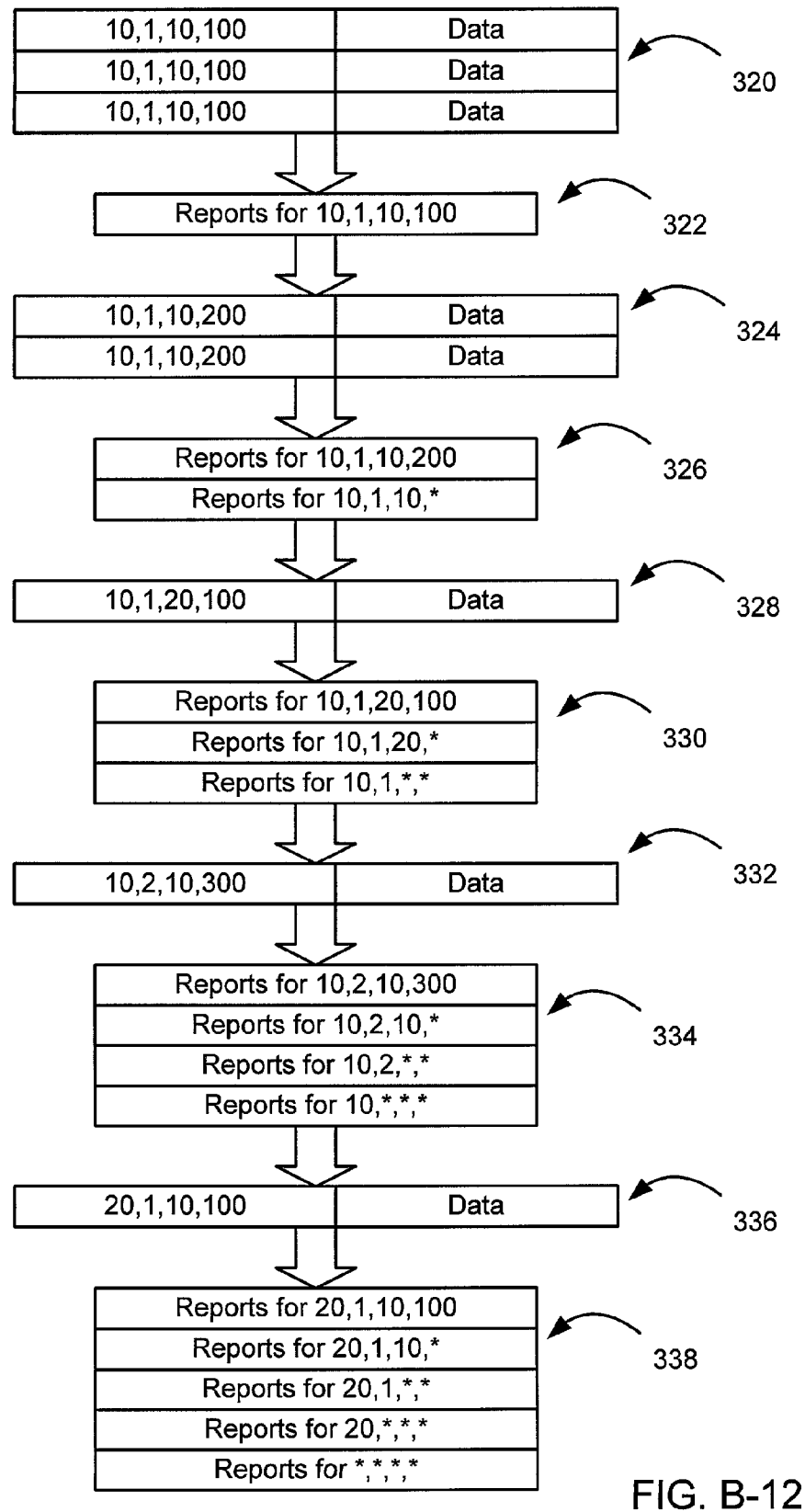
FIG. B-12

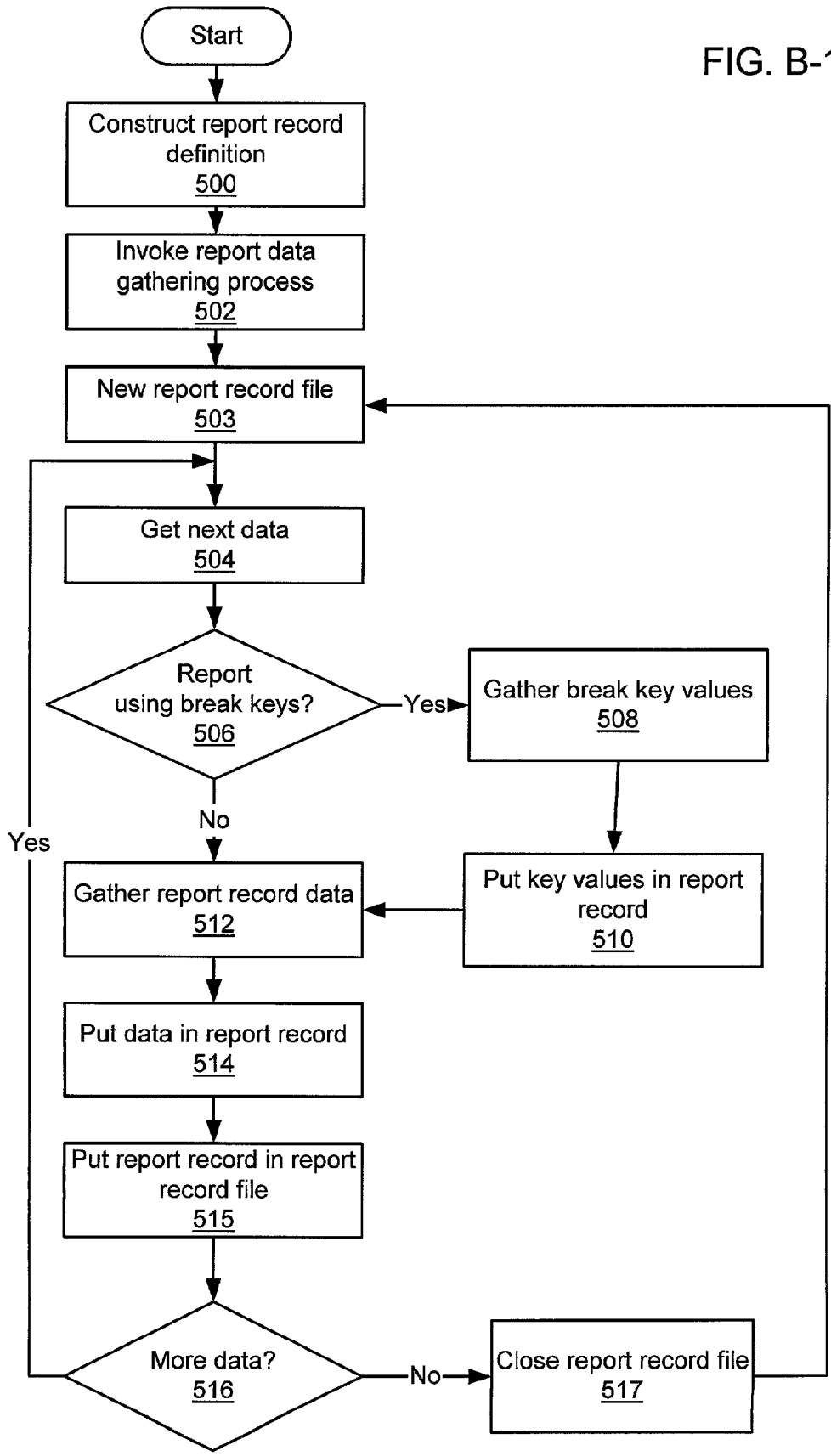
FIG. B-13a

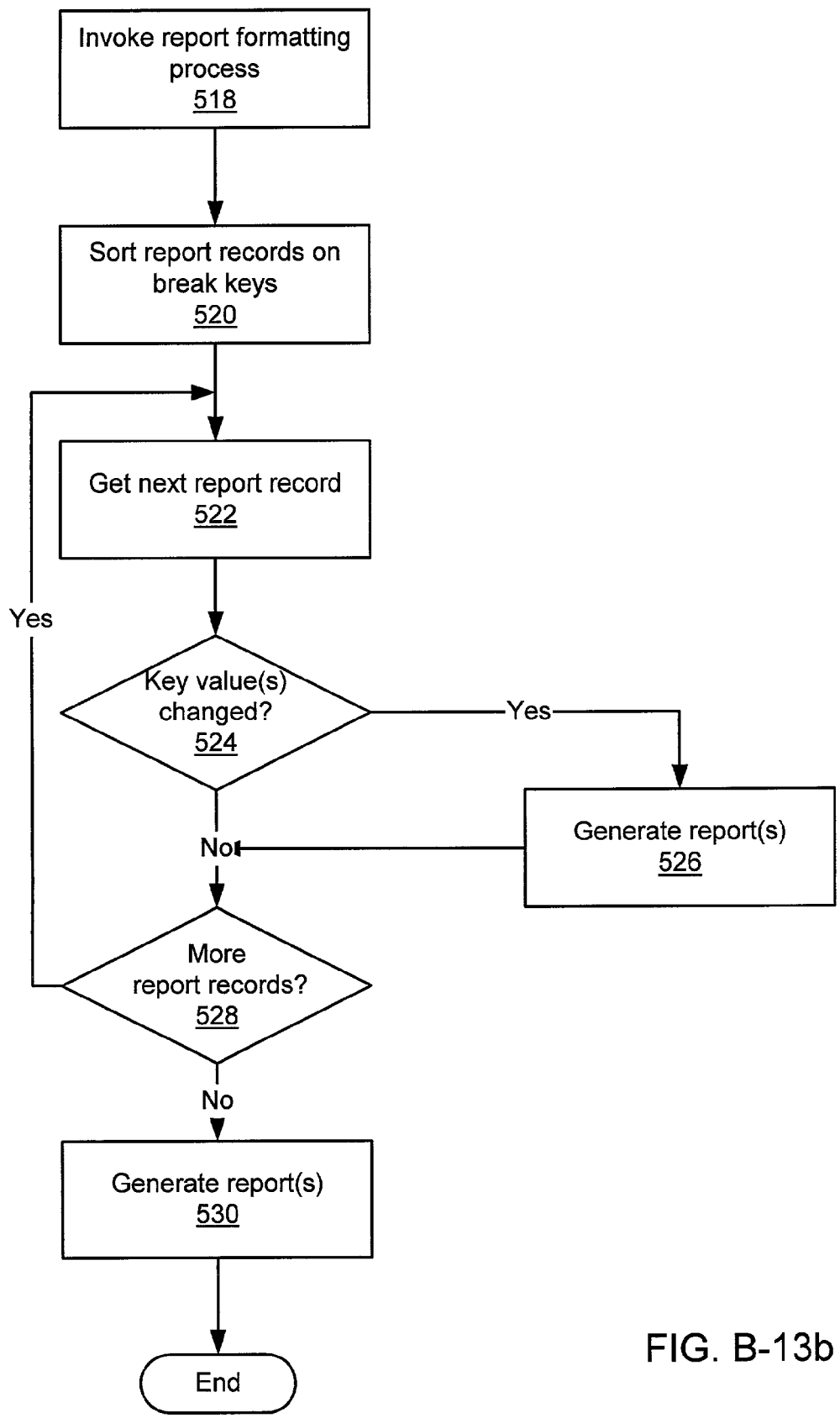
FIG. B-13b

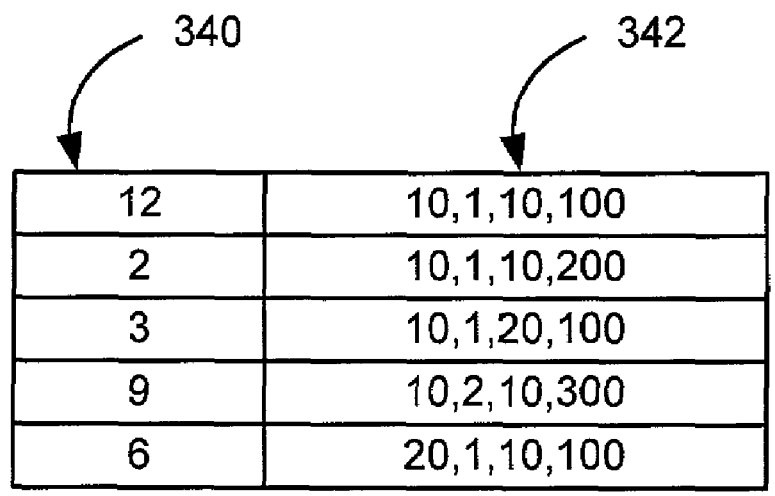
FIG. B-14

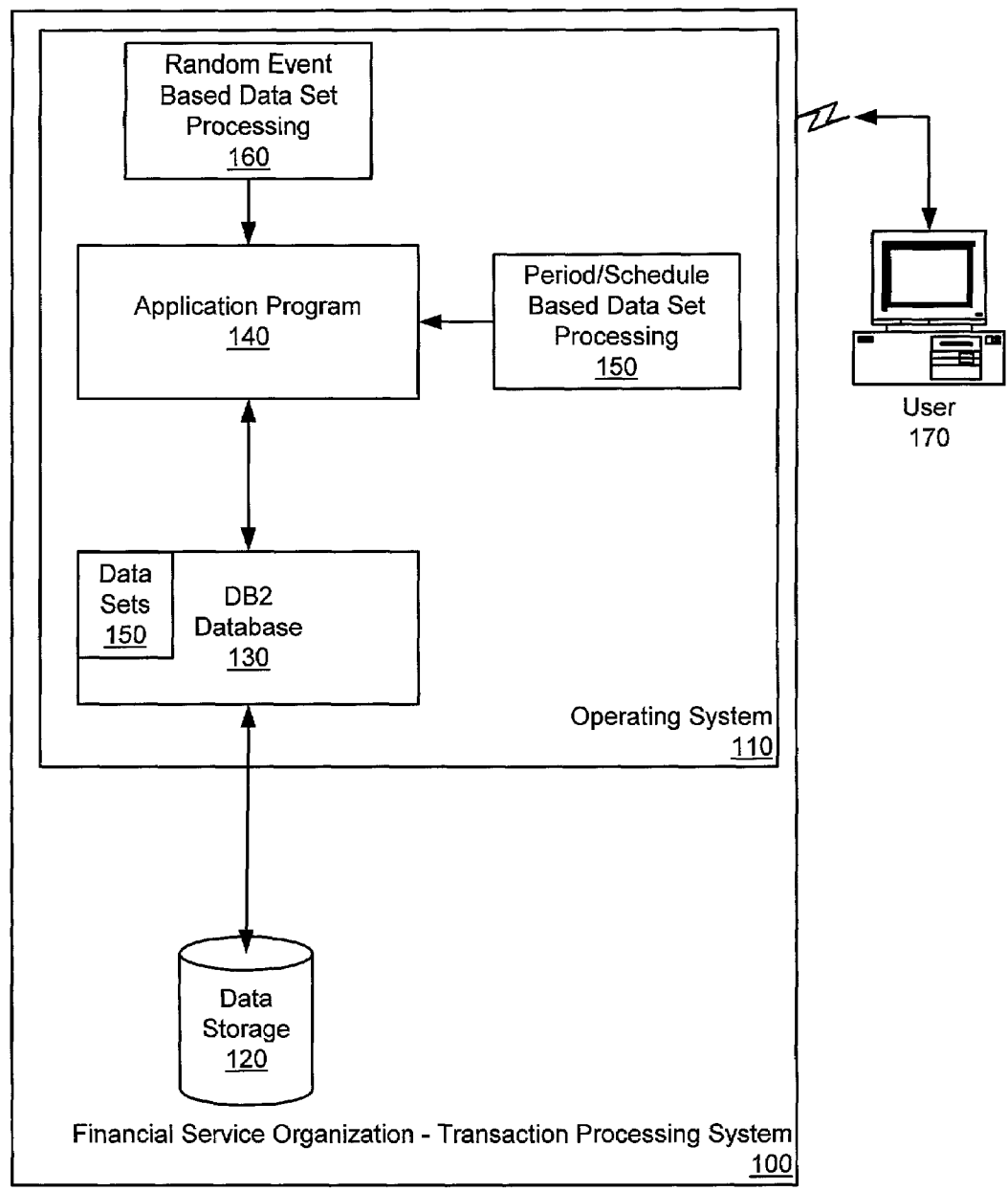
Prior Art
Figure C-1

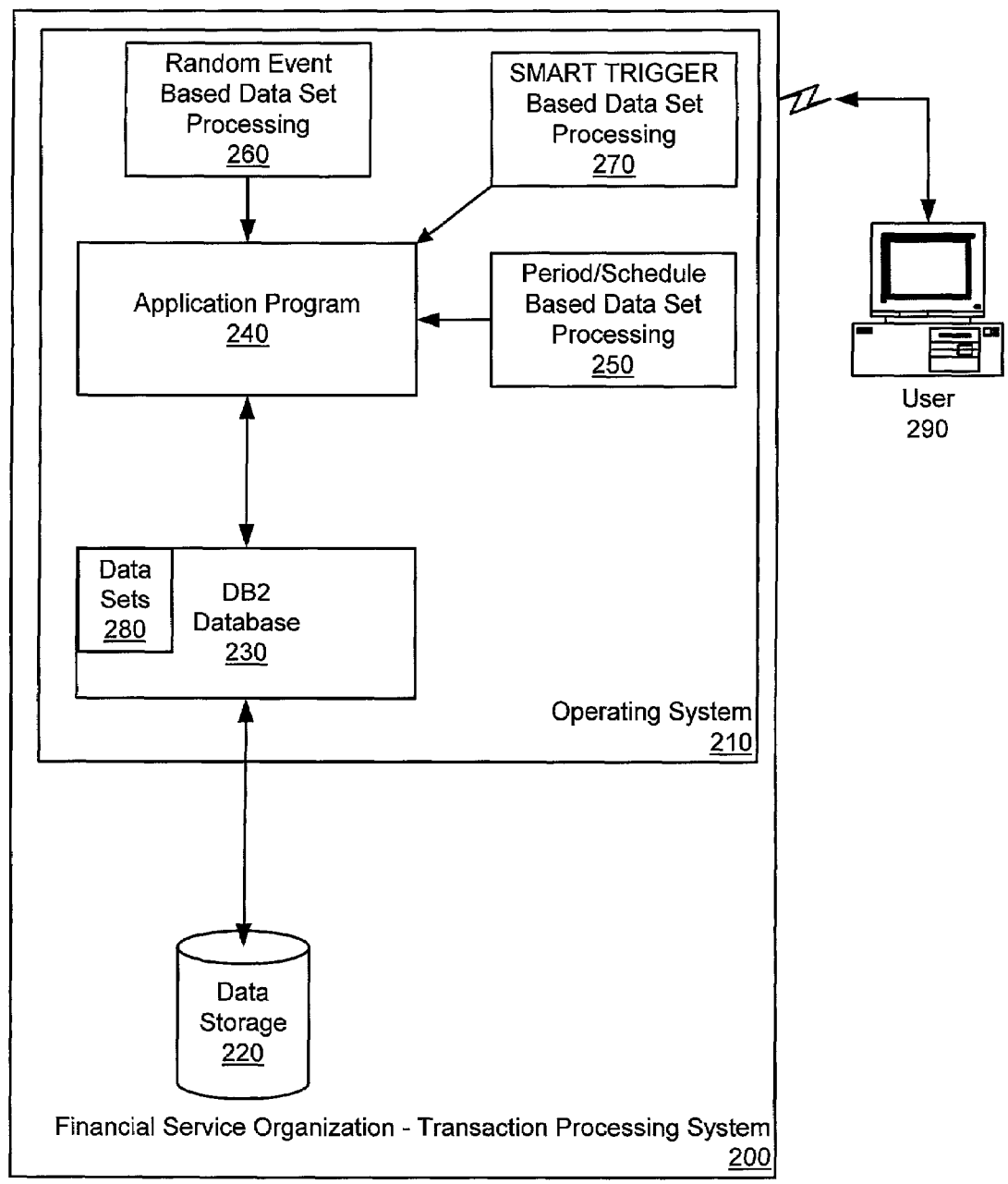
Figure C-2

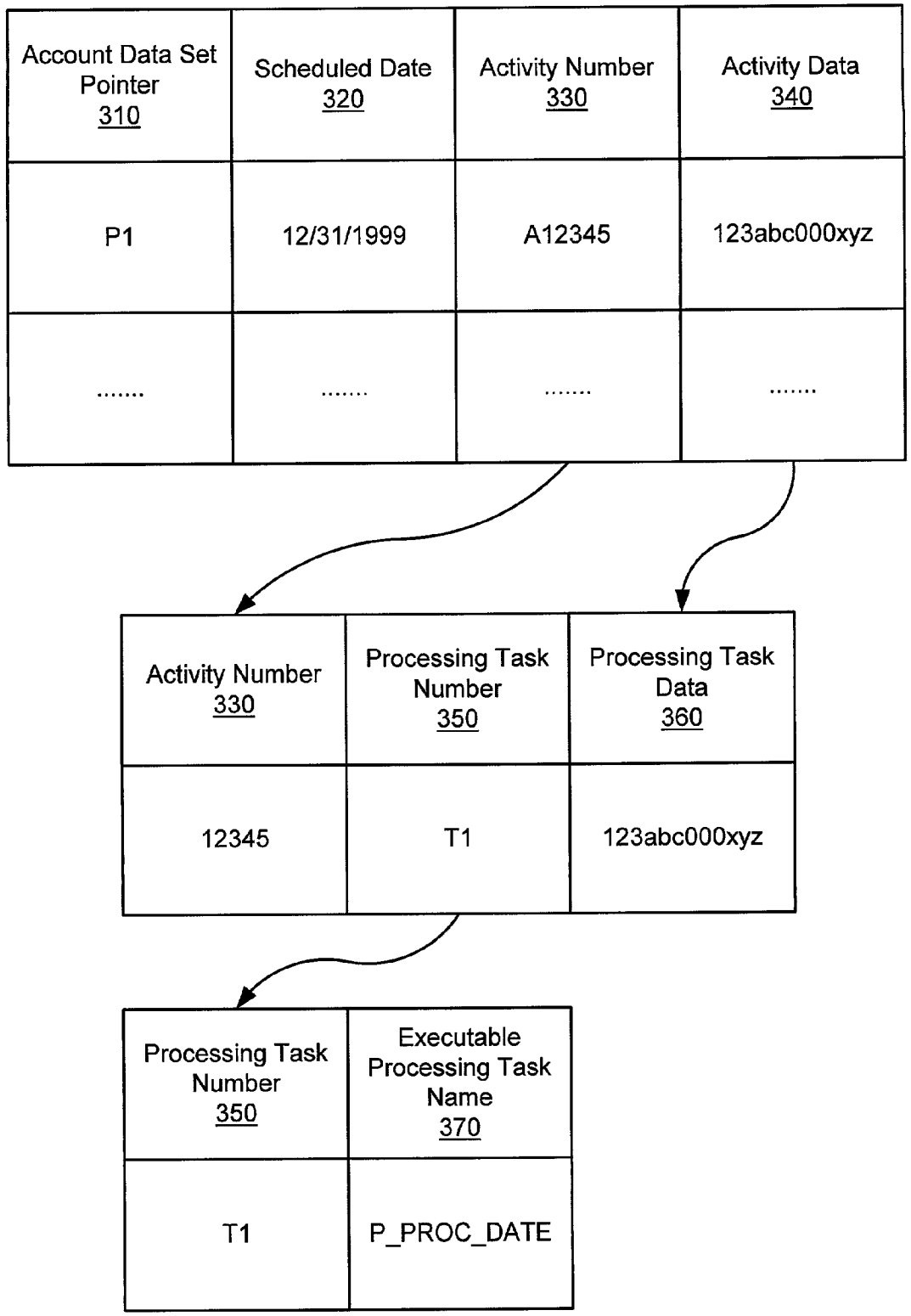
Figure C-3a

| Todays Date 380 | Scheduled Date 320 | Account Data Set Pointer List 310 |
|---|---|---|
| 12/31/1999 | 12/31/1999 | A12345 |
| ....... | ....... | ....... |
| ....... | ....... | A12399 |

Figure C-3b

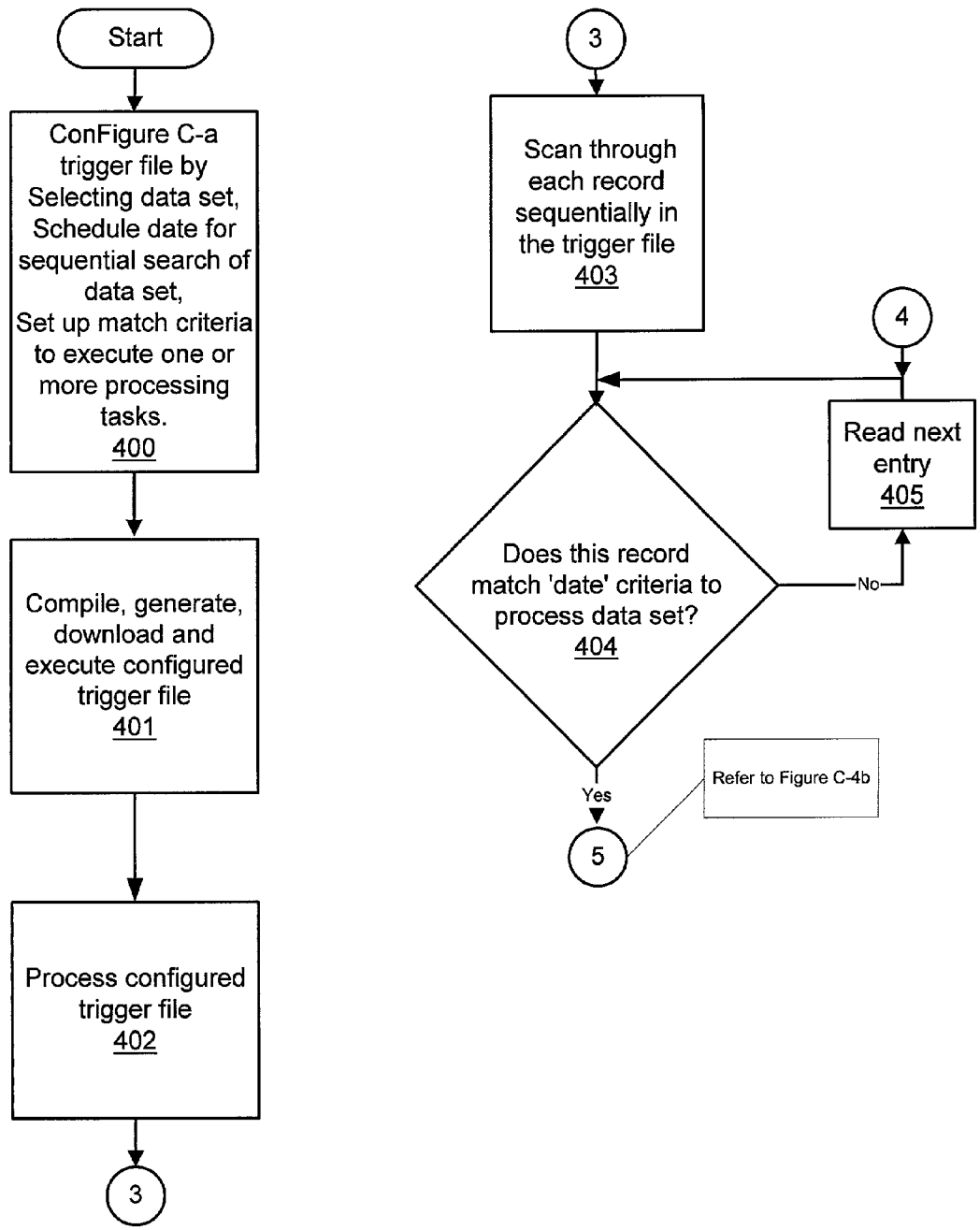
Figure C-4a
PRIOR ART

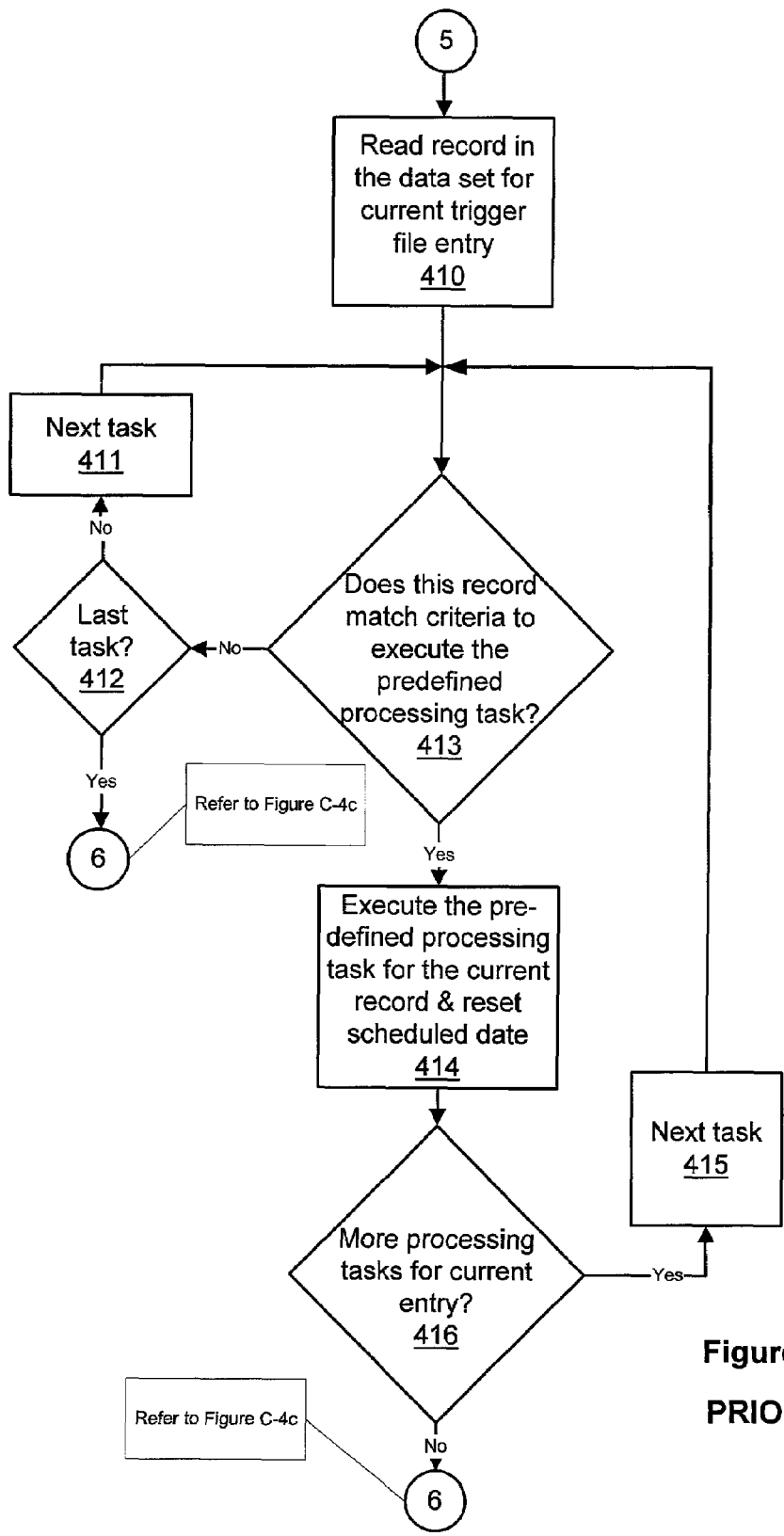
Figure C-4b
PRIOR ART

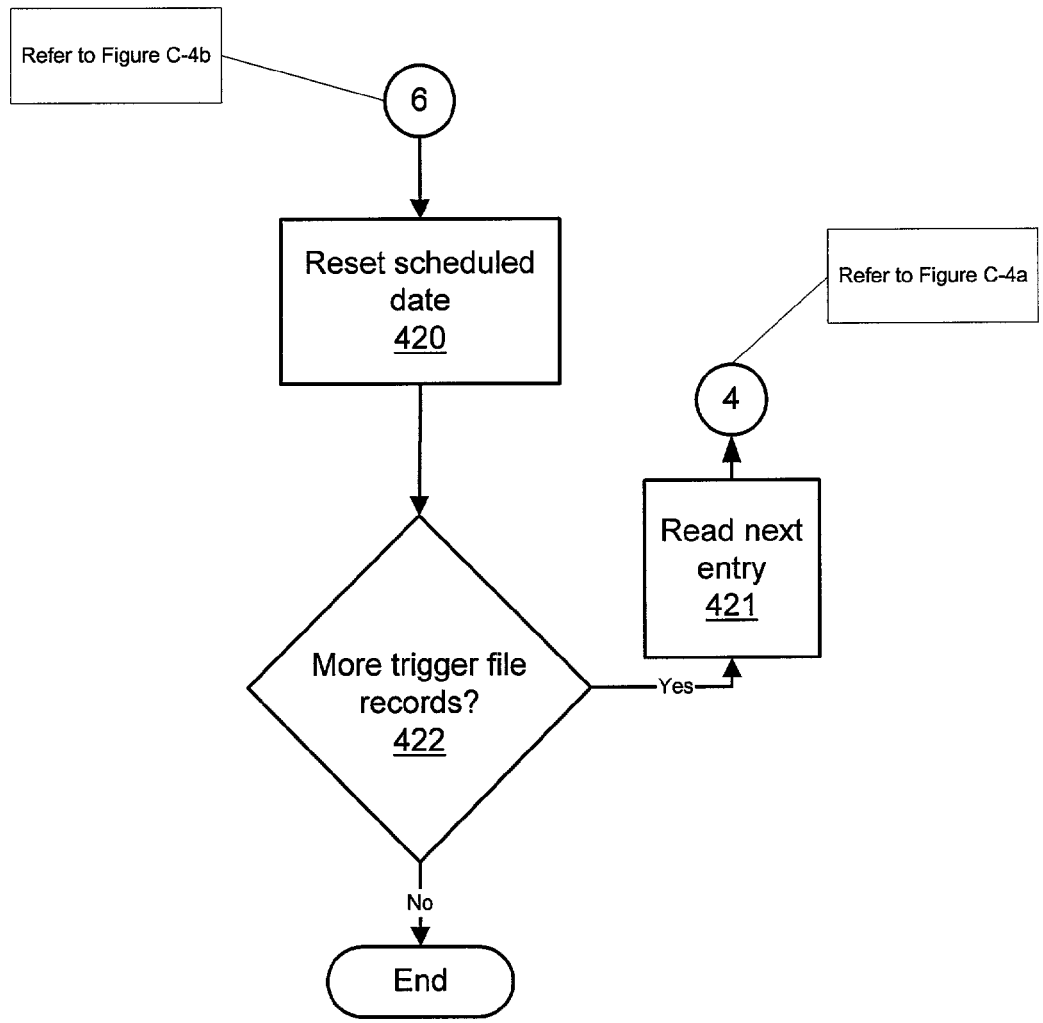
Figure C-4c
PRIOR ART

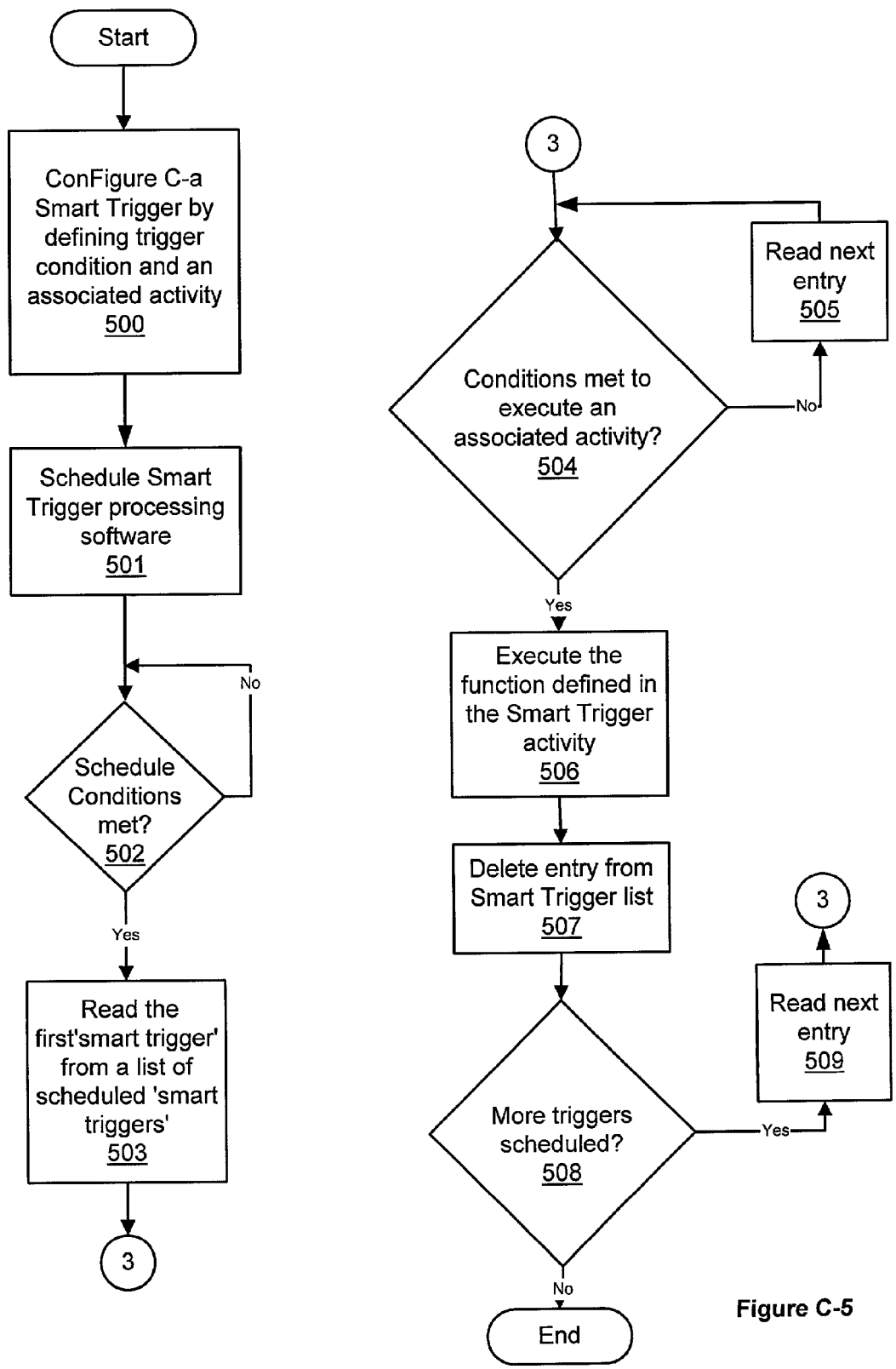
Figure C-5

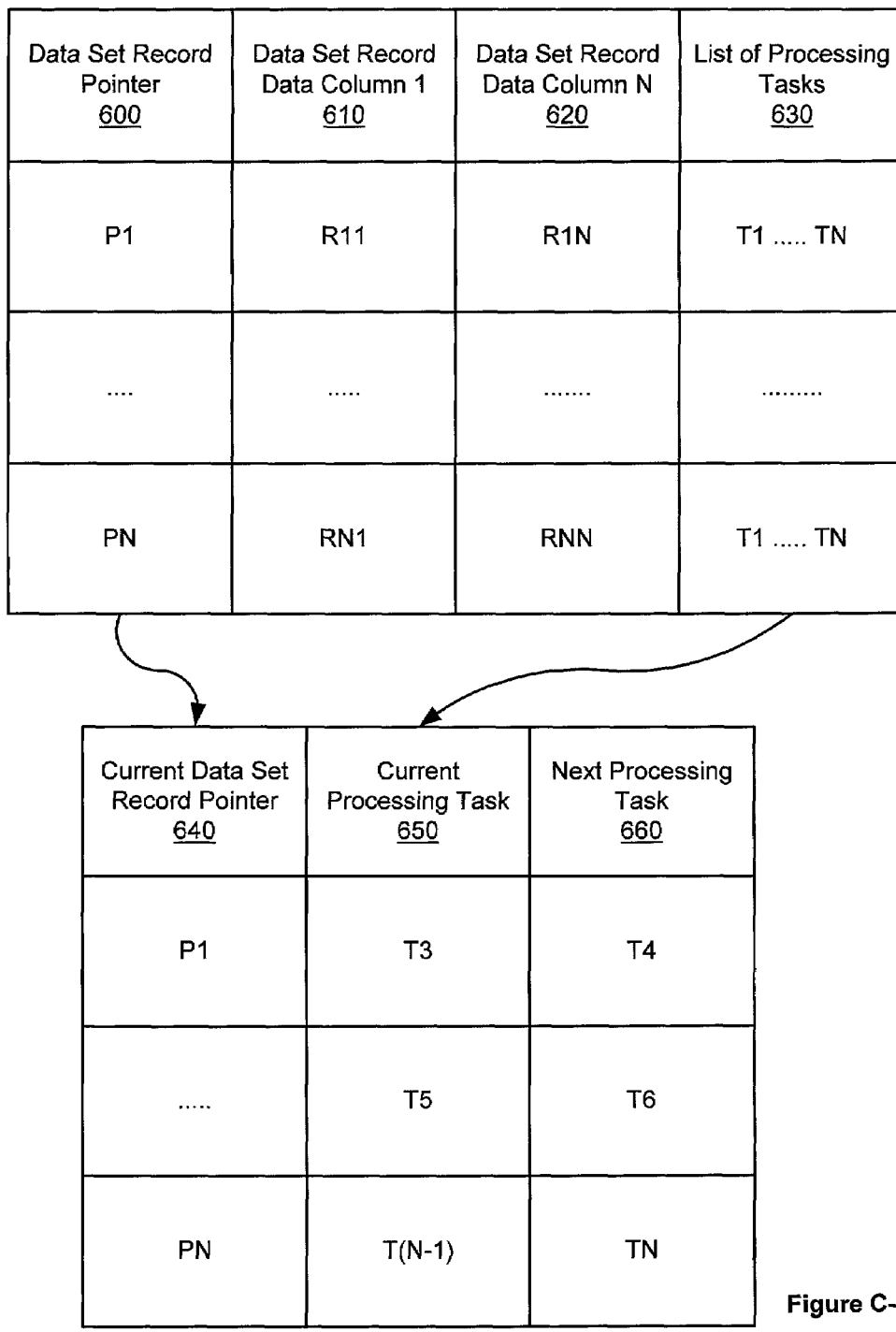
Figure C-6
PRIOR ART

| Current Data Set Record Pointer 700 | Processing Task Number 710 |
|---|---|
| P2 | T1 |
| P5 | T1 |
| PN | T1 |

| Current Data Set Record Pointer | Processing Task Number |
|---|---|
| P1 | T2 |
| P3 | T2 |
| PN | T2 |

| Current Data Set Record Pointer | Processing Task Number |
|---|---|
| P7 | T(N-1) |
| P11 | T(N-1) |
| PN | T(N-1) |

| Current Data Set Record Pointer | Processing Task Number |
|---|---|
| P4 | TN |
| P9 | TN |
| PN | TN |

Figure C-7

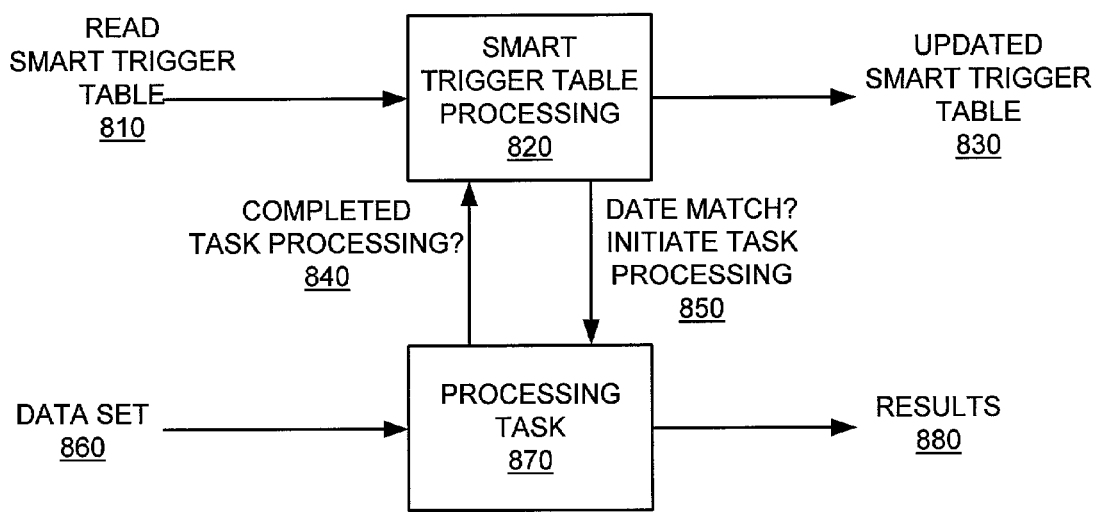
Figure C-8

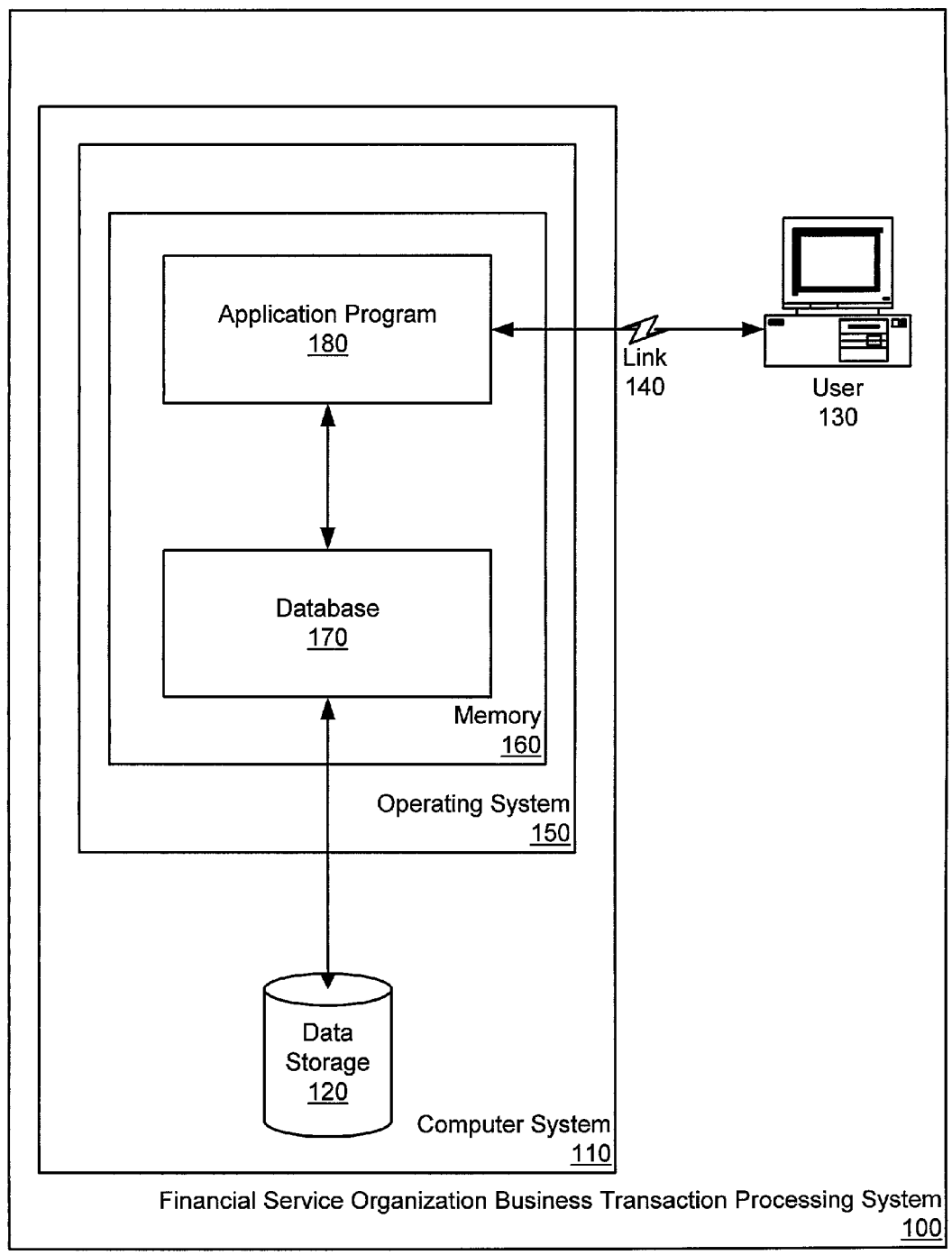
Figure D-1
Prior Art

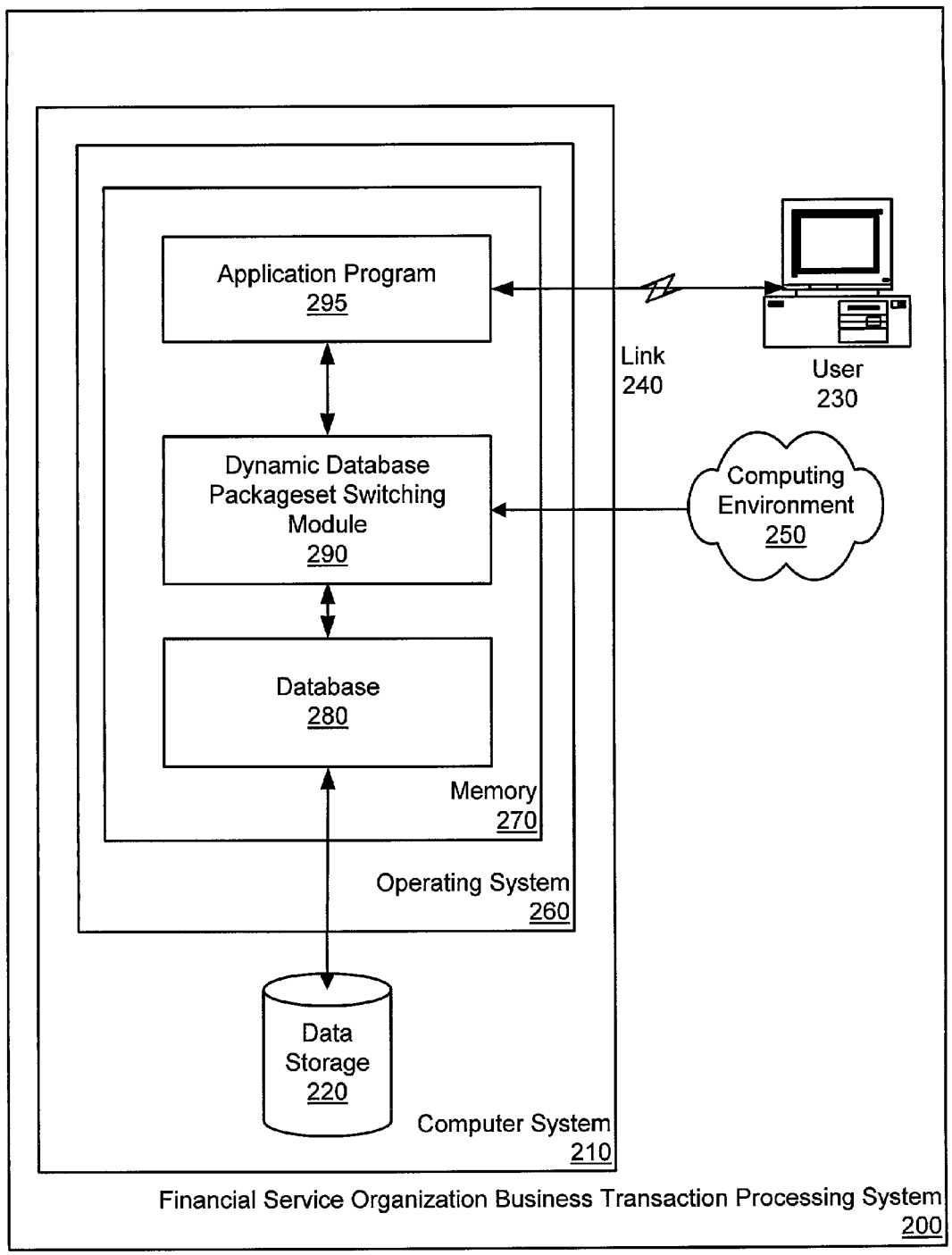
Figure D-2

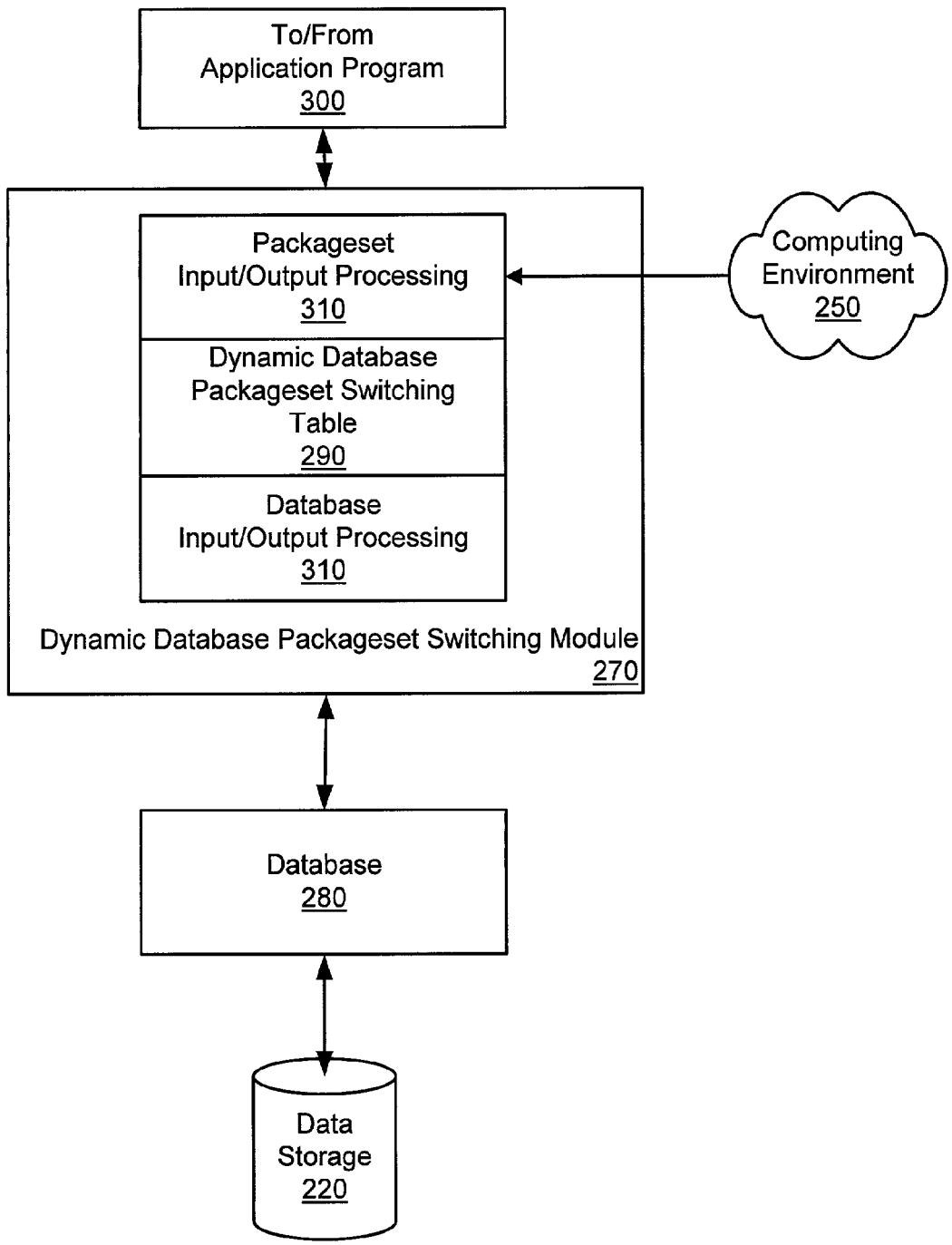
Figure D-2a

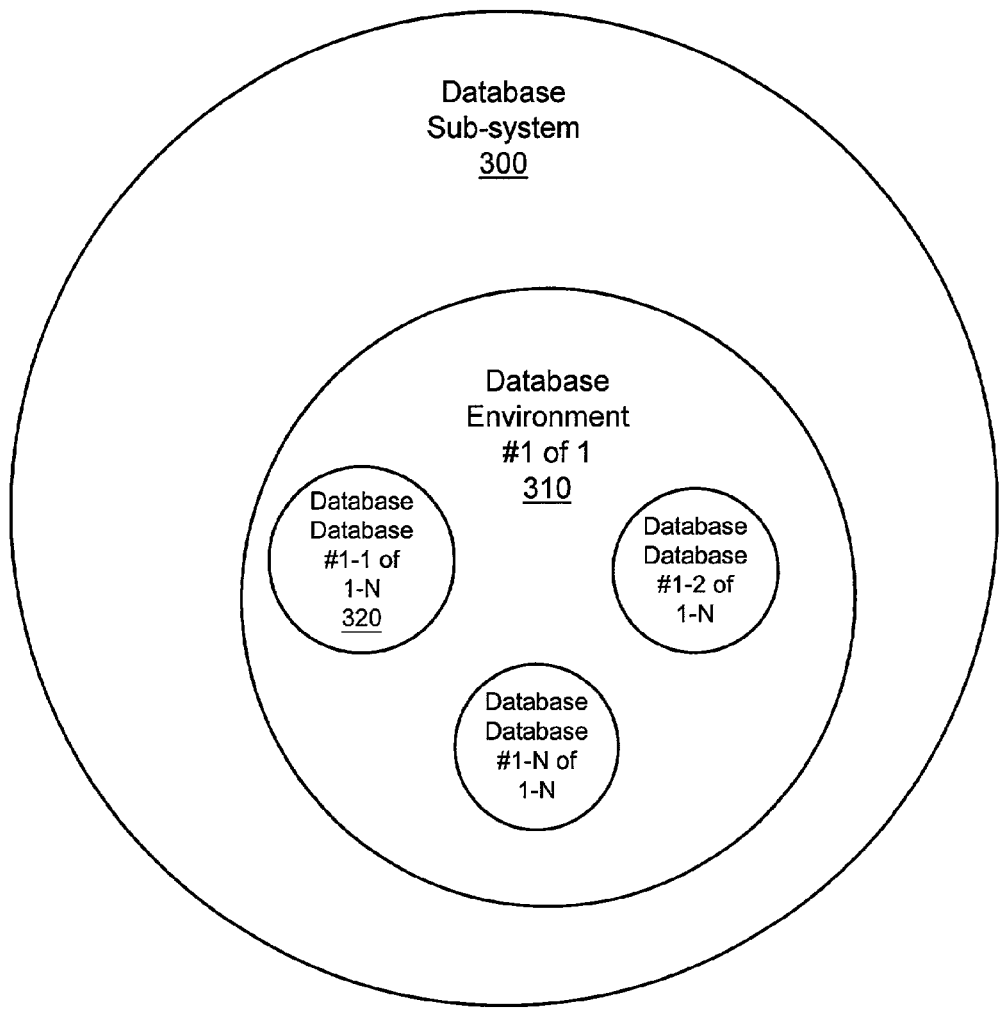
Figure D-3
Prior Art

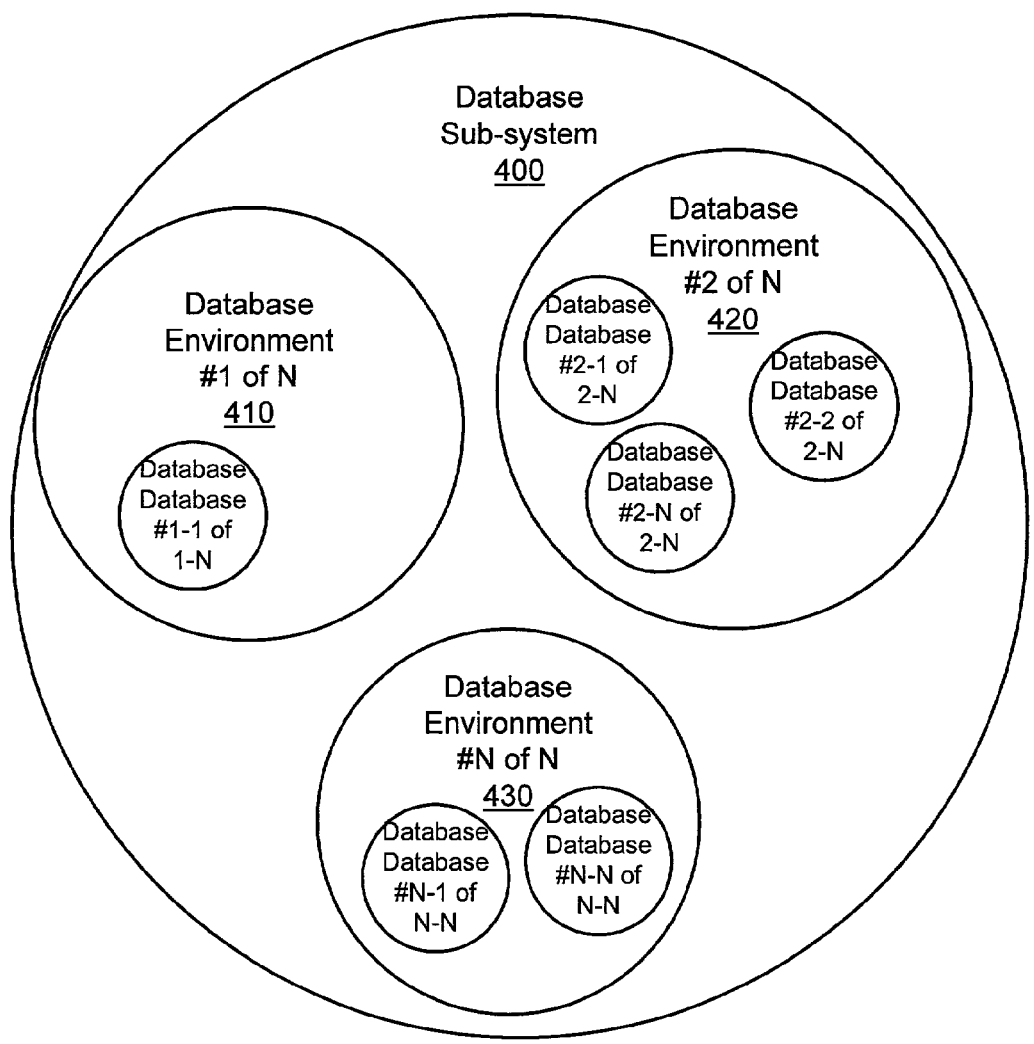
Figure D-4

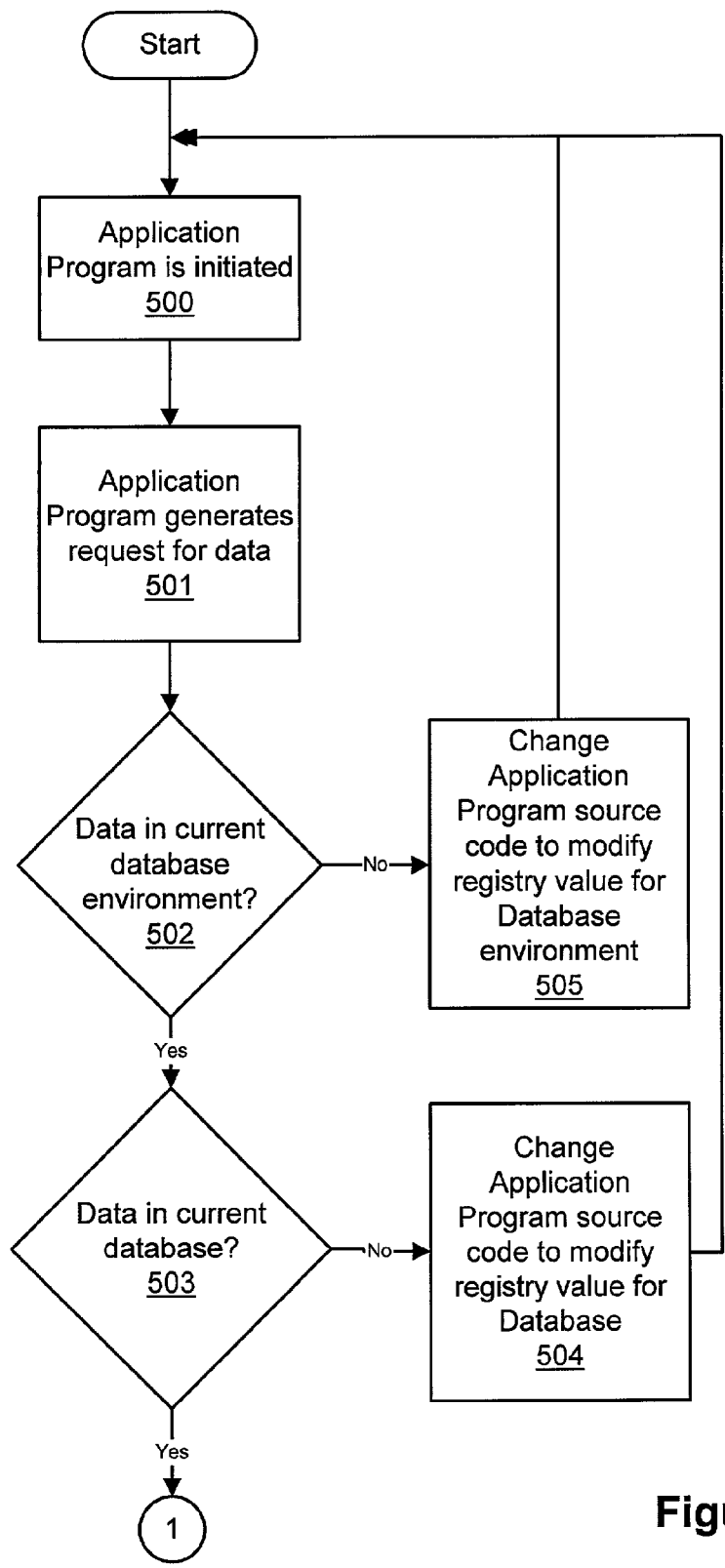
Figure D-5
Prior Art

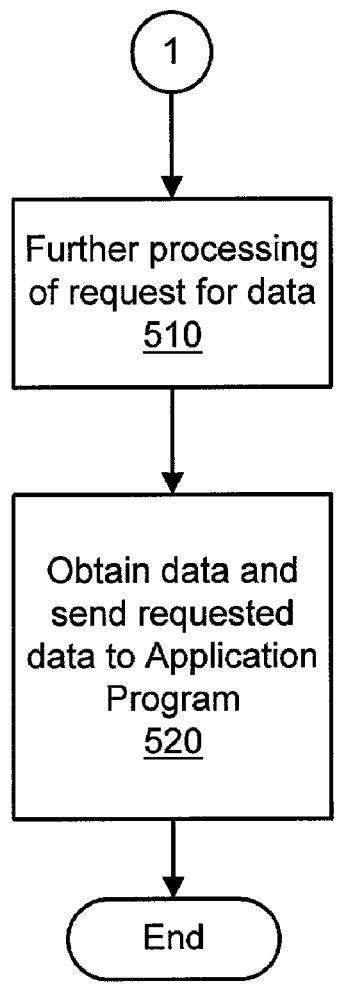
Figure D- 5a

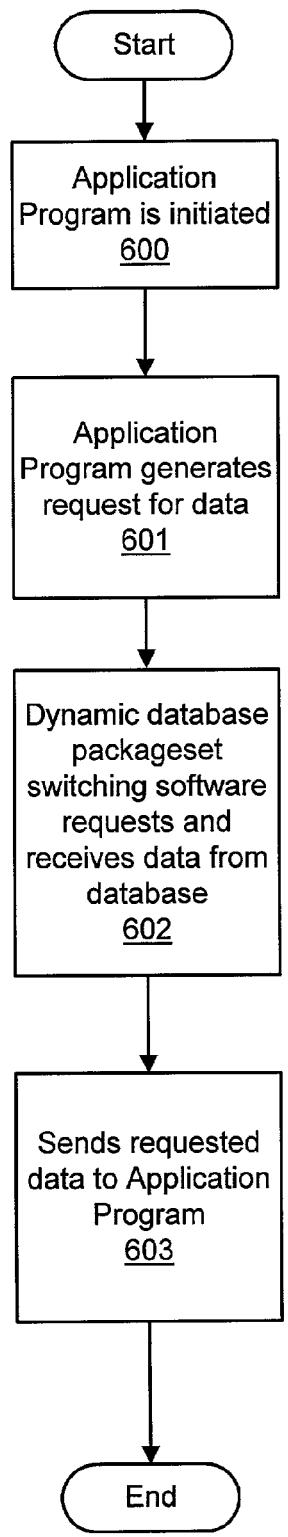
Figure D- 6

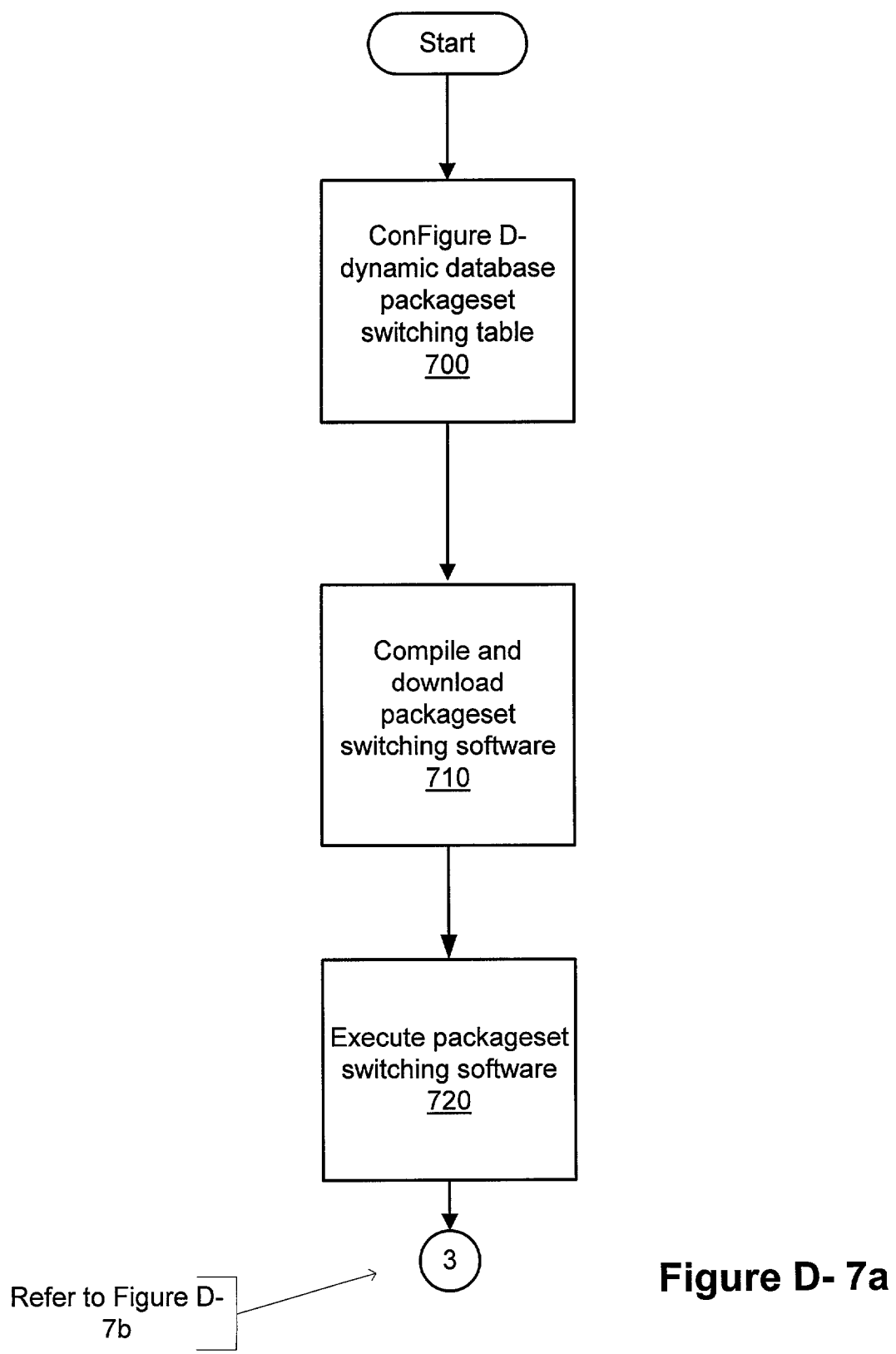
Figure D-7a

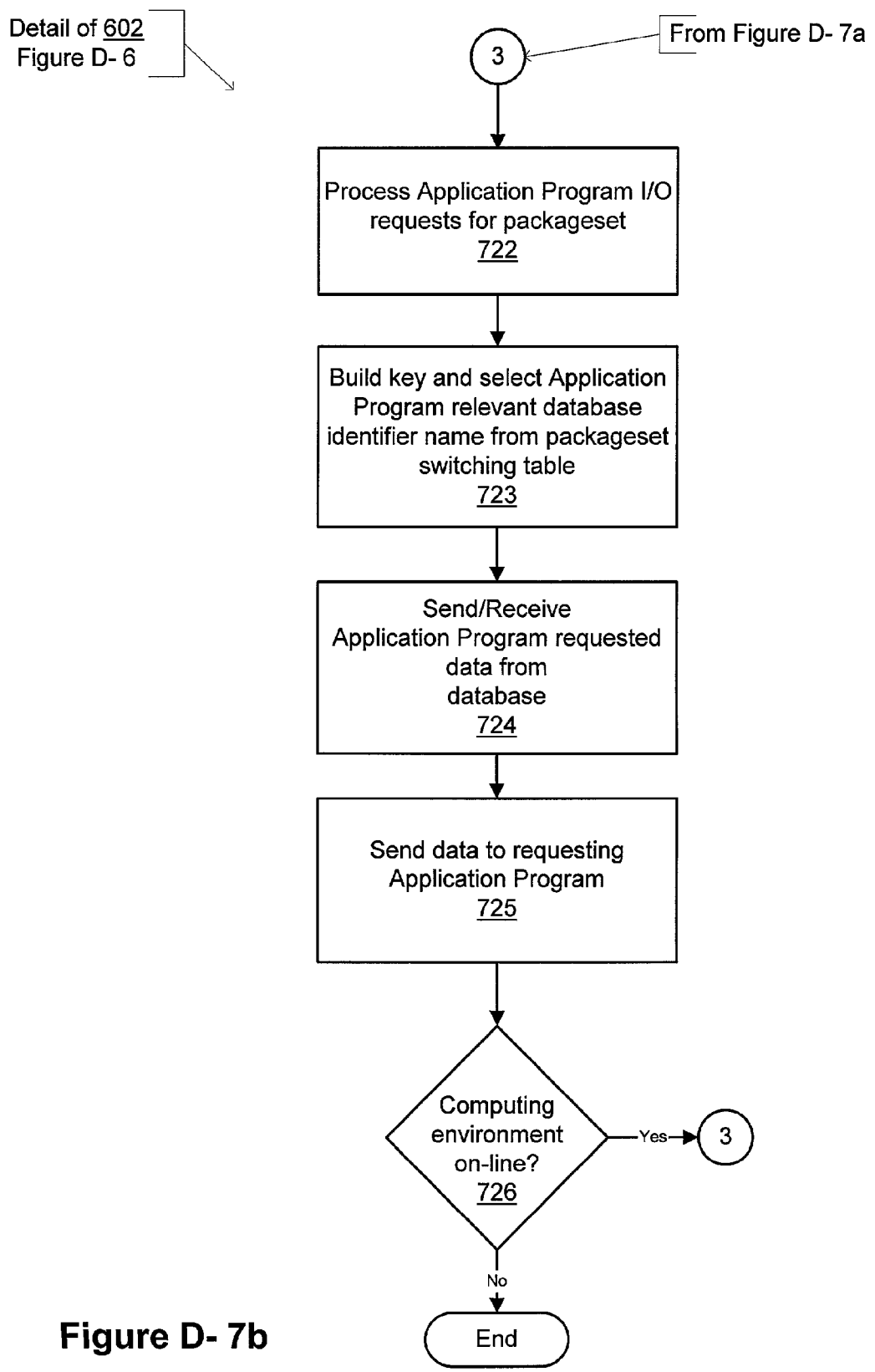
Figure D-7b

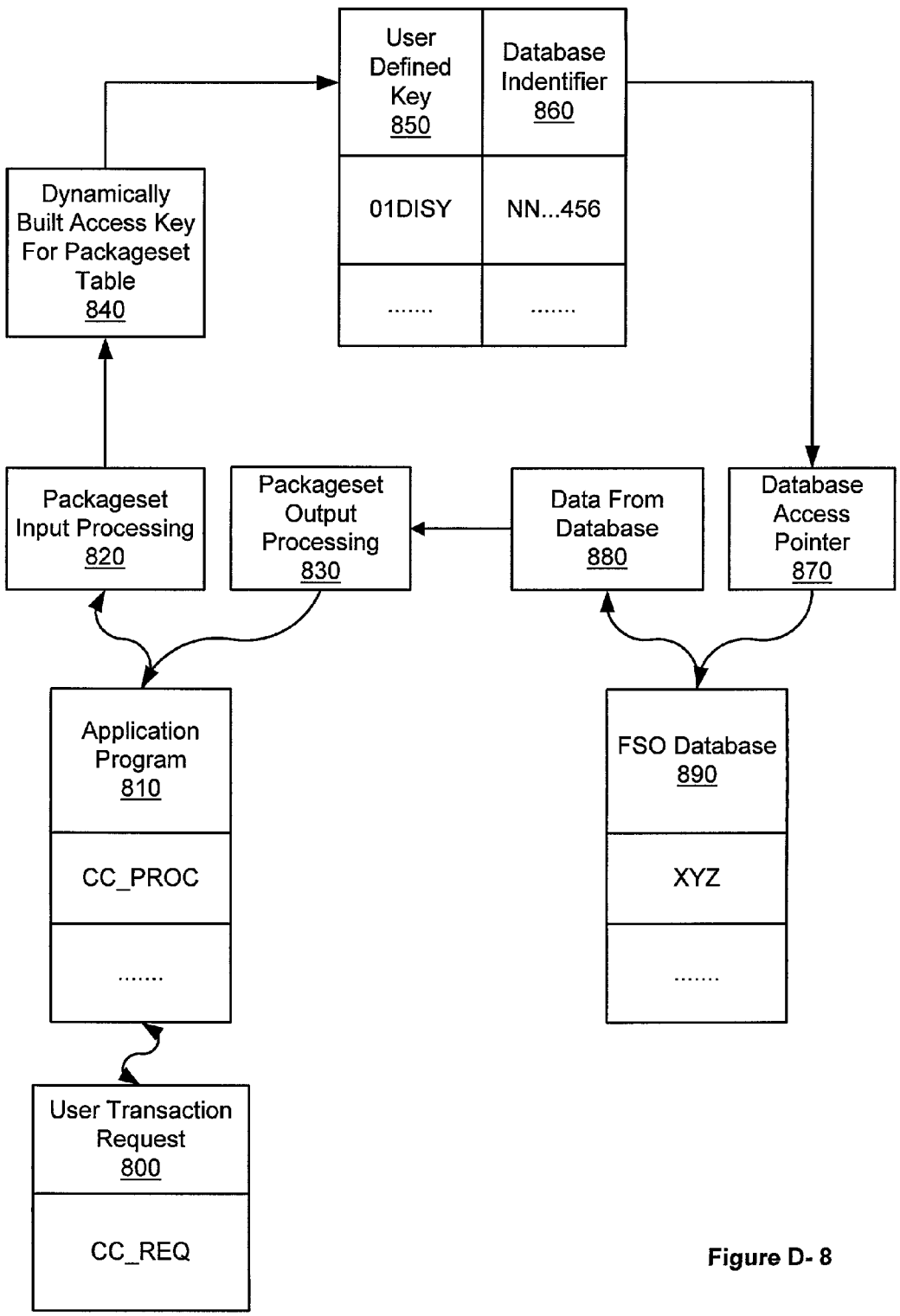
Figure D-8

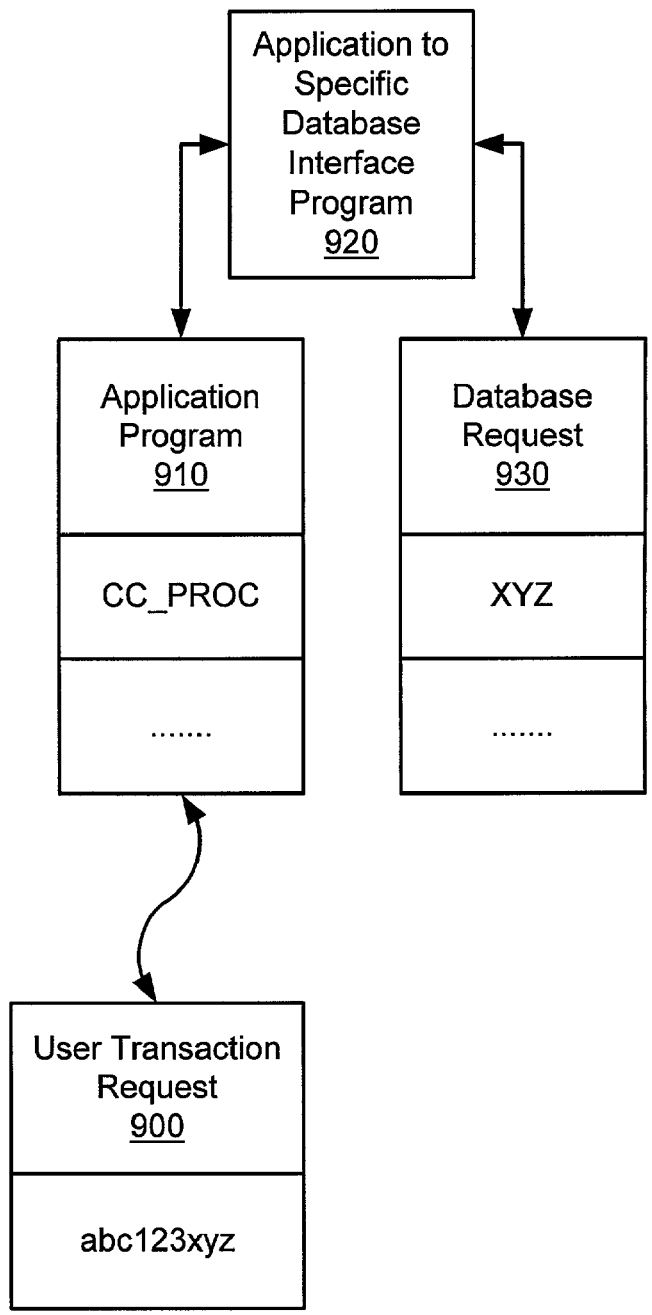
PRIOR ART
Figure D-9

122 → 124 →

120

| DICTIONARY ELEMENTS | USEABLE IN KEYS? |
|---|---|
| A | NO |
| B | NO |
| C | NO |
| D | NO |
| E | NO |
| F | NO |
| G | NO |
| H | NO |
| I | NO |
| J | NO |
| K | NO |
| L | NO |
| M | NO |
| N | YES |
| O | YES |
| P | YES |
| Q | YES |
| R | YES |
| S | YES |
| T | YES |
| U | YES |
| V | YES |
| W | YES |
| X | YES |
| Y | YES |
| Z | YES |

Figure D-10

132 — AVAILABLE KEY ELEMENTS
134 — USEABLE IN KEY?
130

| AVAILABLE KEY ELEMENTS | USEABLE IN KEY? |
|---|---|
| N | NO |
| O | NO |
| P | NO |
| Q | NO |
| R | NO |
| S | NO |
| T | NO |
| U | NO |
| V | YES |
| W | YES |
| X | YES |
| Y | YES |
| Z | YES |

Figure D-11

142 — AVAILABLE KEY ELEMENTS
144 — USE AS KEY FIELD?
146 — SEQUENCE
140

| AVAILABLE KEY ELEMENTS | USE AS KEY FIELD? | SEQUENCE |
|---|---|---|
| V | NO | N/A |
| W | YES | 2 |
| X | YES | 1 |
| Y | NO | N/A |
| Z | YES | 3 |

Figure D-12

| KEY<br>FIELD | FIELD<br>SEQUENCE | ELEMENT<br>NAME | FIELD<br>LENGTH | FIELD<br>TYPE |
|---|---|---|---|---|
| X | 1 | COMPANY ID | 2 | NUMERIC |
| W | 2 | CREDIT CARD TYPE | 3 | CHARACTER |
| Z | 3 | ON US/NOT ON US | 1 | CHARACTER |

Figure D-13

| ROW | KEY VALUES | | | PACKAGESET SWITCHING TABLE VALUES |
|---|---|---|---|---|
| | X | W | Z | DATABASE IDENTIFIER VALUE |
| 1 | 12 | VIS | Y | NN1234567890123456 |
| 2 | 12 | DIS | Y | NN1234567890123457 |
| 3 | 12 | * | * | NN1234567890123458 |
| 4 | 12 | * | Y | NN1234567890123459 |
| 5 | 14 | VIS | N | NN1234567890123460 |
| 6 | 14 | DIS | N | NN1234567890123461 |
| 7 | * | * | * | NN1234567890123462 |

Figure D-14

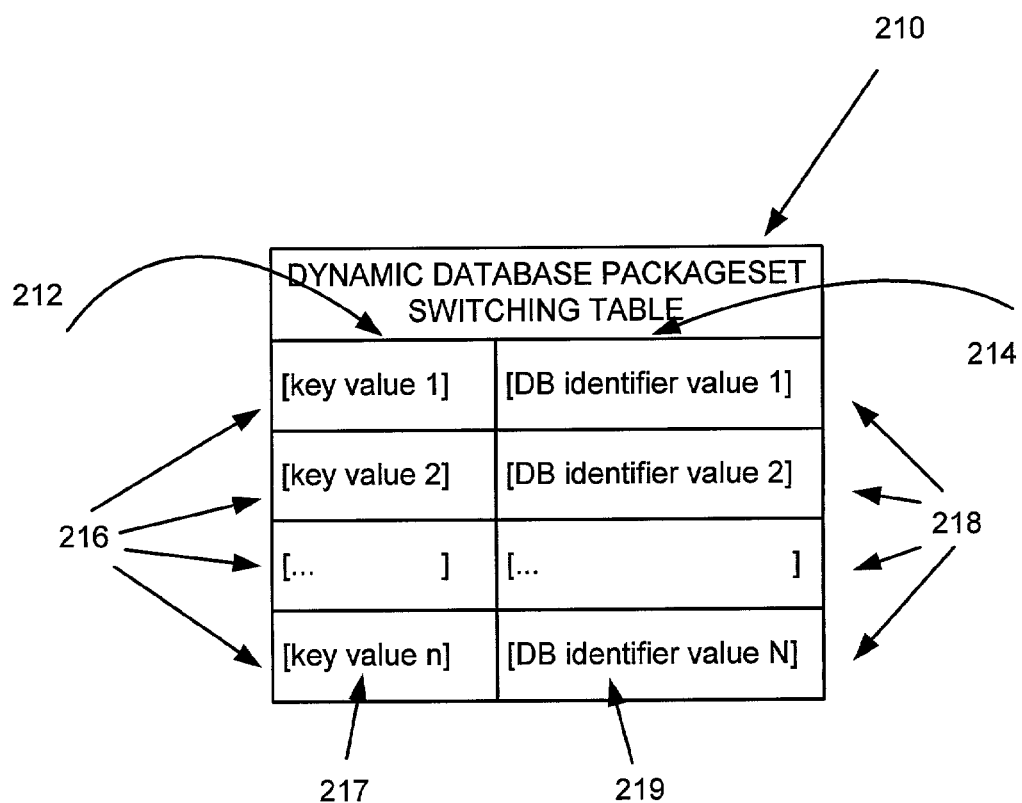
Figure D- 15

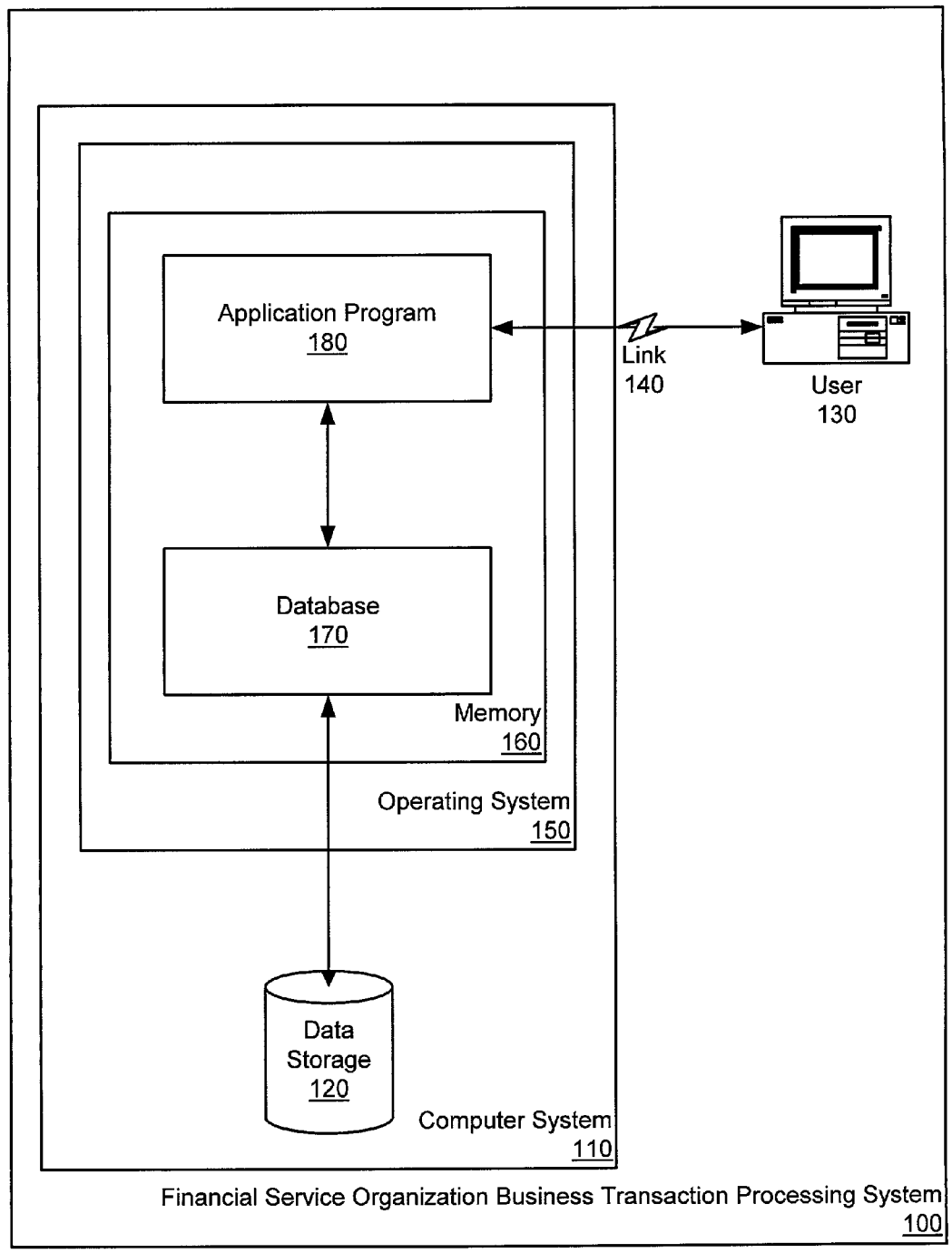
Figure E-1
Prior Art

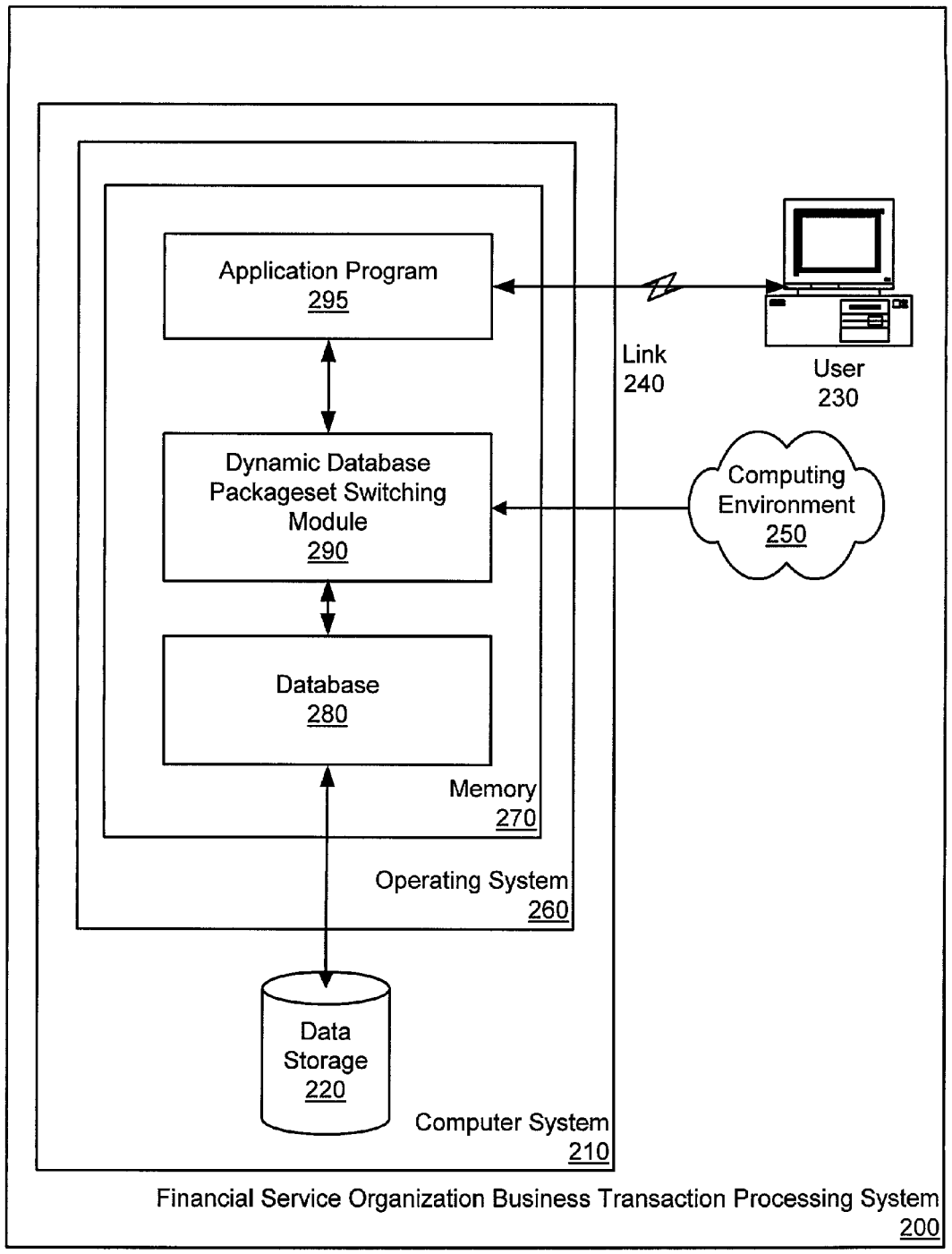
Figure E-2

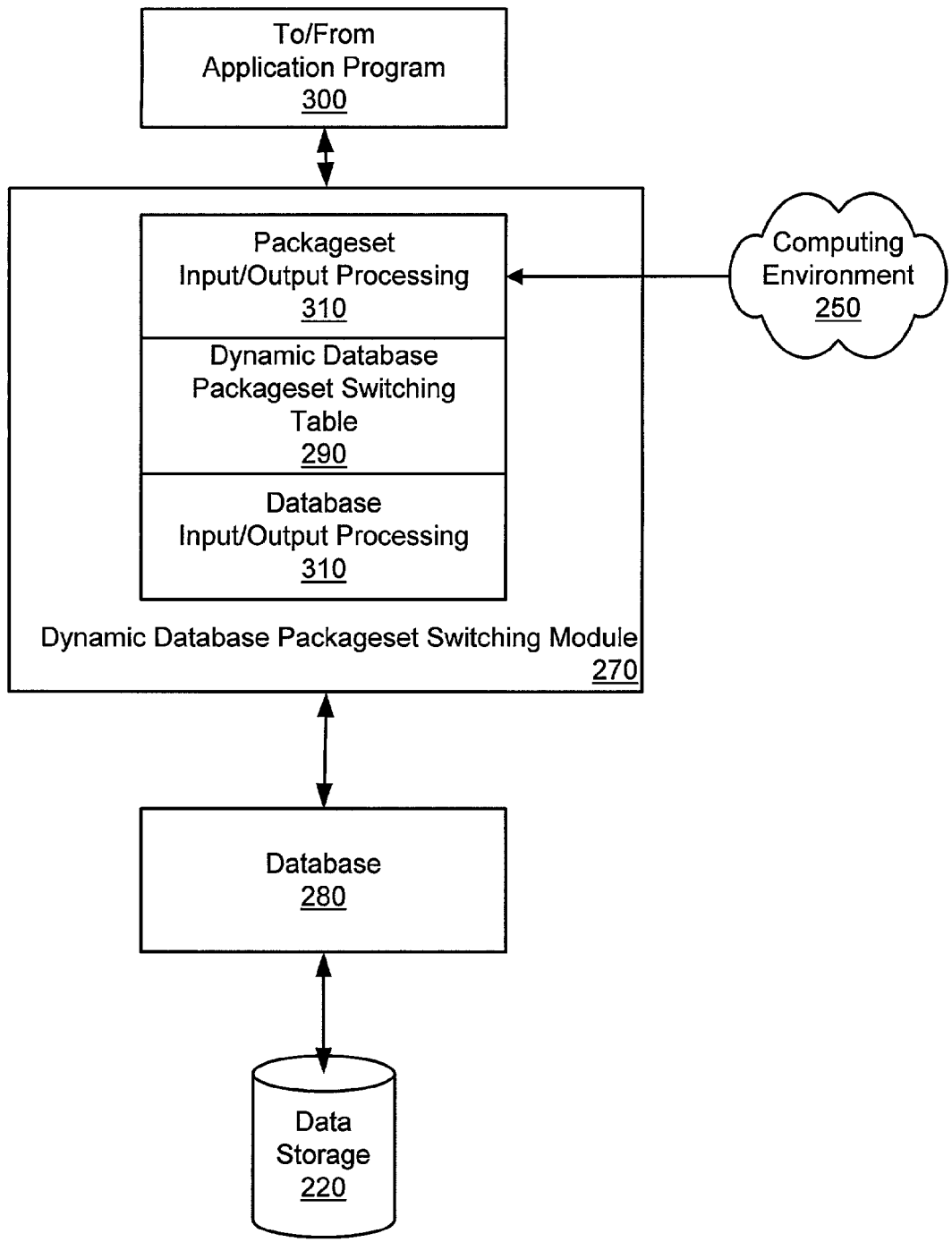
Figure E-2a

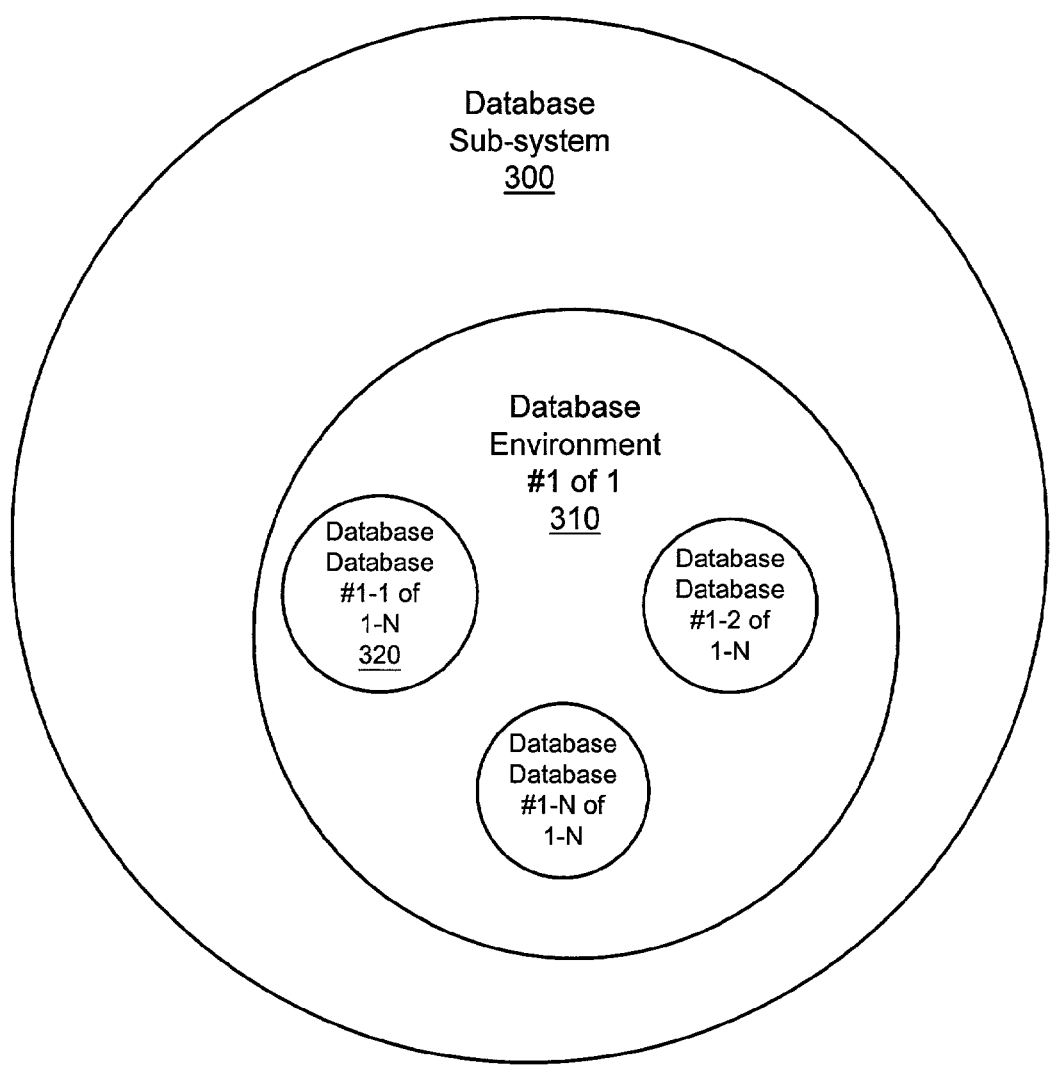
Figure E- 3
Prior Art

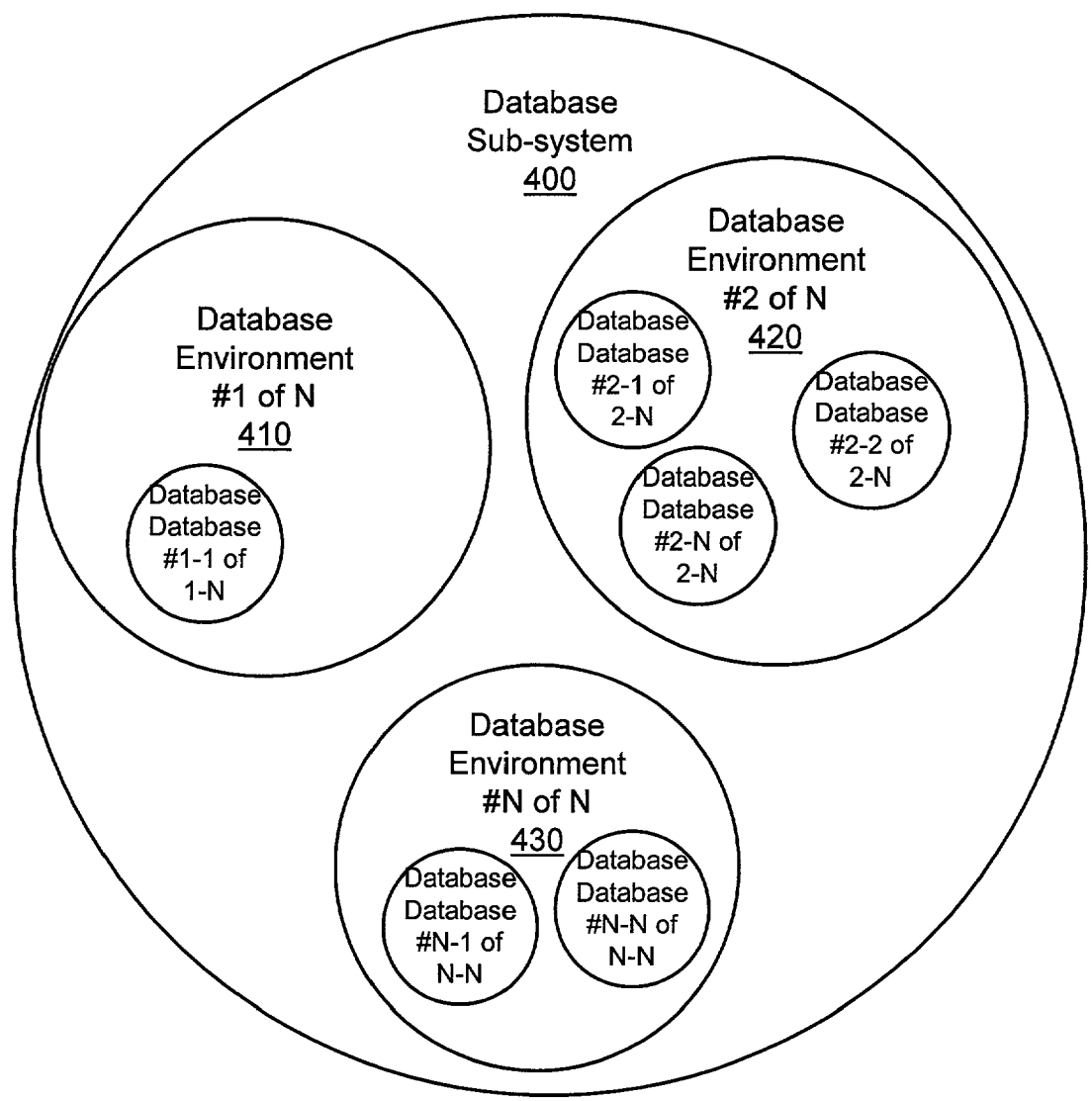
Figure E-4

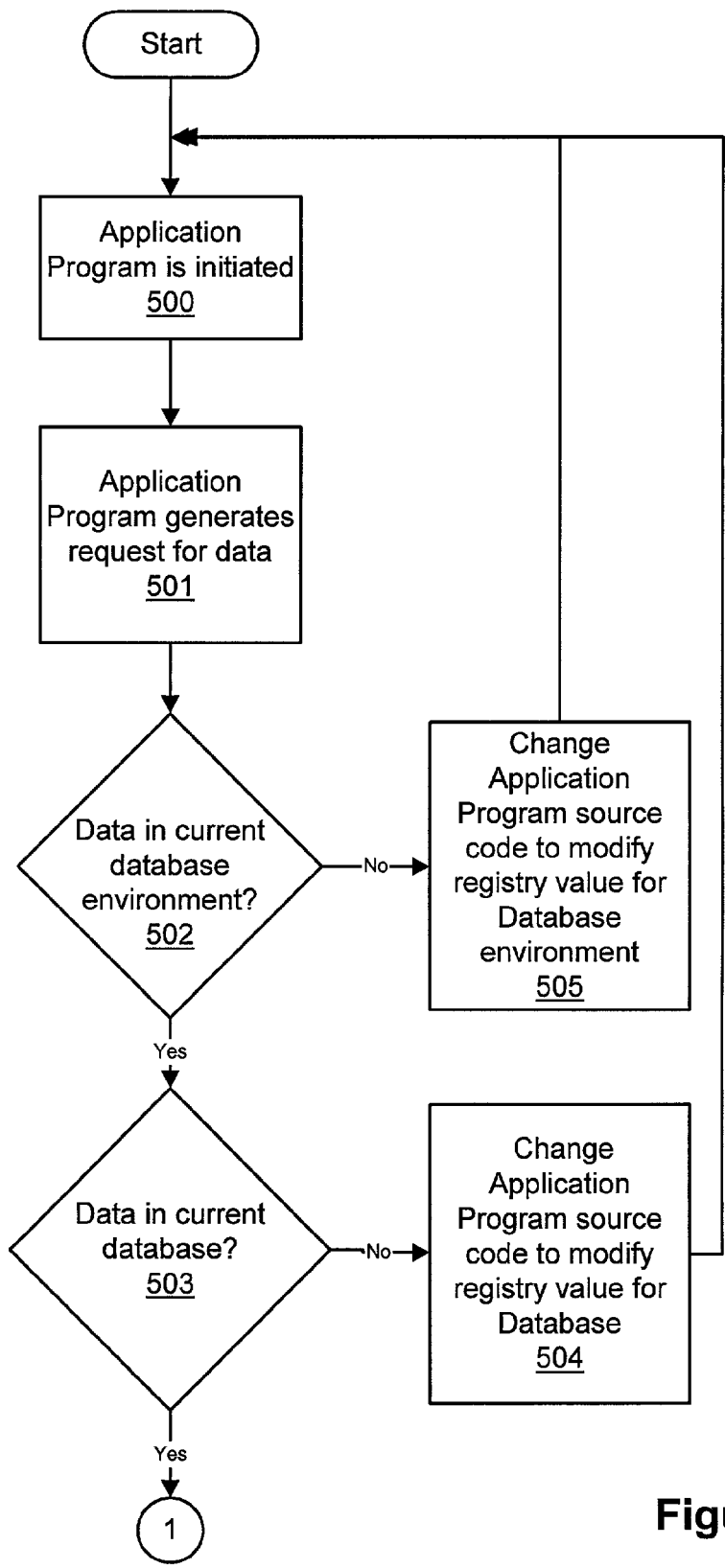
Figure E-5
Prior Art

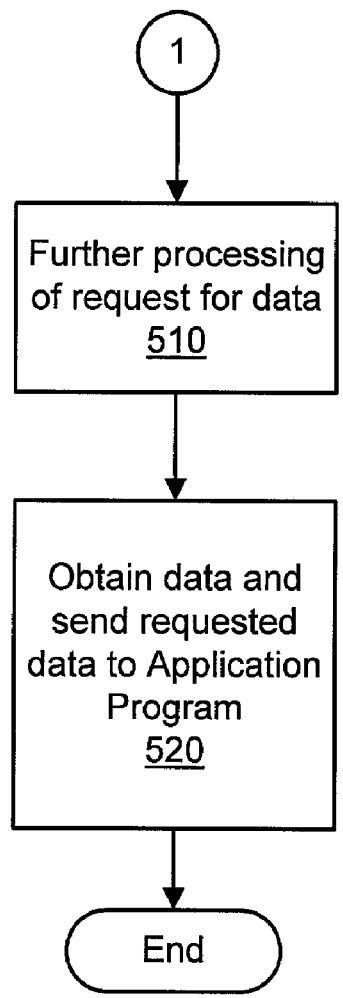
Figure E- 5a

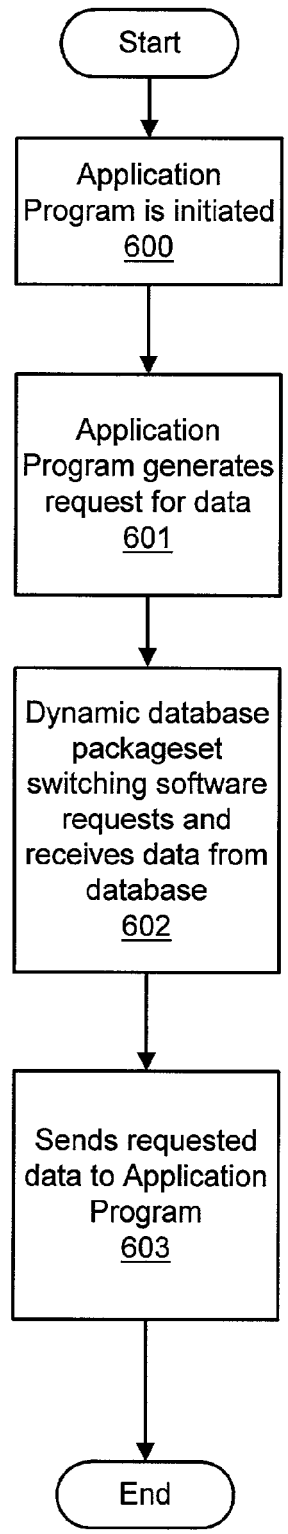
Figure E-6

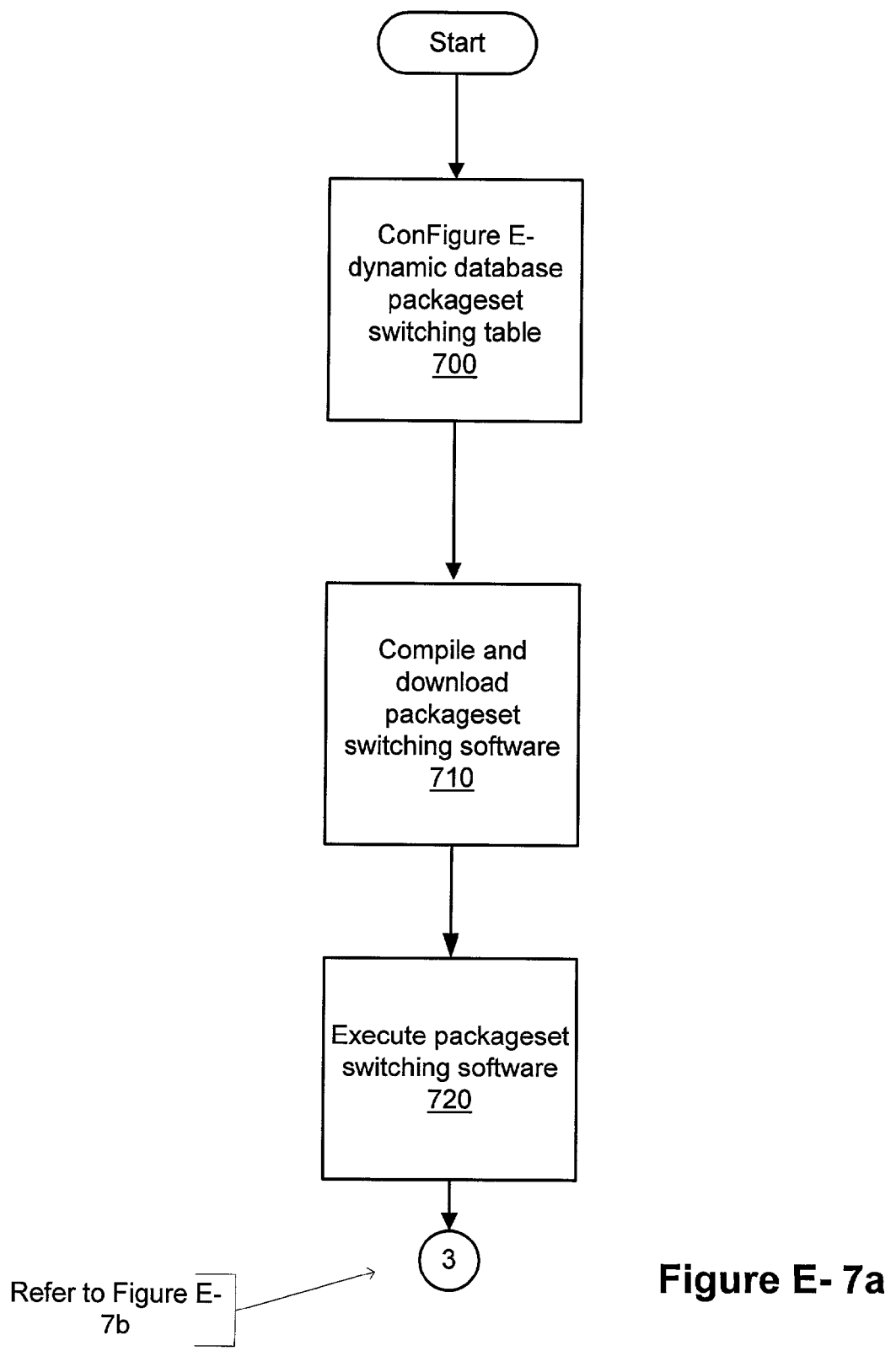
Figure E-7a

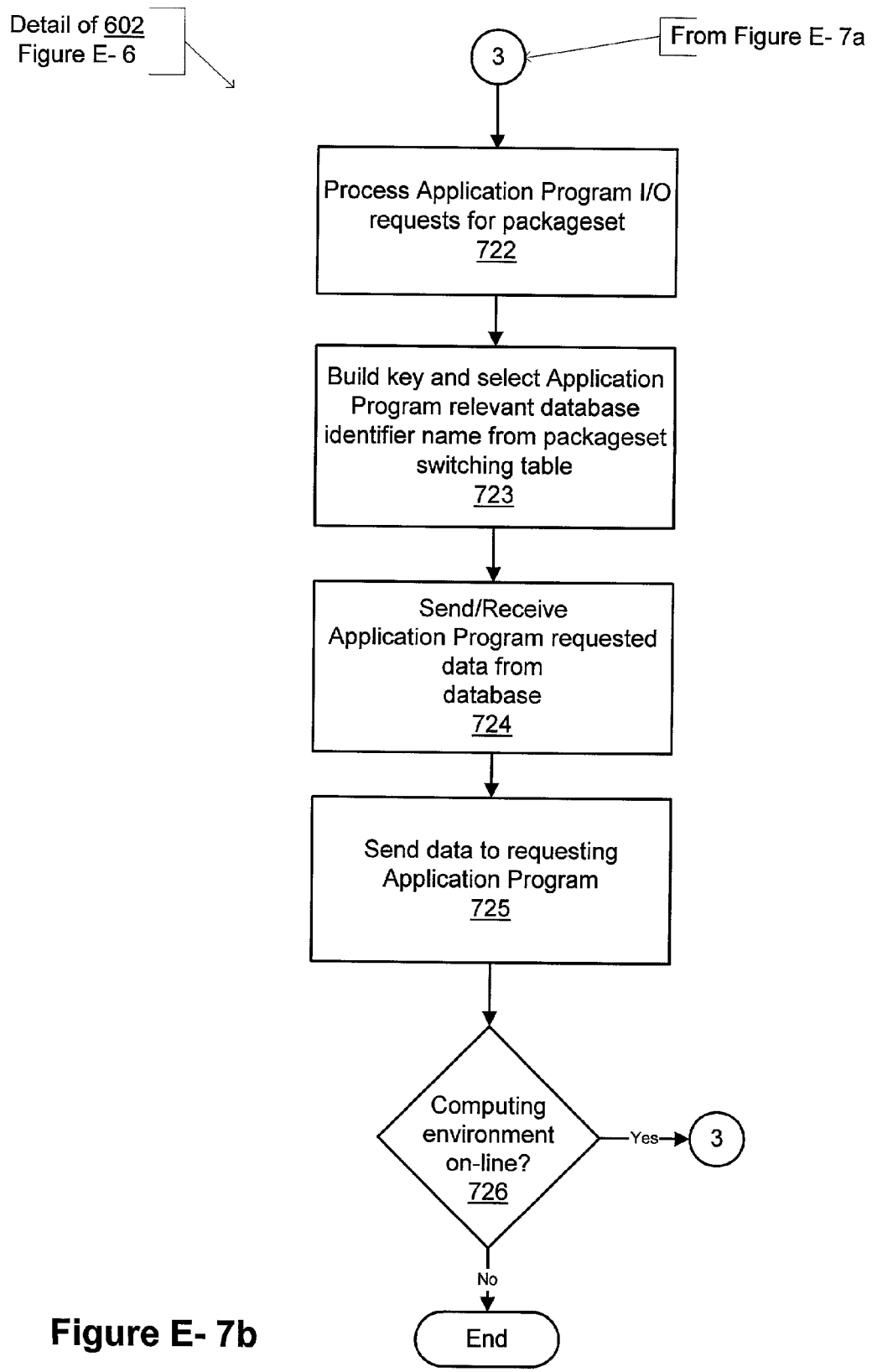
Figure E- 7b

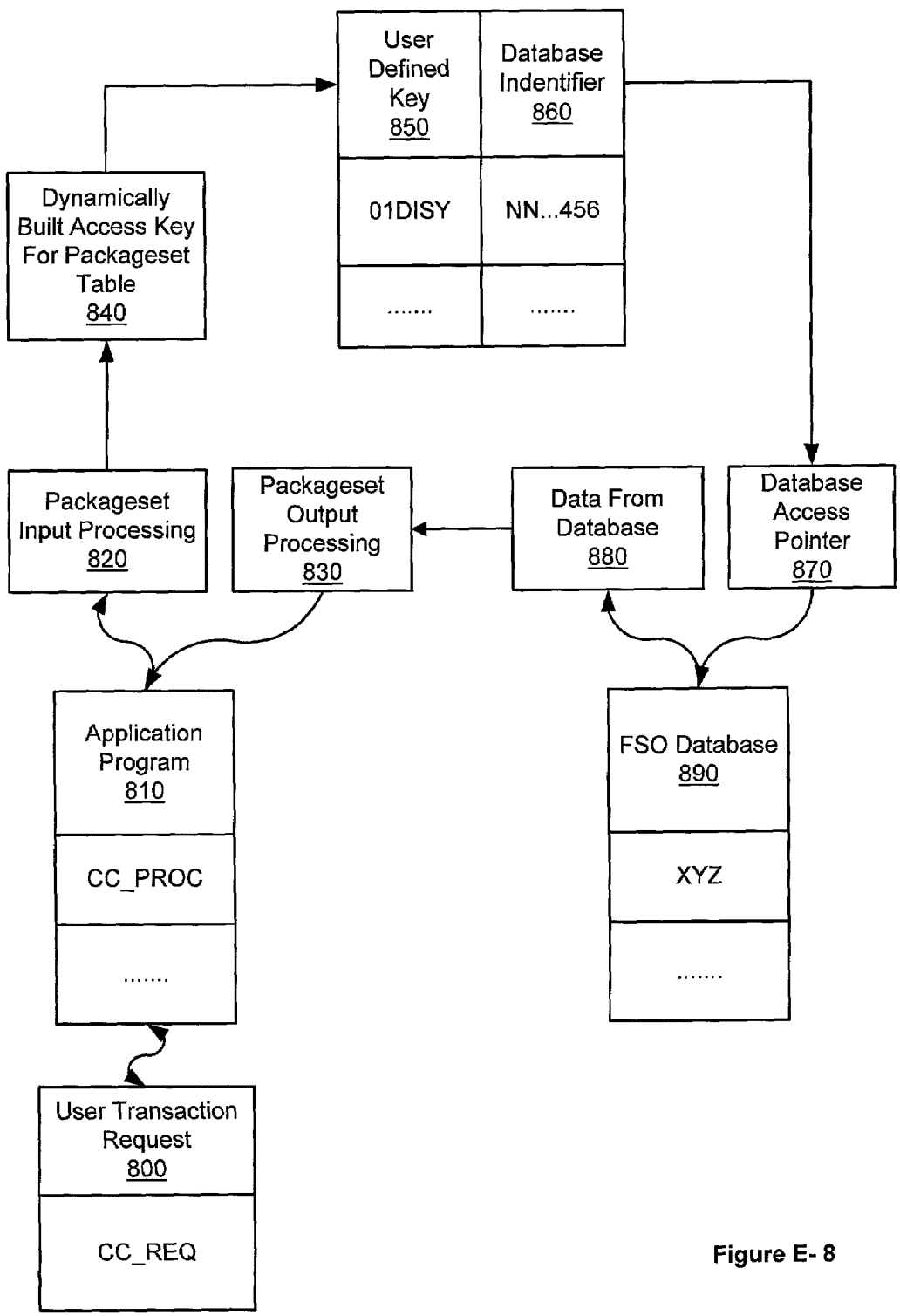
Figure E-8

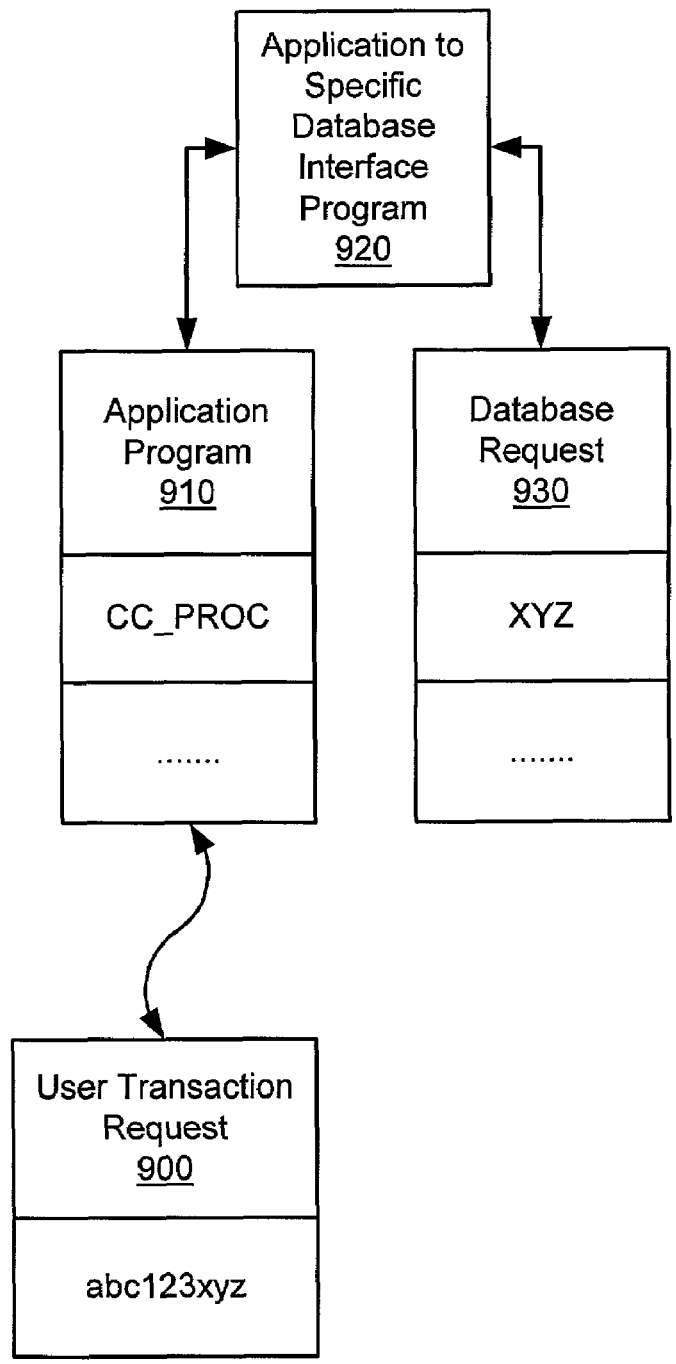
PRIOR ART
Figure E-9

| 122 | 124 |
|---|---|
| DICTIONARY ELEMENTS | USEABLE IN KEYS? |
| A | NO |
| B | NO |
| C | NO |
| D | NO |
| E | NO |
| F | NO |
| G | NO |
| H | NO |
| I | NO |
| J | NO |
| K | NO |
| L | NO |
| M | NO |
| N | YES |
| O | YES |
| P | YES |
| Q | YES |
| R | YES |
| S | YES |
| T | YES |
| U | YES |
| V | YES |
| W | YES |
| X | YES |
| Y | YES |
| Z | YES |

| AVAILABLE KEY ELEMENTS | USEABLE IN KEY? |
|---|---|
| N | NO |
| O | NO |
| P | NO |
| Q | NO |
| R | NO |
| S | NO |
| T | NO |
| U | NO |
| V | YES |
| W | YES |
| X | YES |
| Y | YES |
| Z | YES |

| AVAILABLE KEY ELEMENTS | USE AS KEY FIELD? | SEQUENCE |
|---|---|---|
| V | NO | N/A |
| W | YES | 2 |
| X | YES | 1 |
| Y | NO | N/A |
| Z | YES | 3 |

Figure E-12

| | 152 | 154 | 156 | 158 | 160 |
|---|---|---|---|---|---|
| | KEY FIELD | FIELD SEQUENCE | ELEMENT NAME | FIELD LENGTH | FIELD TYPE |
| | X | 1 | COMPANY ID | 2 | NUMERIC |
| | W | 2 | CREDIT CARD TYPE | 3 | CHARACTER |
| | Z | 3 | ON US/NOT ON US | 1 | CHARACTER |

| ROW | KEY VALUES | | | PACKAGESET SWITCHING TABLE VALUES |
|---|---|---|---|---|
| | X | W | Z | DATABASE IDENTIFIER VALUE |
| 1 | 12 | VIS | Y | NN1234567890123456 |
| 2 | 12 | DIS | Y | NN1234567890123457 |
| 3 | 12 | * | * | NN1234567890123458 |
| 4 | 12 | * | Y | NN1234567890123459 |
| 5 | 14 | VIS | N | NN1234567890123460 |
| 6 | 14 | DIS | N | NN1234567890123461 |
| 7 | * | * | * | NN1234567890123462 |

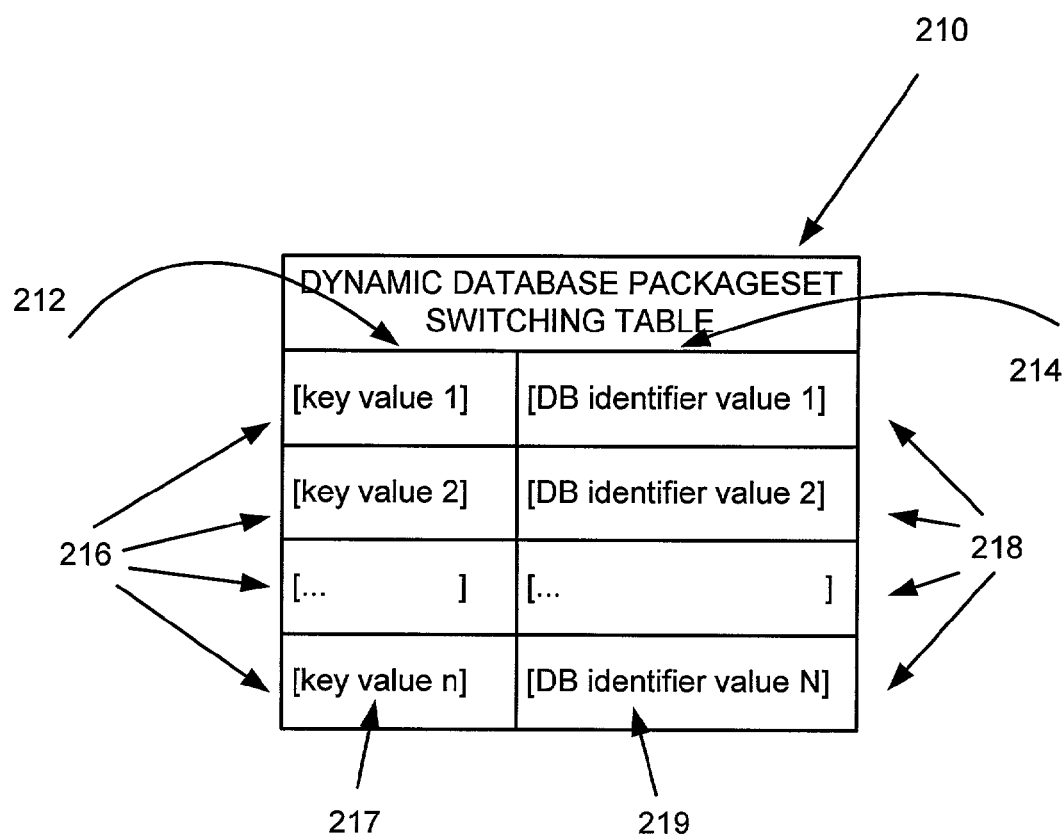
Figure E-15

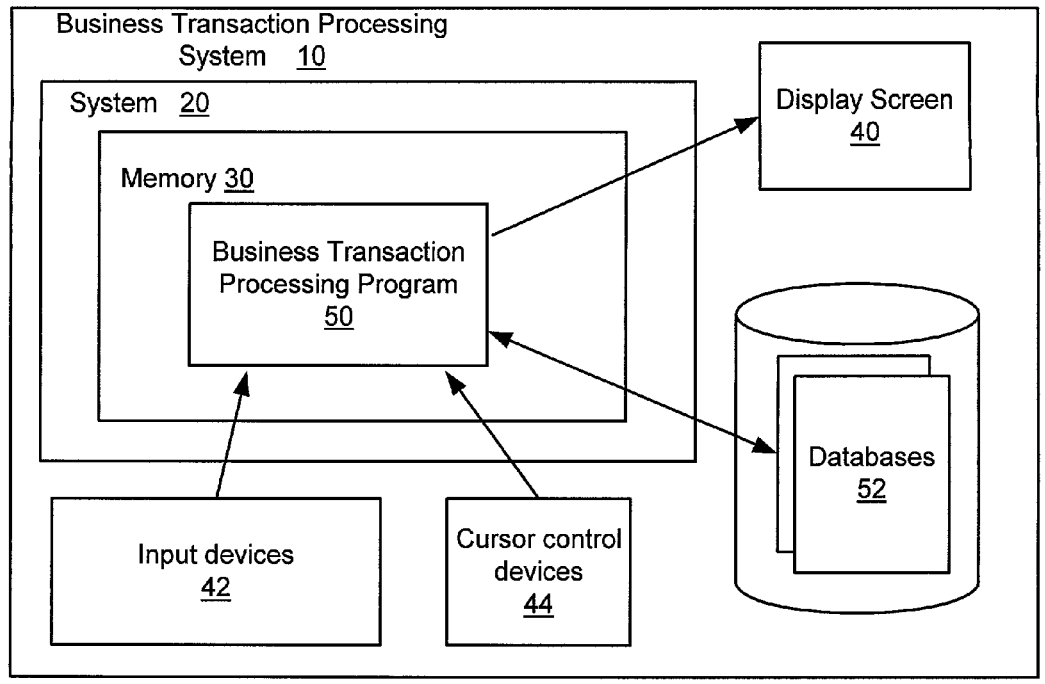
FIG. F-1a
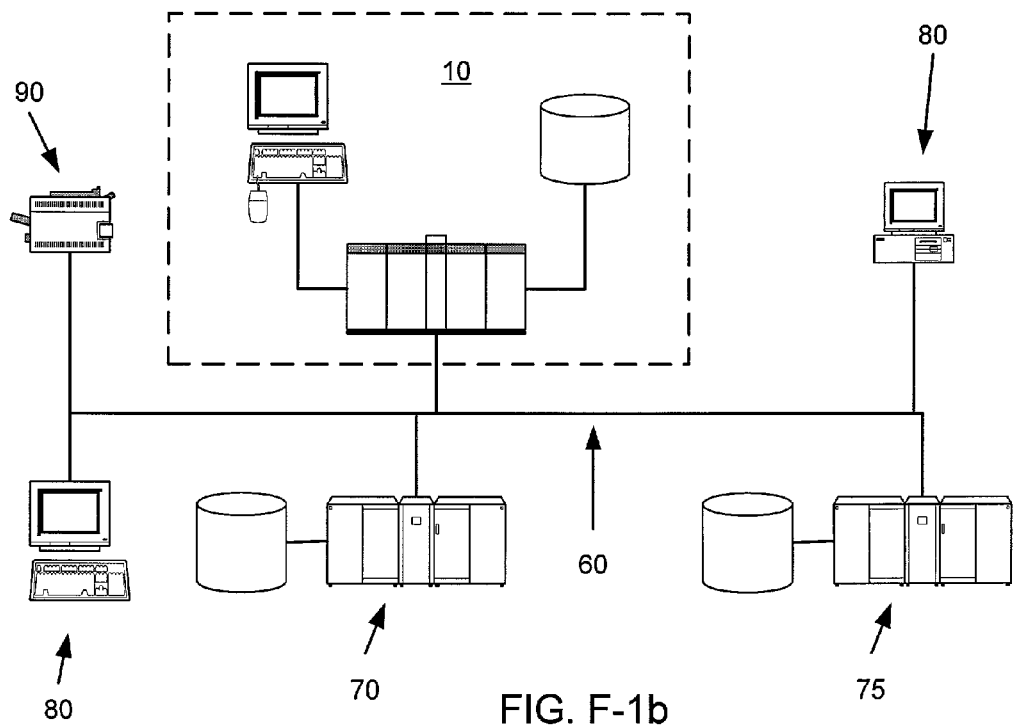
FIG. F-1b

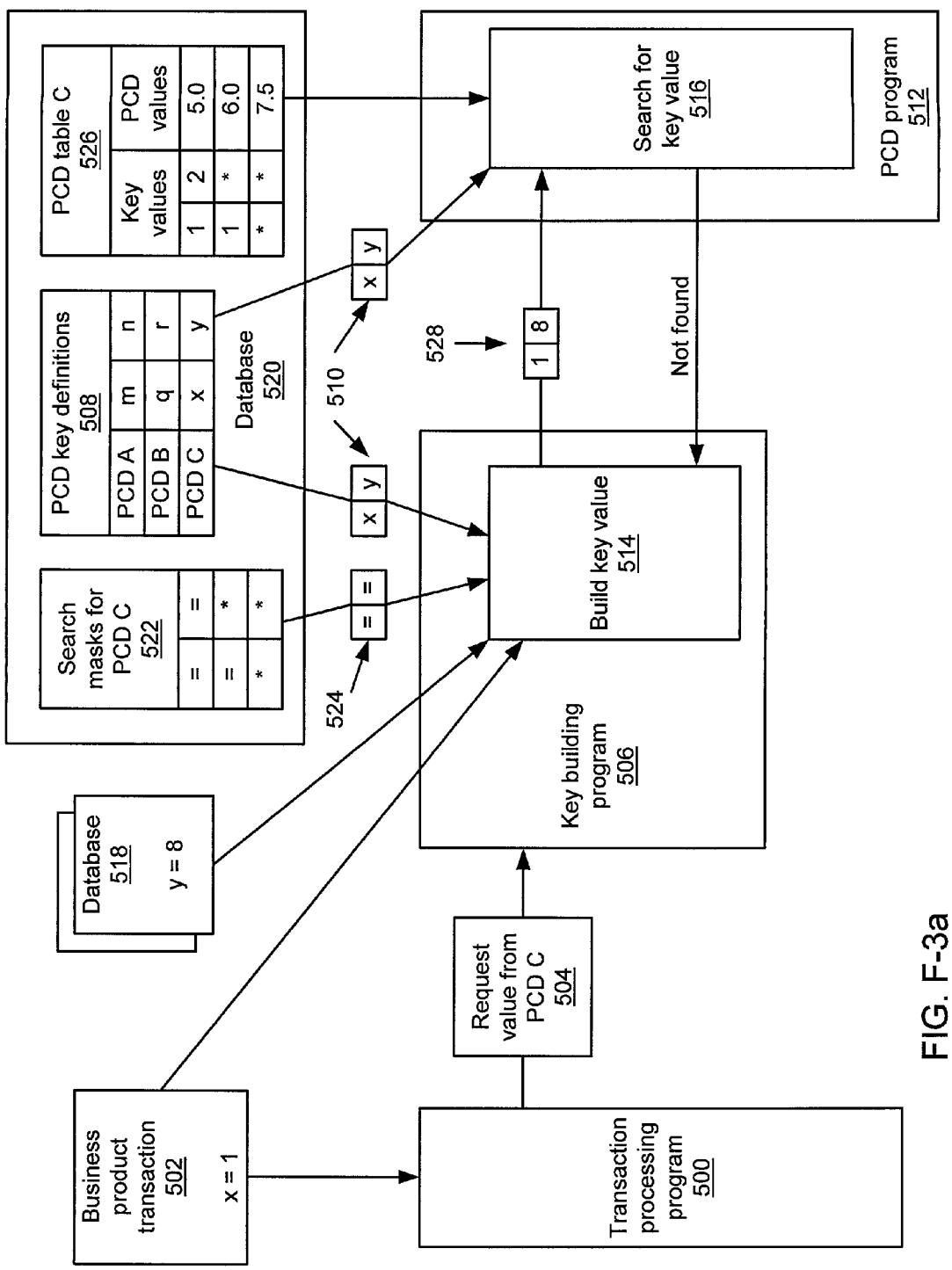
FIG. F-3a

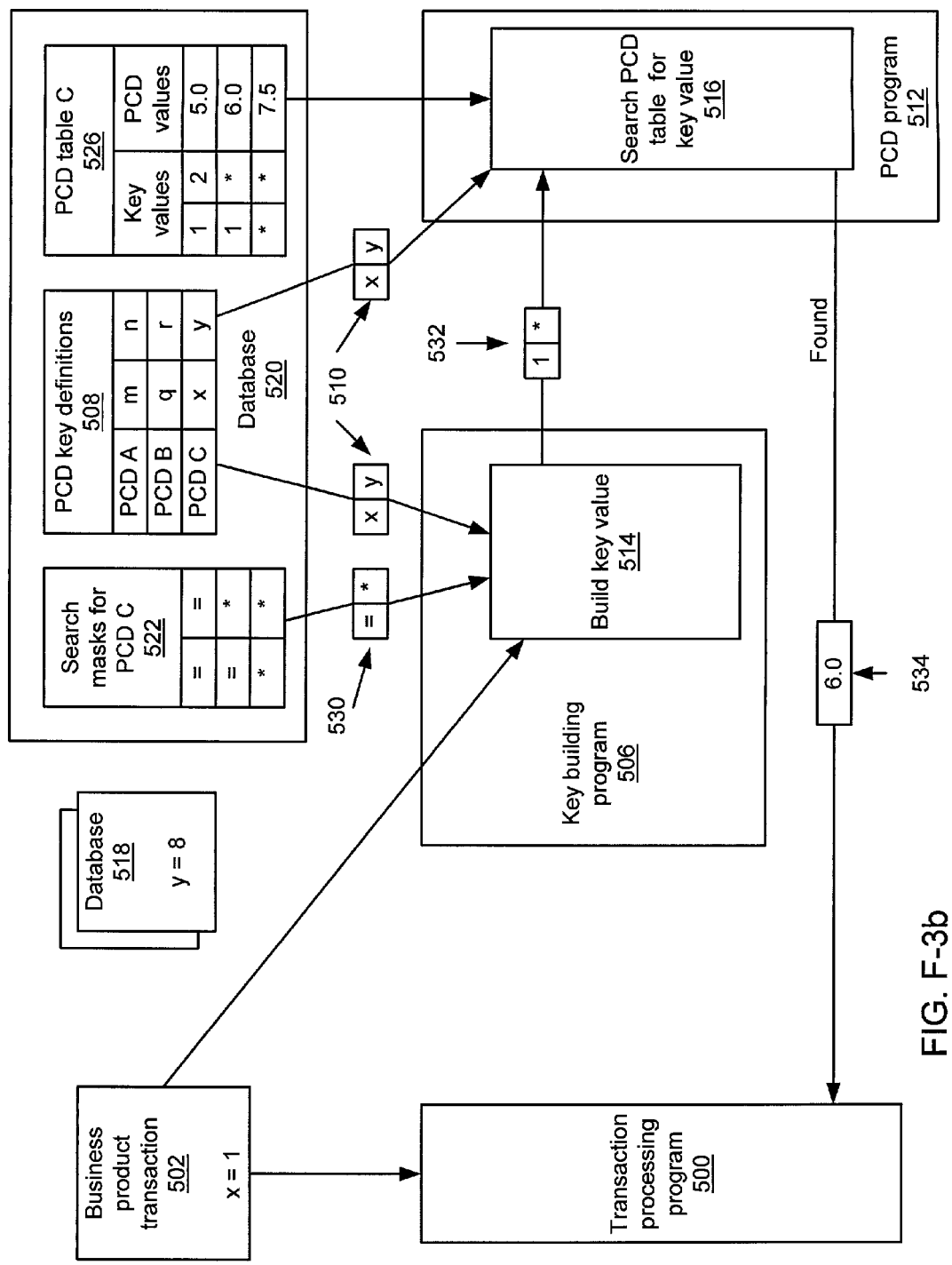
FIG. F-3b

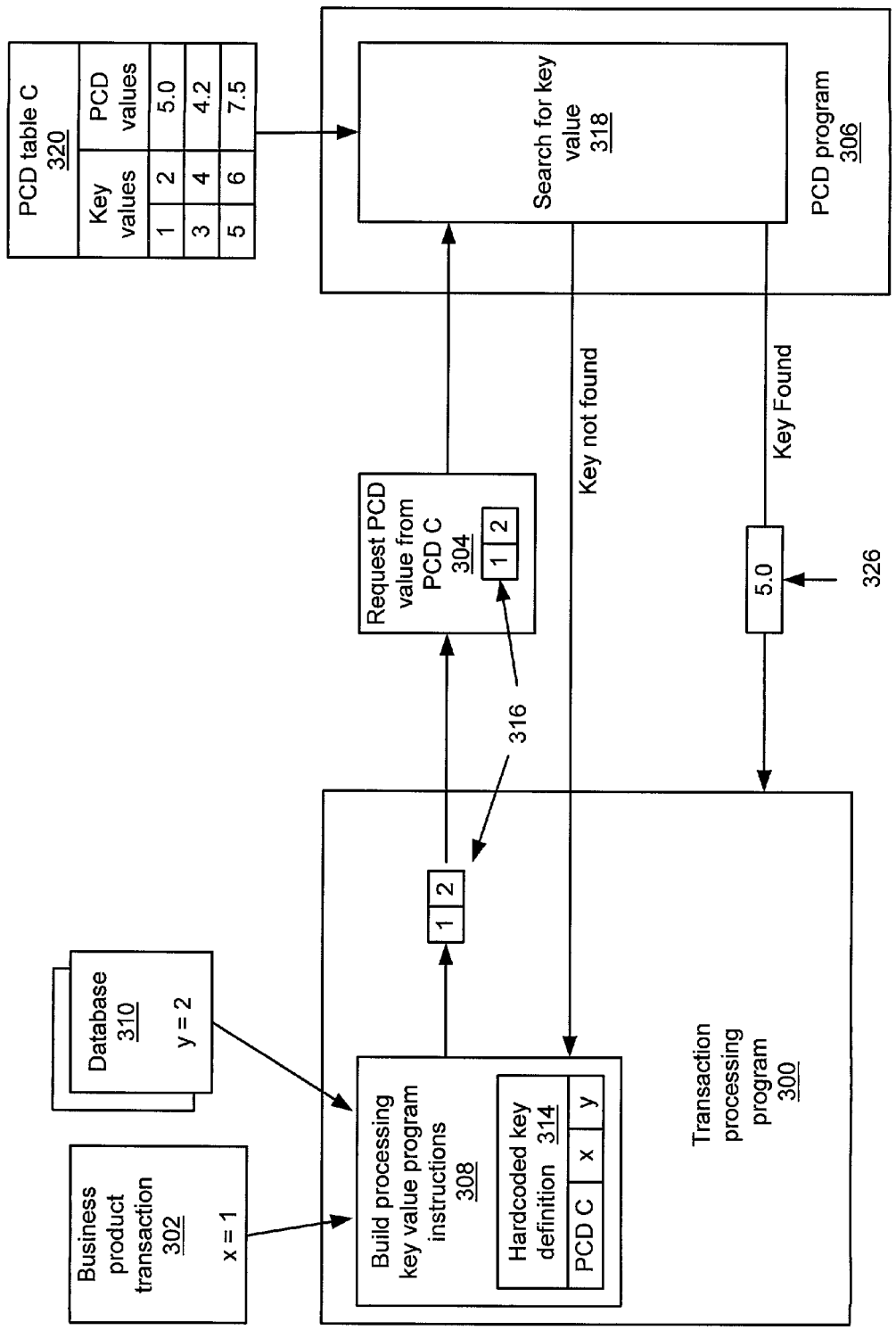
FIG. F-2 - Prior Art

| | 152 | 154 | 156 | 158 | 160 | |
|---|---|---|---|---|---|---|
| | KEY ELEMENT | KEY ELEMENT SEQUENCE | ELEMENT NAME | FIELD LENGTH | DATA TYPE | 150 |
| | X | 1 | COMPANY ID | 2 | NUMERIC | |
| | W | 2 | CREDIT CARD TYPE | 3 | CHARACTER | |
| | Z | 3 | ON US/NOT ON US | 1 | CHARACTER | |

FIG. F-4

| | | 174 | | 178 | 170 |
|---|---|---|---|---|---|
| 172 | KEY VALUES | | | PCD VALUES | |
| ROW | X | W | Z | TRANSACTION CHARGE | |
| 1 | 12 | VIS | Y | 10 | |
| 2 | 12 | DIS | Y | 8 | |
| 3 | 12 | * | * | 12 | |
| 4 | 12 | * | Y | 13 | |
| 5 | 14 | VIS | N | 12 | |
| 6 | 14 | DIS | N | 11 | |
| 7 | * | * | * | 14 | |
| | 175 | 176 | 177 | 179 | |

FIG. F-5

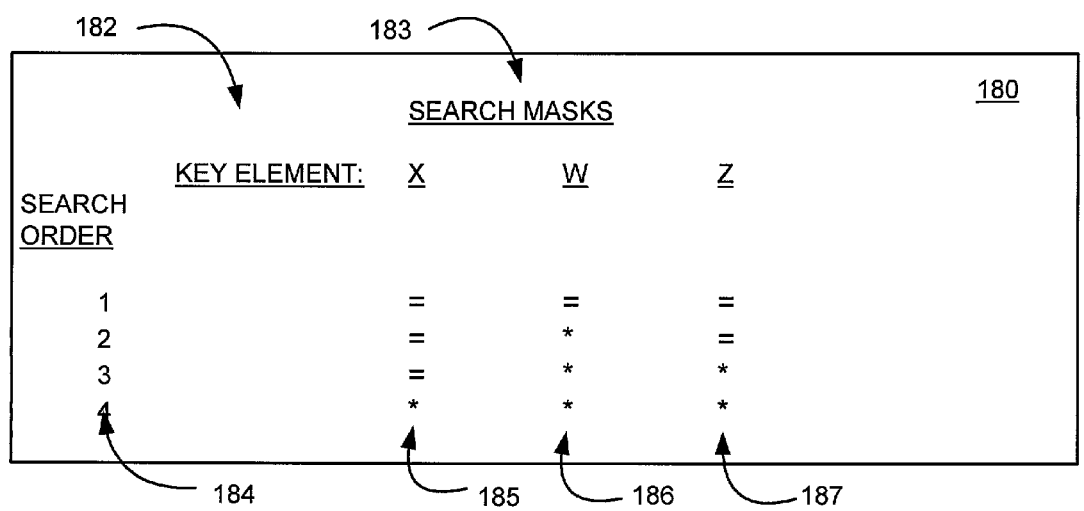
FIG. F-6

| | |
|---|---|
| PCD 1 | User-defined key definition 1 |
| PCD 2 | User-defined key definition 2 |
| PCD ... | ... |
| PCD n | User-defined key definition n |

FIG. F-7

| | |
|---|---|
| PCD 1 | Search mask table 1 |
| PCD 2 | Search mask table 2 |
| PCD ... | ... |
| PCD n | Search mask table n |

FIG. F-8

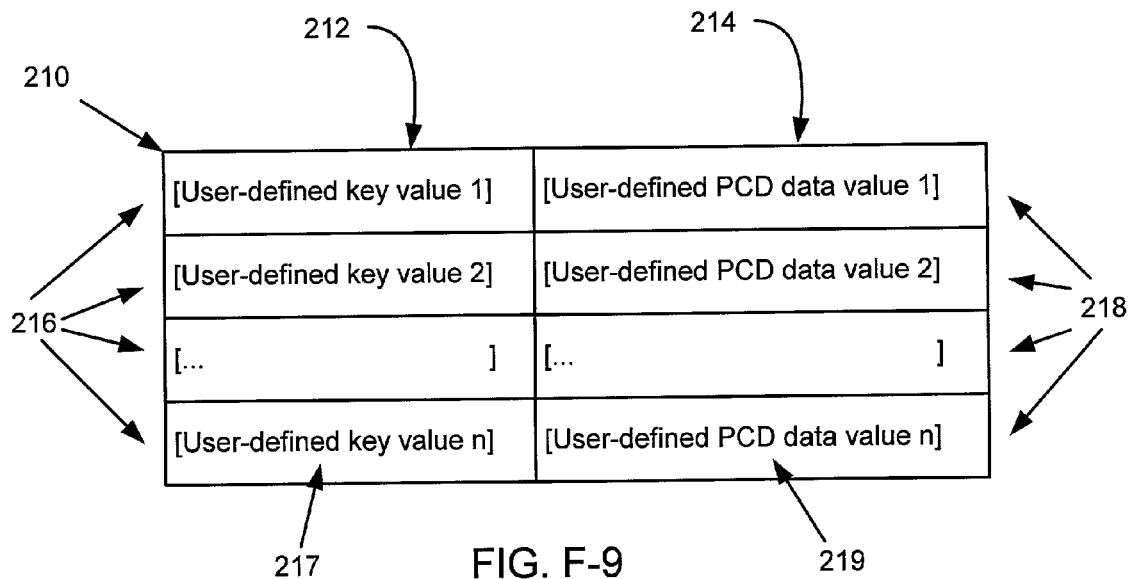
FIG. F-9
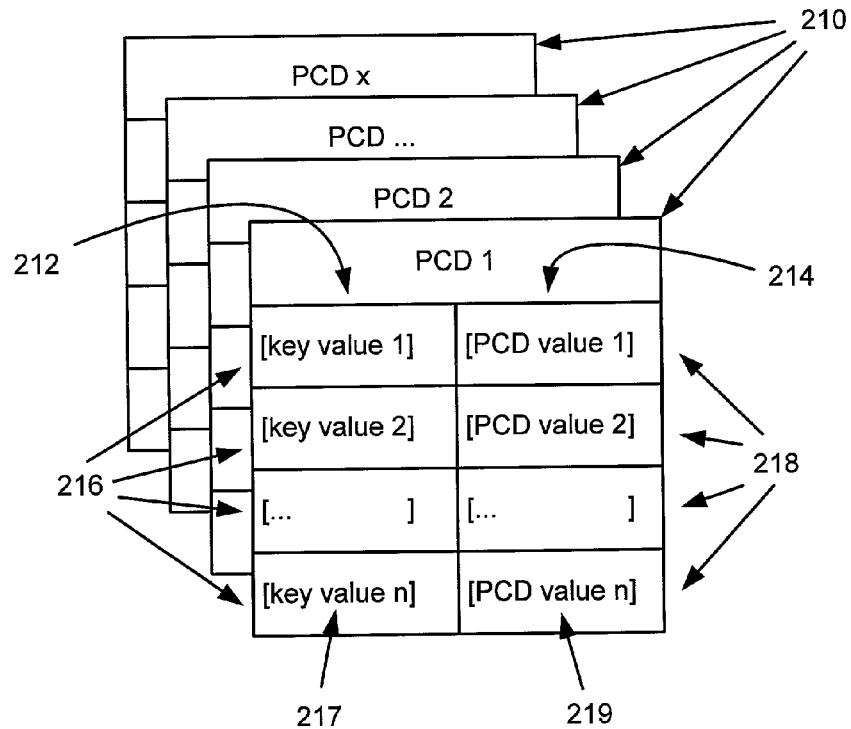
FIG. F-10

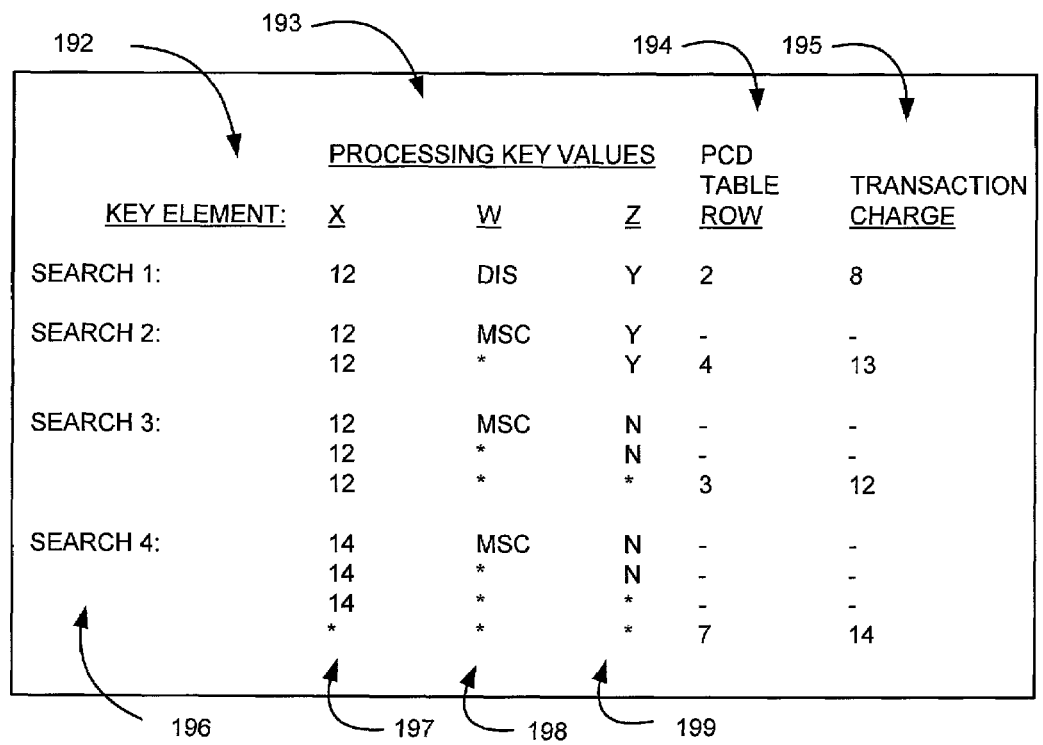
FIG. F-11

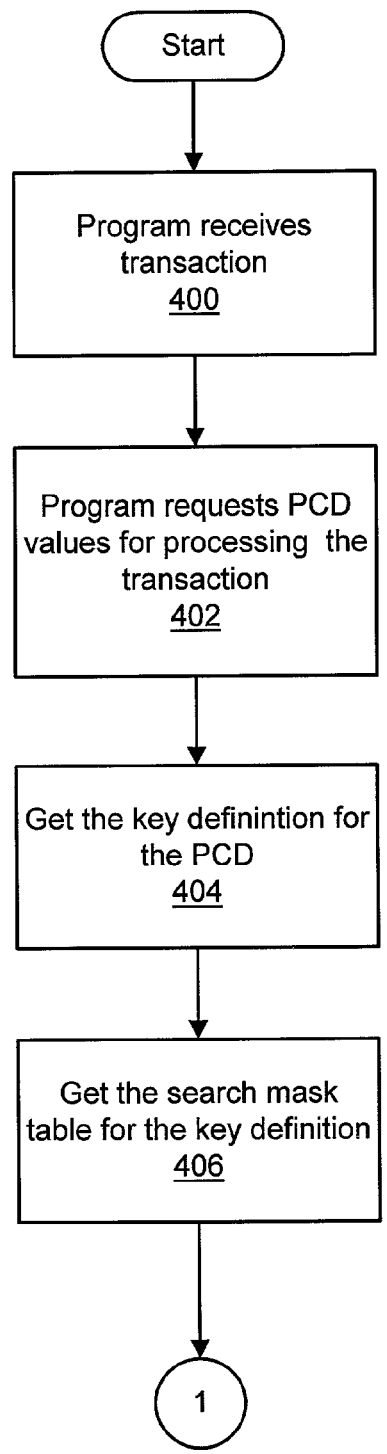
FIG. F-12a

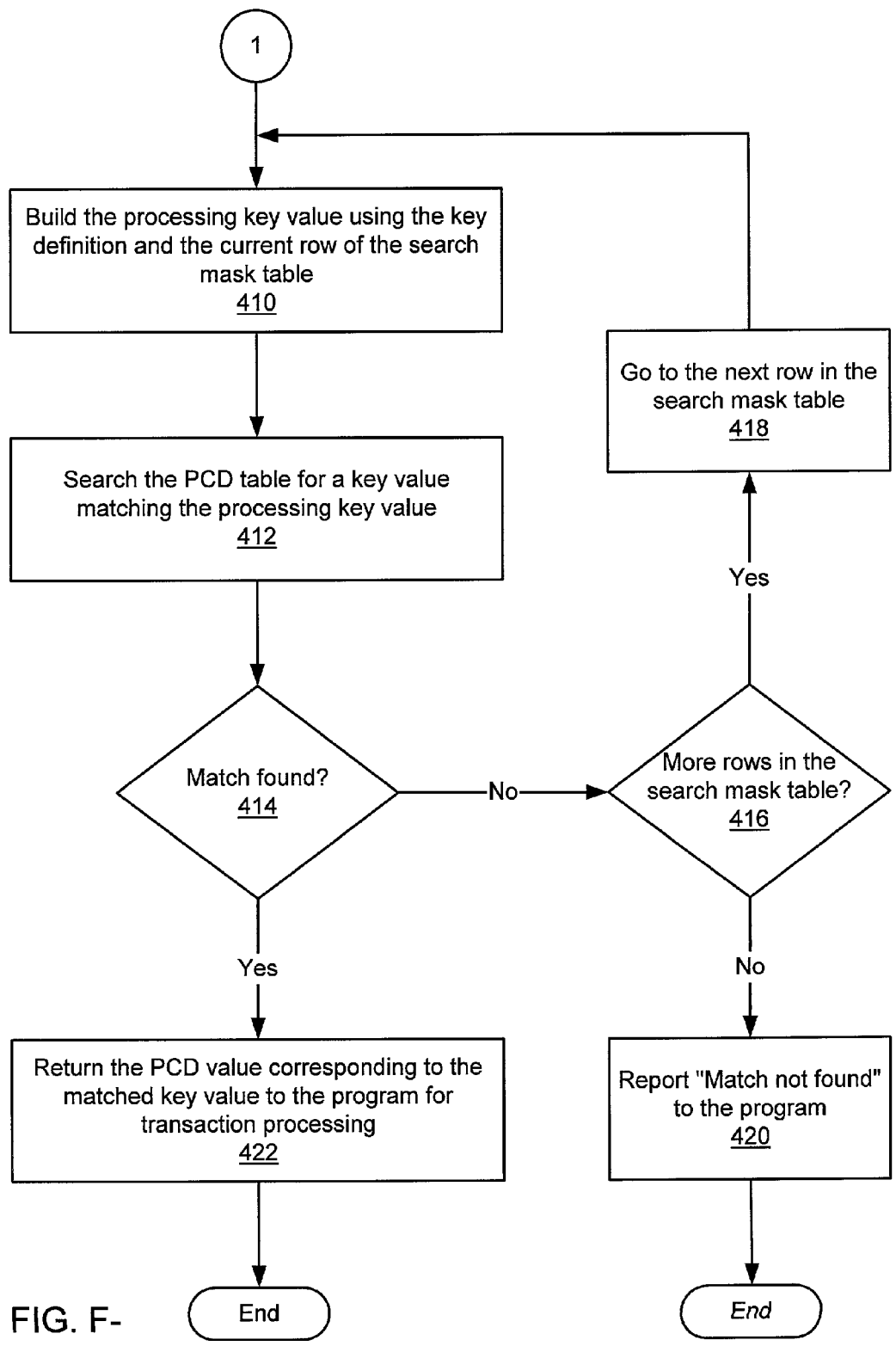
FIG. F-12b

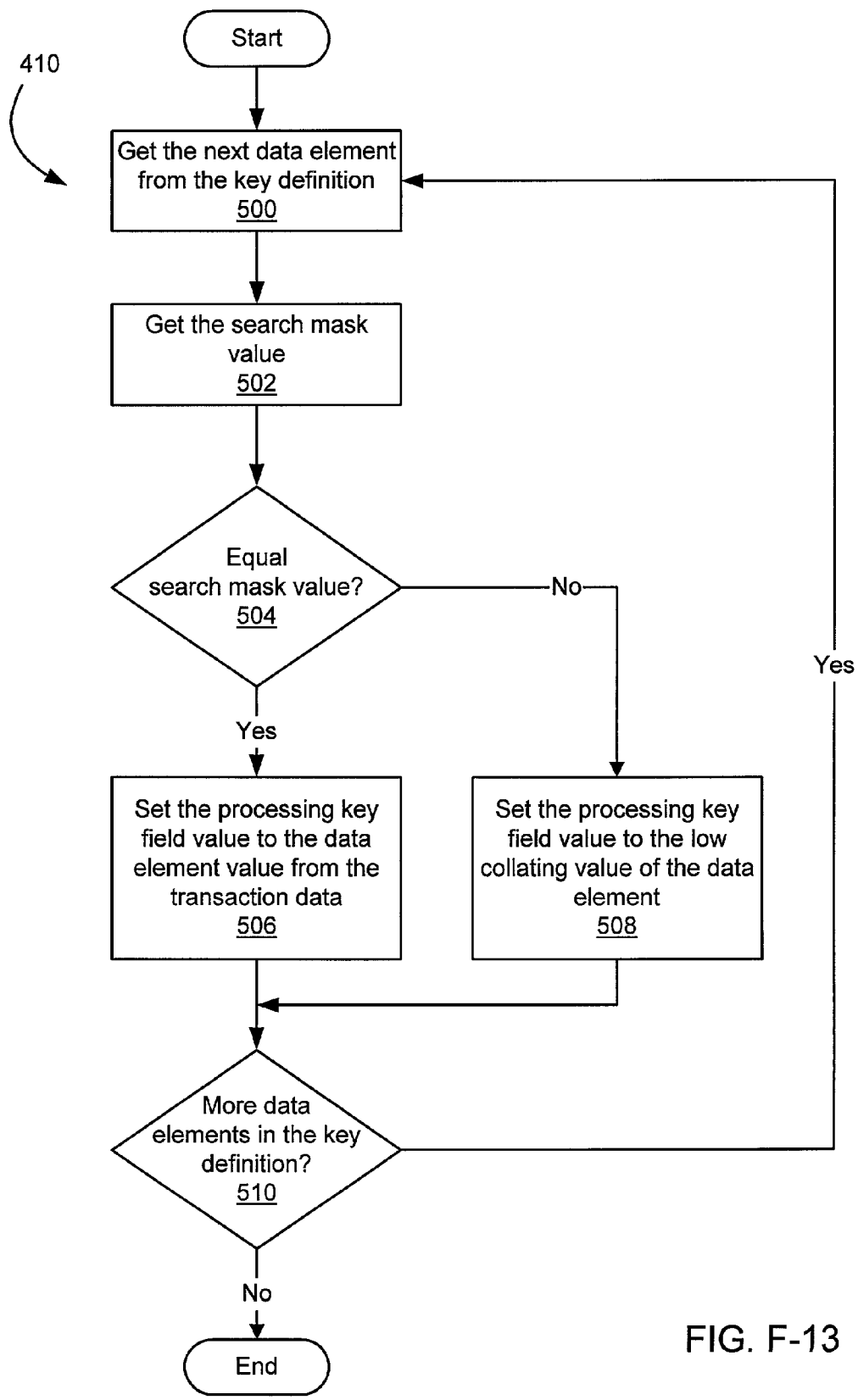
FIG. F-13

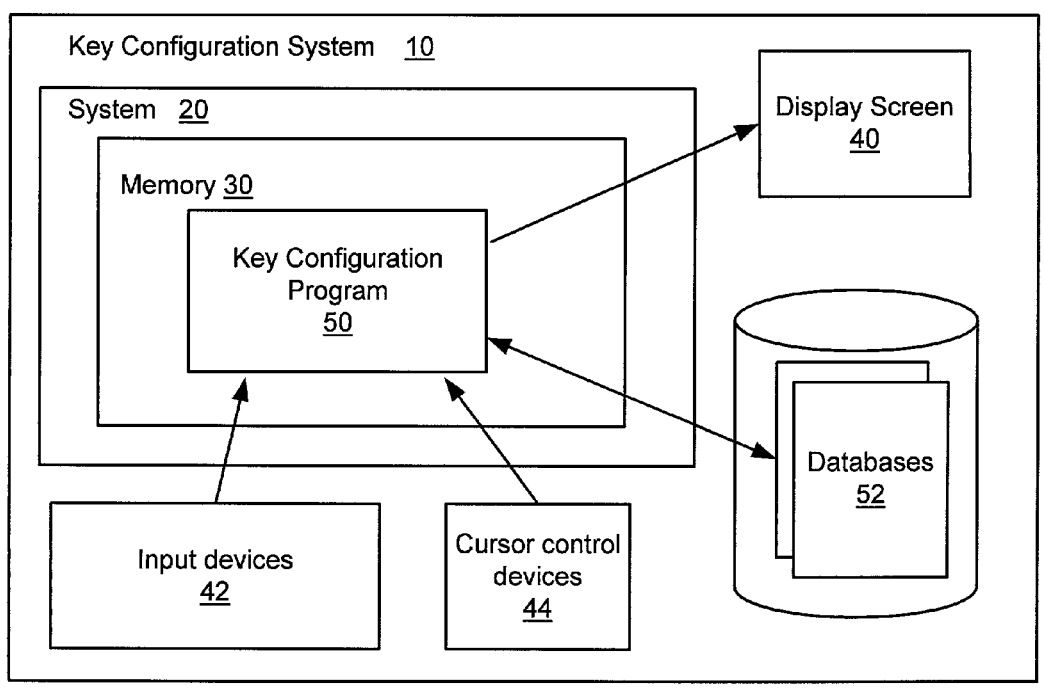
FIG. G-1

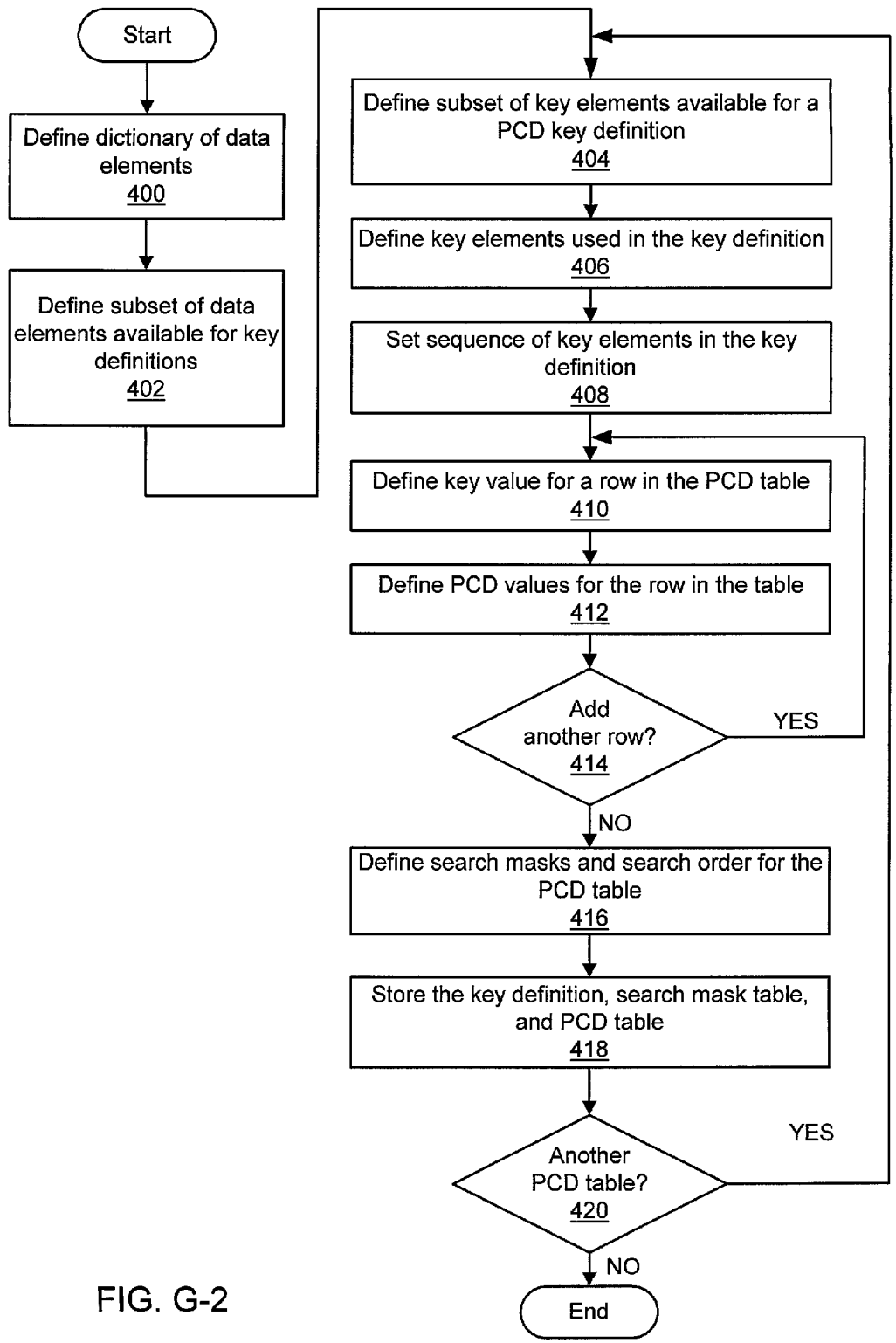
FIG. G-2

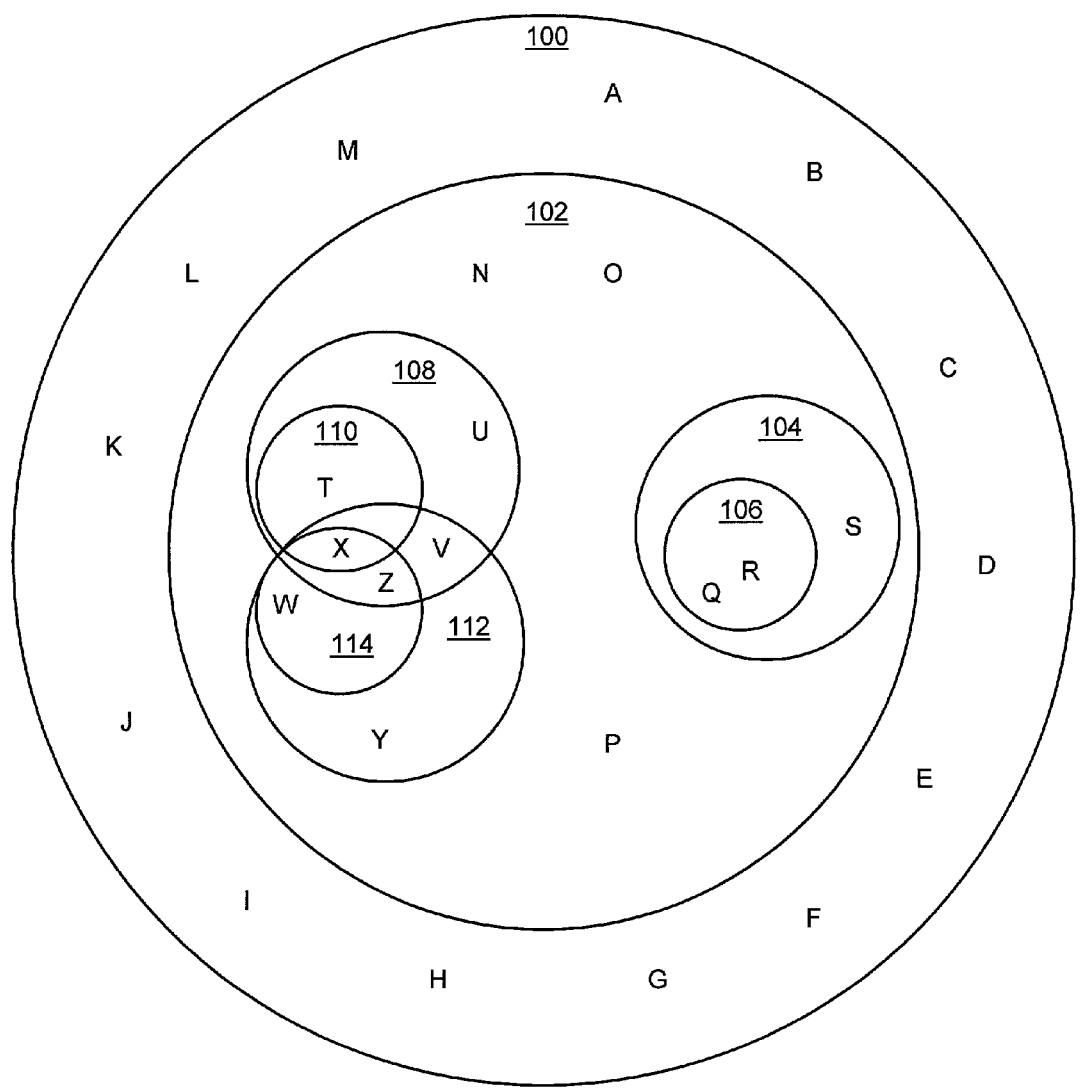
FIG. G-3

122 — DICTIONARY DATA ELEMENTS
124 — USEABLE IN KEYS?

120

| DICTIONARY DATA ELEMENTS | USEABLE IN KEYS? |
|---|---|
| A | NO |
| B | NO |
| C | NO |
| D | NO |
| E | NO |
| F | NO |
| G | NO |
| H | NO |
| I | NO |
| J | NO |
| K | NO |
| L | NO |
| M | NO |
| N | YES |
| O | YES |
| P | YES |
| Q | YES |
| R | YES |
| S | YES |
| T | YES |
| U | YES |
| V | YES |
| W | YES |
| X | YES |
| Y | YES |
| Z | YES |

| AVAILABLE KEY ELEMENTS | USEABLE IN THIS KEY? |
|---|---|
| N | NO |
| O | NO |
| P | NO |
| Q | NO |
| R | NO |
| S | NO |
| T | NO |
| U | NO |
| V | YES |
| W | YES |
| X | YES |
| Y | YES |
| Z | YES |

| AVAILABLE KEY ELEMENTS | USE IN THIS KEY? | SEQUENCE |
|---|---|---|
| V | NO | N/A |
| W | YES | 2 |
| X | YES | 1 |
| Y | NO | N/A |
| Z | YES | 3 |

| KEY ELEMENT | KEY ELEMENT SEQUENCE | ELEMENT NAME | FIELD LENGTH | DATA TYPE |
|---|---|---|---|---|
| X | 1 | COMPANY ID | 2 | NUMERIC |
| W | 2 | CREDIT CARD TYPE | 3 | CHARACTER |
| Z | 3 | ON US/NOT ON US | 1 | CHARACTER |

FIG. G-7

| ROW | KEY VALUES | | | PCD VALUES |
|---|---|---|---|---|
| | X | W | Z | TRANSACTION CHARGE |
| 1 | 12 | VIS | Y | 10 |
| 2 | 12 | DIS | Y | 8 |
| 3 | 12 | * | * | 12 |
| 4 | 12 | * | Y | 13 |
| 5 | 14 | VIS | N | 12 |
| 6 | 14 | DIS | N | 11 |
| 7 | * | * | * | 14 |

FIG. G-8

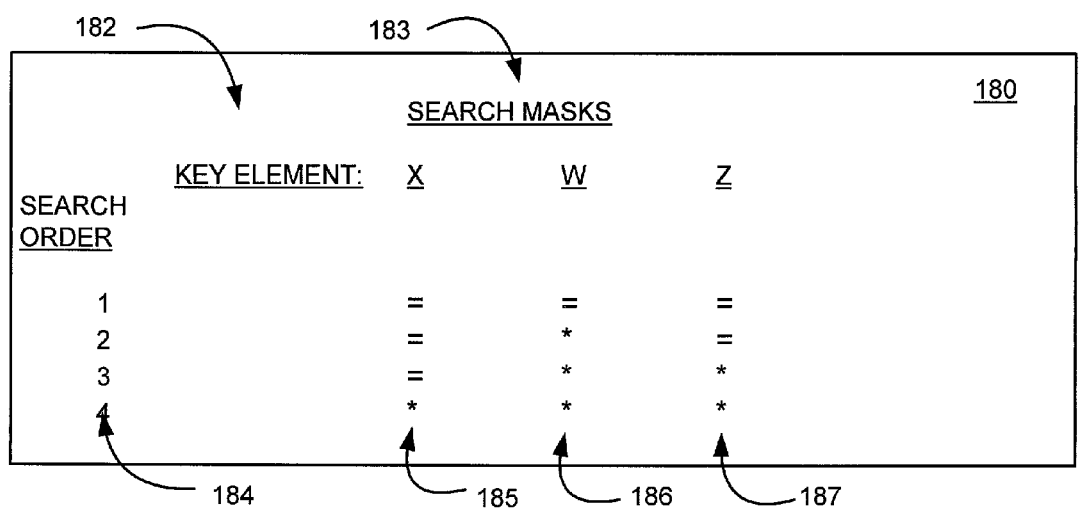
FIG. G-9

| 202 | 204 |
|---|---|
| PCD 1 | User-defined key definition 1 |
| PCD 2 | User-defined key definition 2 |
| PCD ... | ... |
| PCD n | User-defined key definition n |

FIG. G-10

| 206 | 208 |
|---|---|
| PCD 1 | Search mask table 1 |
| PCD 2 | Search mask table 2 |
| PCD ... | ... |
| PCD n | Search mask table n |

FIG. G-11

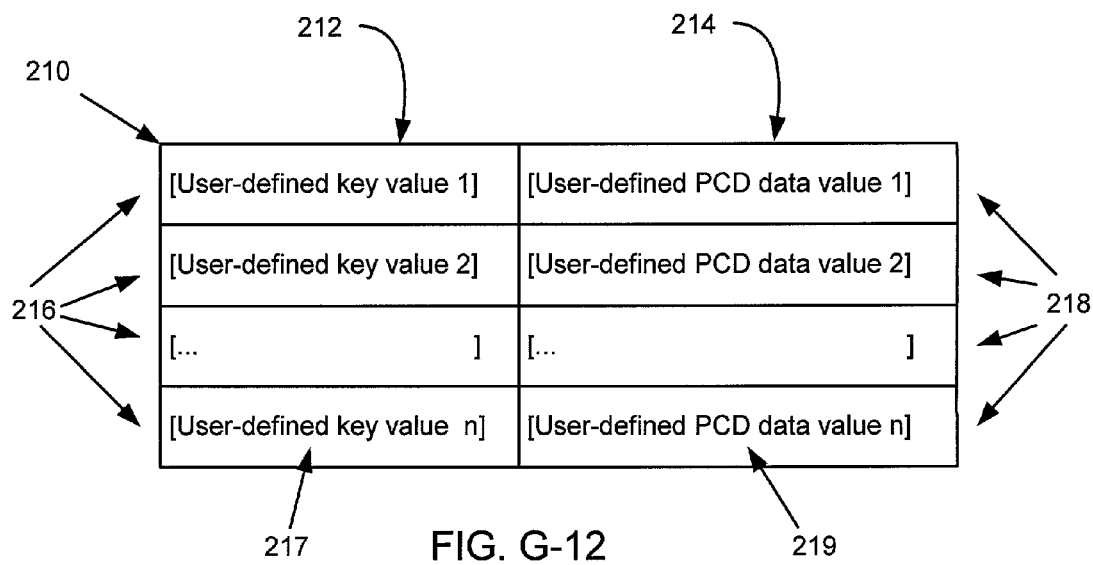
FIG. G-12
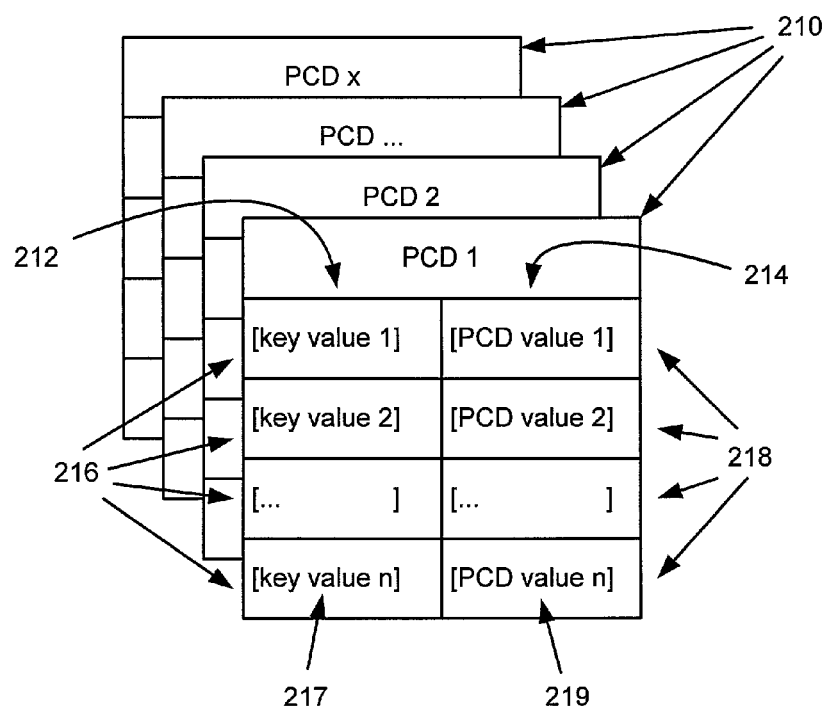
FIG. G-13

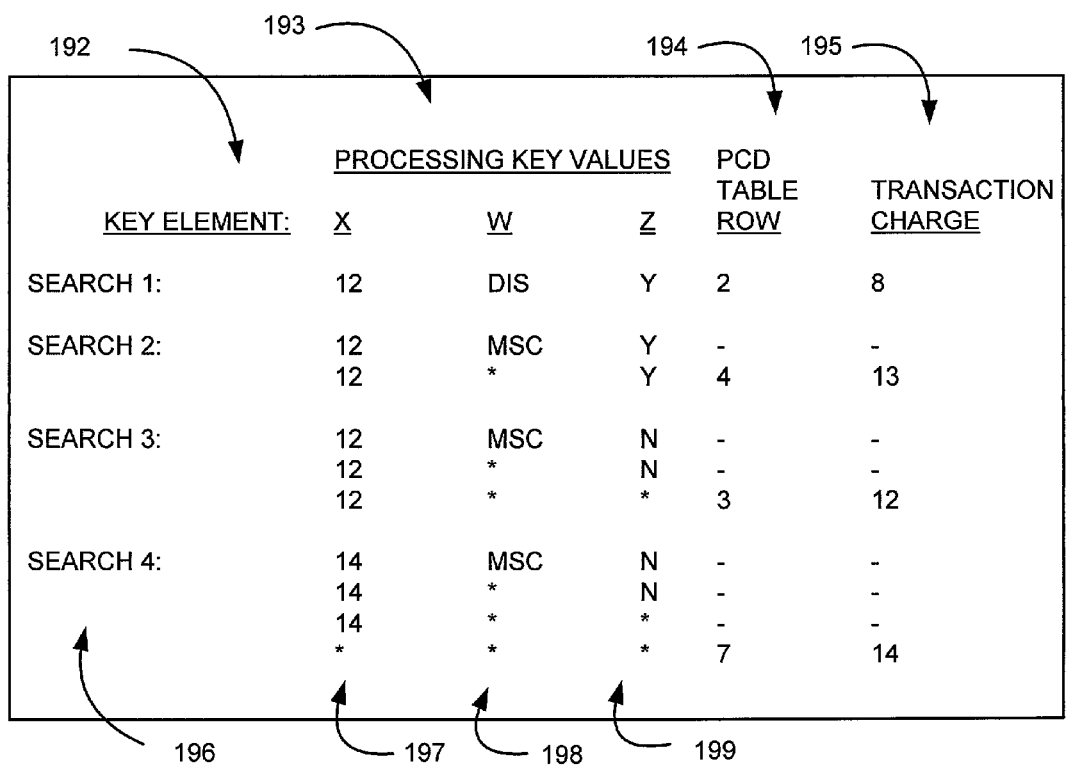
FIG. G-14

BUSINESS TRANSACTION PROCESSING SYSTEMS AND METHODS

PRIORITY CLAIM

This application claims the benefit of U.S. Provisional Application No. 60/162,412 entitled "Configuring Processing Relationships Among Entities Of An Organization," filed Oct. 29, 1999; U.S. Provisional Application No. 60/162,411 entitled "Configuring Systems For Generating Business Transaction Reports Using Processing Relationships Among Entities Of An Organization," filed Oct. 29, 1999; U.S. Provisional Application No. 60/162,602 entitled "Smart Trigger For Use In Processing Business Transactions," filed Oct. 29, 1999; U.S. Provisional Application No. 60/162,509 entitled "Configuring Dynamic Database Packageset Switching For Use In Processing Business Transactions," filed Oct. 29, 1999; U.S. Provisional Application No. 60/162,708 entitled "Processing Business Transactions Using Dynamic Database Packageset Switching," filed Oct. 29, 1999; U.S. Provisional Application No. 60/162,567 entitled "Processing Business Data Using User-Configured Keys," filed Oct. 29, 1999; and U.S. Provisional Application No. 60/162,603 entitled "Configuring Keys For Use In Processing Business Data," filed Oct. 29, 1999.

BACKGROUND OF THE INVENTION

1. Field of the Invention

The present invention generally relates to computer software programs, methods, systems and databases used in Financial Service Organizations.

2. Description of the Related Art

FSOs such as banks, credit unions, insurance companies, mutual find companies, credit card companies, brokerage houses, etc., use FSO computer systems to process business transactions. The FSO production systems, which are often referred to as FSO computer systems or FSO systems, are capable of executing application software programs. The application programs may enable FSOs to offer products and services to their clients. The FSO systems may include one or more databases for storing data. The databases may include, for example, groups of data such as the master files of customer account information, transaction-related data such as customer credit card purchase transactions, processing data such as the processing parameters used in processing transactions, and history data such as log files of daily activities for batch processing.

FSO systems often utilize hardcoded software to process FSO transactions. Changes in the business environment often result in corresponding changes to the processing relationship among various entities of a Financial Service Organization (FSO). For example, new banks being acquired or new branch locations being opened often add to the processing structure of an FSO. FSO systems which utilize hardcoded software may be more difficult to adapt to the changing processing structure.

The following is hereby incorporated by reference: Object Oriented mail server framework mechanism (U.S. Pat. No. 6,081,832), Object Oriented framework mechanism for order processing including predefined extensible classes for defining an order processing environment (U.S. Pat. No. 6,049,665), Object Oriented framework mechanism for determining configuration relations (U.S. Pat. No. 5,937,189), Object Oriented mail server framework mechanism (U.S. Pat. No. 5,768,505).

FSOs such as banks, credit unions, etc., use computer systems running software programs to process FSO transactions. The FSO systems may include one or more databases for storing data. The databases may include groups of data such as the master files of customer account information, transaction data such as customer credit card purchase transactions, processing data such as the processing parameters used in processing transactions, and history data such as log files of daily activities for batch processing.

FSO systems often utilize hardcoded software to process FSO transactions. Changes in the business environment often result in corresponding changes to the processing relationship among various entities of a Financial Service Organization (FSO). For example, new banks being acquired or new branch locations being opened often add to the processing structure of an FSO. FSO systems, which utilize hardcoded software, become more difficult to adapt to the changing processing structure. For example, it may be difficult to change the format of a hardcoded FSO report that has to be collated by regions, wherein one of the regions has expanded to cover more branch FSOs.

The following is hereby incorporated by reference: Object Oriented mail server framework mechanism (U.S. Pat. No. 6,081,832), Object Oriented framework mechanism for order processing including predefined extensible classes for defining an order processing environment (U.S. Pat. No. 6,049,665), Object Oriented framework mechanism for determining configuration relations (U.S. Pat. No. 5,937,189), Object Oriented mail server framework mechanism (U.S. Pat. No. 5,768,505), Decentralized distributed asynchronous object oriented system and method for electronic data management, storage, and communication (U.S. Pat. No. 5,550,976) and Document display system for organizing and displaying documents as screen objects organized along strand paths (U.S. Pat. No. 5,499,330).

FSOs such as banks, credit unions, etc., use computer systems running software programs to process customer account transactions. The computer systems may include databases for storing data such as the master files of customer account information, transactional data such as customer credit card purchase transactions, processing data such as the processing parameters used in processing transactions, and history data such as log files of daily activities for later batch processing.

Databases may be used in FSO business transaction processing systems to store, manage and retrieve data for a variety of applications. In many instances, the databases may be extremely large. The contents of the database may often occupy memory space measured in hundred's of gigabytes. When application programs need to access enormous amounts of data on a transactional basis, whether in batch mode or real-time mode, the FSO business transaction processing systems often utilize commercially available database products. One embodiment of a commercially available database product is the DB2 database from International Business Machines (IBM).

Some nomenclature is introduced here to aid in the understanding of terminology used within the FSO business transaction processing system. A trigger is a defined set of actions that are executed when a delete, insert, or update operation is carried out against a specified table in the FSO database. Stored procedures are similar to a trigger. Both consist of procedural logic that is stored at the database level. However, stored procedures are not event-driven and are not attached to a specific table. A stored procedure is explicitly executed by invoking a CALL to the procedure (instead of implicitly being executed like triggers). Additionally, a stored procedure can access many tables without being specifically associated to any of them.

An example of an FSO that may use such a business transaction processing system is a credit card institution. A credit card institution may issue credit cards to customers of the FSO. The credit card institution may also issue credit cards on behalf of client businesses such as department stores. The credit card institution may also acquire and process credit card transactions from customers and client businesses such as department stores. For example, a credit card institution may issue its own credit card. The credit card institution may also have a client department store. The credit card institution may issue a credit card under the department store's name, and may collect and process all credit card transactions for the department store, charging a fee for each transaction processed. Some of the credit card transactions collected by the credit card institution may be for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

The FSO business transaction processing system may include a data dictionary. A data dictionary may be defined as a collection of descriptions of the data items or elements in the database. For example, the FSO business transaction processing system data dictionary may describe the data elements involved in credit card processing. The data dictionary may describe each of the data elements in the database for credit card processing. Data sets are groups of data, such as master files and transactions, and may be comprised of data elements defined in the data dictionary. Examples of data elements in the FSO data dictionary are customer name, credit card type, and card issuer.

The FSO business transaction processing system may include processing parameters used in processing transactions. Processing parameters may be used to apply business logic to the data elements in the transaction during processing. An example of a transaction in the FSO system is a credit card transaction. An example of a processing parameter is a transaction price that may be charged to a client of a credit card institution for processing a credit card transaction.

The FSO transaction processing application software program may use one or more processing parameters while processing a transaction. A processing parameter may have different values for different transactions. The application software program may examine the values of one or more data elements in the transaction data or database master files to determine the value of a processing parameter for the transaction.

The FSO system database may include processing parameters used in processing transactions. Processing parameters may be used to apply business logic to the data elements in the transaction during processing. An example of a transaction in an FSO system is a credit card transaction. An example of a processing parameter is a transaction price that may be charged to a client of a credit card institution for processing a credit card transaction.

An FSO transaction processing software program may use one or more processing parameters while processing a transaction. A processing parameter may have different values for different transactions. The software program may examine the values of one or more data elements in the transaction data or master files to determine the value of a processing parameter for the transaction.

In one embodiment, an FSO transaction processing system may process one or more data sets using schedule based processing. The user of the FSO may schedule a period for execution of a processing task for the data set. On meeting the qualifications of the schedule, the scheduled processing tasks would be automatically executed.

In another embodiment, an FSO transaction processing system may processes data sets using random event based processing. The user of the FSO may at random or based on an event request the execution of a processing task for the data set. On meeting the qualifications, the requested processing task would be automatically executed.

In prior art and in one embodiment, the processing of data sets or master files was periodic and 'account centric'. Application programs in the FSO computer system had to be scheduled to read and evaluate sequentially every record in the data set to determine if one or more processing tasks were to be executed for the record. For example, a data set may contain a list of all account numbers for an FSO. Processing of an account at a pre-determined period, may comprise evaluating conditions to execute for each account number a list of one or more functions or processing tasks. Preferred embodiments of the processing tasks performed on an account number may require the FSO to raise credit limit, change expiration date, send card data for embossing, and others. For example, the FSO may need to extend the expiration date on a group of credit card accounts, which have a current expiration date of December 1999. The application program would sequentially access every record in an account master file and determine which one of the one or more functions or processing tasks is needed to be performed. Each record lacks information that identifies the particular processing task to be performed. This requires that each of the one or more functions or processing tasks must be queried to determine if it is applicable. If master file record matches the specified criteria of having an expiration date of December 1999, then it would execute the processing task that is subsequently found to be applicable i.e. extend the date of expiration of the credit card. If the evaluation criteria did not match then it would go to the next record in the FSO account master file. Assuming a master file has millions of records, and each record may have one or more processing tasks associated with it, the process of sequentially accessing every record to determine applicability of a processing task to a specific record is very inefficient and time consuming. The method also utilizes extensive FSO computer resources to process FSO data sets.

A conventional method to process FSO data sets in a random event based manner, may use a trigger function provided by IBM's DB2 database sub-system. This method limits FSO data set processing to a specified table. Processing of FSO data sets may need a trigger function to access multiple DB2 tables. Another embodiment of prior art, which is also based on IBM's DB2 database sub-system, may use a stored procedure to process FSO data sets. This method has one or more drawbacks, which may limit the usefulness in FSO data set processing applications. Stored procedures are not event driven and must be explicitly initiated by a CALL command in an application program of the FSO computer system.

It is, therefore, desirable to provide a method and a system to identify and execute only those processing tasks for an FSO data set which have been identified to need further processing. The Smart Trigger method and system to process FSO data sets, improves on the trigger and stored procedure methods by removing their drawbacks and uses periodic and event based techniques. The improved method and system is thus more 'function centric' and not 'account centric'.

FSOs such as banks, credit unions, etc., use computer systems running software programs to process customer account transactions. The computer systems may include databases for storing data such as the master files of customer account information, transactional data such as customer credit card purchase transactions, processing data such as the processing parameters used in processing transactions, and history data such as log files of daily activities for later batch processing.

Databases may be used in FSO business transaction processing systems to store, manage and retrieve data for a variety of applications. In many instances, the databases may be extremely large. The contents of the database may often occupy memory space measured in hundred's of gigabytes. When application programs need to access enormous amounts of data on a transactional basis, whether in batch mode or real-time mode, the FSO business transaction processing systems often utilize commercially available database products. One embodiment of a commercially available database product is the DB2 database from International Business Machines (IBM).

Some nomenclature is introduced here to aid in the understanding of terminology used. A database packageset contains information needed by the FSO database software to locate and access data in the most efficient way for a particular application program in the FSO business transaction processing system. Database packageset switching occurs when the database packageset values associated with one application program are changed to the database packageset values associated with another application program in the same business transaction processing system. Dynamic database packageset switching occurs when the database packageset values associated with one application program are changed in real-time to the database packageset values associated with another application program in the same business transaction processing system. FSO database environmental variables and database registry values may contain information to control a specific database environment within the FSO business transaction processing system. The user may change environmental variables and registry values to change the FSO database environment.

An example of an FSO that may use such a business transaction processing system is a credit card institution. A credit card institution may issue credit cards to customers of the FSO. The credit card institution may also issue credit cards on behalf of client businesses such as department stores. The credit card institution may also acquire and process credit card transactions from customers and client businesses such as department stores. For example, a credit card institution may issue its own credit card. The credit card institution may also have a client department store. The credit card institution may issue a credit card under the department store's name, and may collect and process all credit card transactions for the department store, charging a fee for each transaction processed. Some of the credit card transactions collected by the credit card institution may be for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

The FSO business transaction processing system may include a data dictionary. A data dictionary may be defined as a collection of descriptions of the data items or elements in the database. For example, the FSO business transaction processing system data dictionary may describe the data elements involved in credit card processing. The data dictionary may describe each of the data elements in the database for credit card processing. Groups of data such as master files and transactions may be comprised of data elements defined in the data dictionary. Examples of data elements in the FSO data dictionary are customer name, credit card type, and card issuer.

The FSO business transaction processing system may include processing parameters used in processing transactions. Processing parameters may be used to apply business logic to the data elements in the transaction during processing. An example of a transaction in the FSO system is a credit card transaction. An example of a processing parameter is a transaction price that may be charged to a client of a credit card institution for processing a credit card transaction. Another example of a processing parameter may be a database identifier, which may point to the location of the data in an FSO database.

The FSO transaction processing application software program may use one or more processing parameters while processing a transaction. A processing parameter may have different values for different transactions. The application software program may examine the values of one or more data elements in the transaction data or database master files to determine the value of a processing parameter for the transaction.

A combination of data elements used to determine the value of a processing parameter may be referred to as a key definition for the processing parameter. The combination of data element values constructed from the key definition may be referred to as a key value. For example, a software program for processing credit card transactions for a credit card institution may use the credit card issuer and card type to determine the database identifier.

Key definitions and key value construction are hardcoded in the source code for the FSO system software programs. Modifying the key definitions and the construction of key values from the key definitions involves modifying the source code for all software programs that use the key definitions, recompiling and relinking the programs, reinstalling the software programs, and possibly modifying the data dictionary and database structure used by the software programs. If more than one FSO use the software programs, customization of key definitions and key value construction for one of the FSOs requires creating and maintaining a customized copy of the source code for the programs.

In some FSO systems, processing parameters, such as the database identifier, and the key values used to identify them may be hardcoded in the source code for the FSO system software programs. Modifying the processing parameters and key values for these systems may involve modifying the source code for all software programs that use the processing parameter, recompiling and relinking the programs, and reinstalling the software programs. In other FSO systems, the processing parameters and key values may be stored in the FSO system database. In these systems, the processing parameters and key values in the database and the key definitions and key value construction in the source code must be synchronized. Thus, the processing parameters and key values in the database may be considered hardcoded as well, as they cannot be modified without also modifying the source code and rebuilding the programs as described above.

During the initial design and development phase of a large scale database application, such as the DB2, it may be necessary or desirable to have different database environments such as Development, Quality, Testing, Production, etc. In addition, the Development environment may also be different, based on the operating system of the computer. It may be necessary or desirable to have one or more databases within one environment. For example, it may be desirable to have a separate database for each development engineer within one DB2 Development environment.

Database limitations may prohibit the use of multiple environments within the same database sub-system. The number of multiple databases within one environment within the same database sub-system may also be limited. One embodiment of a database, which may have some of these limitations is the DB2 database from International Business Machines (IBM). These limitations may often substantially reduce the flexibility of the FSO transaction processing application software program to adapt to changing business requirements. For example, an FSO business transaction processing system may need to expand and respond quickly to integrate a newly acquired FSO or process transactions from a new FSO location. A conventional method to implement these changes often involves changing the source code of the application program. This method is programming intensive, time consuming and costly.

The conventional method for the FSO transaction processing application software program developer to work around database environment restriction may be to manually modify the application program source code, in an off-line mode, to change the environment name in the database registry values. The application source code may be written in higher level programming languages such as COBOL, SQL, C, Visual Basic, C++, Java, and others. Manual switching between the one or more database environments may often involve a shutdown and startup phase for the database sub-system. This is especially undesirable in installations, which attempt to operate continuously.

The conventional method for the FSO transaction processing application software program developer to avoid the difficulty of adding a new database name may be to add new data to an existing database name. As an alternate, the application software program developer could manually modify the application program source code, in an off-line mode, to change the database name in the DB2 registry values to the 'new' database name. The application source code may be written in higher level programming languages such as COBOL, SQL, C, Visual Basic, C++, Java, and others. Both of these methods have drawbacks.

The method of adding new data to an existing DB2 database increases the size, often reducing the system performance and increasing maintenance complexity. The method of changing a database name by using applicable commands in the application programming language i.e. by modifying the source code, significantly increases the development time and the costs. For example, adding a new company database in an FSO may affect the source code in thousands of application programs.

FSOs such as banks, credit unions, etc., use computer systems running software programs to process customer account transactions. The computer systems may include databases for storing data such as the master files of customer account information, transactional data such as customer credit card purchase transactions, processing data such as the processing parameters used in processing transactions, and history data such as log files of daily activities for later batch processing.

Databases may be used in FSO business transaction processing systems to store, manage and retrieve data for a variety of applications. In many instances, the databases may be extremely large. The contents of the database may often occupy memory space measured in hundred's of gigabytes. When application programs need to access enormous amounts of data on a transactional basis, whether in batch mode or real-time mode, the FSO business transaction processing systems often utilize commercially available database products. One embodiment of a commercially available database product is the DB2 database from International Business Machines (IBM).

Some nomenclature is introduced here to aid in the understanding of terminology used. A database packageset contains information needed by the FSO database software to locate and access data in the most efficient way for a particular application program in the FSO business transaction processing system. Database packageset switching occurs when the database packageset values associated with one application program are changed to the database packageset values associated with another application program in the same business transaction processing system. Dynamic database packageset switching occurs when the database packageset values associated with one application program are changed in real-time to the database packageset values associated with another application program in the same business transaction processing system. FSO database environmental variables and database registry values may contain information to control a specific database environment within the FSO business transaction processing system. The user may change environmental variables and registry values to change the FSO database environment.

An example of an FSO that may use such a business transaction processing system is a credit card institution. A credit card institution may issue credit cards to customers of the FSO. The credit card institution may also issue credit cards on behalf of client businesses such as department stores. The credit card institution may also acquire and process credit card transactions from customers and client businesses such as department stores. For example, a credit card institution may issue its own credit card. The credit card institution may also have a client department store. The credit card institution may issue a credit card under the department store's name, and may collect and process all credit card transactions for the department store, charging a fee for each transaction processed. Some of the credit card transactions collected by the credit card institution may be for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

The FSO business transaction processing system may include a data dictionary. A data dictionary may be defined as a collection of descriptions of the data items or elements in the database. For example, the FSO business transaction processing system data dictionary may describe the data elements involved in credit card processing. The data dictionary may describe each of the data elements in the database for credit card processing. Groups of data such as master files and transactions may be comprised of data elements defined in the data dictionary. Examples of data elements in the FSO data dictionary are customer name, credit card type, and card issuer.

The FSO business transaction processing system may include processing parameters used in processing transactions. Processing parameters may be used to apply business logic to the data elements in the transaction during processing. An example of a transaction in the FSO system is a credit card transaction. An example of a processing parameter is a transaction price that may be charged to a client of a credit card institution for processing a credit card transaction.

Another example of a processing parameter may be a database identifier, which may point to the location of the data in an FSO database.

The FSO transaction processing application software program may use one or more processing parameters while processing a transaction. A processing parameter may have different values for different transactions. The application software program may examine the values of one or more data elements in the transaction data or database master files to determine the value of a processing parameter for the transaction.

A combination of data elements used to determine the value of a processing parameter may be referred to as a key definition for the processing parameter. The combination of data element values constructed from the key definition may be referred to as a key value. For example, a software program for processing credit card transactions for a credit card institution may use the credit card issuer and card type to determine the database identifier.

Key definitions and key value construction are hardcoded in the source code for the FSO system software programs. Modifying the key definitions and the construction of key values from the key definitions involves modifying the source code for all software programs that use the key definitions, recompiling and relinking the programs, reinstalling the software programs, and possibly modifying the data dictionary and database structure used by the software programs. If more than one FSO use the software programs, customization of key definitions and key value construction for one of the FSOs requires creating and maintaining a customized copy of the source code for the programs.

In some FSO systems, processing parameters, such as the database identifier, and the key values used to identify them may be hardcoded in the source code for the FSO system software programs. Modifying the processing parameters and key values for these systems may involve modifying the source code for all software programs that use the processing parameter, recompiling and relinking the programs, and reinstalling the software programs. In other FSO systems, the processing parameters and key values may be stored in the FSO system database. In these systems, the processing parameters and key values in the database and the key definitions and key value construction in the source code must be synchronized. Thus, the processing parameters and key values in the database may be considered hardcoded as well, as they cannot be modified without also modifying the source code and rebuilding the programs as described above.

During the initial design and development phase of a large scale database application, such as the DB2, it may be necessary or desirable to have different database environments for Development, Quality, Testing, Production, etc. In addition, the Development environment may also be different, based on the operating system of the computer. It may be necessary or desirable to have one or more databases within one environment. For example, it may be desirable to have a separate database for each development engineer within one DB2 Development environment.

Database limitations may prohibit the use of multiple environments within the same database sub-system. The number of multiple databases within one environment within the same database sub-system may also be limited. One embodiment of a database, which may have some of these limitations is the DB2 database from International Business Machines (IBM). These limitations may often substantially reduce the flexibility of the FSO transaction processing application software program to adapt to changing business requirements. For example, an FSO business transaction processing system may need to expand and respond quickly to integrate a newly acquired FSO or process transactions from a new FSO location. A conventional method to implement these changes often involves changing the source code of the application program. This method is programming intensive, time consuming and costly.

The conventional method for the FSO transaction processing application software program developer to work around database environment restriction may be to manually modify the application program source code, in an off-line mode, to change the environment name in the database registry values. The application source code may be written in higher level programming languages such as COBOL, SQL, C, Visual Basic, C++, Java, and others. Manual switching between the one or more database environments may often involve a shutdown and startup phase for the database sub-system. This is especially undesirable in installations, which attempt to operate continuously. The conventional method for the FSO transaction processing application software program developer to avoid the difficulty of adding a new database name may be to add new data to an existing database name. As an alternate, the application software program developer could manually modify the application program source code, in an off-line mode, to change the database name in the DB2 registry values to the 'new' database name. The application source code may be written in higher level programming languages such as COBOL, SQL, C, Visual Basic, C++, Java, and others. Both of these methods have drawbacks.

The method of adding new data to an existing DB2 database increases the size, often reducing the system performance and increasing maintenance complexity. The method of changing a database name by using applicable commands in the application programming language i.e. by modifying the source code, significantly increases the development time and the costs. For example, adding a new company database in an FSO may affect the source code in thousands of application programs.

FSOs such as banks, credit unions, etc., use computer systems running software programs to process FSO transactions. The FSO systems may include one or more databases for storing data. The databases may include groups of data such as the master files of customer account information, transaction data sets such as customer credit card purchase transactions, processing data such as the processing parameters used in processing transactions, and history data such as log files of daily activities for batch processing.

The processing parameters used in the processing of transactions in an FSO system may be embedded in the source code of the FSO system software programs, or the processing parameters may be stored in one or more tables in the FSO system database. Processing parameters may be used to apply business logic to the transactions during processing. A processing parameter may have different values for different transactions based upon one or more attributes of the transactions. For example, the processing parameter values used in processing a customer credit card transaction made at one department store may be different than the processing parameter values used in processing a customer credit card transaction made at a different department store. Attributes of a transaction may be defined by one or more data elements in the transaction or one or more data elements in a master file associated with the transaction. The attributes could be, for example, the name of a bank issuing the credit card to the customer, or the type of credit card (e.g., gold, platinum, etc.). The FSO system may examine the values of one or more data elements (e.g., gold, platinum, etc.) in the transaction data or master files to determine the value of a processing parameter for the transaction. The FSO system may examine the values of one or more data elements in the transaction data or master files to determine the value of a processing parameter for the transaction. A set of data elements useable to determine the value of a processing parameter for a transaction may be referred to as a key definition for the processing parameter. Data element values may be extracted from a transaction data set and an associated master file by using the data elements in the key definition to locate the data element values. The data element values may be combined to form a key value for the processing parameter for the transaction.

Key definitions and the construction of key values are hardcoded in the source code for the FSO system software programs. Modifying the key definitions and the construction of key values from the key definitions involves modifying the source code for all software programs that use the key definitions, recompiling and relinking the programs, reinstalling the software programs, and possibly modifying the data dictionary and database structure used by the software programs. If the software programs are used by more than one FSO, and if one of the FSOs requires customized key definitions, customization of the key definitions and key value construction for one of the FSOs requires creating and maintaining a customized copy of the source code for the software programs.

In some FSO systems, processing parameters and the key values used to identify and select the processing parameters may be hardcoded in the source code for the FSO system software programs. Modifying the processing parameters and key values for these systems may involve modifying the source code for all software programs that use the processing parameters, recompiling and relinking the programs, and reinstalling the software programs. In other FSO systems, the processing parameters and key values may be stored in the FSO system database. In these systems, the processing parameters and key values in the database and the key definitions and key value construction in the source code must be synchronized. Modifying the processing parameters and key values in the database may also require modifying the source code and rebuilding the programs as described above.

As a result of the hardcoding of processing parameters and keys, FSO systems are not flexible in the configuration and use of processing parameters. This inflexibility makes it difficult for the FSO to configure an FSO system to meet custom transaction processing requirements.

The following is, hereby, incorporated by reference: Data retrieval method and apparatus with multiple source capability (U.S. Pat. No. 6,023,694), Graphical user interface for relating key index properties to database table columns (U.S. Pat. No. 5,553,218), Index managing method in database managing system (U.S. Pat. No. 5,806,058) and Relational database management system for chemical structure storage, searching and retrieval (U.S. Pat. No. 5,950,192).

FSOs such as banks, credit unions, etc., use computer systems running software programs to process FSO transactions. The FSO systems may include one or more databases for storing data. The databases may include groups of data such as the master files of customer account information, transaction-related data such as customer credit card purchase transactions, processing-related data such as the processing parameters used in processing transactions including charges to merchants for processing credit card transactions, and history data such as log files of daily activities for batch processing.

The processing parameters used by the FSO system in processing transactions, may be embedded in the source code of the FSO system software programs, or the processing parameters may be stored in one or more tables in the FSO system database. Processing parameters may be used to apply business logic to the transactions during processing. A processing parameter may have different values for different transactions based upon one or more attributes of the transactions. For example, the processing parameter values used in processing a customer credit card transaction made at one department store may be different than the processing parameter values used in processing a customer credit card transaction made at a different department store. Attributes of a transaction may be defined by one or more data elements in the transaction or one or more data elements in a master file associated with the transaction. The attributes could be, for example, the name of a bank issuing the credit card to the customer, or the type of credit card (e.g., gold, platinum, etc.). The FSO system may examine the values of one or more data elements (e.g., gold, platinum, etc.) in the transaction data or master files to determine the value of a processing parameter for the transaction. A set of data elements useable to determine the value of a processing parameter for a transaction may be referred to as a key definition for the processing parameter. Data element values may be extracted from a transaction data set and an associated master file by using the data elements in the key definition to locate the data element values. The data element values may be combined to form a key value for the processing parameter for the transaction. Data elements used in a key definition may be referred to as key elements.

Key definitions and the instructions for constructing or preparing key values are hardcoded in the source code for the FSO system software programs. Modifying the key definitions and the instructions for constructing key values from the key definitions involves modifying the source code for all software programs that use the key definitions and the instructions for constructing the key values, recompiling and relinking the programs, reinstalling the software programs, and possibly modifying a system data dictionary and database structure used by the software programs. If the software programs are used by more than one FSO, and if one of the FSOs requires customized key definitions, customization of the key definitions and instructions for constructing key values for one of the FSOs requires creating and maintaining a customized copy of the source code for the software programs.

In some FSO systems, processing parameters and corresponding key values used to identify and select the processing parameters may be hardcoded in the source code for the FSO system software programs. As an aside, prior FSO systems construct key values and compare the constructed key values to key values embedded in the hardcode in order to find a match. When a match occurs, the corresponding processing parameter is subsequently used in processing the transaction. Modifying the processing parameters and corresponding key values for these systems may involve modifying the source code for all software programs that use the processing parameters, recompiling and relinking the programs, and reinstalling the software programs. In other FSO systems, the processing parameters and corresponding key values may be stored in the FSO system database. In these systems, the processing parameters and corresponding key values in the database must be synchronized with the key definitions and instructions for constructing key values in the source code. Modifying the processing parameters and key values in the database may also require modifying the source code and rebuilding the programs as described above.

As a result of the hardcoding of processing parameters and keys, FSO systems are not flexible in the configuration and use of processing parameters. Any modification to the hardcode must be made by one or more people with sophisticated educational backgrounds and a sufficient understanding of the FSO system. Moreover, the time needed to implement and test modifications to existing FSO systems makes it difficult for FSOs to respond to rapidly changing business strategies.

The following is, hereby, incorporated by reference: Data retrieval method and apparatus with multiple source capability (U.S. Pat. No. 6,023,694), Graphical user interface for relating key index properties to database table columns (U.S. Pat. No. 5,553,218), Index managing method in database managing system (U.S. Pat. No. 5,806,058) and Relational database management system for chemical structure storage, searching and retrieval (U.S. Pat. No. 5,950,192).

SUMMARY OF THE INVENTION

An improved method, system and carrier medium may be used to configure a Financial Service Organization (FSO) production system. Such a production system typically gathers business data (including transactional data), stores the data, sorts the data, and collates the data into FSO reports used, for example, by various entities of the FSO.

In one embodiment, a multilevel business structure, which may represent the processing relationship between various entities of the FSO, may be configured. A processing relationship configuration program may be used to configure, and subsequently modify, a processing relationship structure. A multilevel node structure may be defined to correspond to the processing relationship structure within an FSO. In one embodiment, one or more rows and one or more columns may represent the multilevel node structure. In one embodiment, a node may be created and uniquely defined to represent an FSO physical entity and/or an FSO function. In one embodiment, examples of an FSO physical entity may be a bank, a branch office, a department, etc. An FSO function, in one embodiment, may be an issuance of a credit card, for example.

In one embodiment, the user may construct a processing relationship structure by selecting a required processing relationship object from one or more objects represented on a display screen. The user may specify the values associated with the selected processing relationship object which may include level number, object name, object identifier, etc. More than one processing relationship object of the same type may be created e.g., multiple bank objects may be created as instances of a bank object. In one embodiment, a root level structure may include only one node. Nodes beneath a node may be referred to as descendents of the node. A node number may uniquely identify a node object in the processing relationship structure. Each newly created node in the functional relationship structure may be assigned a node identifier. In one embodiment, a user may assign a node identifier and the processing relationship configuration program may assign a node number. In one embodiment, the node identifier may be unique. By defining each of the nodes at each of the levels of the processing relationship structure the user may complete the configuration process. In one embodiment, an FSO database may be used to store the processing relationship structure information.

In one embodiment, any node and its relationship with other nodes may be edited to reflect current business conditions by using the edit processing function included in the processing relationship configuration program. In one embodiment, editing may include node operations such as insert, delete, change or expand. In one embodiment, FSO software, such as a program to generate reports, may use the processing relationship structure information to reflect current business conditions.

An improved method, system and carrier medium may be used to configure a Financial Service Organization (FSO) production system. Such a production system typically gathers business data (including transactional data), stores the data, sorts the data, and collates the data into FSO reports used by various entities of the FSO.

In one embodiment, a multilevel business structure, which may represent the processing relationship between various entities of the FSO, may be configured. A processing relationship configuration program may be used to configure, and subsequently modify, a processing relationship structure. A multilevel node structure may be defined to correspond to the processing relationship structure within an FSO. In one embodiment, one or more rows and one or more columns may represent the multilevel node structure. In one embodiment, a node may be created and uniquely defined to represent an FSO physical entity and/or an FSO function. In one embodiment, an FSO physical entity may be a bank, a branch office, a department, etc. An FSO function, in one embodiment, may be an issuer of credit cards.

In one embodiment, the user may construct a processing relationship structure by selecting a required processing relationship object from one or more objects represented on a display screen. The user may specify the values associated with the selected processing relationship object which may include level number, object name, object identifier, etc. More than one processing relationship object of the same type may be created e.g., multiple bank objects may be created as instances of a bank object. In one embodiment, a root level structure may include only one node. Nodes beneath a node may be referred to as descendents of the node. A node number may uniquely identify a node object in the processing relationship structure. Each newly created node in the functional relationship structure may be assigned a node identifier. In one embodiment, a user may assign a node identifier and the processing relationship configuration program may assign a node number. In one embodiment, the node identifier may be unique. By defining each of the nodes at each of the levels of the processing relationship structure the user may complete the configuration process. In one embodiment, an FSO database may be used to store the processing relationship structure information.

In one embodiment, any node and its relationship with other nodes may be edited to reflect current business conditions by using the edit processing function included in the processing relationship configuration program. In one embodiment, editing may include node operations such as insert, delete, change or expand. In one embodiment, FSO software, such as a program to generate reports, may use the processing relationship structure information to reflect current business conditions.

In one embodiment, an FSO report may be generated based on the defined processing relationship structure. A report record definition, used in the generation of reports, may be a data structure that defines the format of report records in an FSO system. In one embodiment, a report record definition may be created by selecting a data element included in a node and by adding the selected data element to the break key field included in the report record definition. In one embodiment, a report generation program may read a report format file, gather data from a collection of data i.e., transaction log record, extract data element values from the data collection and add the extracted data element values as break key fields and/or report data values in a report record. In one embodiment, the report data elements for which values are to be extracted and added to report records may be defined in a user configured report record definition in the report format file. After report generation program has gathered all report records to be processed into a report, the report records may be sorted on one or more break key fields. The report records may then be processed into reports. In one embodiment, each report record may represent one line in a report.

In one embodiment, the user of a FSO computer system may reconfigure or edit one or more data elements of the break key field included in the report record definition to change the report format. The report program may automatically keep track of changes made to the processing relationship structure.

The present invention provides various embodiments of an improved method and system for the selective identification and execution of a specific processing task for one or more records contained in the one or more Financial Service Organization (FSO) data sets. An FSO computer user may configure a smart trigger table by defining a scheduled date, an identifier for a data set and an associated processing task. In one embodiment, an identifier for a data set may be a pointer to database memory location of the data set. In one embodiment, an activity number and its corresponding activity data may define an associated processing task. In one embodiment, the specified scheduled date may determine the trigger condition.

In one embodiment, the FSO user may schedule a task to be executed at a specified interval to process entries in the smart trigger table. In one embodiment, the task may be defined to run on a periodic basis. If conditions have been met to process the smart trigger table then each row in the smart trigger table may be processed. In one embodiment, the current date and time may be used to compare to the specified interval of the scheduled task to determine if the conditions to initiate the processing of entries in the smart trigger table have been met. If the scheduled conditions have not been met then the scheduled task may wait. If the scheduled conditions have been met i.e., the specified interval has expired, then the scheduled task may initiate processing of each row in the smart trigger table. In one embodiment, only those rows of the smart trigger table, which have met the trigger conditions, may be processed by executing the associated processing task specified in the smart trigger table record. In one embodiment, the trigger condition may be met if the scheduled date is less than or equal to current date.

After processing the smart trigger table record, i.e., executing the associated processing task specified in the smart trigger table record, in one embodiment, the scheduled date entry for the processed smart trigger table record may be reset to indicate its completion.

The present invention provides various embodiments of an improved method and system for dynamically selecting a database packageset table entry based on application program requirements. In some embodiments, data may be stored in tables in the database. In one embodiment, a key definition table, a dynamic database packageset switching table comprising data identifier values and user defined key values may be provided. In one embodiment, user interfaces to enter, modify, and delete data in the key definition, dynamic database packageset switching table may be provided.

In one embodiment, a program executing on an FSO computer system may provide a user interface that may allow a user of the program to construct key definitions for building the processing key values used in locating processing parameters in the FSO system database. The key definitions may be constructed by selecting one or more data elements to be included as key elements in the key definition. The data elements may be displayed for selection in the graphical user interface. The user interface may also provide a method for specifying a sequence in which the key elements will appear in the key definition. The key definitions may be stored in the database in the FSO system. In one embodiment, the key definitions may be stored in a key definition table in the database.

In one embodiment, a program executing on an FSO computer system may provide a user interface that may allow a user of the program to enter processing parameter values and key values. The processing parameter values may be configured for use during the processing of data, including FSO transactions, in the FSO computer system. The key values may be configured for use in locating the processing parameters in the FSO computer system. In one embodiment, processing parameter values and key values may be stored in a dynamic database packageset switching table in the database, with one row in the table including one or more fields for storing a key value and one or more fields for storing database identifier values associated with the key value. In one embodiment, there may be one dynamic database packageset switching table in the database for each processing parameter in the FSO system, with each row in the table including one unique key value for the key definition for the processing parameter, and each row also including the database identifier values locatable using the unique key value. In one embodiment, a key definition may be used to format the user interface for entering key element values. A key element value may be entered for each key element in the key definition, and the key element values may be combined to construct a key value.

In one embodiment, the key definitions, key values, database identifier values may be constructed and stored during the configuration of the FSO system. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system. During reconfiguration, the key definitions, key values, database identifier values constructed during the initial configuration may be modified or deleted, and new key definitions, key values, database identifier values may be added to the FSO system.

The present invention provides various embodiments of an improved method and system for dynamically selecting a database packageset table entry based on application program requirements. In some embodiments, data may be stored in tables in the database. In one embodiment, a key definition table, database packageset table for storing database identifier values and key values may be provided.

In one embodiment, a key definition may be configured for use in building a processing key value from data associated with an FSO customer transaction in response to a computer program executing on the FSO computer system requesting a processing parameter value to be used in the processing of the FSO customer transaction. The processing key value may be used in locating the database identifier value in a dynamic database packageset table in the FSO computer system database. The key definition may also be used during the comparison of processing key values to pre-configured key values stored in a database packageset table. If a pre-configured key value that matches the processing key value is found in the dynamic database packageset table, a database identifier value stored with the pre-configured key value in the database packageset table may be returned to the requesting computer program.

The key definition may include one or more data elements, or key elements. The key elements may be arranged in a sequence in the key definition. The key elements may include information describing the location and data format of data element values in the FSO system database. The location information in a key element may be used in locating a data element value in the database during the building of a processing key value, wherein the data element value is to be included as part of the processing key value. The data format information may be used to specify the data type, size and other data attributes during the building of a processing key value. The key definition may be stored in the database in the FSO system. In one embodiment, the key definition may be stored in a key definition table in the database.

Processing parameter values may be configured for use during the processing of data, including FSO transactions, in the FSO computer system. Key values may be configured for use in locating the processing parameters in the FSO computer system. In one embodiment, database identifier values and user defined key values may be stored in a dynamic database packageset table in the database, with one row in the dynamic database packageset table including one or more fields for storing a key value and one or more fields for storing processing parameter values associated with the key value. In one embodiment, a key definition may be used to format the user interface for entering key element values. A key element value may be entered for each key element in the key definition, and the key element values may be combined to construct a key value.

In one embodiment of a system for processing business data in an FSO transaction processing computer system using user-configured key definitions, a key building program may be provided. The key building program may be configured to accept requests for processing parameters from FSO transaction processing programs executing on the FSO computer system. The key building program may be configured to access a key definition table in the FSO system database and to read a key definition for a processing parameter in response to receiving a request for the processing parameter.

A key building program may be configured to build a processing key value for a processing parameter from one or more data element values in the FSO system database in response to receiving a request for the processing parameter. In one embodiment, the key building program may be configured to locate data element values in the FSO system database using data element location information stored in the a key definition. In one embodiment, each of one or more key elements in a key definition may specify the location and data format of one data element in the FSO system database. The key building program may be configured to use the data element information stored in the key elements of the key definition to locate data elements in the FSO system database and to read the data element values from the FSO system database. The key building program may be configured to write each data element value read from the FSO system database to a corresponding key element in a processing key. In one embodiment, the key element values in the processing key may be in combination referred to as the processing key value.

In one embodiment of a system for processing business data in an FSO transaction processing computer system using dynamic database packageset switching, a dynamic database packageset switching software program may be provided. In one embodiment, the program may be configured to receive processing key values from a key building program. The dynamic database packageset switching software program may be configured to locate a dynamic database packageset switching table for locating a database identifier in the FSO system database in response to receiving a data value request from the application program. In one embodiment, the dynamic database packageset switching software program may compare the processing key value to the pre-configured key values stored in the rows of the dynamic database packageset switching table.

In one embodiment, the dynamic database packageset switching program may be configured to send a message to the application program in response to the dynamic database packageset switching program not finding a match for the processing key value among the pre-configured key values in the dynamic database packageset switching table for the database identifier. The message may inform the application program that no match was found for the processing key value submitted to the dynamic database packageset switching program.

In one embodiment, the key definitions, key values, processing parameter values, and database identifier values may be constructed and stored during the configuration of the FSO system. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system. During reconfiguration, the key definitions, key values, processing parameter values, and database identifiers constructed during the initial configuration may be modified or deleted, and new key definitions, key values, processing parameter values, and database identifiers may be added to the FSO system.

A system, method and carrier medium for locating processing parameter values in a Financial Service Organization (FSO) computer system using pre-configured key definitions, key values, and key value search masks. In one embodiment, data may be stored in tables in a database. In one embodiment, a key definition table, one or more process control data (PCD) tables for storing processing parameter values and key values, and one or more search mask tables for storing key definition-based search masks for the key values in the PCD tables may be provided.

In one embodiment, a key definition may be configured for use in building a processing key value from data associated with an FSO customer transaction in response to a computer program executing on the FSO computer system requesting a processing parameter value to be used in the processing of the FSO customer transaction. The processing key value may be used in locating the processing parameter value in a PCD table in the FSO computer system database. The key definition may also be used during the comparison of processing key values to pre-configured key values stored in a PCD table. If a pre-configured key value that matches the processing key value is found in the PCD table, a processing parameter value stored with the pre-configured key value in the PCD table may be returned to the requesting computer program.

The key definition may include one or more data elements, or key elements. The key elements may be arranged in a sequence in the key definition. The key elements may include information describing the location and data format of data element values in the FSO system database. The location information in a key element may be used in locating a data element value in the database during the building of a processing key value, wherein the data element value is to be included as part of the processing key value. The data format information may be used to specify the data type, size and other data attributes during the building of a processing key value. The key definition may be stored in the database in the FSO system. In one embodiment, the key definition may be stored in a key definition table in the database.

Processing parameter values may be configured for use during the processing of data, including FSO transactions, in the FSO computer system. Key values may be configured for use in locating the processing parameters in the FSO computer system. In one embodiment, processing parameter values and key values may be stored in a process control data (PCD) table in the database, with one row in the PCD table including one or more fields for storing a key value and one or more fields for storing processing parameter values associated with the key value. In one embodiment, there may be one PCD table in the database for each processing parameter in the FSO system, with each row in the table including one unique key value for the processing parameter, and each row also including the processing parameter value or values locatable using the unique key value. In one embodiment, a key definition may be used to format the user interface for entering key element values. A key element value may be entered for each key element in the key definition, and the key element values may be combined to construct a key value. In one embodiment, wildcard values may be entered as key element values in key elements. In one embodiment, a wildcard value may be the low collating value of the data type of the key element.

In one embodiment, a search mask may include one or more search mask fields. In one embodiment, a key definition may be used to format the search masks, with one search mask field for each key element in the key definition. Each search mask field in a search mask may be set to a search mask field value. In one embodiment, the search masks for a processing parameter may be stored in a search mask table in the database, with one row in the table storing one search mask. In one embodiment, the search masks for a processing parameter may be stored in the search mask table in the database in a sequence in which the search masks may be used in searching for a processing key value in the key values for the processing parameters. In one embodiment, wildcard mask field values and equal mask field values may be entered as mask values in search mask fields. In one embodiment, a wildcard mask field value may specify that the low collating value of the data type of the search mask field is to be written to a corresponding key element when building a processing key value from data element values in the FSO system database. In one embodiment, an equal mask field value may specify that the data element value from the FSO system database is to be written to a corresponding key element when building a processing key value from data element values in the FSO system database.

In one embodiment of a system for processing business data in an FSO transaction processing computer system using user-configured key definitions, a key building program may be provided. The key building program may be configured to accept requests for processing parameters from FSO transaction processing programs executing on the FSO computer system. The key building program may be configured to access a key definition table in the FSO system database and to read a key definition for a processing parameter in response to receiving a request for the processing parameter. The key building program also may be configured to access a search mask table in the FSO system database for a processing parameter in response to receiving a request for the processing parameter.

A key building program may be configured to build a processing key value for a processing parameter from one or more data element values in the FSO system database in response to receiving a request for the processing parameter. In one embodiment, the key building program may be configured to locate data element values in the FSO system database using data element location information stored in the a key definition. In one embodiment, each of one or more key elements in a key definition may specify the location and data format of one data element in the FSO system database. The key building program may be configured to use the data element information stored in the key elements of the key definition to locate data elements in the FSO system database and to read the data element values from the FSO system database. The key building program may be configured to write each data element value read from the FSO system database to a corresponding key element in a processing key. In one embodiment, the key element values in the processing key may be in combination referred to as the processing key value.

In one embodiment, a key building program may be configured to read a first search mask from a search mask table for a processing parameter in response to receiving a request for the processing parameter. In one embodiment, the key building program may be configured to examine a search mask field in a search mask corresponding to a key element in a processing key when building the processing key value. The key building program may be configured to read a data element value from the FSO system database and write the data element value to a key element in response to a corresponding search mask field value being an equal mask field value. The key building program may be configured to write a wildcard, or low collating value, for a corresponding data element type to a key element in response to a corresponding search mask field value being a wildcard mask field value.

In one embodiment of a system for processing business data in an FSO transaction processing computer system using user-configured key definitions, a PCD program may be provided. In one embodiment, the PCD program may be configured to receive processing key values from a key building program. The PCD program may be configured to locate a PCD table for a processing parameter in the FSO system database in response to receiving a processing key value for the processing parameter. In one embodiment, the PCD program may compare the processing key value to the pre-configured key values stored in the rows of the PCD table. In one embodiment, the PCD program may read a processing parameter value from a row of the PCD table in response to the processing key value matching the pre-configured key value stored in the row of the PCD table. The processing parameter value may be a single data value or may be a group of two or more data values. In one embodiment, the PCD program may send the processing parameter value to the key building program in response to reading the processing parameter value from the PCD table, and the key building program may send the processing parameter value to the FSO transaction processing program that requested the processing parameter value. In another embodiment, the PCD program may send the processing parameter value directly to the FSO transaction processing program that requested the processing parameter value.

In one embodiment, the PCD program may be configured to send a message to the key building program in response to the PCD program not finding a match for the processing key value among the pre-configured key values in the PCD table for the processing parameter. The message may inform the key building program that no match was found for the processing key value submitted to the PCD program by the key building program. In one embodiment, the key building program may be configured to read a second search mask from the search mask table for the processing parameter in response to receiving a message from the PCD program that a matching pre-configured key value for the processing key value constructed using the first search mask was not found in the PCD table. The key building program may be configured to construct a second processing key value and submit the second processing key value to the PCD program. The PCD program may be configured to search for a match to the second processing key value among the pre-configured key values in the PCD table for the processing parameter. The PCD program may be configured to send a message to the key building program in response to not finding a match to the second processing key value in the PCD table. In one embodiment, the key building program and PCD program may be configured to continue reading search masks, constructing or preparing processing key values, and searching the PCD table for the processing key values until a matching pre-configured key value is found for a processing key value, or until all of the search masks have been used to construct processing key values with no matching pre-configured key value found for any of the processing key values. In one embodiment, the key building program may be configured to notify the FSO transaction processing program that no processing parameter value was located for the requesting processing parameter in response to not finding a match for any of the constructed processing key values.

In one embodiment, the key definitions, key values, processing parameter values, and search masks may be constructed and stored during the configuration of the FSO system. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system. During reconfiguration, the key definitions, key values, processing parameter values, and search masks constructed during the initial configuration may be modified or deleted, and new key definitions, key values, processing parameter values, and search masks may be added to the FSO system. Some data may be processed differently in the FSO system after a reconfiguration of the FSO system than before the reconfiguration. For example, a key value may be assigned a different processing parameter value in a PCD table after a reconfiguration, and thus a different processing parameter value may be returned to a program for a processing key value after the reconfiguration than would have been returned before the reconfiguration.

A system, method and carrier medium for configuring keys to locate processing parameters stored in a Financial Service Organization (FSO) computer system database.

In one embodiment, data may be stored in tables in the database. In one embodiment, a key definition table, one or more process control data (PCD) tables for storing processing parameter values and key values, and/or one or more search mask tables for storing key definition-based search masks for the key values in the PCD tables may be provided. In one embodiment, user interfaces to enter, modify, and delete data in the key definition, PCD, and search mask tables may be provided.

In one embodiment, a program executing on an FSO computer system may provide a user interface that may allow a user of the program to construct key definitions for building the processing key values used in locating processing parameters in the FSO system database. The key definitions may be constructed by selecting one or more data elements to be included as key elements in the key definition. The data elements may be displayed for selection in the graphical user interface. The user interface may also provide a method for specifying a sequence or map that identifies the arrangement of the key elements in the key definition. The key definitions may be stored in the database in the FSO system. In one embodiment, the key definitions may be stored in a key definition table in the database.

In one embodiment, a program executing on an FSO computer system may provide a user interface that may allow a user of the program to enter processing parameter values and key values. The processing parameter values may be configured for use during the processing of data, including FSO transactions, in the FSO computer system. The key values may be configured for use in locating the processing parameters in the FSO computer system. In one embodiment, processing parameter values and key values may be stored in a process control data (PCD) table in the database, with one row in the table including one or more fields for storing a key value and one or more fields for storing processing parameter values associated with the key value. In one embodiment, there may be one PCD table in the database for each processing parameter in the FSO system, with each row in the table including one unique key value for the key definition for the processing parameter, and each row also including the processing parameter values locatable using the unique key value. In one embodiment, a key definition may be used to format the user interface for entering key element values. A key element value may be entered for each key element in the key definition, and the key element values may be combined to construct a key value. In one embodiment, wildcard values may be entered as key element values for key elements.

In one embodiment, a program executing on an FSO computer system may provide a user interface that may allow a user of the program to enter one or more search masks configured for use in searching for a processing key value in the key values for a processing parameter. In one embodiment, a search mask may include one or more search mask fields. In one embodiment, a key definition may be used to format the user interface for entering the search masks, with one search mask field displayed for each key element in the key definition. A search mask value may be entered in a search mask field for each key element in the key definition. In one embodiment, the search masks for a processing parameter may be stored in a search mask table in the database, with one row in the table storing one search mask. In one embodiment, the search masks for a processing parameter may be stored in the search mask table in the database in a sequence in which the search masks may be used in searching for a processing key value in the key values for the processing parameters. In one embodiment, wildcard mask values and equal mask values may be entered as mask values in search mask fields.

In one embodiment, the key definitions, key values, processing parameter values, and search masks may be constructed and stored during the configuration of the FSO system. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system. During reconfiguration, the key definitions, key values, processing parameter values, and search masks constructed during the initial configuration may be modified or deleted, and new key definitions, key values, processing parameter values, and search masks may be added to the FSO system. Some data may be processed differently in the FSO system after a reconfiguration of the FSO system than before the reconfiguration. For example, a key value may be assigned a different processing parameter value in a PCD table after a reconfiguration, and thus a different processing parameter value may be returned to a program for a processing key value after the reconfiguration than would have been returned before the reconfiguration.

BRIEF DESCRIPTION OF THE DRAWINGS

FIG. A-1a is a block diagram illustrating one embodiment of an FSO computer system for configuring processing relationships;

FIG. A-1b illustrates one embodiment of an FSO computer system integrated into a networked system for processing FSO business data;

FIG. A-2 is an example of one embodiment of a multilevel business processing relationship to be modeled in an FSO business sytstem;

FIG. A-3 illustrates one embodiment of an interactive computer display screen for configuring processing relationships, with a first level of objects representing entities in the FSO displayed;

FIG. A-4 illustrates one embodiment of an interactive computer display screen for configuring processing relationships, with a first and second level of objects displayed;

FIG. A-5 illustrates one embodiment of an interactive computer display screen for configuring processing relationships, with a first, second, and third level of objects displayed;

FIG. A-6 illustrates one embodiment of an interactive computer display screen for configuring processing relationships, with five levels of objects displayed;

FIG. A-7 illustrates one embodiment of an interactive computer display screen for creating instances of a first object in a processing relationships structure;

FIG. A-8 illustrates one embodiment of an interactive computer display screen for creating instances of a second object in a processing relationships structure;

FIG. A-9 is an example of one embodiment of a computer model of the a multilevel business processing relationship illustrated in FIG. A-2, wherein values have been assigned to the objects in the processing relationship;

FIG. A-10a is a high-level flow chart illustrating one embodiment of a method of configuring processing relationships for use in configuring reports in an FSO system;

FIG. A-10b is a mid-level flow chart illustrating one embodiment of a method of configuring processing relationships for use in configuring reports in an FSO system;

FIG. A-10c is a detailed flow chart illustrating one embodiment of a method of defining processing relationship objects and arranging them in a processing relationship model;

FIG. A-10d is a detailed flow chart illustrating one embodiment of a method of defining instances of the processing relationship objects defined in FIG. A-10c; and FIG. A-11 is an embodiment of a database table in the FSO system that may be used to store node identifier permutations and node numbers.

FIG. B-1 is a data flow diagram illustrating the use of hardcoded break keys for sorting and collating reports on business transaction records and accounts in one embodiment of an FSO business transaction processing system;

FIG. B-2 is a data flow diagram illustrating the use of external, user-configurable break keys for sorting and collating reports on business transaction records and accounts in an embodiment of an FSO business transaction processing system in one embodiment of the present invention;

FIG. B-3a is a block diagram illustrating one embodiment of an FSO computer system for the user configuration of report record definitions;

FIG. B-3b is a block diagram illustrating one embodiment of an FSO computer system where user-configured report record definitions are used in report generation;

FIG. B-4 illustrates one embodiment of an FSO computer system integrated into a networked system for processing FSO business data;

FIGS. B-5a through B-2e illustrate various embodiments of configuring a processing relationship structure that may be modeled after an FSO business organization structure FIG. B-5f is an example of one embodiment of a multilevel business processing relationship to be modeled in an FSO business system;

FIG. B-6 illustrates one embodiment of an interactive computer display screen for configuring processing relationships, with five levels of objects displayed;

FIG. B-7 illustrates one embodiment of an interactive computer display screen for creating instances of a first object in a processing relationships structure;

FIG. B-8 is an example of one embodiment of a computer model of the a multilevel business processing relationship illustrated in FIG. B-5f, wherein values have been assigned to the objects in the processing relationship;

FIG. B-9 illustrates one embodiment of an interactive computer display screen for specifying data elements to be used as break keys in a report record definition;

FIG. B-10a is a high-level flow chart illustrating one embodiment of a method of configuring processing relationships and report record definitions in an FSO system;

FIG. B-10b is a mid-level flow chart illustrating one embodiment of a method of configuring processing relationships and report record definitions in an FSO system;

FIG. B-10c is a detailed flow chart illustrating one embodiment of a method of configuring break keys in report record definitions in an FSO system;

FIG. B-11a illustrates the general format of one embodiment of a report record definition;

FIG. B-11b illustrate an example of one embodiment of a report record definition;

FIG. B-11c illustrates a format of one embodiment of a report record definition, showing the use of processing relationship nodes as break keys;

FIG. B-11d illustrates an example of an unsorted set of report records constructed using the report record definition illustrated in FIG. B-11b;

FIG. B-11e illustrates the example set of report records constructed using the report record definition illustrated in FIG. 11b after sorting on the processing relationship break keys;

FIG. B-12 is a data flow diagram illustrating one embodiment of generating reports using processing relationship break keys;

FIG. B-13a is a flowchart illustrating one embodiment of a method of report data gathering using user-configured break keys;

FIG. B-13b is a flowchart illustrating one embodiment of a method of report sorting and collating using user-configured break keys;

FIG. B-14 is an embodiment of a database table in the FSO system that may be used to store node identifier permutations and node numbers.

FIG. C-1 is a prior art block diagram illustrating one embodiment of a financial service organization business transaction processing system;

FIG. C-2 illustrates one embodiment of a financial service organization business transaction processing system with Smart Trigger software;

FIG. C-3a is a data flow diagram illustrating a Smart Trigger selection for an associated executable processing task according to one embodiment;

FIG. C-3b is a diagram illustrating a Smart Trigger date dependent data set selection according to one embodiment;

FIG. C-4a is a flowchart illustrating the configuration and runtime use of prior art data set processing method for an FSO computer system, according to one embodiment;

FIG. C-4b is a continuation of the flowchart in FIG. C-4a;

FIG. C-4c is a continuation of the flowchart in FIG. C-4b;

FIG. C-5 is a flowchart illustrating the configuration and runtime use of a Smart Trigger based processing method for an FSO computer system, according to one embodiment;

FIG. C-6 is a data flow diagram illustrating sequential processing of a FSO data set in prior art, according to one embodiment;

FIG. C-7 is a data flow diagram illustrating selective task processing of a FSO data set using Smart Trigger, according to one embodiment; and FIG. C-8 is a block diagram illustrating a scheduled task processing entries in a Smart Trigger table, according to one embodiment.

FIG. D-1 is a block diagram illustrating the architecture of one embodiment of a financial service organization business transaction processing system with an application program, a database sub-system, a data storage sub-system and a user sub-system in the network;

FIG. D-2 is a block diagram illustrating the architecture of one embodiment of a financial service organization business transaction processing system with an application program, a dynamic database packageset switching sub-system, a computing environment monitoring sub-system, a database sub-system, a data storage sub-system, and a user sub-system in the network;

FIG. D-2a is a block diagram illustrating one embodiment of a dynamic database packageset switching module, a packageset input/output processing sub-system, a dynamic database packageset switching table, a database input/output processing sub-system, a computing environment monitoring sub-system, a database sub-system, a data storage sub-system;

FIG. D-3 illustrates a prior art database domain architecture of a financial service organization business transaction processing system with the database domain consisting of a single database sub-system, a single database environment within the database sub-system and one or more databases within the single DB2 database environment;

FIG. D-4 illustrates a multi-environment, multi-database domain architecture of one embodiment of a financial service organization business transaction processing system with the database domain consisting of a single database sub-system, one or more database environments within the single database sub-system and one or more databases within each of the database environments;

FIG. D-5 is a prior art flowchart illustrating the need for modifying application program source code to a change in database environment or an addition of a new database according to one embodiment;

FIG. D-5a is a continuation of flowchart in FIG. D-5;

FIG. D-6 is a flowchart illustrating the runtime use of dynamic database packageset switching method according to one embodiment;

FIG. D-7a is a flowchart illustrating the configuration and runtime use of dynamic database packageset switching method according to one embodiment;

FIG. D-7b is a continuation of flowchart in FIG. D-7a;

FIG. D-8 is a data flow diagram illustrating a dynamic database packageset switching for an associated application program database request according to one embodiment;

FIG. D-9 is a data flow diagram illustrating a legacy method for an application program database request according to one embodiment;

FIG. D-10 illustrates one embodiment of a method for selecting data dictionary data elements as key elements available for inclusion in key definitions;

FIG. D-11 illustrates one embodiment of a method for selecting key elements to be available for inclusion in a particular key definition from a list of key elements available for inclusion in all key definitions;

FIG. D-12 illustrates one embodiment of a method for selecting key elements for inclusion in a key definition from a list of key elements available for inclusion in the key definition;

FIG. D-13 illustrates one embodiment of a key definition with examples of parameters that may be included in the key element definitions;

FIG. D-14 illustrates one embodiment of a dynamic database packageset switching table for the key definition of FIG. D-13 with examples of key values and processing parameter values;

FIG. D-15 illustrates one embodiment of a dynamic database packageset switching table in an FSO system.

FIG. E-1 is a block diagram illustrating the architecture of one embodiment of a financial service organization business transaction processing system with an application program, a database sub-system, a data storage sub-system and a user sub-system in the network;

FIG. E-2 is a block diagram illustrating the architecture of one embodiment of a financial service organization business transaction processing system with an application program, a dynamic database packageset switching sub-system, a computing environment monitoring sub-system, a database sub-system, a data storage sub-system, and a user sub-system in the network;

FIG. E-2a is a block diagram illustrating one embodiment of a dynamic database packageset switching module, a packageset input/output processing sub-system, a dynamic database packageset switching table, a database input/output processing sub-system, a computing environment monitoring sub-system, a database sub-system, a data storage sub-system;

FIG. E-3 illustrates a prior art database domain architecture of a financial service organization business transaction processing system with the database domain consisting of a single database sub-system, a single database environment within the database sub-system and one or more databases within the single DB2 database environment;

FIG. E-4 illustrates a multi-environment, multi-database domain architecture of one embodiment of a financial service organization business transaction processing system with the database domain consisting of a single database sub-system, one or more database environments within the single database sub-system and one or more databases within each of the database environments;

FIG. E-5 is a prior art flowchart illustrating the need for modifying application program source code to a change in database environment or an addition of a new database according to one embodiment;

FIG. E-5a is a continuation of flowchart in FIG. E-5;

FIG. E-6 is a flowchart illustrating the runtime use of dynamic database packageset switching method according to one embodiment;

FIG. E-7a is a flowchart illustrating the configuration and runtime use of dynamic database packageset switching method according to one embodiment;

FIG. E-7b is a continuation of flowchart in FIG. E-7a;

FIG. E-8 is a data flow diagram illustrating a dynamic database packageset switching for an associated application program database request according to one embodiment;

FIG. E-9 is a data flow diagram illustrating a legacy method for an application program database request according to one embodiment;

FIG. E-10 illustrates one embodiment of a method for selecting data dictionary data elements as key elements available for inclusion in key definitions;

FIG. E-11 illustrates one embodiment of a method for selecting key elements to be available for inclusion in a particular key definition from a list of key elements available for inclusion in all key definitions;

FIG. E-12 illustrates one embodiment of a method for selecting key elements for inclusion in a key definition from a list of key elements available for inclusion in the key definition;

FIG. E-13 illustrates one embodiment of a key definition with examples of parameters that may be included in the key element definitions;

FIG. E-14 illustrates one embodiment of a dynamic database packageset switching table for the key definition of FIG. E-13 with examples of key values and processing parameter values; and FIG. E-15 illustrates one embodiment of a dynamic database packageset switching table in an FSO system.

FIG. F-1a is a block diagram illustrating one embodiment of an FSO computer system for processing FSO business data using pre-configured key definitions, key values, and processing values;

FIG. F-1b illustrates one embodiment of an FSO computer system integrated into a networked system for processing FSO business data;

FIG. F-2 illustrates a system for processing FSO business data using hardcoded key definitions and key construction;

FIG. F-3a illustrates one embodiment of a system for processing FSO business data using user-defined key definitions, search masks, key values and PCD values, illustrating an unsuccessful first search of a PCD table for a match to a processing key value;

FIG. F-3b illustrates one embodiment of a system for processing FSO business data using user-defined key definitions, search masks, key values and PCD values, illustrating a successful second search of a PCD table for a match to a processing key 1 value;

FIG. F-4 illustrates one embodiment of a key definition with examples of fields that may be included in the key definition;

FIG. F-5 illustrates one embodiment of a PCD table for the key definition of FIG. F-4 with examples of key values and processing parameter values;

FIG. F-6 illustrates one embodiment of a search mask table with examples of search masks that may be applied to the PCD table of FIG. F-5;

FIG. F-7 illustrates one embodiment of a structure for a database table for storing key definitions;

FIG. F-8 illustrates one embodiment of a structure for a database table for referencing search masks;

FIG. F-9 illustrates one embodiment of a structure for a user-defined PCD table with key values and data values;

FIG. F-10 illustrates one embodiment of several PCD tables in an FSO system;

FIG. F-11 illustrates examples of inputs to and results from one embodiment of a search process that may be applied to PCD tables as depicted in FIG. F-5 using search mask tables as depicted in FIG. F-6;

FIG. F-12a is a flow diagram illustrating one embodiment of a process for processing business data in an FSO computer system using user-configured key definitions, search masks, key values and processing values;

FIG. F-12b is a continuation of the flow diagram of FIG. F-12a; and

FIG. F-13 is a flow diagram illustrating one embodiment of a process for building a key value from data element values using a search mask.

FIG. G-1 is a block diagram illustrating one embodiment of a computer system for configuring key definitions;

FIG. G-2 is a flowchart illustrating one embodiment of a method for user configuration of key definitions, PCD tables, and search mask tables in an FSO system;

FIG. G-3 illustrates one embodiment of a data dictionary with the data elements in the data dictionary divided into subsets available for inclusion in key definitions;

FIG. G-4 illustrates one embodiment of a method for selecting data dictionary data elements as key elements available for inclusion in key definitions;

FIG. G-5 illustrates one embodiment of a method for selecting key elements to be available for inclusion in a particular key definition from a list of key elements available for inclusion in all key definitions;

FIG. G-6 illustrates one embodiment of a method for selecting key elements for inclusion in a key definition from a list of key elements available for inclusion in the key definition;

FIG. G-7 illustrates one embodiment of a key definition with examples of parameters that may be included in the key element definitions;

FIG. G-8 illustrates one embodiment of a PCD table for the key definition of FIG. G-7 with examples of key values and processing parameter values;

FIG. G-9 illustrates one embodiment of a search mask table with examples of search masks that may be applied to the PCD table of FIG. G-8;

FIG. G-10 illustrates one embodiment of a structure for a database table for storing key definitions;

FIG. G-11 illustrates one embodiment of a structure for a database table for referencing search masks;

FIG. G-12 illustrates one embodiment of a structure for a user-defined PCD table with key values and data values;

FIG. G-13 illustrates one embodiment of several PCD tables in an FSO system;

FIG. G-14 illustrates examples of inputs to and results from one embodiment of a search process that may be applied to PCD tables as depicted in FIG. G-8 using search mask tables as depicted in FIG. G-9.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may include other types of memory or combinations thereof. In addition, the memory medium may be located in a first computer in which the programs are executed, or may be located in a second computer that connects to the first computer (e.g., over a network). In the latter instance, the second computer may provide the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for configuring the FSO system software programs and databases in an FSO system, and for processing FSO transactions in the FSO system, as described herein. The software program(s) may be implemented in any of various ways, including procedure-based techniques, component-based techniques, and/or object-oriented techniques, among others. For example, the software program(s) may be implemented using ActiveX controls, C, C++ objects, JavaBeans, Microsoft Foundation Classes (MFC), or other technologies or methodologies, as desired. A CPU, such as the host CPU, executing code and data from the memory medium includes a way to create and execute the software program or programs according to the methods, flowcharts, and/or block diagrams described below.

A computer system's software generally includes at least one operating system, which is typically a specialized software program that manages and provides services to other software programs on the computer system. Examples of operating systems may include, but are not limited to: Windows NT available from Microsoft Corporation, and the MVS and OS/390 operating systems available from IBM. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

A server program may be defined as a computer program that, when executed, provides services to other computer programs executing in the same or other computer systems. The computer system on which a server program is executing may be referred to as a server, though it may contain a number of server and client programs. In the client/server model, a server program awaits and fulfills requests from client programs in the same or other computer systems. An example of a computer program that may serve as a server is Windows NT server, available from Microsoft Corporation.

The following paragraphs introduce various terminologies, definitions, abbreviations, etc., as used herein to describe various embodiments.

As used herein, a Financial Service Organization (FSO) is a business organization that provides financial services to customers and client organizations. As used herein, the term customer generally refers to an individual, and client organization generally refers to other businesses, including retail businesses and other FSOs. Services provided to customers and client organizations include credit products, such as loans and credit cards. An FSO may also provide services to client organizations such as credit card transaction processing. Examples of FSOs include, but are not limited to, banks, credit unions, insurance companies, mutual fund companies, credit card companies and brokerage houses. An FSO that issues credit cards and processes credit card transactions may be referred to as a credit card institution. An FSO may include one or more organizational units. Examples of organizational units include, but are not limited to, main offices, divisions, regional offices, and branch offices.

As used herein, an FSO transaction may be defined as an occurrence of a service provided to a customer or client organization. Examples of FSO transactions include, but are not limited to, financial transactions such as deposits, withdrawals, loan application servicing, and credit card application servicing. FSO transactions may also include services related to financial products such as loans and credit cards previously issued to FSO customers and client organizations. These services may include processing of credit card purchases and collection of payments.

An FSO system may include a data dictionary. A data dictionary may be defined as a collection of descriptions of data items in the database. A description of a data item in a database may be called a data element. A data item may be referred to as a data element value. A data element in the data dictionary may describe attributes of a data element value in the database. Examples of attributes of data element values include, but are not limited to: location in the database, size, and data type. For example, an FSO system data dictionary may describe the data elements involved in credit card processing. The data dictionary may describe each of the data elements in the database for credit card processing. A collection of data may include data elements defined in the data dictionary. Examples of a collection of data, may include, but not be limited to, customer account master files and daily transaction-related data. Examples of data elements in an FSO data dictionary include, but are not limited to: customer name, credit card type, and card issuer.

As used herein, a key is one or more data elements in a database record or group of records that may be used to identify the record or group of records. For example, a record for storing information about an individual may have a name data element. The name data element may be used as a key to identify a particular individual's record in the database. A key value is an instance of a key in the database. In the example above, an example of a key value for a name data element used as a key might be "John Smith." In some examples, not all data elements in a database may be available for use in keys. Data elements that are available for use in keys may be referred to as key elements.

The format of a key may be stored in a key definition. A key definition may include one or more key elements that in combination make the key. During configuration of an FSO system, key definitions may be used in creating key values for records or groups of records in the database. During processing, key definitions may be used by the FSO system to create key values and to read key values stored in the database. During the processing of a transaction, the FSO system may create a key value from transaction-related data using a key definition to extract data element values from the transaction-related data, and may compare the key value to key values stored in the database while searching for a matching key value. A key value created during processing from a key definition and transaction-related data may be referred to as a processing key value.

As used herein, the term "break key" has a different meaning than the term "key" described above. A break key may be defined as a field in a record that may be used as a sort field and/or as a collating field for the record. For example, a set of records may have a field A designated as a break key. Each record's break key field may be set to a break key value. When the records are sorted by a sort process, the sort process may sort the records on the break key field. The sort may be done in ascending or descending order. A break key field may be used in collating the records after a sort. For example, a first group of records with a first break key value may be written to a first file, and a second group of records with a second break key value may be written to a second file.

The FSO system database may include processing parameters used in processing transactions. Processing parameters may be used to apply business logic to the transactions during processing. An example of a transaction processed in an FSO system is a credit card purchase transaction. An example of a processing parameter is a credit card purchase transaction price that may be charged to a client of a credit card institution for the processing of a credit card purchase transaction. An instance of a processing parameter in the database may be referred to as a processing parameter value. For example, an instance of a credit card purchase transaction price might be "$1.50." In some cases, a processing parameter value may include more than one data value. For example, a matrix of data values used in transformation functions on tables of data may be stored as a processing parameter value.

An FSO transaction processing software program may use one or more processing parameters during the processing of a transaction. A processing parameter may have a different processing parameter value for different transactions. The software program may examine the values of one or more data elements in the transaction data and master files to determine the processing parameter value for the transaction. A combination of data elements used to determine the processing parameter value may be referred to as the key definition for the processing parameter. The combination of data element values constructed from the key definition may be referred to as a key value. For example, a software program for processing credit card transactions for a credit card institution may use the credit card issuer and card type to determine what transaction price to charge a client of the credit card institution for processing a credit card transaction. The key definition in this example includes the credit card issuer data element and card type data element, and the key value is constructed from the values for the credit card issuer data element and card type data element read from the credit card transaction data or from a master file associated with the transaction.

In one embodiment, processing parameter values and the key values used to identify the processing parameter values may be stored in tables in the database. The tables in the database that store the processing parameter values and key values may be referred to as Process Control Data (PCD) tables or processing parameter tables. In one embodiment, there may be one PCD table for each processing parameter in the FSO system.

Processing parameters are one example of parameters that may be stored in PCD tables and located using key definitions as described herein. Examples of other types of parameters that may be stored in PCD tables are default parameters and definition parameters. Default parameters may be used to fill in default information in records in the database when they are created. For example, when a new customer account is created, one or more fields in the customer account master file may be filled with default parameter values. Default parameter values may be retrieved from PCD tables using key values constructed from the PCD key definitions and data element values from the customer account master file. Definition parameters are text or numeric values that are located using key values as codes. An example is a text error message that may be looked up using a numeric error code as a key value.

During processing, an FSO transaction may be stored as a record or file in the FSO system. In one embodiment, the FSO transaction may be stored in the FSO system database. A portion of the FSO transaction record may be read into system memory during processing. An FSO transaction record may include one or more data elements. The data elements included in an FSO transaction record may be defined in the data dictionary. The data elements in the transaction record may describe the various attributes of the transaction. For example, the data elements in a credit card transaction record may include items such as the customer's name, account numbers, credit card type, card issuer, date of the transaction, and the business at which the transaction originated.

An example of an FSO that may use an FSO computer system as described herein is a credit card institution. A credit card institution may issue credit cards to customers and client institutions of the FSO. The credit card institution may also issue credit cards on behalf of client businesses such as department stores. The credit card institution may also acquire and process credit card transactions from customers and client businesses such as department stores. For example, a credit card institution may issue its own credit card. Continuing the example, the credit card institution may also have client department stores. The credit card institution may issue a credit card under a department store's name, and may collect and process all credit card transactions for the department store. The credit card institution may charge a fee for each transaction processed. Some of the credit card transactions collected by the credit card institution may be transactions for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

In the above example, the fee charged for each transaction, also called the merchant transaction price, is an example of a processing parameter for an FSO system in a credit card institution. One embodiment of an FSO system database in a credit card institution may include a merchant transaction pricing PCD table. The merchant transaction pricing PCD table may include one or more merchant transaction pricing values. Each merchant transaction pricing value may be associated with one unique key value in the table. The key values in the PCD table may be constructed using a key definition. Each processing parameter in the FSO system, and thus each PCD table, may be associated with a key definition. In one embodiment, the FSO system database may include a key definition table for storing key definitions in the FSO system.

A key definition may include one or more data elements from the data dictionary. As an example, the merchant transaction pricing parameter described above may have a key definition that includes one or more data elements. Examples of data elements that may be included as fields in the merchant transaction pricing parameter key definition include card issuer, card type, on us/not on us, and transaction type. A card issuer may be the brand of card, for example, VISA, MasterCard, Discovery, etc. Examples of card types may include, but are not limited to: "gold" and "platinum" cards issued by some card issuers. On us/not on us refers to whether the FSO processing the transaction also issued the credit card. "On us" may mean that the FSO did issue the card. "Not on us" may mean that another FSO issued the card, and thus the transaction may be forwarded to the other FSO for processing. The term "transaction type" may refer to the way the transaction was entered; examples of transaction types may include, but are not limited to: manual, electronic, and telephone transactions. A manual credit card transaction may be a credit card transaction that is entered by hand and imprinted with a credit card imprint machine. An electronic transaction may be a credit card transaction where the magnetic strip on a credit card is read electronically. A telephone transaction may be a credit card transaction performed by telephone call.

The organizational and/or functional structure of an FSO may be represented in a FSO computer system by a processing relationship structure. A processing relationship structure may be defined as a computer representation of the entities in the FSO and of the relationships among the entities, wherein the computer representation is useable by software applications to process FSO business data based upon the organizational and/or functional structure of the organization. In one embodiment, the processing relationship structure may be stored in a database on the FSO computer system. In one embodiment, the processing relationship structure may be configured by a user of the FSO system at configuration of the FSO system or during FSO system runtime. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system.

The data dictionary may include one or more processing relationship data elements. One or more processing relationship data elements may be included as key fields in a key definition. In one embodiment, a processing relationship data element may be a Processing Relationship Node Number data element, and the Processing Relationship Node Number data element may be included in a key definition. Thus, a processing parameter value may be located in a PCD table using processing relationship data elements such as the Processing Relationship Node Number data element. This allows processing parameter values to be located for transactions based upon the ownership of the account for which the transaction was generated.

Section One

FIG. A-1a—A Block Diagram Illustrating One Embodiment of an FSO Computer System For Configuring Processing Relationships In FIG. A-1a, an embodiment of an FSO business transaction processing system 10 may include a computer system 20, a display screen 40 connected to the computer system, and one or more databases 52 residing on external storage. Computer system 20 may include memory 30 configured to store computer programs for execution on computer system 20, and a central processing unit (not shown) configured to execute instructions of computer programs residing on computer system 20. Processing relationships configuration program 50 may be stored in memory 20. System 10 may also include a business transaction processing program (not shown). In one embodiment, processing relationships configuration program 50 may be integrated in the business transaction processing program, so that configuring processing relationships may be viewed as a function within the business transaction processing program. System 10 may also include one or more input devices 42 such as a keyboard for entering data and commands into program 50 and one or more cursor control devices 44 such as a mouse.

FIG. A-1b—One Embodiment of an FSO Computer System Integrated into a Networked System for Processing FSO Business Data FIG. A-1b illustrates one embodiment of a networked system configured for processing FSO business data. Network 60 may be a local area network or wide area network, and may include communications links including, but not limited to, Ethernet, token ring, internet, satellite and modem. An FSO computer system 10 as illustrated in FIG. A-1a may be connected to network 60. One or more user workstations 80 may be connected to network 60 and may be used by users of the FSO computer system to enter and modify data, initiate data processing tasks, and monitor the processing of data in the FSO computer system. One or more printers 90 for outputting hardcopy reports on FSO system data may also be connected to network 60. One or more other FSO computer systems 70 may also be connected to network 60. In one embodiment, one or more computer systems 75 of client businesses of the FSO may also be connected to network 60. Client businesses of the FSO may forward business transactions to the FSO computer system for processing. In one embodiment, computer systems 75 may include computer systems belonging to one or more entities within the FSO, such as branches, regional offices, banks, departments, etc.

FIG. A-2—An Example of one Embodiment of a Multilevel Business Processing Relationship to be Modeled in an FSO Business System FIG. A-2 graphically illustrates one example of a multilevel business processing relationship that may be modeled in an FSO business system using a processing relationships configuration program according to one embodiment. An FSO user or any other person or persons familiar with the FSO organization may create a graphical diagram similar to FIG. A-2 to reflect the FSO business organization.

In this example, six levels are shown (levels 0-5). Level 0 may be called the root level of the processing relationship structure. Only one node appears at level 0. Node 250 at level 0 represents the root level of the FSO processing relationship structure. All other nodes in the structure are beneath node 250. Nodes beneath a node may be called descendents of the node. At level 1, one or more nodes may appear. In this example, an issuer node 252 and an acquirer node 254 are shown.

In the processing relationship structure, some nodes may represent physical entities in the FSO, and others may represent functional areas. A physical entity is an organizational unit that has a physical presence or manifestation, such as a bank branch office, regional office, or credit card line. A node representing a functional area is used to organize one or more other nodes into a sub-processing relationship group in the FSO processing relationship based upon some function of the FSO. Examples of functional areas include issuer, acquirer, and non-risk. The issuer function may be described as the function of issuing credit cards or other credit instruments to customers of the FSO. The acquirer function may be described as the function of acquiring payments from users of credit cards and other credit instruments on behalf of the FSO and client organizations of the FSO. Non-risk is a functional area that may be used to group nodes dealing with non-risk (or very low risk) instruments such as some types of bonds and secured loans.

Three nodes are shown as descendents of issuer node 252 at level 2. One of the three nodes is Company B 256. Note that Company B is also represented by a node underneath acquirer node 254. In a processing relationship, an entity may appear below more than one functional area. An entity may have more than one function, and the functions of an entity may be represented by separate nodes in the processing relationship.

Company B node 256 has two descendents at level 3, Non-risk node 260 and Bank node 258. A node in the processing relationship tree may represent an object in the processing relationship, such as a bank. During the configuration, a node may be given multiple instances of the object. For example, bank node 258 may represent banks in general at level 3 under Company B. When configured, multiple banks may be created as instances of bank node 258. For example, First Street Bank, Main Street Bank, and Elm Street Bank may be added to the processing relationship structure as instances of Bank node 258. In this example, the three banks report to Company B, but not to each other. Non-risk node 260 has one descendent at level 4, Bank 262. Bank 262 has one descendent at level 5, Branch 264.

By using a processing relationships configuration program and its associated display screens, as described in FIGS. A-3 through A-9, the FSO user may configure the processing relationship structure. At the end of the configuration process, FIG. A-9 may describe a processing relationship structure, which may be equivalent to the multilevel business processing relationship illustrated in FIG. A-2.

FIGS. 3-8—Various Embodiments of Configuring a Processing Relationship Structure Using Various Interactive Computer Display Screens Generated by a Processing Relationship Configuration Program FIGS. A-3 through A-8 describe various embodiments of configuring the processing relationship structure, described in FIG. A-2, using various interactive computer display screens generated by a processing relationship configuration program.

FIG. A-3—One Embodiment of an Interactive Computer Display Screen for Configuring Processing Relationships, with a First Level of Objects Representing Entities in the FSO Displayed FIG. A-3 illustrates one embodiment of a screen 150 for the user configuration of processing relationships using a processing relationship configuration program in an FSO system. In one embodiment, screen 150 may be presented to a user of a processing relationship configuration program in response to the user selecting an "edit processing relationship" or "create processing relationship" function choice. Function choices may be selectable in a variety of methods, including standard GUI methods such as buttons, menus, text boxes, and mouse highlighting and selection. In one embodiment, the screen 150 may be a graphical user interface (GUI). In another embodiment, the screen 150 may be a textual interface. Screen 150 may include one or more function choices (not shown). For example, screen 150 may include insert node, delete node, edit node, and expand node function choices. Screen 150 may include multiple rows, with each row displaying one node in the processing relationships structure, and multiple columns, with each column displaying one property of the nodes displayed in the rows. The data in the rows and columns may be modifiable by a user of the system. New rows may be inserted in screen 150 by selecting an insertion point and selecting an "insert" function choice from screen 150. In this example, two rows have been inserted. The user may then insert data in one or more of the columns to conFigure A—the node. Some of the columns may be automatically filled in by the processing relationship configuration program upon creating the new node.

Columns in screen 150 may include a sequence column 152, an element ID constant column 154, a level column 156, an element ID column 158, an abbreviation column 160, and a description column 162. Sequence column 152 may display a sequence number for the rows in screen 150. In one embodiment, the Element ID constant column 154 may identify an attribute of a node that participates in the processing relationship structure. Element ID constant column 154 may be used to enter, display, and edit a textual identifier for the node. Level column 156 may be used to display the level of a node in the processing relationship structure. For example, FIG. A-2f illustrates level 0 through level 5. Element ID column 158 may be used to enter, display, and edit an alphanumeric database identifier for the node. Abbreviation column 160 may be used to enter, display, and edit a short label for the node. Description column 162 may be used to enter, display, and edit a textual description of the node.

In one embodiment, an FSO user may create a new object by using the drag-and-drop method. Screen 150 may be displayed in response to an FSO user further identifying the values associated with the methods and properties of the newly created object. In one embodiment, the FSO user may identify specific values for a sequence column 152, an element ID constant column 154, a level column 156, an element ID column 158, an abbreviation column 160, and a description column 162 associated with the newly created object.

FIG. A-4—One Embodiment of an Interactive Computer Display Screen for Configuring Processing Relationships, with a First and Second Level of Objects Displayed FIG. A-4 illustrates one embodiment of a screen 150 for the user configuration of processing relationships using a processing relationship configuration program in an FSO system. This example shows screen 150 from FIG. A-3 with more rows added. The first row, or node, at level one in the processing relationship structure, is shown highlighted, signifying that it is selected, with three rows, or nodes, added at level two below the selected first node. The new rows were inserted in screen 150 by selecting the first row as the insertion point and selecting an insert function choice from screen 150. The columns in the new rows were then filled in. Some of the columns may be filled in by the user adding the rows, and some may be automatically filled by the processing relationship configuration program. In this example, the sequence column 152 and the level column 156 may be automatically calculated and displayed by the processing relationship configuration program when a new row, or node, is added. The other columns (154, 158, 160, and 162) may be filled in by the user.

FIG. A-5—One Embodiment of an Interactive Computer Display Screen for Configuring Processing Relationships, with a First, Second, and Third Level of Objects Displayed FIG. A-5 illustrates one embodiment of a screen 150 for the user configuration of processing relationships using a processing relationship configuration program in an FSO system. This example shows screen 150 from FIG. A-4 with more rows added. The third row, or node, at level two in the processing relationship structure, is shown highlighted, signifying that it is selected, with two rows, or nodes, added at level three below the selected first node. The user may continue selecting rows and inserting rows and filling in the columns in the newly added rows until a processing relationship structure, such as that illustrated in FIG. A-2, has been fully defined.

FIG. A-6—One Embodiment of an Interactive Computer Display Screen for Configuring Processing Relationships, with Five Levels of Objects Displayed FIG. A-6 illustrates one embodiment of a screen 150 for the user configuration of processing relationships using a processing relationship configuration program in an FSO system. This example shows a processing relationship structure, such as that illustrated in FIG. A-2, which has been fully defined. The descendents of a first node in the processing relationship structure may appear directly beneath the node; after the descendents of the first node, a second node on the same level may appear, and then the second node's dependents, and so on. One or more columns may be indented to represent the processing relationship structure's levels. In this example, the description fields are indented to represent the levels.

FIG. A-7—One Embodiment of an Interactive Computer Display Screen for Creating Instances of a First Object in a Processing Relationships Structure FIG. A-7 illustrates one embodiment of a screen 170 for the user configuration of instances of nodes, or processing relationship objects, using a processing relationship configuration program in an FSO system. Screen 170 may be invoked by selecting one of the rows in screen 150 shown in FIG. A-6 and selecting an "expand node" function choice from screen 150. Screen 170 may include one or more function choices (not shown). For example, screen 170 may include insert row, delete row, and edit row function choices. Function choices may be selectable in a variety of methods, including standard GUI methods such as buttons, menus, text boxes, and mouse highlighting and selection. Screen 170 may include one or more rows, with each row displaying one instance of a node in the processing relationships structure, and one or more columns, with each column displaying one node identifier. The data in the rows and columns may be modifiable by a user of the system. New rows may be inserted in screen 170 by selecting an insertion point and selecting an insert function choice from screen 170. In this example, two rows have been inserted.

Each instance of a node in the functional relationship structure may be assigned a node identifier. The node identifier may be unique among other instances of the node. For example, in the processing relationship structure displayed in FIG. A-6, the user may select the ISSUER node (row 1, level 1) and assign it a node identifier of 10. The user may then select the COMPANYA node (row 2, level 2) and assign it a node identifier of 1. The user may then select the REGION node (row 3, level 3) and assign it a node identifier of 10. The user may then select the BRANCH node (row 4, level 4) and select the "expand node" function choice from screen 150. Screen 170 may be displayed, with ISS column 172, COA column 174, RGN column 176, BRN column 178, and NODE NUMBER column 179. Initially, no rows may be displayed, as no instances of the selected node may have been created. A row may be inserted in screen 170 by selecting an insertion point and selecting an "insert" function choice from screen 170. The node identifiers for the nodes may then be entered by the user. In one embodiment, one or more of the node identifiers may be automatically filled in by the process relationship configuration program upon inserting a new row. The processing relationship configuration program may then assign a unique node number (not to be confused with the node identifier) to the newly created node instance, and display the node number in NODE NUMBER column 179. In one embodiment, the user may not change the node numbers.

The combination of node identifiers assigned to an instance of a node may uniquely locate the node instance in the processing relationship structure. The node number may be used as an abbreviation for the combination of node identifiers. In the example illustrated in FIG. A-7, two node instances are displayed. The first is defined by node identifier combination (ISS=10, COA=1, RGN=10, BRN=100), and is assigned the node number 4. The second is defined by node identifier combination (ISS=10, COA=1, RGN=10, BRN=200), and is assigned the node number 5.

In one embodiment, an FSO user may create a new instance of an existing object by using the create_new_ instance method. Screen 170 may be displayed in response to an FSO user further identifying the values associated with the methods and properties of the new instance of the object (e.g. node 5 created as an instance of node 4). In one embodiment, the FSO user may identify specific values for ISS, COA, RGN, BRN which may be associated with the newly created object.

FIG. A-8—One Embodiment of an Interactive Computer Display Screen for Creating Instances of a Second Object in a Processing Relationships Structure FIG. A-8 illustrates one embodiment of a screen 170 for the user configuration of instances of nodes, or processing relationship objects, using a processing relationship configuration program in an FSO system. FIG. A-8 is another example of screen 170 as illustrated in FIG. A-7. FIG. A-8 illustrates that different columns may be displayed for different nodes. In the example illustrated in FIG. A-8, two node instances are displayed. The first is defined by node identifier combination (ACQ=20, COB=2, BNK=70, BRN=700), and is assigned the node number 20. The second is defined by node identifier combination (ACQ=20, COB=2, BNK=70, BRN=800), and is assigned the node number 21.

FIG. A-9—An Example of One Embodiment of a Computer Model of a Multilevel Business Processing Relationship Illustrated in FIG. A-2f, Wherein Values have been Assigned to the Objects in the Processing Relationship In one embodiment, nodes at level two may be specified as Company nodes. At level two, under Issuer node instance 252, one instance of Company B node 256 has been created and assigned a node identifier of 2 by the user and a node number of 6 by the processing relationship configuration program. Also at level two, under Acquirer node instance 254, one instance of Company B node 270 has been created and assigned a node identifier of 2 by the user and a node number of 18 by the processing relationship configuration program. Node instances 256 and 270 illustrate that one entity in an organization may occur as multiple node instances in a processing relationship structure if the entity performs multiple functions in the processing relationship structure and therefore appears under multiple function node instances.

In one embodiment, nodes at levels three and lower may be specified as owner nodes, with a number attached to the owner tag indicating the level, with owner 1 at level three, owner 2 at level four, etc. At level three, one instance of Non-risk node 260 has been created and assigned a node identifier of 20 by the user and a node number of 7 by the processing relationship configuration program. Also at level three, one instance of Bank node 258 has been created and assigned a node identifier of 30 by the user and a node number of 10 by the processing relationship configuration program. At level four, one instance of Bank node 262 has been created and assigned a node identifier of 399 by the user and a node number of 8 by the processing relationship configuration program. At level five, one instance of Branch node 264 has been created and assigned a node identifier of 500 by the user and a node number of 9 by the processing relationship configuration program.

Branch node instances 266A and 266B illustrate the creation of multiple instances of a node by a user. Branch node instance 266A has been assigned a node identifier of 700 by the user and a node number of 20 by the processing relationship configuration program. Branch node instance 266B has been assigned a node identifier of 700 by the user and a node number of 20 by the processing relationship configuration program.

Accounts in an FSO system may be associated with node instances in the processing relationship structure. In one embodiment, an account may be associated with only one node instance. Node instance information may be stored in the account master files, and also may be attached to transactions, files, database records, database tables, and other FSO data objects associated with the accounts. In some embodiments, an account master file or other FSO data object associated with the account may include the entire node identifier permutation that uniquely identifies the node in the tree. In some embodiments, an account master file or other FSO data object associated with the account may include the node number that uniquely identifies the node instance associated with the account.

In FIG. A-9, examples of account types include customer accounts 265, which are accounts for individuals who do business with the FSO, and merchant accounts 267, which are accounts for merchant businesses who do business with the FSO. In one embodiment, accounts may be associated with node instances at any level of the processing relationship structure. In some embodiments, accounts may not be associated with node instances at one or more levels of the processing relationship structure.

In one embodiment, a database table in the FSO system may be used to store the node identifier permutations and node numbers for all of the node instances in a processing relationship structure, as illustrated in further detail in FIG. A-11. The database table may be used in the FSO system as a lookup table to convert between node numbers and node identifier permutations. The node number may serve in the FSO system as an abbreviation of the node identifier permutation, and allows the node instance associated with an account to be identified in FSO data objects using a minimum of space. The node identifier permutation may be used in user interfaces, output files, etc. to identify node instances to the user, as this may be the form a user is most likely to recognize and understand.

FIGS. 10*a*-10*d*—Various Flow Charts Illustrating One Embodiment of a Method of Configuring Processing Relationships for Use in Various FSO Application Software Programs FIGS. 10*a*-10*d* include various flow charts illustrating one embodiment of a method of configuring processing relationships for use in various FSO application software programs, such as a report program.

FIG. A-10*a*—A High-Level Flow Chart Illustrating One Embodiment of a Method of Configuring Processing Relationships for Use in Configuring Reports in an FSO System FIG. A-10*a* is a flowchart illustrating one embodiment of a method of creating a processing relationship structure using the processing relationship configuration program, and of then using the node instances created in the processing relationship structure in an FSO runtime system in report record definitions to generate reports based on the processing relationship structure. In step 400, the processing relationship configuration program is used by a user of the FSO system to conFigure A—the processing relationship structure and the nodes and node instances therein. In step 402, the user may add one or more node instances to report record definitions, which may then be used to extract, sort, and/or collate reports based upon the processing relationship structure. FIGS. 10*b*-10*d* expand on the flowchart illustrated in FIG. A-10*a*.

FIG. A-10*b*—A Mid-Level Flow Chart Illustrating One Embodiment of a Method of Configuring Processing Relationships for Use in Configuring Reports in an FSO System FIG. A-10*b* is a flowchart illustrating one embodiment of a method of creating a processing relationship structure using the processing relationship configuration program, and of then using the node instances created in the processing relationship structure in an FSO runtime system in report record definitions to generate reports based on the processing relationship structure. FIG. A-10*b* expands on the flowchart illustrated in FIG. A-10*a*; steps 400 and 402 have been expanded into several steps.

In step 404, one or more persons may first define the business structure of the FSO to be modeled in a processing relationship structure. After the business structure has been defined, a processing relationship structure may be configured using the processing relationship configuration program. In step 406, a user may define the processing relationship objects, or nodes, at each level of the processing relationship structure. The process of defining the nodes at each level of the structure, and of defining descendents of the nodes at the next level, in effect creates the processing relationship structure. In step 408, the user may then select processing relationship nodes in the processing relationship structure and create instances of the nodes by assigning node identifiers to the nodes. A node identifier may uniquely define a node instance within the processing relationship structure, and may define the relationship of the node instance with node instances above it in the processing relationship structure.

In step 410 and 412, report record definitions may be defined. A report record definition is a data structure that defines the format of report records in an FSO system. A report record may be defined as a data record including break key values and one or more data values. A report record may also include other data such as header data, sequencing information, time stamps, etc. Break key values in a report record may be used to sort the report records by one or more of the break key values, thus ordering the report records in a logical sequence by one or more of the break key fields. The break key values may then be used when generating a report to collate the report by one or more of the break key fields. When generating reports, a collection of data records, such as transaction log records, transaction records, account master files, etc., may be processed, with one or more report records extracted from the collection of data records using the report record definition for the report to be generated. In some embodiments, one report record may be generated for each data record processed.

In step 410, a user may add break keys to a report record definition. Break keys are fields in the report record definition that are used to extract data values from transaction records, account master files, or other data sources, and to assign the extracted data values to break key fields in a report record. The report record definition may also include one or more data field definitions which may be used to extract data values from data elements in transaction records, account master files, or other data sources, and to assign the extracted data values to report data fields in a report record. The data field definitions may be added to the report record definition in step 412.

Processing relationship node identifiers may be used in report record definitions as break key fields. In one embodiment, node numbers may be used as an abbreviation for node identifiers in break key fields. A data record for which a report record is generated for a report may be associated with an account in the processing relationship structure. The data record may include a processing relationship node identifier and/or node number that may be used to link the data record to the account in the processing relationship structure. Using processing relationship node identifiers as break key fields in report record definitions may allow reports to be sorted and collated according to the processing relationship structure. This may allow individual reports to be automatically generated for business entities and FSO functional areas based upon the processing relationship structure. Rollup and summary reports may also be generated. As the report records including node instances are processed into reports, summary data may be compiled from the data fields within the report records. When a change, or break, in the key field values for the node instances is encountered, a summary report for all node instances at that level, for that branch of the processing relationship structure, may be generated. A report may continue this process for the entire processing relationship structure, thus generating summary reports for the entire FSO processing relationship as defined in the structure.

FIG. A-10*c*—A Detailed Flow Chart Illustrating One Embodiment of a Method of Defining Processing Relationship Objects and Arranging them in a Processing Relationship Model FIG. A-10*c* is a flowchart illustrating one embodiment of a method of creating a processing relationship structure using the processing relationship configuration program. FIG. A-10*c* is an expansion of step 406 from the flowchart illustrated in FIG. A-10*b*. In step 414, a user may initialize a new processing relationship structure by creating a processing relationship object, or node, at the first level. In one embodiment, a GUI in the processing relationship configuration program may provide a method of creating a new processing relationship structure. For example, a "create new processing relationship structure" menu choice may be available to the user. In one embodiment, creating a new processing relationship structure may automatically create a first node at a first level of the processing relationship. In one embodiment, this first node may be a system node that represents the highest level in the FSO processing relationship structure.

In one embodiment, all other nodes in the processing relationship structure are created as descendents of the first node. The first node may be assigned a unique node number by the processing relationship configuration program. In one embodiment, the node at the first level may be assigned a node number of 0. In one embodiment, the first level may be level 0.

In one embodiment, nodes created in the processing relationship structure may be displayed on a processing relationship configuration screen by the processing relationship configuration program. In one embodiment, one row may be displayed for each node in the processing relationship structure. The row may include fields for displaying and entering information about the node. Fields in the row may include a sequence field, a element ID constant field, a level field, an element ID field, an abbreviation field, and/or a description field. A sequence field may display a sequence number for the row in the screen. An element ID constant field may be used to enter, display, and edit a textual identifier for the node. A level field may be used to display the level of a node in the processing relationship structure. An element ID field may be used to enter, display, and edit an alphanumeric database identifier for the node. An abbreviation field may be used to enter, display, and edit a short, for example three characters, label for the node. A description field may be used to enter, display, and edit a textual description of the node. The rows in the screen may also include other information about the node not described herein.

In step 416, the user may select the first node created in step 414 on the processing relationship configuration screen in preparation for adding nodes at the second level as descendents of the first node. Selecting a node on the processing relationship configuration screen may be accomplished using one of a variety of methods, including standard GUI methods such as mouse highlighting and selection. The processing relationship configuration screen may include one or more function choices. For example, the screen may include insert node, delete node, edit node, and expand node function choices. Function choices may be selectable in a variety of methods, including standard GUI methods such as buttons, menus, text boxes, and mouse highlighting and selection.

In step 418, after the first processing node is selected, the user may insert a node at the second level as a descendent of the first node. The user may invoke an "insert node" function after selecting the first node. A new row representing the newly created node may be displayed immediately below the first node's row. The user may then insert data in one or more of the fields in the row to conFigure A—the new node. Some of the fields in the row may be automatically filled in by the processing relationship configuration program upon creating the new node. In step 420, the user determines if there are more nodes to be inserted at the second level as a descendent of the first node. If so, steps 418 and 420 are repeated. If no more nodes are to be added at the second level as descendents of the first node, the first node may be deselected by the user.

In step 422, the user may determine if nodes are to be added as descendents of any node already created in the processing relationship structure. If more nodes are to be added, the user proceeds to step 416 to select a node for which descendent nodes are to be added. Steps 416-422 may be repeated by the user until all processing relationship nodes in the processing relationship structure have been created and configured.

FIG. A-10*d*—A Detailed Flow Chart Illustrating One Embodiment of a Method of Defining Instances of the Processing Relationship Objects Defined in FIG. A-10*c*

FIG. A-10*d* is a flowchart illustrating one embodiment of a method of creating a processing relationship structure using the processing relationship configuration program. FIG. A-10*d* is an expansion of step 408 from the flowchart illustrated in FIG. A-10*b*. In step 424, the user may select a node displayed on the processing relationship configuration screen in preparation for adding node instances for the node. In one embodiment, nodes created in the processing relationship structure may be displayed on the processing relationship configuration screen by the processing relationship configuration program. In one embodiment, one row may be displayed for each node in the processing relationship structure. The row may include fields for displaying and entering information about the node. Selecting a node on the processing relationship configuration screen may be accomplished using one of a variety of methods, including standard GUI methods such as mouse highlighting and selection. The processing relationship configuration screen may include one or more function choices. For example, the screen may include insert node, delete node, edit node, and/or expand node function choices. Function choices may be selectable in a variety of methods, including standard GUI methods such as buttons, menus, text boxes, and mouse highlighting and =selection.

In step 426, after node is selected, the user may add instances of the node. The user may invoke an "expand node" function after selecting the first node. In response to the "expand node" function being invoked, the processing relationship configuration program may open a node instance configuration screen. The screen may include one or more function choices. For example, the screen may include insert row, delete row, and/or edit row function choices. Function choices may be selectable in a variety of methods, including standard GUI methods such as buttons, menus, text boxes, and mouse highlighting and selection. The screen may include one or more rows, with each row displaying one instance of a node in the processing relationships structure, and one or more columns, with each column displaying one node identifier. The data in the rows and columns may be modifiable by a user of the system. A new instance of the node may be created by inserting a new row in the screen. New rows may be inserted in the screen by selecting an insertion point and selecting an "insert function" choice from the screen.

Initially, no rows may be displayed, as no instances of the expanded node may have been created. A row may be inserted in by selecting an insertion point and selecting an "insert" function choice from the screen. The node identifiers for the nodes may then be entered by the user. In one embodiment, one or more of the node identifiers may be automatically filled in by the process relationship configuration program upon inserting a new row. The processing relationship configuration program may then assign a unique node number (not to be confused with the node identifier) to the newly created node instance, and display the node number in a column of the node instance row. In one embodiment, the user may not change the node number. The combination of node identifiers assigned to an instance of a node uniquely locate the node instance in the processing relationship structure. The node number may be used as an abbreviation for the combination of node identifiers. In one embodiment, the node identifiers assigned to an instance of a node may be read from left to right, with the leftmost being the node identifier of the highest node on the branch of the processing relationship structure the new node instance is on. The rightmost node identifier may be the node identifier of the newly created node, and may be assigned and edited by the user. Nodes between the leftmost node and rightmost node may be node identifiers of the ancestors of the node instance on the branch of the processing relationship structure. In one embodiment, the user may assign and edit the node identifiers of ancestor nodes. Other embodiments of ordering schemes for the node identifiers may be used, such as right-to-left, top-to-bottom (vertical arrangement), etc.

In step 428, the user determines if any more node instances are to be created for the currently selected node. If there are more node instances to be created for the currently selected node, step 426 may be repeated until all the node instances have been created. If there are no more node instances to be created for the currently selected node, the user may determine if node instances remain to be created for any other nodes in the processing relationship structure. If there are more node instances to be created, the user may repeat steps 424-428 until all node instances for all nodes have been created.

FIG. A-11—An Embodiment of a Database Table in the FSO System that May be Used to Store Node Identifier Permutations and Node Numbers FIG. A-11 illustrates an embodiment of a database table in the FSO system that may be used to store the node identifier permutations 342 and node numbers 340 for all of the node instances in a processing relationship structure. The database table may be used in the FSO system as a lookup table to convert between node numbers 340 and node identifier permutations 342. The node number 340 may serve in the FSO system as an abbreviation of the node identifier permutation 342, and allows the node instance associated with an account to be identified in FSO data objects using a minimum of space. The node identifier permutation may be used in user interfaces, output files, etc. to identify node instances to the user, as this may be the form a user is most likely to recognize and understand.

A processing relationship node number data element may be used as a key field in key definitions. The key definition may be used to search for processing parameters in the FSO system database. Since a node number uniquely identifies a node instance in the processing relationship structure, and one or more of the node identifier(s) that are associated with the node number may be changed without changing the node number, key definitions do not have to be modified when one or more node identifier(s) in the processing relationship structure are changed. This may isolate the FSO application software program source code from changes when the processing relationship structure may have changed.

In one embodiment, a processing relationship node number may be logged with a transaction record when the transaction is closed or written to a logfile, wherein the processing relationship node number uniquely identifies a processing relationship node instance in the processing relationship structure. The processing relationship node number in the transaction record may then be used by the system to identify the owner of the transaction record's account in the processing relationship structure.

Section Two

An FSO transaction processing system may include multiple report formats for generating reports on account-related data such as transactions, account master files, etc. Report formats may be stored in a database, and may include information defining the page layout, contents, and functions of the report. One example of a report function may be a summary of one or more data fields on the report, such as adding a column of account balance totals for a bank to report a total account balance for the bank. Report record definitions may also be stored in the database of the FSO transaction processing system. Report record definitions may include fields defining report record header information, one or more break keys, and one or more report data elements to be collected ("gathered") into report records from account-related data. Report record definitions may be used by a report data gathering process to extract break key values and report data values from account-related data and to store the values in report records.

In one embodiment, report records may be stored in a report record file by the data gathering process. At some point, a report generation process may read the report records stored in the report record file, sort the records, and generate one or more formatted reports including the contents of the report records. For example, an FSO system may gather report records into report record files, "close" the day at 2 p.m., and generate daily reports from the report records in the report record files. In some reports, one line may appear in a report for each report record read by the report. Some reports may include the results of one or more functions applied to the data values in the report records, such as summary reports. The report generation process may sort the report records in a report record file on one or more of the break key values that may be stored in the report records. In one embodiment, break keys in report record definitions may be assigned a sort order, and the report generation process may sort the report records on the break keys in the specified sort order. Thus, the report generation process may sort the report records by a first break key, and then a second break key, etc.

Reports in an FSO system may be generated from logfiles, wherein the logfiles are used to collect records of events in the FSO system over a period. The FSO system may take a "snapshot" of a portion or all of its databases and generate reports from the snapshot of the databases. Types of reports in an FSO system may include journal reports, for example, journal reports of a day's activities, and portfolio reports, i.e. a "snapshot" of the entire FSO's business data.

The report generation process may include a data gathering process, wherein break key values and report data values are extracted from transaction records or other sources and stored in report records, and a report creation process, wherein the report records are read, sorted, collated and formatted into reports. The data gathering process may also be referred to as an "implosion" and the report creation process as an "explosion."

Using processing relationships as break keys in report record definitions allows the FSO system to output reports, including rollups, totals, and subtotals, in the way that the FSO defines its business, not on a fixed level, because the definition of the business may be accomplished by a user of the system at configuration and/or runtime of the system, where previously the definition of the business was hardcoded into the source code of the FSO system software.

FIG. B-1—A Data Flow Diagram Illustrating the Use of Hardcoded Break Keys for Sorting And Collating Reports on Business Transaction Records and Accounts in One Embodiment of An FSO Business Transaction Processing System FIG. B-1 is a data flow diagram illustrating the use of hardcoded break keys for sorting and collating reports on business transaction records and accounts in one embodiment of an FSO business transaction processing system. Data 100 may be input into a report data gathering process 104. A hardcoded break key definition 106 may be embedded in the source code of the report data gathering process 104. Report data gathering process 104 may use hardcoded break key definition 106 to locate and extract break key values from data elements in data 100. Report data gathering process 104 may also use a hardcoded report data definition (not shown) to locate and extract report data values from data elements in data 100. The extracted break key values and report data values may be combined in a report record 108, and the report record 108 may be added to a group of report records in a report record file 110. Report records may be added to report record file 110 in a random order, and therefore may be considered unsorted in the report record file. After report records have been gathered in report record file 110, a sort process 112 may read the report records in unsorted report file 110 and use hardcoded break key definition 106 to sort the report records and output the sorted records 108 to a sorted report record file 114. A report formatting process 116 may then read the sorted report records from report record file 114, use hardcoded break key definition 106 to collate the report records, and generate one or more formatted reports 118 including collated report records and summaries of report records.

The hardcoded break key definitions necessitate the modification of source code, recompilation of executable programs, and reinstallation of the system to affect a change in a break key definition. The break key definition may be hardcoded in the source code separately for each of the report data gathering process 104, sort process 112, and report formatting process 116, necessitating the maintenance of the break key definitions in multiple source code locations. The hardcoding of break key definitions result in a fixed, inflexible sorting and collating format for reports. Report sorting and collating formats must be pre-defined and embedded in the source code. For processing relationships used as break keys in reports, hardcoding limits report sorting and collating to a fixed number of levels in the processing relationship, and the processing relationship may be limited to a symmetrical structure.

FIG. B-2—a Data Flow Diagram Illustrating the Use of External, User-Configurable Keys For Sorting and Collating Reports on Business Transaction Records and Accounts in an Embodiment of an FSO Business Transaction Processing System in One Embodiment of the Present Invention FIG. B-2 is a data flow diagram illustrating the use of external, user-configured keys for sorting and collating reports on business transaction records and accounts in one embodiment of an FSO business transaction processing system. Data 200 may be input into a report data gathering process 204. An external, user-configured break key definition 206 may be read by data gathering process 104. Report data gathering process 204 may use break key definition 206 to locate and extract break key values from data elements in data 200. Report data gathering process 204 may also use an external, user-defined report data definition (not shown) to locate and extract report data values from data elements in data 200. The extracted break key values and report data values may be combined in a report record 208, and the report record 208 may be added to a group of report records in a report record file 210. Report records may be added to report record file 210 in a random order, and therefore may be considered unsorted in the report record file. After report records have been gathered in report record file 210, a sort process 212 may read the report records in unsorted report file 210 and use external, user-configured break key definition 206 to sort the report records and output the sorted records 208 to a sorted report record file 214. A report formatting process 216 may then read the sorted report records from report record file 214, use external, user-configured break key definition 206 to collate the report records, and generate one or more formatted reports 218 including collated report records and summaries of report records.

FIG. B-3*a*—A Block Diagram Illustrating One Embodiment of an FSO Computer System for the user Configuration of Report Record Definitions In FIG. B-3*a*, an embodiment of an FSO business transaction processing system 10 may include a computer system 20, a display screen 40 connected to the computer system, and one or more databases 52 residing on external storage. Computer system 20 includes memory 30 configured to store computer programs for execution on computer system 20, and a central processing unit (not shown) configured to execute instructions of computer programs residing on computer system 20. Report record definition program 50 may be stored in memory 20. System 10 may also include a business transaction processing program (not shown). In one embodiment, Report record definition program 50 may be integrated in the business transaction processing program, so that configuring report record definitions may be viewed as a function within the business transaction processing program. System 10 may also include one or more input devices 42 such as a keyboard for entering data and commands into program 50, and one or more cursor control devices 44 such as a mouse.

FIG. B-3*b*—A Block Diagram Illustrating One Embodiment of an FSO Computer System Where User-Configured Report Record Definitions are Used in Report Generation In FIG. B-3*b*, an embodiment of an FSO business transaction processing system 10 may include a computer system 20, a display screen 40 connected to the computer system, and one or more databases 52 residing on external storage. Computer system 20 includes memory 30 configured to store computer programs for execution on computer system 20, and a central processing unit (not shown) configured to execute instructions of computer programs residing on computer system 20. Report generation program 51 may be stored in memory 20. System 10 may also include a business transaction processing program (not shown). In one embodiment, report generation program 51 may be integrated in the business transaction processing program, so that configuring processing relationships may be viewed as a function within the business transaction processing program.

System 10 may also include one or more report format files 43 that may include one or more report record definitions for use in generating reports. In one embodiment, report record definitions may be stored separately from the report format files in a report record definition file. Report format files 43 may also include report formatting information such as report layout, title and header information, functions to be performed upon report breaks, etc. System 10 may also include transaction logfiles 45 and account files 47. Transaction logfiles 45 may include log records of FSO business transactions executed over a period. Account files may include customer and merchant account information such as account master files. Transactions, transaction logfiles, account files and other collections of data may include one or more data elements. Some of the data elements in the collections of data may be data elements that uniquely identify the node instance in a processing relationship structure that the data collection is associated with. For example, a transaction log record may include a "node number" data element that corresponds to a unique node number of a node instance in the user-configured processing relationship structure for the FSO.

Report generation program 51 may read a report format file 43, gather data from a collection of data (such as a transaction log record), extract data element values from the data collection and add the extracted data element values as break key values in a report record, and extract data element values from the data collection and add the extracted data element values as report data values in the report record. The data elements for which values are to be extracted and added to report records may be defined in a user-configured report record definition in the report format file 43. After report generation program 51 has gathered all report records to be processed into a report, the report records may be sorted on one or more break key fields. The report records may then be processed into reports. In one embodiment, one report record generates one line on a report. Report breaks may occur in the report when a change in one or more break key values is detected. For example, if there are 20 report records, the first ten report records have a break key value of 3, and the second ten report records have a break key value of 5, a first report may be generated for the records including the break key value of 3 when report generation program 51 detects that the break key value changes from 3 to 5. A second report may be generated for the records including the break key value of 5. One or more report outputs 41 may be generated by report generation program 51. Reports may be output in a variety of way, including, but not limited to: report displays on computer display screen, hardcopy reports such as reports printed on computer printers, and electronic reports such as reports stored on a memory medium or transmitted electronically to remote locations.

FIG. B-4—One Embodiment of an FSO Computer System Integrated into a Networked System for Processing FSO Business Data FIG. B-4 illustrates one embodiment of a networked system configured for processing FSO business data. Network 60 may be a local area network or wide area network, and may include communications links including, but not limited to, Ethernet, token ring, Internet, satellite and modem. An FSO computer system 10 as illustrated in FIG. B-3*a* and 3*b* may be connected to network 60. One or more user workstations 80 may be connected to network 60 and may be used by users of the FSO computer system to enter and modify data, initiate data processing tasks, and monitor the processing of data in the FSO computer system. One or more printers 90 for outputting hardcopy reports on FSO system data may also be connected to network 60. One or more other FSO computer systems 70 may also be connected to network 60. In one embodiment, one or more computer systems 75 of client businesses of the FSO may also be connected to network 60. Client businesses of the FSO may forward business transactions to the FSO computer system for processing. In one embodiment, computer systems 75 may include computer systems belonging to one or more entities within the FSO, such as branches, regional offices, banks, departments, etc.

FIGS. 5*a*-5*f*—Various Embodiments of Configuring a Processing Relationship Structure That May be Modeled after an FSO Business Organization Structure A Financial Service Organization (FSO) is a business organization that provides financial products and services to customers and client organizations. An FSO may include one or more organizational units. Examples of organizational units include, but are not limited to, an entity, a business unit, a subsidiary, a division, a functional unit, a headquarter, an operating unit, a profit center, a regional office, and a branch office.

FIG. B-5*a* illustrates one embodiment of an FSO business organization. For example, the FSO business organization may be a global bank 2250. The FSO business units may be represented in a chart or a similar graphical form to illustrate the attributes of an FSO organization such as, but not limited to, the reporting relationship between various FSO entities, the reporting structure, the number of hierarchical levels between the highest level entity and the lowest level entity, the number of direct reports for an FSO entity. Each FSO entity may be represented as a node or a block on an FSO organizational chart. For example, global bank is represented as node 2250, the business unit for Americas by node 2252, the business unit for Europe, Middle East and Africa by node 2252. Each node may have a parent node and one or more children nodes. For example, USA business unit has a parent node i.e., Americas 2252 and has two children nodes, i.e., region aue 2260 and region auw 2258. Each node may be identified uniquely with a node number and/or a name. The FSO organizational chart may include multiple levels 2266 in the hierarchical relationship. A node without a parent may be described as a root node or a level zero node. A root node may include the entire FSO organization. The global bank node 2250 may be described as a root node. The FSO organizational chart may be updated, in real-time, as new FSO entities are introduced or removed by adding or deleting a node corresponding to the FSO entity. The FSO organizational chart may thus graphically represent the current, real world.

In one embodiment, an FSO user may create a similar or identical processing relationship structure modeled after the FSO business organization. In one embodiment, an FSO user may use a processing relationship configuration software program to conFigure B—or define the processing relationships between various FSO entities, which represent the FSO business organization. In one embodiment, an FSO user may conFigure B—a node in the processing relationship structure, which may provide same or similar functionality provided by the real world FSO entity. In one embodiment, there may be a one-to-one correspondence between a node included in the FSO business organization chart and a node included in the processing relationship structure.

In one embodiment, the processing relationship structure 2276 may be based on object-oriented technology. Each node in the processing relationship structure 2276 may be represented by a software object, which may be defined by the methods and properties associated with the object. For example, in one embodiment, a node may be represented by a bank object. The bank object may include properties such as, but not limited to, bank locations, ATM locations, types of customer accounts, types of loans. The bank object may include methods such as, but not limited to, add_new_account, add_new_location, delete_current_loan. In one embodiment, an FSO user may create various classes of objects such as a class of bank objects. A user may create an instance of the class to create, for example, a new global bank. The new global bank object may inherit all of the properties and methods associated with the class of bank objects.

In one embodiment, the processing relationship structure 2276 may be represented graphically on a display screen, as illustrated in FIG. B-5*b*. A user of an FSO may modify or edit the processing relationship structure 2276 by adding or deleting a node, e.g. the object associated with the node. In one embodiment, the node or object may be represented on a display screen as an icon or a symbol. In one embodiment, a group of objects, each represented as an icon, may be displayed as palette of objects 2274 on a display screen. In one embodiment, the user may use drag-and-drop techniques to add a new object selectable from a palette of objects 2274 to the processing relationship structure. For example, the FSO user may position a cursor 2268 on a node object 2274 and use a drag-and-drop method 2272 to place the selected object 2274 on the processing relationship structure. The FSO user may then conFigure B—the node, i.e. the object by using and/or defining the properties and methods associated with that node.

In one embodiment, the processing relationship structure may be based on traditional programming and traditional database technology. Programming in the C language may be an example of traditional programming. Examples of traditional database technologies may include, but not be limited to, hierarchical, proprietary, relational, flat file. Each node in the processing relationship structure may be represented, in one embodiment, by a table in a relational database. A node may be defined by the rows and columns associated with the table. For example, in one embodiment, a bank table may represent a node. The bank table may include attributes such as, but not limited to, a node identifier, a level number, a sequence number, a bank location identifier, an ATM location description, a customer account number, a type of loan. Access to the bank table may include identifying required keys such as, but not limited to a transaction identifier, an account number, an FSO user identifier. In one embodiment, the processing relationship structure may be represented by text on a display screen 150, as illustrated in FIG. B-5*c-d*. The parent/child or a precedent/descendent relationship may be defined in one embodiment by defining a previous node identifier and a next node identifier. An FSO user may modify or edit the processing relationship structure by adding or deleting a row in a table associated with the node being edited. The FSO user may add the root level node 2250 in FIG. B-5*c*. In one embodiment, the FSO user may add a first row to a global bank table. The user may conFigure B—the processing relationship structure by entering values for attributes such as, but not limited to, a node identifier, a level number, a sequence number. In FIG. B-5*d*, the FSO user may insert a row to add node 2252 for Americas. The user may conFigure B—the new node by entering values for attributes such as, but not limited to, a node identifier, a level number, a sequence number. In FIG. B-5*e*, the FSO user may insert a row to add node 2254 for Europe, Middle East and Africa. The process may be repeated for all of the remaining nodes included in the global bank business organization chart in FIG. B-5*a*. The FSO user may perform a modification to the processing relationship structure, i.e., reconFigure B-based on changes in the real world.

In one embodiment, an expert system may perform all the functions of an FSO user. An expert system may be programmed to duplicate or re-create all of the functions performed by the FSO user. For example, an expert system may graphically conFigure B- and/or modify the processing relationship structure.

In one embodiment, it may be possible to make the processing relationship structure identical to the FSO business organization. By using the same objects and/or tables the FSO user may eliminate the need to map real-life FSO entities with corresponding objects, which replicate the properties and/methods associated with the real-life FSO entities. Thus, the FSO user may automatically create and/or update a processing relationship structure when the user creates and/or modifies the FSO business organization structure. In one embodiment, the user may be able to create separate processing relationship objects from the FSO entity objects such that the processing relationship objects may be able to automatically mirror or track their corresponding master FSO objects.

The processing relationship structure may be used by FSO application software programs to process FSO transactions. Examples of application software, which may utilize the processing relationship structure, may include, but are not limited to, a report generation program, a credit card transaction processing program, a billing program, a monthly account reconciliation summary program. In one embodiment, changes made to the node associated objects and/or tables may have little or no effect on the application software program source code. For example, in FIG. B-2a the global bank may reorganize its visa account business unit 2262 such that the visa unit now falls under region auw instead of region aue. This change may have little or no impact on the report generation program source code for the visa account business unit 2262 since all the objects and/or tables associated with the visa account node, i.e., the owner of the data, may get automatically updated when the FSO user makes changes to the processing relationship structure. The application programs may, in one embodiment, reference the current properties and/or attributes of the node objects and/or tables to process FSO transactions.

FIG. B-5*f* through FIG. B-8, further illustrate various embodiments of configuring a processing relationship structure by starting with a representative FSO organization structure in FIG. B-5*f* and ending with a corresponding processing relationship structure in FIG. B-8.

Various Embodiments of Configuring a Report Program Based on the FSO Business Organization Structure In one embodiment, the FSO application programs such as the report program may be based on object-oriented technology. In one embodiment, each report required by the FSO may be represented by a software object. An FSO user may define methods and properties associated with a report object. In one embodiment, the report object may include properties such as, but not limited to, number_of rows, number_of columns, report_title, report_header, report_total, report_date. The report object may include methods such as, but not limited to, get_value, column_sub_total, row_count, grand_total, sort. In one embodiment, an FSO user may create various classes of objects such as a class of report objects. A user may create an instance of the report class to create, for example, a new daily report for visa account 2262 or a weekly report for region auw 2258.

In one embodiment, an FSO user may create a report object for gathering or collecting the data from the data sources and storing the gathered data in a report record file. In one embodiment, another report object may be created to manage report records, e.g., store, sort, etc. In one embodiment, a report object may be created to format and generate a report by reading report records stored in a records file and printing the output to a file or to a printer per specified format.

The new report object may inherit and/or further customize the properties and methods associated with the class of report objects. In one embodiment, the report object may interface, in real-time, with other software objects such as the objects associated with the nodes included in the processing relationship structure. The report object may, in real-time, invoke methods and access/change properties of the nodes.

In one embodiment, the FSO application programs such as the report program may be based on traditional programming and traditional database technology. Each report may be represented, in one embodiment, as a table in a relational database. A particular report may be represented by the rows and columns associated with a table. The report table may include attributes such as, but not limited to, a node identifier, a break level number, a sequence number, a report location identifier, an attribute description, a report frequency, a report type number. Access to the report table may include identifying required keys such as, but not limited to a report identifier, an account number, a node identifier.

In one embodiment, an FSO user may define or set up or conFigure B-a plurality of reports in various formats and/or styles for use by the FSO. The report format may include, but not be limited to, the definition related to the page layout, content and function. The definition of a report, e.g., the report record definition may include fields or properties for defining a report header, one or more break keys, one or more data elements to be collected (or gathered) into report records from the data sources. In one embodiment, the data source may be a property or an attribute of an account-related node included in the processing relationship structure. In one embodiment, the break keys to be used in the report format may be defined in a particular order. For example, in one embodiment, the break keys may identify visa account 2262 charge totals by branch, state, region and country.

In one embodiment, the report record definition may be represented by text on a display screen 130, as illustrated in FIG. B-9. In one embodiment, invoking the define_record_definition method of a report object may display screen 130. A sequence number, a break level number, a node identifier, an attribute and a descriptor may represent the report record definition, in one embodiment. An FSO user may modify or edit the report record definition by adding or deleting a row in a table associated with the break key being edited. The user may conFigure B—the report record definition by entering values for attributes such as, but not limited to, a node identifier, a break level number, a sequence number. The process may be repeated for all of the remaining report record definitions included in the database. The FSO user may perform a modification to the report record definition, i.e., reconFigure B-it based on changes in the real world.

FIG. B-9 further illustrates an embodiment of a display screen to conFigure B-break keys in a report record definition. FIGS. 10*a*-10*c* include flow charts illustrating various embodiments of a method of configuring report record definition using the processing relationship structure. FIGS. 11*a*-11*e* and 12 illustrate one embodiment of a structure of a report record definition. FIGS. 13*a*-13*b* include flow charts illustrating embodiments of a method to gather and format reports based on the configured report record definition.

FIG. B-5*f*—An Example of One Embodiment of a Multilevel Business Processing Relationship to be Modeled in an FSO Business System FIG. B-5*f* graphically illustrates one embodiment of a multi-level business processing relationship that may be modeled by a user of an FSO business system using a processing relationships configuration program. In this example, six levels are shown (levels 0-5). Level 0 may be called the root level of the processing relationship structure. Only one node appears at level 0. Node 250 at level 0 represents the root level of the FSO processing relationship structure. All other nodes in the structure are beneath node 250. Nodes beneath a node may be called descendents of the node. At level 1, one or more nodes may appear. In this example, an issuer node 252 and an acquirer node 254 are shown.

In the processing relationship structure, some nodes may represent physical entities in the FSO, and others may represent functional areas. A physical entity is an organizational unit that has a physical presence or manifestation, such as a bank branch office, regional office, or credit card line. A node representing a functional area is used to organize one or more other nodes into a sub-processing relationship group in the FSO processing relationship based upon some function of the FSO. Examples of functional areas include issuer, acquirer, and non-risk. The issuer function may be described as the function of issuing credit cards or other credit instruments to customers of the FSO. The acquirer function may be described as the function of acquiring payments from users of credit cards and other credit instruments on behalf of the FSO and client organizations of the FSO. Non-risk is a functional area that may be used to group nodes dealing with non-risk (or very low risk) instruments such as some types of bonds and secured loans.

Three nodes are shown as descendents of issuer node 252 at level 2. One of the three nodes is Company B 256. Note that Company B is also represented by a node underneath acquirer node 254. In a processing relationship, an entity may appear below more than one functional area. An entity may have more than one function, and the functions of an entity may be represented by separate nodes in the processing relationship.

Company B node 256 has two descendents at level 3, Non-risk node 260 and Bank node 258. A node in the processing relationship tree may represent an object in the processing relationship, such as a bank. During the configuration, a node may be given multiple instances of the object. For example, bank node 258 may represent banks in general at level 3 under Company B. When configured, multiple banks may be created as instances of bank node 258. For example, First Street Bank, Main Street Bank, and Elm Street Bank may be added to the processing relationship structure as instances of Bank node 258. In this example, the three banks report to Company B, but not to each other. Non-risk node 260 has one descendent at level 4, Bank 262. Bank 262 has one descendent at level 5, Branch 264.

FIGS. 6 and 7—Various Embodiments of Configuring a Processing Relationship Structure Using Various Interactive Computer Display Screens Generated by a Processing Relationship Configuration Program FIGS. 6-7 describe embodiments of configuring the processing relationship structure, described in FIG. B-5f, using various interactive computer display screens generated by a processing relationship configuration program.

FIG. B-6—One Embodiment of an Interactive Computer Display Screen for Configuring Processing Relationships, with Five Levels of Objects Displayed FIG. B-6 illustrates one embodiment of a screen 150 for the user configuration of processing relationships using a processing relationship configuration program in an FSO system. This example shows a processing relationship structure, such as that illustrated in FIG. B-5, that has been fully defined. All descendents of a first node in the processing relationship structure may appear directly beneath the node; after the descendents of the first node, a second node on the same level may appear, and then the second node's dependents, and so on. One or more columns may be indented to represent the processing relationship structure's levels. In this example, the description fields are indented to represent the levels.

FIG. B-7—One Embodiment of an Interactive Computer Display Screen for Creating Instances of a First Object in a Processing Relationships Structure FIG. B-7 illustrates one embodiment of a screen 170 for the user configuration of instances of nodes, or processing relationship objects, using a processing relationship configuration program in an FSO system. Screen 170 may be invoked by selecting one of the rows in screen 150 shown in FIG. B-6 and selecting an "expand node" function choice from screen 150. Screen 170 may include one or more function choices (not shown). For example, screen 170 may include insert row, delete row, and edit row function choices. Function choices may be selectable in a variety of methods, including standard GUI methods such as buttons, menus, text boxes, and mouse highlighting and selection. Screen 170 may include one or more rows, with each row displaying one instance of a node in the processing relationships structure, and one or more columns, with each column displaying one node identifier. The data in the rows and columns may be modifiable by a user of the system. New rows may be inserted in screen 170 by selecting an insertion point and selecting an insert function choice from screen 170. In this example, two rows have been inserted.

Each instance of a node in the functional relationship structure may be assigned a node identifier. The node identifier may be unique among other instances of the node. In the processing relationship structure displayed in FIG. B-6, the user may select the ISSUER node (row 1, level 1) and assign it a node identifier of 10. The user may then select the COMPANYA node (row 2, level 2) and assign it a node identifier of 1. The user may then select the REGION node (row 3, level 3) and assign it a node identifier of 10.

The user may then select the BRANCH node (row 4, level 4) and select the "expand node" function choice from screen 150. Screen 170 may be displayed, with ISS column 172, COA column 174, RGN column 176, BRN column 178, and NODE NUMBER column 179. Initially, no rows may be displayed, as no instances of the selected node may have been created. A row may be inserted in screen 170 by selecting an insertion point and selecting an "insert" function choice from screen 170. The node identifiers for the nodes may then be entered by the user. In one embodiment, one or more of the node identifiers may be automatically filled in by the process relationship configuration program upon inserting a new row. The processing relationship configuration program may then assign a unique node number (not to be confused with the node identifier) to the newly created node instance, and display the node number in NODE NUMBER column 179. In one embodiment, the user may not change the node numbers.

The combination of node identifiers assigned to an instance of a node uniquely locate the node instance in the processing relationship structure. The node number may be used as an abbreviation for the combination of node identifiers. In the example illustrated in FIG. B-7, two node instances are displayed. The first is defined by node identifier combination (ISS=10, COA=1, RGN=10, BRN=100), and is assigned the node number 4. The second is defined by node identifier combination (ISS=10, COA=1, RGN=10, BRN=200), and is assigned the node number 5.

FIG. B-8—An Example of One Embodiment of a Computer Model of the a Multilevel Business Processing Relationship Illustrated in FIG. B-5f, Wherein Values have been Assigned to the Objects in the Processing Relationship FIG. B-8 illustrates one embodiment of a computer model of the multilevel processing relationship structure illustrated in FIG. B-5f, showing the node identifiers assigned by a user, and the node numbers assigned by the processing relationship configuration program, to the nodes and node instances. In FIG. B-8, the user has created instances of all the nodes, and assigned node identifiers to all of the nodes. All node instances have been assigned unique node numbers. Node 250, the root level node is the only node on level zero and has been assigned a node number of 0. In one embodiment, the root level node may serve only as the root level node for the rest of the nodes in the processing relationship structure, and may not have an instance created. In one embodiment, nodes on level one may be specified as subsystem nodes. One instance of issuer node 252 at level one has been created and assigned a node identifier of 10 by the user, and a node number of 1 by the processing relationship configuration program. One instance of acquirer node 254 at level one has been created and assigned a node identifier of 20 by the user and a node number of 14 by the processing relationship configuration program.

In one embodiment, nodes at level two may be specified as Company nodes. At level two, under Issuer node instance 252, one instance of Company B node 256 has been created and assigned a node identifier of 2 by the user and a node number of 6 by the processing relationship configuration program. Also at level two, under Acquirer node instance 254, one instance of Company B node 270 has been created and assigned a node identifier of 2 by the user and a node number of 18 by the processing relationship configuration program. Node instances 256 and 270 illustrate that one entity in an organization may occur as multiple node instances in a processing relationship structure if the entity performs multiple functions in the processing relationship structure and therefore appears under multiple function node instances.

In one embodiment, nodes at levels three and lower may be specified as owner nodes, with a number attached to the owner tag indicating the level, with owner 1 at level three, owner 2 at level four, etc. At level three, one instance of Non-risk node 260 has been created and assigned a node identifier of 20 by the user and a node number of 7 by the processing relationship configuration program. Also at level three, one instance of Bank node 258 has been created and assigned a node identifier of 30 by the user and a node number of 10 by the processing relationship configuration program. At level four, one instance of Bank node 262 has been created and assigned a node identifier of 399 by the user and a node number of 8 by the processing relationship configuration program. At level five, one instance of Branch node 264 has been created and assigned a node identifier of 500 by the user and a node number of 9 by the processing relationship configuration program.

Branch node instances 266A and 266B illustrate the creation of multiple instances of a node by a user. Branch node instance 266A has been assigned a node identifier of 700 by the user and a node number of 20 by the processing relationship configuration program. Branch node instance 266B has been assigned a node identifier of 700 by the user and a node number of 20 by the processing relationship configuration program.

Accounts in an FSO system may be associated with node instances in the processing relationship structure. In one embodiment, an account may be associated with only one node instance. Node instance information may be stored in the account master files, and also may be attached to transactions, files, database records, database tables, and other FSO data objects associated with the accounts. In some embodiments, an account master file or other FSO data object associated with the account may include the entire node identifier permutation that uniquely identifies the node in the tree. In some embodiments, an account master file or other FSO data object associated with the account may include the node number that uniquely identifies the node instance associated with the account.

In FIG. B-8, examples of account types include customer accounts 265, which are accounts for individuals who do business with the FSO, and merchant accounts 267, which are accounts for merchant businesses who do business with the FSO. In one embodiment, accounts may be associated with node instances at any level of the processing relationship structure. In some embodiments, accounts may not be associated with node instances at one or more levels of the processing relationship structure.

In one embodiment, a database table in the FSO system may be used to store the node identifier permutations and node numbers for all of the node instances in a processing relationship structure. The database table may be used in the FSO system as a lookup table to convert between node numbers and node identifier permutations. The node number may serve in the FSO system as an abbreviation of the node identifier permutation, and allows the node instance associated with an account to be identified in FSO data objects using a minimum of space. The node identifier permutation may be used in user interfaces, output files, etc. to identify node instances to the user, as this may be the form a user is most likely to recognize and understand.

A processing relationship node number data element may be used as a break key field in report record definitions. The report record definition may be used for gathering report records, sorting the report records, and generating reports from the report records. Since a node number uniquely identifies a node instance in the processing relationship structure, and one or more of the node identifier(s) that are associated with the node number may be changed without changing the node number, report record definitions do not have to be modified when one or more node identifier(s) in the processing relationship structure are changed.

FIGS. 9-13 Illustrate Various Embodiments to Configure B-a Report Record Definition and To Use the Report Record Definition and the Processing Relationship Structure to Gather and Format Reports FIG. B-9 further illustrates an embodiment of a display screen to conFigure B-break keys in a report record definition. FIGS. 10*a*-10*c* include flow charts illustrating various embodiments of a method of configuring report record definition using the processing relationship structure. FIGS. 11*a*-11*e* and 12 illustrate one embodiment of a structure of a report record definition. FIGS. 13*a*-13*b* include flow charts illustrating embodiments of a method to gather and format reports based on the configured report record definition.

FIG. B-9—One Embodiment of an Interactive Computer Display Screen for Specifying Data Elements to be Used as Break Keys in a Report Record Definition FIG. B-9 illustrates one embodiment of a screen for specifying data elements to be used as break keys in a report record definition. In one embodiment, screen 130 may be presented to a user of a report record definition program in response to the user selecting a report record definition from a plurality of report record definitions. In one embodiment, the screen 130 may be a graphical user interface (GUI). In another embodiment, the screen 130 may be a textual interface. Screen 130 may include one or more function choices (not shown). For example, screen 130 may include insert new break point, delete break point, and edit break point function choices. Function choices may be selectable in a variety of methods, including standard GUI methods such as buttons, menus, text boxes, and mouse highlighting and selection. Screen 130 may include multiple rows, with each row displaying one break point in the report record definition, and multiple columns, with each column displaying one property of the report record definitions displayed in the rows. The data in the rows and columns may be modifiable by a user of the system.

Columns in screen 130 may include a sequence column 132, a break level column 134, an element ID column 136, an abbreviation column 138, and a description column 139. Sequence column 132 may display a sequence number for the rows in screen 130. The sequence numbers may signify the order the break key values will appear in a report record. Break level column 134 may be used to specify an order in which the break keys will be evaluated during sorting of the report records and collating of the reports. Entering a special character, or entering no character (leaving the field blank), in break level column 134 for a break key may specify that the break key is to not be used in the sorting and collating of report records. Element ID column 136 may be used to display an alphanumeric database identifier for the data element that is being used as a break key. Abbreviation column 139 may be used to display a short label for the data element that is being used as a break key. Description column 162 may be used to display a textual description of the data element that is being used as a break key.

In one embodiment, a user may add additional break keys to a report record definition by selecting one or more data elements from among a plurality of data elements available to be used as break keys in report records in the FSO system. The user may then use screen 130 to specify the break order of one or more break keys in the report record definition by specifying a break level in field 134 for each break key. Field 134 may be left blank, or a special character may be entered, in one or more break keys to specify that the one or more break keys are not to be used to sort report records or collate reports.

In FIG. B-9, screen 130 displays two break keys. The first break key (SEQ=1) is a Processing Relationship Node Number, and has been assigned a break level of 1. Account-related data may have a Processing Relationship Node Number data element. In one embodiment, during data gathering, the data gathering process may extract the Processing Relationship Node Number value from the account-related data from which report records are being gathered and write the Processing Relationship Node Number value to the report records. Thus, each report record may be associated with a unique account in the processing relationship structure using the Processing Relationship Node Number value. In one embodiment, the data gathering process may use the Processing Relationship Node Number value to look up an "expanded" processing relationship node identifier permutation in a look-up table, wherein the lookup table includes one column of node numbers and one or more columns of node identifiers that uniquely identify node instances in the processing relationship structure. The node identifier(s) located in the lookup table may then be written to the report record.

The second break key (SEQ=2) is an Account Type data element, and has been assigned a break level of 2. The second break key illustrates that data elements other than processing relationship node numbers and node identifiers may be used as break keys for reports.

The break level associated with a break key may be stored in the report record definition, along with other information about the data element to be used as the break key. In the example above, Processing Relationship Node Number is used as a break key, and is assigned a break level of 1. Account Type is also used as a break key, and is assigned a break level of 2. In this example, 1 is a higher priority break order than 2, meaning that, in sorting and collating, a break key with a break order of 1 is more significant than a break key with a break order of 2. In this example, when Processing Relationship Node Number is expanded into a processing relationship node identifier permutation, the report records may be sorted or collated on the node identifiers first, and then on the Account Type, because Processing Relationship Node Number has a higher priority break order than Account Type.

FIGS. 10*a*-10*c*—Flow Charts for Various Embodiments of a Method of Configuring Report Record Definition Using the Processing Relationship Structure FIGS. 10*a*-10*c* include flow charts illustrating various embodiments of a method of configuring report record definition using the processing relationship structure. FIGS. 11*a*-11*e* and 12 illustrate one embodiment of a structure of a report record definition. FIGS. 13*a*-13*b* include flow charts illustrating embodiments of a method to gather and format reports based on the configured report record definition.

FIG. B-10*a*—A High-Level Flow Chart Illustrating One Embodiment of a Method of Configuring Processing Relationships for use in Configuring Reports in an FSO System FIG. B—10*a* is a flowchart illustrating one embodiment of a method of creating a processing relationship structure using the processing relationship configuration program, and of then using the node instances created in the processing relationship structure in an FSO runtime system in report record definitions to generate reports based on the processing relationship structure. In step 400, the processing relationship configuration program is used by a user of the FSO system to conFigure B—the processing relationship structure and the nodes and node instances therein. In step 402, the user may add one or more node instances to report record definitions, which may then be used to extract, sort, and collate reports based upon the processing relationship structure. FIGS. 10*b*-10*c* expand on the flowchart illustrated in FIG. B-10*a*.

FIG. B-10*b*—A Mid-Level Flow Chart Illustrating One Embodiment of a Method of Configuring Processing Relationships for use in Configuring Reports in an FSO System FIG. B-10*b* is a flowchart illustrating one embodiment of a method of creating a processing relationship structure using the processing relationship configuration program, and of then using the node instances created in the processing relationship structure in an FSO runtime system in report record definitions to generate reports based on the processing relationship structure. FIG. B-10*b* expands on the flowchart illustrated in FIG. B-10*a*; steps 400 and 402 have been expanded into several steps.

In step 404, one or more persons may first define the business structure of the FSO to be modeled in a processing relationship structure. After the business structure has been defined, a processing relationship structure may be configured using the processing relationship configuration program. In step 406, a user may define the processing relationship objects, or nodes, at each level of the processing relationship structure. The process of defining the nodes at each level of the structure, and of defining descendents of the nodes at the next level, in effect creates the processing relationship structure. In step 408, the user may then select processing relationship nodes in the processing relationship structure and create instances of the nodes by assigning node identifiers to the nodes. A node identifier may uniquely define a node instance within the processing relationship structure, and may define the relationship of the node instance with node instances above it in the processing relationship structure.

In step 410 and 412, report record definitions may be defined. A report record definition is a data structure that defines the format of report records in an FSO system. A report record may be defined as a data record including break key values and one or more data values. A report record may also include other data such as header data, sequencing information, time stamps, etc. Break key values in a report record may be used to sort the report records by one or more of the break key values, thus ordering the report records in a logical sequence by one or more of the break key fields. The break key values may then be used when generating a report to collate the report by one or more of the break key fields. When generating reports, a collection of data records, such as transaction log records, transaction records, account master files, etc., may be processed, with one or more report records extracted from the collection of data records using the report record definition for the report to be generated. In some embodiments, one report record may be generated for each data record processed.

In step 410, a user may add break keys to a report record definition. Break keys are fields in the report record definition that are used to extract data values from transaction records, account master files, or other data sources, and to assign the extracted data values to break key fields in a report record. The report record definition may also include one or more data field definitions, which may be used to extract data values from data elements in transaction records, account master files, or other data sources, and to assign the extracted data values to report data fields in a report record. The data field definitions may be added to the report record definition in step 412.

Processing relationship node identifiers may be used in report record definitions as break key fields. In one embodiment, node numbers may be used as an abbreviation for node identifiers in break key fields. A data record for which a report record is generated for a report may be associated with an account in the processing relationship structure. The data record may include a processing relationship node identifier and/or node number that may be used to link the data record to the account in the processing relationship structure. Using processing relationship node identifiers as break key fields in report record definitions may allow reports to be sorted and collated according to the processing relationship structure. This may allow individual reports to be automatically generated for business entities and FSO functional areas based upon the processing relationship structure. Rollup and summary reports may also be generated. As the report records including node instances are processed into reports, summary data may be compiled from the data fields within the report records. When a change, or break, in the key field values for the node instances is encountered, a summary report for all node instances at that level, for that branch of the processing relationship structure, may be generated. A report may continue this process for the entire processing relationship structure, thus generating summary reports for the entire FSO processing relationship as defined in the structure.

FIG. B-10*c*—A Detailed Flow Chart Illustrating One Embodiment of a Method of Configuring Break Keys in Report Record Definitions in an FSO System FIG. B-10*c* is a flowchart illustrating one embodiment of a method of configuring break keys in a report record definition using the report record definition program. FIG. B-10*c* is an expansion of step 410 from the flowchart illustrated in FIG. B-10*b*. In step 432, a user of the report record definition program may select processing relationships to be available for use as break key(s) in the report. In one embodiment, Processing Relationship Node Number may appear as a data element in a plurality of data elements in the FSO system database. The user may select the Processing Relationship Node Number data element from a list of the plurality of data elements and add it to a list of data elements available for use as break keys in the report record definition. In step 434, a user of the report record definition program may select one or more other data elements to be available for use as break key(s) in the report. The user may select the data elements from the list of the plurality of data elements and add it to the list of data elements available for use as break keys in the report record definition.

In step 436, the user may select processing relationships to be used as break keys in a report record definition. In one embodiment, a Processing Relationship Node Number data element may appear as a break key in a list of break keys available for use in the report record definition. The user may select the Processing Relationship Node Number break key and specify a break level for the break key to enable the break key for use in sorting and collating report records. In step 438, the user may select other data elements to be used as break keys in a report record definition. In one embodiment, the data elements may appear as break keys in a list of break keys available for use in the report record definition. The user may select the data elements to be used as break keys in step 438, and specify a break level for the break keys to enable the break keys for use in sorting and collating report records. In some embodiments, the break keys to be used in a report record definition may be first selected in steps 436 and 438, and the break order for the selected break keys may be specified in step 440. For example, a display of the break keys may include a "select for break key" field and a "break level" field. The user may enter a character in the "select for break key" field to select the break record in step 436 or 438, and then enter a break level for all of the selected break keys to specify the break order in step 440.

FIGS. 11*a*-11*e*—An Embodiment of A Structure of A Report Record Definition FIGS. 11*a*-11*e* and 12 illustrate one embodiment of a structure of a report record definition. FIG. B-12 illustrates one embodiment of generating a report using break keys. FIGS. 13*a*-13*b* include flow charts illustrating embodiments of a method to gather and format reports based on the configured report record definition.

FIG. B-11*a*—A General Format of One Embodiment of a Report Record Definition FIG. B-11*a* illustrates the general format for one embodiment of a report record definition. A report record definition may include several groups of fields. Field group 300 may include one or more data elements to be used as break keys in report records. Field group 302 may include one or more data elements to be used as report data in report records. In one embodiment, the FSO system may be capable of outputting a plurality of reports. In one embodiment, each of the plurality of reports may have one or more report record definitions for extracting break key data values and report data values from account-specific data and storing the data values in report records. In one embodiment, the FSO system may include a database including report record definitions that is accessible processes that create, manipulate, and read the report records, such as the data generation process, the sort process, and the report generation process. Thus, the report record definitions may be external to the processes that use them, making it unnecessary for the report record definitions to be hardcoded in the source code of the processes. The external report record definitions may make it possible for users of the FSO system to conFigure B—the report record definitions without going through the process of modifying source code, recompiling executable programs, and re-installing the software applications that may utilize report record definitions.

FIG. B-11*b*—An Example of One Embodiment of a Report Record Definition

FIG. B-11*b* illustrates an example of one embodiment of a report record definition. In FIG. B-11*b*, one data element, the processing relationship node number 304, has been added as a break key in the report record definition.

A data element may appear in a report record definition both as a break key and as a report data element. For example, an FSO may wish to sort and collate report records on data element A, and to display the value of data element A in a report.

FIG. B-11c—A Format of One Embodiment of a Report Record Definition, Showing the Use of Processing Relationship Nodes as Break Keys FIG. B-11c illustrates the format of a report record that may be constructed using the report record definition illustrated in FIG. B-11b. The report record may include a header 310 that may include data fields to be used in storing, sorting, and producing collated reports on the report records. Break key field 312 illustrates that processing relationship node number used as a break key may result in an expanded set of processing relationship node identifiers being written to the report records. In one embodiment, the FSO system may include a lookup table for converting processing relationship node numbers into permutations of processing relationship node identifiers, as illustrated further in FIG. B-14. As account-specific data are processed by the data gathering process, the data gathering process may read a processing relationship node number value from the account-specific data set, look up the processing relationship node identifiers for the node number value in the lookup table, and write the node identifiers to the report record to be used as break key values for sorting and collating report records. In one embodiment, the set of node identifiers may be arranged in a sort order. In one embodiment, the higher the node identifier in the processing relationship structure, the more significant the node identifier is in the sort order. Data area 314 may include one or more data element values extracted from the account-specific data set using the report record definition. The data element values may be used in one or more fields on a report.

FIG. B-11d—An Example of an Unsorted Set of Report Records Constructed Using the Report Record Definition Illustrated in FIG. B-11b FIG. B-11d illustrates an example of an unsorted set of report records constructed using the report record definition of FIG. B-11b. The report records are specific examples of the general format illustrated in FIG. B-11c. In one embodiment, the report records may be constructed by a data gathering process and written to a report record file. In one embodiment, the data gathering process may read the report record definition from an external source, such as a database including report records. Break key fields 312 are set to specific values of processing relationship node identifiers in each of the report records. Report records that have been generated from account-specific data belonging to the same account have identical break key field values. In one embodiment, report records may be appended to the bottom of the report record file as they are generated. In this embodiment, the report records may appear in the file in chronological order. In one embodiment, the header 310 may include a time stamp for the report record.

FIG. B-11e—The Example Set of Report Records Constructed Using the Report Record Definition Illustrated in FIG. B-11b after Sorting on the Processing Relationship Break Keys FIG. B-11e shows the example set of report records illustrated in FIG. B-11d after the records have been sorted by a sort process. In one embodiment, the sort process may use a report record definition, such as that shown in FIG. B-11b, in the sorting of the records. In one embodiment, the sort process may read the report record definition from an external source, such as a database including report records. The records have been sorted by the break key fields. In this example, the break key fields are processing relationship node identifiers shown in the report record format of FIG. B-11c. The sort process may use the report record definition to generate a template of the report record format to determine which break keys to sort on, what the sort order of the break keys is, etc. In FIG. B-11d, the leftmost node identifier, representing the highest node instance in the processing relationship structure used for report break key purposes, being the most significant field in the sort. The rightmost node identifier is the least significant field in the sort. The rightmost node identifier is the node identifier of the node instance to which the account associated with the report record belongs. In one embodiment, the sort process may be integrated with the report generation process, so that the sorting of the report records in a report record file may occur during the report generation process.

An account may be associated with a node instance at one of several levels in a processing relationship structure, resulting in different numbers of node identifiers in one or more report records. For example, a first report record constructed using processing relationship node number as a break key may include three levels of node identifiers, while a second report record constructed using processing relationship node number as a break key may include four levels of node identifiers.

FIG. B-12—A Data Flow Diagram Illustrating One Embodiment of Generating Reports Using Processing Relationship Break Keys FIG. B-12 is a flow diagram illustrating one embodiment of generating reports using processing relationship break keys. In the example shown in FIG. B-12, the sorted set of report records illustrated in FIG. B-11e are input into the report generation process. The report generation process may read the records from a first record to the last, and may generate a report break when a change in one or more break keys is detected. In the example, four levels of processing relationship node identifiers are break keys. The node identifier values may have been written into the report records by the data gathering process that compiled the set of report records. The data gathering process may have read a processing relationship node number from the account-specific data set being processed and used the node number to look up a corresponding set of node identifiers in a lookup table.

The report generation process may use the report record definition illustrated in FIG. B-11b to construct a report record format such as that illustrated in FIG. B-11c. The report generation process may use a report record definition such as that illustrated in FIG. B-11b to construct a template report record format for reading and sorting the report records. In one embodiment, the report generation process may read the report record definition from an external source, such as a database including report records.

The report generation process may read the report records from the sorted set of report records from a first record to a last record. The report generation process may read the first report record and format the report data values read from the report record into a report. In one embodiment, the report may be a report on all of the report records for accounts associated to a particular node instance in the processing relationship structure. The node instance for which the report is being generated may be uniquely identified by one or more node identifier values. The report records being processed into the report may include node identifier values as break key values.

The report generation process may add one or more report data values to accumulators for later using the accumulated values in summary reports. In one embodiment, the report generation process may write one line in the report for each report record processed. When the report generation process reads the second report record, it may compare the one or more break key values in the second report record to the first report record's break key values. If the break key values are the same, the report generation process may process the second report record into the same report and accumulators that the first report record was processed into. If one or more of the break keys have changed, a report break is generated.

Upon generating a report break, the report generation process may perform one or more report formatting tasks. Examples of report formatting tasks include, but are not limited to: generating summary reports, starting new reports, inserting line breaks, inserting page breaks, and inserting headers. The formatting task performed may depend upon which break key(s) changed to generate the report break. If more than one break key changed, the report generation process may perform report formatting tasks for each of the changed break keys. In one embodiment, the formatting tasks to be performed upon report breaks generated by the break keys in a report record definition may be stored in a report format file.

In this example, the report generation process may read the first three report records 320 from the inputted sorted set of report records and add them to a first report. In the fourth report record (the first in report record set 324) one of the break key values has changed, so a report break is generated. The report generation process may generate reports 322. Since in this example the break keys are processing relationship node identifiers, the reports may include account detail and summary reports for the node instance identified by the unique node identifier permutation (10,1,10,100).

The report generation process may then read the next two report records 324 from the inputted sorted set of report records and add them to a second report. In the sixth report record (the first in report record set 328) two of the break key values have changed, so two report breaks may be generated. The report generation process may generate reports 326. Since in this example the break keys are processing relationship node identifiers, the reports may include account detail and summary reports for the node instance identified by the unique node identifier permutation (10,1,10,200). Since a break key with a higher significance has changed (Own1 from the report record format illustrated in FIG. B-11c), the reports may also include account detail and summary reports for all node instance identified by the node identifier permutation (10,1,10,*), where the "*" is a wildcard value. In this example, the wildcard value identifies node identifier permutation (10,1,10,100) and node identifier permutation (10,1,10,200).

The report generation may continue the process of reading sets of report records, generating report breaks, and generating detail and summary reports for processing relationship node instances identified by unique node identifier permutations (when the least significant node identifier changes) and for groups of node instances identified by node identifier permutations with wildcards in one or more fields (when one or more of the more significant node identifiers change). Upon reading the last record 336, one or more report breaks may be generated. Since in this example the break keys are processing relationship node identifiers, the reports may include account detail and summary reports for the node instance identified by the unique node identifier permutation (20,1,10,100). Since record 336 is the last report record in the input report record set, the report generation program may behave like all of the break keys have changed, and generate report breaks for all of the break keys. Thus, the reports may include account detail and summary reports for all node instance identified by the node identifier permutations (20,1, 10,*), (20,1,*,*), (20,*,*,*), and (*,*,*,*), where the "*" is a wildcard value. The last node identifier permutation, (*,*,*,*), may generate reports covering all of the node instances in the processing relationship structure.

Thus, an FSO may use processing relationships as break keys to automatically generate detail and summary reports for the accounts in each of the entities and functions described as node instances in a processing relationship structure. "Rollup" and summary reports may be generated for an entity or function described as a node instance in the processing relationship structure that has one or more node instances "beneath" it on the branch of the processing relationship structure. The summary reports may include summaries of the accounts associated with the node instances beneath the entity or function in the processing relationship structure. For instance, a bank A may have a branch B and a branch C beneath it in a processing relationship structure. Account detail reports may be generated for branch B and branch C, then a branch account summary report may be generated for bank A that summarizes account data from branch B and branch C.

Data elements other than processing relationships may be used as break keys in report record definitions. The sorting and collating of reports using data elements other than processing relationships as break keys may be performed identically to the sorting and collating of reports using processing relationships as break keys. The only difference may be that the break key values may be read directly from the input data source, rather than being read as a node number and translated into a unique node identifier permutation. Some report record definitions may include processing relationships as break keys and other data elements as break keys.

FIGS. 13a-13c—Embodiments of Report Gathering and Generation Using Break Keys.

FIGS. 13a-13c illustrate various embodiments of gathering data used in reports, processing of the gathered data and the generation of reports using break keys.

FIG. B-13a—A Flowchart Illustrating One Embodiment of a Method of Report Data Gathering Using User-Configured Break Keys FIG. B-13a is a flowchart illustrating one embodiment of a method of report data gathering using user-configured break keys. In step 500, a user may conFigure B—a report record definition. Configuring the report record definition may include adding one or more data elements to the report record definition to be used as break keys, specifying a break order for the one or more break keys, and adding one or more data elements to the report record definition to be used as report data elements. The report record definition may be stored in the FSO system database for later retrieval by one or more processes that may create, manipulate, and generate reports from report records using the report record definition. In one embodiment, a user may conFigure B—the report record definitions during a configuration of the FSO computer system. In one embodiment, report record definitions may be configured by users of the FSO computer system during runtime.

In step 502, a report data gathering process may be invoked. In one embodiment of an FSO system, a report data gathering process may run continuously as long as the system is operable. The report data gathering process may generate a report record for each account transaction that occurs in the FSO system. In one embodiment, a report data gathering process may be invoked on a scheduled basis to periodically gather data from account data files. In one embodiment, a user may invoke a report data gathering process, for example, to generate reports on customer account master files in the FSO system. In step 503, the data gathering process may create and open a new report record file for receiving report records generated in the data gathering process.

Steps 504 through 516 may be repeated until the report gathering process is terminated, or until a break occurs in the process, such as an end-of-day break, that may cause the data gathering process to close the current report record file and open a new report record file. In step 504, the data gathering process may become aware of a new data set from which a report record is to be generated. In one embodiment, the data set may be an account-specific data set. In one embodiment, the data set may be an FSO business product transaction generated for a particular customer, client, or merchant account in the FSO system.

In step 506, the data gathering process may check the report record definition generated in step 500 to see if it includes break keys. In one embodiment, the report record definition may have been stored in a database in step 500, and the data gathering process may read the report record definition from the database. If the report record definition does not include break keys, the data gathering process may proceed to step 512. If the report record definition does include break keys, the data gathering process may proceed to step 508. In step 508, the data gathering process may use the break keys defined in the report record definition to locate and extract the data element values to be used as break key values from the data set being processed. In step 510, the break key values may be written to the report record for the data set being processed. The data gathering process may then proceed to step 512. In step 512, the data gathering process may use the report data elements defined in the report record definition to locate and extract the data element values to be used as report data values from the data set being processed. In step 514, the report data values may be written to the report record for the data set being processed. In step 516, if more report records are to be gathered, the process returns to step 504. If the report record file is ready for report generation, the data gathering process may close the report in step 517.

FIG. B-13*b*—A Flowchart Illustrating One Embodiment of a Method of Report Sorting and Collating Using User-Configured Break Keys FIG. B-13*b* is a flowchart illustrating one embodiment of a method of report sorting and collating using user-configured break keys. The method illustrated in FIG. B-13*b* may be performed on report record files generated using the method illustrated in FIG. B-13*a*. In step 518 of FIG. B-13*b*, the report generating process may be invoked. The report generation process may be invoked in a variety of ways. For example, a batch process may be set up to invoke the report generation process on a set schedule, such as once a day at 2 p.m. or Saturday at midnight. The report generation process may be invoked to run immediately on a selected report record file by a user. A user may invoke a batch process to run once at a future time and invoke the report generation process. Events in the FSO system may also invoke the report generation process; for example, an error condition may trigger the report generation process to report on data in logfiles for error recovery validation purposes.

In step 520, the report records in a report record file may be sorted on one or more break keys defined in a report record definition. In one embodiment, the report record definition may be stored in a database, and the sort process may read the report record definition from the database. The sorted report records may be written back into the report file (sort in place) or may be written to a new report file.

In steps 522 through 528, the report records in the sorted report record file are processed and collated into one or more reports. The report records may be collated on one or more break keys defined in a report record definition. In one embodiment, the report record definition may be stored in a database, and the collate process may read the report record definition from the database. In step 522, a next report record may be read from the report record file. One or more report data values in the report record may be written to a report, and one or more of the report data values may be added to accumulators. In step 524, the break key values in the report record may be compared to the break key values of a previous report record. If one or more break key values have changed on or more report breaks may be generated, and one or more reports may be generated in step 526. Refer to the description of FIG. B-12 for details on the generation of report breaks and the generation of reports based on the report breaks.

Referring again to FIG. B-13*b*, the report collating process may check to see if there are more report records in the report record file being processed. If there are, processing may return to step 522 to get the next record. If there are no more records, a report break may be generated and processing may proceed to step 530. In step 530, one or more reports may be generated. In one embodiment, if one of the break keys in the report record definition is a processing relationship node number, then a summary report covering all of the report records for all of the node instances in the processing relationship structure may be generated.

FIG. B-14—An Embodiment of a Database Table in the FSO System that May be Used to Store Node Identifier Permutations and Node Numbers FIG. B-14 illustrates an embodiment of a database table in the FSO system that may be used to store the node identifier permutations 342 and node numbers 340 for all of the node instances in a processing relationship structure. FIG. B-14 uses the node identifier permutations previously used in FIGS. 11*d* and 11*e* as examples. The database table may be used in the FSO system as a lookup table to convert between node numbers 340 and node identifier permutations 342. The node number 340 may serve in the FSO system as an abbreviation of the node identifier permutation 342, and allows the node instance associated with an account to be identified in FSO data objects using a minimum of space. The node identifier permutation may be used in user interfaces, output files, etc. to identify node instances to the user, as this may be the form a user is most likely to recognize and understand.

Section Three

In FIG. C-1, an embodiment of a financial service organization business transaction processing system 100 may include a computer operating system 110, a database 130 comprising one or more data sets 131 residing on a data storage system 120. System 100 includes memory (not shown) configured to store computer application programs 140 for execution on system 100, and a central processing unit (not shown) configured to execute instructions of computer application programs 140 residing on system 100. A user 170 of a financial service organization business transaction processing system 100 may interact with the system via an application program 140. In one embodiment, an Application program 140 may process data sets 131 included in database 130 using random event based data set processing 160. In another embodiment, an Application program 140 may process data sets 131 included in database 130 using schedule based data set processing 150.

FIG. C-2 illustrates one embodiment of a financial service organization business transaction processing system with Smart Trigger software. In this embodiment, a financial service organization business transaction processing system 200 may include a computer operating system 210, a database 230 comprising one or more data sets 280 residing on a data storage system 220. System 200 includes memory (not shown) configured to store computer application programs 240 for execution on system 200, and a central processing unit (not shown) configured to execute instructions of computer application programs 240 residing on system 200. A user 270 of a financial service organization business transaction processing system 200 may interact with the system via an application program 240. In one embodiment, an Application program 240 may process data sets 280 included in database 230 using random event based data set processing 260. In another embodiment, an Application program 240 may process data sets 280 included in database 230 using schedule based data set processing 250. In another embodiment, an Application program 240 may process data sets 280 included in database 230 using Smart Trigger based data set processing 270.

FIG. C-3a is a data flow diagram illustrating a Smart Trigger selection for an associated executable processing task according to one embodiment. The Smart Trigger table according to one embodiment comprises a list of pointers to an account data set 310 which need further processing as identified by a specific activity number 330 using activity data 340 on a user specified scheduled date 320. The specific activity number 330 is used as a key to access the associated processing task number 350 which in turn is used as a key to access an executable processing task name 370.

FIG. C-3b is a diagram illustrating a Smart Trigger date dependent data set selection according to one embodiment. The scheduled date being equal to or greater than today's date is a trigger to process the specific account data set 310 linked to the specific processing task name 370 as explained in FIG. C-3a.

FIG. C-4a is a flowchart illustrating the configuration and runtime use of prior art data set processing method for an FSO computer system, according to one embodiment. In one embodiment, steps 400 and 405 may be performed in a business transaction processing program in the FSO system. The user of the FSO computer may START the data set processing method by initiating a business transaction. In step 400, a user of the FSO computer system may set up a TRIGGER file to process FSO related data sets on a specific scheduled date. The user would further define a series of evaluation criteria for every record in the FSO data set to determine if FSO computer needs to execute one or more processing tasks. For example, one embodiment of a FSO related data set may be an FSO account master file. An embodiment of a processing task may determine if the credit card expiration date falls within the next two months and if it does the processing task may further include extending the expiration date of the FSO issued credit card by one year. In step 401, the FSO data set processing software may be compiled, generated and downloaded. In step 402, the user may initiate the task to process the TRIGGER FILE. In step 403, the trigger file is processed sequentially. The first record in the file which may consist of a data set pointer and a scheduled date may be read. In step 404, a comparison may be made between the scheduled date and the current date to determine if the current record of the FSO data set needs further processing. As one embodiment, if the current date is greater than or equal to the scheduled date then the current record may need further processing. In step 405, if the current date is less than the scheduled date then the next sequential record in the FSO data set may be read and the step 404 may be executed again.

FIG. C-4b is a continuation of flowchart in FIG. C-4a. Step 410 is executed after step 404 in FIG. C-4a. In step 410, the data set pointer may be used to access the entire record in the FSO data set. In step 413, the data contained in the FSO record may be evaluated to determine if criteria for executing one or more processing tasks have been met. If the one or more evaluation criteria are matched then step 414 would be executed next. If the one or more evaluation criteria are not matched then step 412 would be executed next. As one embodiment of the criteria for executing a processing task to extend the credit card expiration date, an evaluation may be made to determine if the current credit card expiration date falls within the next two months. In step 414, if the data in the FSO record met the criteria then the processing task may be executed. As one embodiment, the processing task may extend the expiration date of the FSO issued credit card by one year for the current FSO record. In step 416, an evaluation may be made if there are any additional processing tasks for the current FSO record. If it is determined that there may be additional processing tasks then step 415 would be executed next. If it is determined that there may be no additional processing tasks then step 420 would be executed next. In step 412, since it has been determined that one or more evaluation criteria were not matched, a further evaluation may be made to determine if additional processing tasks remain to be processed for the current FSO record. If no additional processing tasks remain to be processed for the current FSO record then the program control would go to step 420 in FIG. C-4c. If additional processing tasks remain to be processed for the current FSO record then step 411 would be executed next. In step 411, the next processing task for the current sequential record in the FSO data set may be accessed and program control may be transferred to step 413 in FIG. C-4b. In step 415, the next processing task for the current sequential record in the FSO data set may be accessed and program control may be transferred to step 413 in FIG. C-4b.

FIG. C-4c is a continuation of flowchart in FIG. C-4b. In step 420, the scheduled date may be reset to indicate that all processing tasks for the current FSO record may have been completed. Program control may then be transferred to step 422. In step 422, an evaluation may be made if there are any additional records of the current FSO data set. If there are additional records to be processed then program control may be transferred to step 421. If there are no additional records to be processed then program control may be transferred to the END step. In step 421, the next sequential record for the current FSO data set may be accessed and program control may be transferred to step 404 in FIG. C-4a.

FIG. C-5 is a flowchart illustrating the configuration and runtime use of a Smart Trigger based processing method for an FSO computer system, according to one embodiment. In one embodiment, steps 500 and 509 may be performed in a business transaction processing program in the FSO system. A user of the FSO computer may START the data set processing method by initiating a business transaction. In step 500, the user of the FSO computer system may conFigure C-a Smart Trigger by defining an identifier for an FSO data set, a scheduled date and an identifier for an associated processing task. In another embodiment, the user may also define a data field with the associated processing task identifier. As one embodiment, the user may set up a Smart Trigger table for processing one or more accounts of an FSO data set on a particular scheduled date by assigning an associated task to be executed when certain pre-defined condition such as current date is equal to or greater than the scheduled date has been met. In step 501, the user of the FSO computer system may schedule a task to be executed at a user defined period to process the Smart Trigger table. In step 502, an evaluation may be made if certain predefined condition such as execution date and time for processing Smart Trigger task is equal to or greater than the current date and time has been met. If the scheduled conditions are met then the Smart Trigger table may be ready for processing in step 503. If the scheduled conditions have not been met then step 502 will loop on itself. In step 503, the processing of the Smart Trigger table may be initiated by reading the first row of the Smart Trigger table. In step 504, an evaluation may be made if certain predefined condition such as scheduled date field obtained by reading the data from the first row in the Smart Trigger table is equal to or less than the current date has been met. If the predefined date condition has been met then program control is passed on to step 506. If the predefined date condition has not been met then program control is passed on to step 505. In step 505, the current row index for the Smart Trigger is incremented by one. After reading the data for the new row, program control is passed on to step 504. In step 506, if the data contained in a row of the Smart Trigger table met the predefined date conditions then the associated processing task may be executed. As one embodiment, the processing task may extend the expiration date of the FSO issued credit card by one year for the current FSO record. In step 507, the scheduled date field in the Smart Trigger table may be reset to indicate that the processing task for the current row of the Smart Trigger table may have been completed. In step 508, an evaluation may be made if there are any additional rows of the Smart Trigger table. If there are additional rows to be processed then program control may be transferred to step 509. If there are no additional rows to be processed then program control may be transferred to the END step. In step 509, the next row for the Smart Trigger table may be accessed and program control may be transferred to step 504 in FIG. C-5.

FIG. C-6 is a data flow diagram illustrating sequential processing of a FSO data set in prior art, according to one embodiment. A data set may consist of one or more data records. A data set record pointer 600, which may vary from P1 through PN, may be used as a pointer to the physical storage location of the data set record. The data in the data set record may be stored in data column #1 610 through data column #N 620. For each data set record, one or more evaluations may have to be made for every processing task T1 through TN 630. The data set processing may be initiated by reading data set pointer P1. Data set record 610 and 620 associated with P1 may be evaluated to determine if processing task T1, T2, T3 and others through TN need to be executed. In one embodiment, 650 may store the current processing task and 660 may store the next processing task. Once all processing tasks T1 through TN associated with the first data set pointer P1 have been completed then the same process can be repeated for data set pointer P2. The data set sequential processing may continue by reading data set pointer P3 through PN and evaluating and executing processing tasks T1 through TN for each data set pointer.

FIG. C-7 is a data flow diagram illustrating selective task processing of a FSO data set using Smart Trigger, according to one embodiment. A data set may consist of one or more data records. A data set record pointer 700, which may vary from P1 through PN, may be used as a pointer to the physical storage location of the data set record (not shown). A selective task processing method using Smart Trigger may build a list of associated data set pointers for a specific processing task T1 710. In one embodiment, data set records with data set record P2, P5 and PN have been specifically identified to execute processing task T1. Similar lists may be built for processing tasks T2 through TN. Data contained in the data records may be accessed by tasks T1 through TN using associated data set pointers 700.

FIG. C-8 is a block diagram illustrating a scheduled task processing entries in a Smart Trigger table, according to one embodiment. The user of the FSO computer system may schedule a task to be executed at a user-defined period to process the Smart Trigger table. An evaluation may be made if certain predefined condition such as execution date and time for processing Smart Trigger task is equal to or greater than the current date and time has been met. If the scheduled conditions are met then the Smart Trigger table may be ready for processing by reading the smart trigger table 810. If the scheduled date included in the smart trigger table record meets the trigger conditions 850 then the associated task may be processed 870. The associated processing task 870 may use specified data set 860 to generate results 880. On completion of the processing of the associated task 840, the scheduled date may be updated in the smart trigger table 830 to indicate its completion.

Section Four

FIG. D-1—A Block Diagram Illustrating a Prior Art Financial Service Organization Business Transaction Processing System In FIG. D-1, an embodiment of a prior art financial service organization business transaction processing system 100 may include a computer system 110, an operating system 150, a user display screen 130 connected to the computer system via a link 140, and a database 170 residing on data storage 120. Computer system 110 includes memory 160 configured to store computer programs for execution on system 100, and a central processing unit (not shown) configured to execute instructions of computer programs residing on system 100. Application program 180 may be stored in memory 160. Database access requests generated by the Application program 180 are processed by the FSO database 170. If requested FSO data is available within the FSO database 170 then it retrieves the requested FSO data from the data storage 120. If requested FSO data is not available within the FSO database 170 then it may send an error message to the Application program 180. The user working at a display screen 130 may need to change the Application program 180 source code to eliminate the FSO database 170 error.

FIG. D-2—A Block Diagram Illustrating One Embodiment of a Financial Service Organization Business Transaction Processing System Utilizing a Dynamic Database Packageset Switching Method In FIG. D-2, an embodiment of a financial service organization business transaction processing system 200, utilizing a dynamic database packageset switching method, may include a computer system 210, an operating system 260, a user display screen 230 connected to the computer system via a link 240, a computing environment monitoring software 250 connected to a dynamic database packageset switching software 290, and a database 280 residing on data storage 220. Computer system 210 includes memory 270 configured to store computer programs for execution on system 200, and a central processing unit (not shown) configured to execute instructions of computer programs residing on system 200. Application program 295 is used to interface to and process financial services organization business transactions requested by a user working at a user display screen 230. Application program 295 may be stored in memory 260.

A user working at display screen 230 may execute a transaction associated with Application program 295. The transaction may need data from FSO database 280. FSO database 280 access requests from the Application program 295 are processed by the dynamic database packageset switching module 290. The dynamic database packageset switching module 290 dynamically selects the packageset name associated with the application program. The packageset specified memory location of the requested FSO data and forwards that information to the FSO database 280. The requested FSO data within the FSO database 280 is then retrieved from the data storage 220.

FIG. D-3—A Prior Art Database Domain Architecture of a Financial Service Organization Business Transaction Processing System FIG. D-3 illustrates a prior art database domain architecture of a financial service organization business transaction processing system with the database domain consisting of a single database sub-system 300, a single database environment 310 within the database sub-system 300 and one or more databases 320 within the single database environment 310. Prior art database design and set up restrictions normally limit the financial service organization business transaction processing system to use the single environment within the same DB2 sub-system.

FIG. D-4—A Multi-Environment, Multi-Database Domain Architecture of One Embodiment of a Financial Service Organization Business Transaction Processing System FIG. D-4 illustrates a multi-environment, multi-database domain architecture of one embodiment of a financial service organization business transaction processing system with a single database sub-system, one or more database environments within the single database sub-system and one or more databases within one of the database environments. The Dynamic Database Packageset Switching Design is Capable of processing, at run time, an FSO database access request from the Application Program which would be independent of the current database environment and database name.

FIG. D-5—A Flowchart Illustrating the Prior Art for Processing a Business Transaction Which Involves a Change in Database Environment According to One Embodiment;

FIG. D-5 is a flowchart illustrating the prior art for processing an FSO business transaction. If the Application Program associated with the business transaction requests data not available in the current database environment or in the current database name then the Application Program source code must be modified. Modifying an application program source code to accommodate a change in database environment or an addition of a new database, according to one embodiment, is time consuming and expensive. In one embodiment, steps 500 and 505 may be performed in a business transaction processing program in the FSO system. The user of the FSO computer may START the prior art FSO processing method by initiating a business transaction. In step 500, the user initiated business transaction may communicate with an application program. In step 501, in response to the user requested business transaction, the application program may generate one or more requests for data from FSO computer database. In step 502, a determination may be made if the requested data is obtainable within the definition of the current environment. If the requested may be obtained in the current environment then program control is passed to step 503. If the requested may not be obtained in the current environment then program control is passed to step 505. In step 505, the user of the FSO computer system may need to change the application program source code, in an off-line mode, to modify the environment registry values used in FSO database definition. In step 503, a determination may be made if the requested data is obtainable within the current database name. If the requested may be obtained in the current database name then program control may be passed to step 510 in FIG. D-5a. In step 504, the user of the FSO computer system may need to change the application program source code, in an off-line mode, to modify the database registry values used in FSO database definition.

FIG. D-5a—A Continuation of Flowchart Illustrated in FIG. D-5

FIG. D-5a is a continuation of flowchart illustrated in FIG. D-5. In step 510, in one embodiment, the request for data may be passed on to a database manager in the FSO computer system to physically locate the requested data. In step 520, in one embodiment, the requested data is retrieved and passed on to the originating application program.

FIG. D-6—A Flowchart Illustrating the Runtime Version of a Dynamic Database Packageset Switching Method According to One Embodiment FIG. D-6 is a flowchart illustrating the runtime version of the dynamic database packageset switching method for performing database access during the processing an FSO business transaction. If the Application program associated with the business transaction requests data which may not be available in the current database environment or in the current database name then the dynamic database packageset switching software dynamically changes the environment or the database name without requiring a source code change to access the requested data. In one embodiment, steps 600 and 603 may be performed in a business transaction processing program in the FSO system. The user of the FSO computer may START the dynamic database packageset switching method for performing database access during the processing an FSO business transaction by initiating a business transaction. In step 600, the user requested business transaction may initiate an application program. In step 601, in response to the user requested business transaction, the application program may generate one or more requests for data from the FSO computer database. In step 602, the dynamic database packageset switching method for performing database access obtains the requested data from the FSO database without changing the application program source code. Further detail of step 602 is shown in FIG. D-7b. In step 603, the dynamic database packageset switching method returns the requested data to the application program.

FIG. D-7a—A Flowchart Illustrating One Embodiment of the Configuration and Runtime Use of Dynamic Database Packageset Switching Method FIG. D-7a is a flowchart illustrating the configuration and runtime version of the dynamic database packageset switching method for performing database access during the processing an FSO business transaction. In one embodiment, steps 700 through 720 may be performed in a business transaction processing program in the FSO system. The user of the FSO computer may START the configuration of the dynamic database packageset switching method by defining values in a dynamic database packageset switching table. In one embodiment, the dynamic database packageset switching table may consist of data values stored in one or more rows and two columns. Column number one may comprise a database identifier and column number two may comprise a user defined key. The user defined key structure may be defined by selecting one or more data dictionary elements arranged in a specific sequence. The database identifier in column number one may comprise a pointer to the FSO computer database location associated with the value of the user defined key in column number two. The dynamic database packageset switching table configuration method is further detailed in FIGS. 11 through 16. In step 710, the dynamic database packageset switching software may be compiled, generated and downloaded. In step 720, the user may execute the dynamic database packageset switching software.

FIG. D-7*b*—A Continuation of Flowchart in FIG. D-7*a*

FIG. D-7*b* is the continuation of flowchart in FIG. D-7*a*. In step 722, the dynamic database switching software receives a request for data stored in the FSO database from the application program. In step 723, the dynamic database switching software program may build a key in real-time, consistent with the user defined key structure defined in step 700. The key may then be used to access the dynamic database switching table to find a database identifier with a matching entry in the user defined key value. In step 724, the dynamic database switching software program may use the database identifier to request data from FSO database. On receiving the requested data from the FSO database, program control may transfer to step 725. The dynamic database switching software program may send the requested data to the application program in step 725. This completes the data request/response cycle for the application program, using the dynamic database switching software program. In step 726, the dynamic database switching software program may constantly monitor if the FSO computer is on-line. If it is on-line, program control transfers to step 722.

FIG. D-8—A Data Flow Diagram Illustrating Dynamic Database Packageset Switching for an Associated Application Program Database Request According to One Embodiment FIG. D-8 is a data flow diagram illustrating dynamic database packageset switching for an associated application program database request, according to one embodiment. In step 800, a user requests an FSO business transaction. In step 810, an application program associated with the business transaction processes the user request and generates a request for FSO data, which may be required to complete the business transaction, to the dynamic database packageset switching software. In step 820, the input processing portion of the dynamic database packageset switching software may gather additional transaction related information regarding the application program request for FSO data. In one embodiment, this may include the application program name, program variable, location of user and similar other. In step 840, the dynamic database packageset switching software may dynamically create a key to access the dynamic database packageset switching table. In steps 850 and 860, the dynamic database packageset switching software may find a matching user defined key with an associated database identifier. In step 870, the dynamic database packageset switching software may use the database identifier to point to the physical data storage location in the FSO database. In steps 880 and 830, the requested data from FSO database may be returned to the dynamic database packageset switching software which may be passed on to the application program in step 830. The application program may then display requested data to user to complete the user business transaction.

FIG. D-9—A Data Flow Diagram Illustrating a Legacy Method for an Application Program Database Request According to One Embodiment FIG. D-9 is a data flow diagram illustrating a legacy method for an application program database request, according to one embodiment. In step 900, a user requests an FSO business transaction. In step 910, an application program associated with the business transaction may process the user request and may generate a request for FSO data, which may be required to complete the business transaction. In step 920, the application to specific database interface program may convert the data request to a format understood by the FSO database. In one embodiment, this may include converting the application program data read request written in COBOL to an IBM DB2 database format. In step 930, the requested data from FSO database may be returned to the application to specific database interface program which may be pass on the data to the application program. The application program may then display requested data to user to complete the user business transaction.

FIG. D-10—One Embodiment of a Method for Selecting Data Dictionary Data Elements as Key Elements Available for Inclusion in Key Definitions FIG. D-10 illustrates one embodiment of a method for a user of an FSO system to select data dictionary data elements as key elements available for inclusion in key definitions in an FSO system. In this illustration, by way of example, the letters A through Z are used to represent the data elements in the universe of data elements in the data dictionary. In one embodiment, the database may include a table including references to all data elements in the data dictionary that are useable in keys. In another embodiment, each data element in the data dictionary may have a useable in keys parameter associated with it. In one embodiment, the useable in keys parameter may be a binary parameter, and may be set to either allow the data element to be used in key definitions or to exclude the data element from use in key definitions. In one embodiment, a particular data element in the data dictionary may be selected, and information about the selected data element including the useable in keys parameter may be presented on a computer display screen. In one embodiment, a list 122 of all data elements in the data dictionary may be presented on a computer display screen 120 to a user of the FSO system. In one embodiment, a current state 124 of the useable in keys parameter may be displayed with each data element. The state of the useable in keys parameter may be displayed in any form suitable to represent a binary parameter. Examples of forms of displaying states of binary parameters include, but are not limited to: textual binary displays such as YES/NO, YIN, TRUE/FALSE, T/F, I/O and ON/OFF, and; graphic binary displays, such as check boxes and radio buttons. In this example, YES/NO is used, with YES representing a useable in keys parameter set to allow the data element to be used in key definitions, and NO representing a useable in keys parameter set to exclude the data element from use in key definitions. A user may change the state of a useable in keys parameter for a data element by changing the displayed state of the useable in keys parameter. In one embodiment, the user may select the useable in keys parameter using a cursor control device and enter the textual representation of the desired state of the useable in keys parameter using an input device. In one embodiment, the user may select data dictionary data elements as key elements available for inclusion in key definitions to monitor the FSO computing environment.

FIG. D-11—One Embodiment of a Method for Selecting Key Elements to be Available for Inclusion in a Particular Key Definition from a List of Key Elements Available for Inclusion in all Key Definitions FIG. D-11 illustrates one embodiment of a method for a user of an FSO system to select a group of key elements available for inclusion as key elements in a particular key definition in the FSO system. In this illustration, by way of example, the letters A through Z are used to represent the data elements in the universe of data elements in the data dictionary. In one embodiment, a list 132 of all key elements available for inclusion in key definitions may be presented on a computer display screen 130 to a user of the FSO system. In this example, list 132 includes key elements N through Z. Each key element in list 132 may have a useable in key parameter 134 associated with it. In one embodiment, a current state 134 of the useable in key parameter may be displayed with each key element. The state of the useable in key parameter may be displayed in any form suitable to represent a binary parameter. In this example, YES/NO is used, with YES representing a useable in key parameter set to allow the key element to be used in this key definition, and NO representing a useable in key parameter set to exclude the data element from use in this key definition. A user may change the state of a useable in key parameter for a key element by changing the displayed state of the useable in key parameter. In one embodiment, the user may select the useable in key parameter using a cursor control device and enter the textual representation of the desired state of the useable in key parameter using an input device.

FIG. D-12—One Embodiment of a Method for Selecting Key Elements for Inclusion in a Key Definition from a List of Key Elements Available for Inclusion in the Key Definition FIG. D-12 illustrates one embodiment of a method for a user of an FSO system to select key elements for inclusion in a key definition from a list of available key elements for the key definition in the FSO system. In this illustration, by way of example, the letters A through Z are used to represent the data elements in the universe of data elements in the data dictionary. In one embodiment, a list 142 of all key elements available for inclusion in a particular key definition may be presented on a computer display screen 140 to a user of the FSO system. In this example, list 142 includes key elements V through Z. Computer display screen 140 may also display a "use in this key" parameter 144 and a key element sequence parameter 146 for each key element displayed. The state of the "use in this key" parameter 144 may be displayed in any form suitable to represent a binary parameter. In this example, YES/NO is used, with YES representing a key element selected to be used as a key element in this key definition, and NO representing a key element not selected to be used as a key element in this key definition. A user may change the state of the "use in this key" parameter for a key element by changing the displayed state of the "use in this key" parameter. In one embodiment, the user may select the "use in this key" parameter using a cursor control device and enter the textual representation of the desired state of the "use in this key" parameter using an input device. In this example, the "use in this key" parameter for key elements W, X and Z are set to YES to indicate that W, X and Z are to be used as key elements in the key definition. The key element sequence parameter may be used to specify the order in which the key elements will appear in the key definition. In this example, key element X is set to appear as the first key element, key element W is set to appear as the second key element, and key element Z is set to appear as the third key element.

FIG. D-13—One Embodiment of a Key Definition with Examples of Parameters that May be Included in the Key Element Definitions FIG. D-13 illustrates an embodiment of a key definition that may have been defined by a user of an FSO system, with key elements displayed on a key definition screen 150. Each key element may include several parameters that define the key element. In one embodiment, the key elements may be displayed as rows on computer display screen 150, with the columns displaying key element parameters. This example shows key elements X, W, and Z. Key element column 152 displays the key element name. Key element sequence column 154 displays the order in which the key elements may appear in the key definition. In this example, key element X is the first key element, key element W is the second key element, and key element Z is the third key element. Element name column 156 may display a data element name. In this example, key element X is Company ID, key element W is the Credit Card Type, and key element Z is ON US/NOT ON US. Field length column 158 may display a length in units for the key element. In one embodiment, the units are 8-*bit* bytes. In this example, key element X is 2 bytes long, key element W is 3 bytes long, and key element Z is one byte long. Data type column 160 may display a data type for the key element. In this example, key element X is of data type numeric, and key elements W and Z are of data type character.

FIG. D-14—One Embodiment of a Dynamic Database Packageset Switching Table for the Key Definition of FIG. D-13 with Examples of Key Values and Processing Parameters FIG. D-14 illustrates an embodiment of a dynamic database packageset switching table 170 from a database used in an FSO system, with rows including user defined key values 174 and database identifiers 178 associated with the key values. The dynamic database packageset switching table may be used to store user defined key values and the database identifier values associated with the key values. The user defined key values and the database identifier may be entered by a user of the FSO system. In one embodiment, the dynamic database packageset switching table may include pre-defined key values and the database identifier, and the user of the FSO system may add key values and the database identifier to the dynamic database packageset switching table. In one embodiment, the user defined keys may be configured to monitor the FSO computing environment.

The dynamic database packageset switching table may be searched for a particular user defined key value to find the database identifier associated with the key value. In this example, the dynamic database packageset switching table 170 may be used to point to database locations 179 for different key values. The ability for a user of the FSO system to conFigure D-key definitions and dynamic database packageset switching tables at configuration time allows the FSO application programs to look up database location for data in a particular transaction based upon attributes of the transaction. For example, an FSO may add a new city branch 175 to process business transactions for Location 14. The user may include one or more attributes (data elements) of the transaction as key elements in the key definition and define a database pointer 179. In this example, the FSO may be able to add new locations, such as adding Location 14, and process business transactions by merely configuring the dynamic database packageset switching table 170 and without changing any application program source code.

In one embodiment, each row 172 in table 170 holds one key value and its associated database identifier value. In one embodiment, each key value is unique among the key values in the dynamic database packageset switching table. Each key definition is associated with one database identifier value in the dynamic database packageset switching table. A key value may be constructed from the key element values stored in the one or more key elements defined in the key definition for this dynamic database packageset switching table. In this example, the key values are constructed from key elements X (175), W (176), and Z (177), as defined in key description 150 illustrated in FIG. D-14. In FIG. D-15, row 1's key value is (12, VIS, Y). The database identifier value corresponding to the key value of (12, VIS, Y) is NN1234567890123456. Searching the dynamic database packageset switching table 170 for the key value of (12, VIS, Y) will return the database identifier value of NN1234567890123456.

FIG. D-15 . One Embodiment of a Dynamic Database Packageset Switching Table in an FSO System FIG. D-15 illustrates one embodiment of the dynamic database packageset switching table 210 in an FSO system database. Dynamic database packageset switching table 210 may include cells 216 for storing user-defined key values 217 in one column 212 and cells 218 for storing user-defined database identifier values 218 in a second column 214. One row in each table may include one cell 216 for storing a user-defined key value 217 and one cell 218 for storing the user-defined database identifier value 219 associated with the key value. In this example, in Dynamic database packageset switching table, user defined key values (1, 2, . . . , n) correlate to database identifiers (1, 2, . . . n).

In one embodiment, cells 216 for storing key values 217 may be of a pre-configured fixed size that is identical for all dynamic database packageset switching tables 210. In this embodiment, the fixed size of cells 216 may be pre-configured large enough to store key values 217 of the maximum size anticipated by the user of the system. In one embodiment, if the pre-configured size of cells 216 is not large enough, the dynamic database packageset switching tables may be re-configured with a larger fixed size for cells 216.

Section Five

FIG. E-1—A Block Diagram Illustrating a Prior Art Financial Service Organization Business Transaction Processing System In FIG. E-1, an embodiment of a prior art financial service organization business transaction processing system 100 may include a computer system 110, an operating system 150, a user display screen 130 connected to the computer system via a link 140, and a database 170 residing on data storage 120. Computer system 110 includes memory 160 configured to store computer programs for execution on system 100, and a central processing unit (not shown) configured to execute instructions of computer programs residing on system 100. Application program 180 may be stored in memory 160. Database access requests generated by the Application program 180 are processed by the FSO database 170. If requested FSO data is available within the FSO database 170 then it retrieves the requested FSO data from the data storage 120. If requested FSO data is not available within the FSO database 170 then it may send an error message to the Application program 180. The user working at a display screen 130 may need to change the Application program 180 source code to eliminate the FSO database 170 error.

FIG. E-2—A Block Diagram Illustrating One Embodiment of a Financial Service Organization Business Transaction Processing System Utilizing a Dynamic Database Packageset Switching Method In FIG. E-2, an embodiment of a financial service organization business transaction processing system 200, utilizing a dynamic database packageset switching method, may include a computer system 210, an operating system 260, a user display screen 230 connected to the computer system via a link 240, a computing environment monitoring software 250 connected to a dynamic database packageset switching software 290, and a database 280 residing on data storage 220. Computer system 210 includes memory 270 configured to store computer programs for execution on system 200, and a central processing unit (not shown) configured to execute instructions of computer programs residing on system 200. Application program 295 is used to interface to and process financial services organization business transactions requested by a user working at a user display screen 230. Application program 295 may be stored in memory 260.

A user working at display screen 230 may execute a transaction associated with Application program 295. The transaction may need data from FSO database 280. FSO database 280 access requests from the Application program 295 are processed by the dynamic database packageset switching module 290. The dynamic database packageset switching module 290 dynamically selects the packageset name associated with the application program. The packageset specified memory location of the requested FSO data and forwards that information to the FSO database 280. The requested FSO data within the FSO database 280 is then retrieved from the data storage 220.

FIG. E-3—A Prior Art Database Domain Architecture of a Financial Service Organization Business Transaction Processing System FIG. E-3 illustrates a prior art database domain architecture of a financial service organization business transaction processing system with the database domain consisting of a single database sub-system 300, a single database environment 310 within the database sub-system 300 and one or more databases 320 within the single database environment 310. Prior art database design and set up restrictions normally limit the financial service organization business transaction processing system to use the single environment within the same DB2 sub-system.

FIG. E-4—A Multi-Environment, Multi-Database Domain Architecture of One Embodiment of a Financial Service Organization Business Transaction Processing System FIG. E-4 illustrates a multi-environment, multi-database domain architecture of one embodiment of a financial service organization business transaction processing system with a single database sub-system, one or more database environments within the single database sub-system and one or more databases within one of the database environments. The dynamic database packageset switching method and system is capable of processing, at run time, an FSO database access request from the Application Program which would be independent of the current database environment and database name.

FIG. E-5—A Flowchart Illustrating the Prior Art for Processing a Business Transaction Which Involves a Change in Database Environment According to One Embodiment;

FIG. E-5 is a flowchart illustrating the prior art for processing an FSO business transaction. If the Application Program associated with the business transaction requests data not available in the current database environment or in the current database name then the Application Program source code must be modified. Modifying an application program source code to accommodate a change in database environment or an addition of a new database, according to one embodiment, is time consuming and expensive. In one embodiment, steps 500 through 505 may be performed in a business transaction processing program in the FSO system. The user of the FSO computer may START the prior art FSO processing method by initiating a business transaction. In step 500, the user initiated, or another FSO computer initiated in another embodiment, business transaction may communicate with an application program. In step 501, in response to the user requested business transaction, the application program may generate one or more requests for data from FSO computer database. In step 502, a determination may be made if the requested data is obtainable within the definition of the current environment. If the requested data may be obtained in the current environment then program control is passed to step 503. If the requested data may not be obtained in the current environment then program control is passed to step 505. In step 505, the user of the FSO computer system may need to change the application program source code, in an off-line mode, to modify the environment registry values used in FSO database definition. In step 503, a determination may be made if the requested data is obtainable within the current database name. If the requested data may be obtained in the current database name then program control may be passed to step 510 in FIG. E-5a. In step 504, the user of the FSO computer system may need to change the application program source code, in an off-line mode, to modify the database registry values used in FSO database definition.

FIG. E-5a—A Continuation of Flowchart Illustrated in FIG. E-5

FIG. E-5a is a continuation of flowchart illustrated in FIG. E-5. In step 510, in one embodiment, the request for data may be passed on to a database manager in the FSO computer system to locate the requested data. In step 520, in one embodiment, the requested data is retrieved and passed on to the originating application program.

FIG. E-6—A Flowchart Illustrating the Runtime Version of a Dynamic Database Packageset Switching Method According to One Embodiment FIG. E-6 is a flowchart illustrating the runtime version of the dynamic database packageset switching method for performing database access during the processing an FSO business transaction. If the Application program associated with the business transaction requests data which may not be available in the current database environment or in the current database name then the dynamic database packageset switching software dynamically changes the environment or the database name without requiring a source code change to access the requested data. In one embodiment, steps 600 and 603 may be performed in a business transaction processing program in the FSO system. The user of the FSO computer may START the dynamic database packageset switching method for performing database access during the processing an FSO business transaction by initiating a business transaction. In step 600, the user requested business transaction may initiate an application program. In step 601, in response to the user requested business transaction, the application program may generate one or more requests for data from the FSO computer database. In step 602, the dynamic database packageset switching method for performing database access may obtain the requested data from the FSO database without changing the application program source code. Further detail of step 602 is shown in FIG. E-7b. In step 603, the dynamic database packageset switching method may return the requested data to the application program.

FIG. E-7a—A Flowchart Illustrating One Embodiment of the Configuration and Runtime Use of Dynamic Database Packageset Switching Method FIG. E-7a is a flowchart illustrating the configuration and runtime version of the dynamic database packageset switching method for performing database access during the processing an FSO business transaction. In one embodiment, steps 700 through 720 may be performed in a business transaction processing program in the FSO system. The user of the FSO computer may START the configuration of the dynamic database packageset switching method by defining values in a dynamic database packageset switching table. In one embodiment, the dynamic database packageset switching table may consist of data values stored in one or more rows and two columns. Column number one may comprise a database identifier and column number two may comprise a user defined key. The user defined key structure may be defined by selecting one or more data dictionary elements arranged in a specific sequence. The database identifier in column number one may comprise a pointer to the FSO computer database location associated with the value of the user defined key in column number two. The dynamic database packageset switching table configuration method is further detailed in FIGS. 11 through 16. In step 710, the dynamic database packageset switching software may be compiled, generated and downloaded. In step 720, the user may execute the dynamic database packageset switching software.

FIG. E-7b—A Continuation of Flowchart in FIG. E-7a

FIG. E-7b is the continuation of flowchart in FIG. E-7a. In step 722, the dynamic database switching software receives a request for data stored in the FSO database from the application program. In step 723, the dynamic database switching software program may build a key in real-time, consistent with the user defined key structure defined in step 700. The key may then be used to access the dynamic database switching table to find a database identifier with a matching entry in the user defined key value. In step 724, the dynamic database switching software program may use the database identifier to request data from FSO database. On receiving the requested data from the FSO database, program control may transfer to step 725. The dynamic database switching software program may send the requested data to the application program in step 725. This completes the data request/response cycle for the application program, using the dynamic database switching software program. In step 726, the dynamic database switching software program may constantly monitor if the FSO computer is on-line. If it is on-line, program control transfers to step 722.

FIG. E-8—A Data Flow Diagram Illustrating Dynamic Database Packageset Switching for an Associated Application Program Database Request According to One Embodiment FIG. E-8 is a data flow diagram illustrating dynamic database packageset switching for an associated application program database request, according to one embodiment. In step 800, a user requests an FSO business transaction. In step 810, an application program associated with the business transaction processes the user request and generates a request for FSO data, which may be required to complete the business transaction, to the dynamic database packageset switching software. In step 820, the input processing portion of the dynamic database packageset switching software may gather additional transaction related information regarding the application program request for FSO data. In one embodiment, this may include the application program name, program variable, location of user and similar other. In step 840, the dynamic database packageset switching software may dynamically create a key to access the dynamic database packageset switching table. In steps 850 and 860, the dynamic database packageset switching software may find a matching user defined key with an associated database identifier. In step 870, the dynamic database packageset switching software may use the database identifier to point to the physical data storage location in the FSO database. In steps 880 and 830, the requested data from FSO database may be returned to the dynamic database packageset switching software which may be passed on to the application program in step 830. The application program may then display requested data to user to complete the user business transaction.

FIG. E-9—A Data Flow Diagram Illustrating a Legacy Method for an Application Program Database Request According to One Embodiment FIG. E-9 is a data flow diagram illustrating a legacy method for an application program database request, according to one embodiment. In step 900, a user requests an FSO business transaction. In step 910, an application program associated with the business transaction may process the user request and may generate a request for FSO data, which may be required to complete the business transaction. In step 920, the application to specific database interface program may convert the data request to a format understood by the FSO database. In one embodiment, this may include converting the application program data read request written in COBOL to an IBM DB2 database format. In step 930, the requested data from FSO database may be returned to the application to specific database interface program which may be pass on the data to the application program. The application program may then display requested data to user to complete the user business transaction.

FIG. E-10—One Embodiment of a Method for Selecting Data Dictionary Data Elements as Key Elements Available for Inclusion in Key Definitions FIG. E-10 illustrates one embodiment of a method for a user of an FSO system to select data dictionary data elements as key elements available for inclusion in key definitions in an FSO system. In this illustration, by way of example, the letters A through Z are used to represent the data elements in the universe of data elements in the data dictionary. In one embodiment, the database may include a table including references to all data elements in the data dictionary that are useable in keys. In another embodiment, each data element in the data dictionary may have a useable in keys parameter associated with it. In one embodiment, the useable in keys parameter may be a binary parameter, and may be set to either allow the data element to be used in key definitions or to exclude the data element from use in key definitions. In one embodiment, a particular data element in the data dictionary may be selected, and information about the selected data element including the useable in keys parameter may be presented on a computer display screen. In one embodiment, a list 122 of all data elements in the data dictionary may be presented on a computer display screen 120 to a user of the FSO system. In one embodiment, a current state 124 of the useable in keys parameter may be displayed with each data element. The state of the useable in keys parameter may be displayed in any form suitable to represent a binary parameter. Examples of forms of displaying states of binary parameters include, but are not limited to: textual binary displays such as YES/NO, Y/N, TRUE/FALSE, T/F, I/O and ON/OFF, and; graphic binary displays, such as check boxes and radio buttons. In this example, YES/NO is used, with YES representing a useable in keys parameter set to allow the data element to be used in key definitions, and NO representing a useable in keys parameter set to exclude the data element from use in key definitions. A user may change the state of a useable in keys parameter for a data element by changing the displayed state of the useable in keys parameter. In one embodiment, the user may select the useable in keys parameter using a cursor control device and enter the textual representation of the desired state of the useable in keys parameter using an input device. In one embodiment, the user may select data dictionary data elements as key elements available for inclusion in key definitions to monitor the FSO computing environment.

FIG. E-11—One Embodiment of a Method for Selecting Key Elements to be Available for Inclusion in a Particular Key Definition from a List of Key Elements Available for Inclusion in all Key Definitions FIG. E-11 illustrates one embodiment of a method for a user of an FSO system to select a group of key elements available for inclusion as key elements in a particular key definition in the FSO system. In this illustration, by way of example, the letters A through Z are used to represent the data elements in the universe of data elements in the data dictionary. In one embodiment, a list 132 of all key elements available for inclusion in key definitions may be presented on a computer display screen 130 to a user of the FSO system. In this example, list 132 includes key elements N through Z. Each key element in list 132 may have a useable in key parameter 134 associated with it. In one embodiment, a current state 134 of the useable in key parameter may be displayed with each key element. The state of the useable in key parameter may be displayed in any form suitable to represent a binary parameter. In this example, YES/NO is used, with YES representing a useable in key parameter set to allow the key element to be used in this key definition, and NO representing a useable in key parameter set to exclude the data element from use in this key definition. A user may change the state of a useable in key parameter for a key element by changing the displayed state of the useable in key parameter. In one embodiment, the user may select the useable in key parameter using a cursor control device and enter the textual representation of the desired state of the useable in key parameter using an input device.

FIG. E-12—One Embodiment of a Method for Selecting Key Elements for Inclusion in a Key Definition from a List of Key Elements Available for Inclusion in the Key Definition FIG. E-12 illustrates one embodiment of a method for a user of an FSO system to select key elements for inclusion in a key definition from a list of available key elements for the key definition in the FSO system. In this illustration, by way of example, the letters A through Z are used to represent the data elements in the universe of data elements in the data dictionary. In one embodiment, a list 142 of all key elements available for inclusion in a particular key definition may be presented on a computer display screen 140 to a user of the FSO system. In this example, list 142 includes key elements V through Z. Computer display screen 140 may also display a "use in this key" parameter 144 and a key element sequence parameter 146 for each key element displayed. The state of the "use in this key" parameter 144 may be displayed in any form suitable to represent a binary parameter. In this example, YES/NO is used, with YES representing a key element selected to be used as a key element in this key definition, and NO representing a key element not selected to be used as a key element in this key definition. A user may change the state of the "use in this key" parameter for a key element by changing the displayed state of the "use in this key" parameter. In one embodiment, the user may select the "use in this key" parameter using a cursor control device and enter the textual representation of the desired state of the "use in this key" parameter using an input device. In this example, the "use in this key" parameter for key elements W, X and Z are set to YES to indicate that W, X and Z are to be used as key elements in the key definition. The key element sequence parameter may be used to specify the order in which the key elements will appear in the key definition. In this example, key element X is set to appear as the first key element, key element W is set to appear as the second key element, and key element Z is set to appear as the third key element.

FIG. E-13—One Embodiment of a Key Definition with Examples of Parameters that May be Included in the Key Element Definitions FIG. E-13 illustrates an embodiment of a key definition that may have been defined by a user of an FSO system, with key elements displayed on a key definition screen 150. Each key element may include several parameters that define the key element. In one embodiment, the key elements may be displayed as rows on computer display screen 150, with the columns displaying key element parameters. This example shows key elements X, W, and Z. Key element column 152 displays the key element name. Key element sequence column 154 displays the order in which the key elements may appear in the key definition. In this example, key element X is the first key element, key element W is the second key element, and key element Z is the third key element. Element name column 156 may display a data element name. In this example, key element X is Company ID, key element W is the Credit Card Type, and key element Z is ON US/NOT ON US. Field length column 158 may display a length in units for the key element. In one embodiment, the units are 8-*bit* bytes. In this example, key element X is 2 bytes long, key element W is 3 bytes long, and key element Z is one byte long. Data type column 160 may display a data type for the key element. In this example, key element X is of data type numeric, and key elements W and Z are of data type character.

FIG. E-14—One Embodiment of a Dynamic Database Packageset Switching Table for the Key Definition of FIG. E-13 with Examples of Key Values and Processing Parameters FIG. E-14 illustrates an embodiment of a dynamic database packageset switching table 170 from a database used in an FSO system, with rows including user defined key values 174 and database identifiers 178 associated with the key values. The dynamic database packageset switching table may be used to store user defined key values and the database identifier values associated with the key values. The user defined key values and the database identifier may be entered by a user of the FSO system. In one embodiment, the dynamic database packageset switching table may include pre-defined key values and the database identifier, and the user of the FSO system may add key values and the database identifier to the dynamic database packageset switching table. In one embodiment, the user defined keys may be configured to monitor the FSO computing environment.

The dynamic database packageset switching table may be searched for a particular user defined key value to find the database identifier associated with the key value. In this example, the dynamic database packageset switching table 170 may be used to point to database locations 179 for different key values. The ability for a user of the FSO system to conFigure E-key definitions and dynamic database packageset switching tables at configuration time allows the FSO application programs to look up database location for data in a particular transaction based upon attributes of the transaction. For example, an FSO may add a new city branch 175 to process business transactions for Location 14. The user may include one or more attributes (data elements) of the transaction as key elements in the key definition and define a database pointer 179. In this example, the FSO may be able to add new locations, such as adding Location 14, and process business transactions by merely configuring the dynamic database packageset switching table 170 and without changing any application program source code.

In one embodiment, each row 172 in table 170 holds one key value and its associated database identifier value. In one embodiment, each key value is unique among the key values in the dynamic database packageset switching table. Each key definition is associated with one database identifier value in the dynamic database packageset switching table. A key value may be constructed from the key element values stored in the one or more key elements defined in the key definition for this dynamic database packageset switching table. In this example, the key values are constructed from key elements X (175), W (176), and Z (177), as defined in key description 150 illustrated in FIG. E-14. In FIG. E-15, row 1's key value is (12, VIS, Y). The database identifier value corresponding to the key value of (12, VIS, Y) is NN1234567890123456. Searching the dynamic database packageset switching table 170 for the key value of (12, VIS, Y) will return the database identifier value of NN1234567890123456.

FIG. E-15—One Embodiment of a Dynamic Database Packageset Switching Table in an FSO system FIG. E-15 illustrates one embodiment of the dynamic database packageset switching table 210 in an FSO system database. Dynamic database packageset switching table 210 may include cells 216 for storing user-defined key values 217 in one column 212 and cells 218 for storing user-defined database identifier values 218 in a second column 214. One row in each table may include one cell 216 for storing a user-defined key value 217 and one cell 218 for storing the user-defined database identifier value 219 associated with the key value. In this example, in Dynamic database packageset switching table, user defined key values (1, 2, . . . , n) correlate to database identifiers (1, 2, . . . n).

In one embodiment, cells 216 for storing key values 217 may be of a pre-configured fixed size that is identical for all dynamic database packageset switching tables 210. In this embodiment, the fixed size of cells 216 may be pre-configured large enough to store key values 217 of the maximum size anticipated by the user of the system. In one embodiment, if the pre-configured size of cells 216 is not large enough, the dynamic database packageset switching tables may be re-configured with a larger fixed size for cells 216.

Section Six

FIG. F-1*a*—A Block Diagram Illustrating One Embodiment of an FSO Computer System For Processing FSO Business Data Using Pre-Configured Key Definitions, Key Values, and Processing Values In FIG. F-1*a*, an embodiment of an FSO business transaction processing system 10 may include a computer system 20, a display screen 40 connected to the computer system, and one or more databases 52 residing on external storage. Computer system 20 includes memory 30 configured to store computer programs for execution on computer system 20, and a central processing unit (not shown) configured to execute instructions of computer programs residing on computer system 20. Business transaction processing program 50 may be stored in memory 20. System 10 may also include one or more input devices 42 such as a keyboard for entering data and commands into program 50 and one or more cursor control devices 44 such as a mouse.

FIG. F-1*b*—One Embodiment of an FSO Computer System Integrated into a Networked System for Processing FSO Business Data FIG. F-1*b* illustrates one embodiment of a networked system configured for processing FSO business data. Network 60 may be a local area network or wide area network, and may include communications links including, but not limited to, Ethernet, token ring, Internet, satellite and modem. An FSO computer system 10 as illustrated in FIG. F-1*a* may be connected to network 60. One or more user workstations 80 may be connected to network 60 and may be used by users of the FSO computer system to enter and modify data, initiate data processing tasks, and monitor the processing of data in the FSO computer system. One or more printers 90 for outputting hardcopy reports on FSO system data may also be connected to network 60. One or more other FSO computer systems 70 may also be connected to network 60. In one embodiment, one or more computer systems 75 of client businesses of the FSO may also be connected to network 60. Client businesses of the FSO may forward business transactions to the FSO computer system for processing.

FIG. F-2—One Embodiment of a System for Processing FSO Business Data Using Hardcoded Key Definitions and Key Construction FIG. F-2 illustrates one embodiment of a system for processing FSO business data using hardcoded key definitions and key construction. The system using hardcoded key definitions may include a transaction processing program 300 and a PCD program 306. The system may also include a PCD table 320 and a database 310. Database 310 may include customer account master files.

Transaction processing program 300 may receive a business product transaction 302 for processing. Transaction processing program 300 may require a PCD value from PCD table C 320 for processing business product transaction 302. Transaction processing program 300 may include program instructions 308 for building a processing key value for locating a PCD value in PCD table C 320. Program instructions 308 may include one or more program instructions that specify a PCD key definition 314 for PCD value C. The program instructions may include instructions for locating one or more data elements in business product transaction 302 and database 310. In this example, the program instructions have embedded references to data elements x and y. Data element x is located in business product transaction 302, and data element y is located in database 310. The values stored in the located data elements may be copied into one or more key elements in processing key value 316. Processing key value 316 may be stored in program memory in transaction processing program 300.

After the processing key value 316 is constructed in program instructions 308, transaction processing program may send a request 304 to PCD program 306. Request 304 may include information on which PCD table is to be searched. Request 304 may also include a processing key value to be searched for. In this example, request 304 includes information specifying that PCD table C 320 is to be searched, and includes processing key value 316. PCD program 306 receives request 304 and locates the requested PCD table 320. PCD program 306 may include program instructions 318 that are configured to search PCD table 320 for a key value. The search of PCD table 320 may include comparing processing key value 316 with a first key value in PCD table C 320. If processing key value 316 does not match the key value, the search may continue with the next key value in PCD table C 320. The search may continue until a key value in PCD table C 320 is found that matches processing key value 316, or until all of the key values in PCD table C 320 have been compared to processing key value 316 without finding a match.

If a matching key value for processing key value 316 is found, the PCD value 326 corresponding to the matching key value is returned to transaction processing program 300. In this example, processing key value 316 is the value [1, 2]. Searching PCD table C 320 finds key value [1, 2] in the first row of the table. The PCD value stored with key value [1, 2] is 5.0. The PCD value 5.0 is returned to transaction processing program 300 in PCD value 326.

If a matching key value for processing key value 316 is not found, PCD program 306 may notify transaction processing program 300 that a match for processing key value 316 was not found. Program instructions 308 may include one or more program instructions for creating an alternate processing key value (not shown) for PCD value C. The alternate processing key value may include alternate values for one or more of the key elements. The alternate processing key value may be sent to PCD program 306 in a new request 304, and the searching of PCD table C 320 as described above may be repeated with the alternate processing key value.

FIG. F-3*a*—One Embodiment of a System for Processing FSO Business Data Using User-Defined Key Definitions, Search Masks, Key Values and PCD Values, Illustrating an Unsuccessful First Search of a PCD Table for a Match to a Processing Key Value FIGS. 3*a* and 3*b* are block diagrams illustrating one embodiment of a system for processing FSO business data, and illustrates one embodiment of searching a PCD table for a match to a processing key value, where the key definitions, search masks, key values, and PCD values are all entered by a user of the system. In one embodiment, the user may identify the key definitions during the configuration of the FSO computer system. In one embodiment, an expert system may be programmed to identify the key definitions.

Referring to FIG. F-3*a*, the system may include a transaction processing program 500, a key building program 506, and a PCD program 512. The system may also include a database 518, a PCD key definition table 508, a search mask table 522, and a PCD table C 526. In one embodiment, database 518 may include customer account master files. In one embodiment, PCD key definition table 508, search mask table 522, and PCD table C 526 may reside in a database 520.

Transaction processing program 500 may receive a business product transaction 502 for processing. Transaction processing program 500 may require a PCD value from PCD table C 526 for processing business product transaction 502. Transaction processing program may send a request 504 to key building program 506. Request 504 may include information identifying the PCD table that transaction processing program 500 requires a PCD value from. In this example, transaction processing program is requesting a PCD value from PCD table C.

Key building program 506 may include program instructions 514 for building a key value. Program instructions 514 may receive the PCD table name from request 504. In this example, the PCD table name is PCD table C. Program instructions 514 may search PCD key definition table 508 for a PCD key definition for PCD table C. PCD key definition 510 may be read from PCD key definition table 508 in response to finding the entry in the table for PCD table C. In this example, key definition 510 for PCD table C includes data elements x and y. Data element x is located in business product transaction 502, and data element y is located in database 518.

Program instructions 514 may access search mask table 522 for PCD table C in database 520. In one embodiment of a search mask table, the search masks in the search mask table may be arranged in an order from first to last, wherein the search masks are read in order from first to last by a key building program until a match for a processing key value is located. After locating search mask table 522, program instructions 514 may read a first search mask 524 from search mask table 522. In one embodiment of search mask tables, each row of the search mask includes one search mask, and each search mask includes one field for each key element in the key definition associated with the search mask table. In one embodiment, wildcard mask field values and equal mask field values may be entered as mask values in search mask fields. In one embodiment, an equal mask field value in a search mask field may specify that, when constructing or preparing a processing key value from the data element values in a customer account data set during processing of the customer account data set, the key element value in the processing key value corresponding to the mask field will be set to the data element value from the customer account data set. In one embodiment, a wildcard mask field value in a mask field may specify that, when constructing a processing key value from the data element values in a customer account data set during processing of the customer account data set, the key element value in the processing key value corresponding to the mask field will be set to the low collating value for the data type of the key element. For example, key elements of numeric data type may use zero (0) as a low collating value, and character fields may use spaces, or blank characters, as low collating values. Other key element types may have low collating values specific to the type. In the embodiment illustrated in FIG. F-3a, an equal mask field value is represented by an equal sign ("="), and a wildcard mask field value is represented by an asterisk ("*"). In this example, search mask 524 includes one search mask field for each data element in key definition 510, where the search mask fields for data elements x and y are set to equal mask field values.

Program instructions 514 may use key definition 510 and search mask 524 to build a first key value 528 from data element values read from database 518 and transaction 502. Program instructions 514 may use the data elements in key definition 510 to read the data element values from the data elements. In this example, the value read from data element x in transaction 502 is 1, and the value read from data element y in database 518 is 8. Program instructions 514 may use search mask 524 to copy the data elements into processing key value 528. In this example, both search mask values in search mask 524 are equal search mask values, so the data element values may be copied directly into the key elements of processing key value 528. Processing key value 528 may be passed to PCD program 512. Information indicating which PCD table to search may also be passed to PCD program 512.

PCD program 512 may include program instructions 516 configured for searching PCD tables and matching processing key values to PCD key values. In this example, the is PCD table name is PCD table C. In one embodiment, program instructions 512 may search PCD key definition table 508 for a PCD key definition for PCD table C. PCD key definition 510 may be read from PCD key definition table 508 in response to finding the entry in the table for PCD table C. In this example, key definition 510 for PCD table C includes data elements x and y. Data elements may include information on the format of data element values, such as the data type and length of the data. In one embodiment, program instructions 516 may use the data format information of the data elements in a key definition during the comparison of a processing key values to one or more PCD table key values. In another embodiment, program instructions 516 may compare a processing key value directly to a PCD table key value without using the formatting information from data elements in a key definition.

In one embodiment, program instructions 516 may use information received from key building program 506 to locate PCD table C 526 in database 520. Program instructions 516 may include instructions for searching the key value fields of a PCD table for a key value that matches a processing key value. In one embodiment, two key values match if they include the same key elements in the same order, and if the key element values in the first key value are the same as the key element values in the second key value for all of the key elements in the key element values. In the example shown in FIG. F-3a, processing key value 528 includes the key element values [1, 8]. Program instructions 516 may compare processing key value 528 to each of the key values in PCD table C 526. In this example, PCD table C 526 does not include a key value that matches processing key value 528. PCD program 512 may notify key building program 506 that no matching key value was found in PCD table C 526.

FIG. F-3b—One embodiment of a system for processing FSO business data using user-defined key definitions, search masks, key values and PCD values, illustrating a successful second search of a PCD table for a match to a processing key value FIGS. 3a and 3b are block diagrams illustrating one embodiment of a system for processing FSO business data, and illustrates one embodiment of searching a PCD table for a match to a processing key value, where the key definitions, search masks, key values, and PCD values are all entered by a user of the system. Referring to FIG. F-3b, the system may include a transaction processing program 500, a key building program 506, and a PCD program 512. The system may also include a database 518, a PCD key definition table 508, a search mask table 522, and a PCD table C 526. In one embodiment, database 518 may include customer account master files. In one embodiment, PCD key definition table 508, search mask table 522, and PCD table C 526 may reside in a database 520.

FIG. F-3b illustrates one embodiment of building a second processing key value and searching for a match to the second processing key value after no matching key value is found for a first processing key value in a PCD table. In FIG. F-3a, PCD program 512 may notify key building program 506 that no match was found for processing key value 528 in PCD table C 526. Referring to FIG. F-3b, key building program 506 may include program instructions 514 for building a key value. Program instructions 514 may use key definition 510 and a second search mask 530 read from search mask table 522 to build a second key value 532 from data element values read from database 518 and transaction 502. Program instructions 514 may use the data elements in key definition 510 to read the data element values from the data elements. In this example, the value read from data element x in transaction 502 is 1. Program instructions 514 may use search mask 530 to copy the data elements into processing key value 532. In this example, the first search mask field value in search mask 530 is an equal search mask value, and therefore the data element value for data element x may be copied into the first key element of processing key value 532. The second search mask field value in this example is a wildcard search mask value, and therefore the wildcard value for the data type of data element y may be copied into the second key element of processing key value 532. After processing key value 532 is built by program instructions 514, processing key value 532 may be passed to PCD program 512. Information indicating which PCD table to search may also be passed to PCD program 512.

PCD program 512 may include program instructions 516 configured for searching PCD tables and matching processing key values to PCD key values. In this example, the PCD table name is PCD table C. In one embodiment, program instructions 516 may use information received from key building program 506 to locate PCD table C 526 in database 520. Program instructions 516 may include instructions for searching the key value fields of a PCD table for a key value that matches a processing key value. In the example shown in FIG. F-3b, processing key value 532 includes the key element values [1,*], where "*" represents the wildcard, or low collating, value for the data element y in key definition 510. Program instructions 516 may compare processing key value 532 to each of the key values in PCD table C 526. In this example, the search of PCD table C 526 finds a matching key value [1, *] in a row of the PCD table. Program instructions 516 may read PCD value 534 from the row of the PCD table where the matching key value was found. PCD program 512 may then send PCD value 534 to transaction processing program 500.

Key building program 506 and PCD program 512 may continue to search PCD table C 526 for a match to a processing key value constructed from transaction and database data element values and wildcard values until a match is found or until all the search masks in search mask table 522 have been used without finding a matching PCD key value. In the example shown in FIG. F-3b, a row in search mask table 522 has wildcard values for all of the data elements in key definition 510. There is also a row in PCD table C 526 where all of the key element values are set to wildcard values. Therefore, in this example, a match, and therefore a corresponding PCD value, will be found for all transactions. In other examples where one or both of the tables do not include a row with all wildcard values, a matching key value for a processing key value may not be found in a PCD table, and therefore no PCD value is found for the original request issued by transaction processing program 500. In one embodiment, transaction processing program 500 may be notified when a PCD value is not found by key building program 506 and PCD program 512.

FIG. F-4—One Embodiment of a Key Definition with Examples of Fields that May be Included in the Key Definition FIG. F-4 illustrates an embodiment of a key definition that may have been defined by a user of an FSO system, with key elements displayed on a key definition screen 150. Each key element may include several parameters that define the key element. In one embodiment, the key elements may be displayed as rows on computer display screen 150, with the columns displaying key element parameters. This example shows key elements X, W, and Z. Key element column 152 displays the key element name. Key element sequence column 154 displays the order in which the key elements will appear in the key definition. In this example, key element X is the first key element, key element W is the second key element, and key element Z is the third key element. Element Name column 156 may display a data element name. In this example, key element X is Company ID, key element W is the Credit Card Type, and key element Z is ON US/NOT ON US. Field Length column 158 may display a length in units for the key element. In one embodiment, the units are 8-bit bytes. In this example, key element X is 2 bytes long, key element W is 3 bytes long, and key element Z is one byte long. Data type column 160 may display a data type for the key element. In this example, key element X is of type numeric, and key elements W and Z are of type character.

FIG. F-5—One Embodiment of a PCD Table for the Key Definition of FIG. F-4 with Examples of Key Values and Processing Parameter Values FIG. F-5 illustrates an embodiment of a PCD table 170 from a database used in an FSO system, with rows including key values 174 and processing parameter values 178 associated with the key values. A PCD table may be used to store key values and the processing, or PCD, values associated with the key values. The key values and processing parameter values may be entered by a user of the FSO system. In one embodiment, a PCD table may include pre-defined key values and processing parameter values, and the user of the FSO system may add key values and processing parameter values to the PCD table.

A PCD table may be searched for a particular key value to find the processing parameter value associated with the key value. In this example, PCD table 170 may be used to access credit card merchant transaction charges 179 for different key values. In the credit card business, an Acquirer is an FSO that manages credit card accounts, processes credit card transactions, and collects credit card payments as an agent of one or more organizations, or companies. The FSO may charge a merchant transaction charge for each credit card transaction processed. The ability for a user of the FSO system to configure F-key definitions and PCD tables at configuration time allows the FSO to define merchant transaction charges for a particular transaction based upon attributes of the transaction. For example, a bank may manage the Visa and Discovery credit card transactions for Store 12 and Store 14. The user may include one or more attributes (data elements) of the transaction as key elements in the key definition, and may define one or more permutations of key values and associated merchant transaction prices for the permutations in the merchant transaction pricing PCD table. In this example, the bank may define different transaction prices for processing MasterCard transactions for Store 12 than it charges for processing MasterCard transactions for Store 14.

In one embodiment, each row 172 in table 170 holds one key value and its associated processing parameter value. In one embodiment, each key value is unique among the key values in the PCD table. Each key definition is associated with one PCD table. A key value may be constructed from the key element values stored in the one or more key elements defined in the key definition for this PCD table. In this example, the key values are constructed from key elements X (175), W (176), and Z (177), as defined in key description 150 illustrated in FIG. F-4. In FIG. F-5, row 1's key value is (12, VIS, Y). The processing parameter value corresponding to the key value of (12, VIS, Y) is 10. Searching PCD table 170 for the key value of (12, VIS, Y) will return the transaction charge of 10.

In one embodiment of PCD tables, wildcard values may also be entered as key element values in a PCD table. In FIG. F-5, key elements with wildcard values are represented by asterisks ("*"). In one embodiment of PCD tables, low collating values for the data type of the key element may be used as wildcard key element values. For example, key elements of numeric data type may use zero (0) as a low collating value, and character fields may use spaces, or blank characters. Other key element types may have low collating values specific to the type. Any or all of the key element values in a row of a PCD table may be set to a wildcard value. In FIG. F-5, row 3 has key elements W and Z set to wildcard values, row 4 has key element W set to a wildcard value, and row 7 has all of its key elements (X, W, and Z) set to wildcard values. In one embodiment, to specify a wildcard value for a key element value, the user may enter a wildcard display value (for example, "*") in the PCD table entry display screen, and the FSO system may then substitute the low collating value for the data type of the key element set to the wildcard display value when storing the key value in the PCD table.

FIG. F-6—One Embodiment of a Search Mask Table with Examples of Search Masks that May be Applied to the PCD Table of FIG. F-5

In one embodiment of an FSO system using PCD tables to store key values and associated processing parameter values, each PCD table and corresponding key definition may have an associated search mask table. A user of the FSO system may enter the search masks in the search mask table. A search mask table may include one or more rows for storing search masks entered by the user, with each row including one column, or mask field, for each of the key elements in the key definition. In the example illustrated in FIG. F-6, search mask table 180 may be defined for key definition 150 illustrated in FIG. F-4 and PCD table 170 illustrated in FIG. F-5. Thus, search mask table 180 may include mask fields corresponding to key elements X, W, and Z in key definition 150. The user of the FSO system may enter a mask field value for each mask field in each search mask in a search mask table.

In one embodiment of a search mask table, mask field values may include an equal mask field values and a wildcard mask field value. In one embodiment, an equal mask field value may be entered by the user and displayed on the search mask entry display screen as an equal sign ("="), as illustrated in FIG. F-6. In one embodiment, a wildcard mask field value may be entered by the user and displayed on the search mask entry display screen as an asterisk ("*"), as illustrated in FIG. F-6. In one embodiment, an equal mask field value in a mask field may specify that, when constructing a processing key value from the data element values in a customer account data set during processing of the customer account data set, the key element value in the processing key value corresponding to the mask field will be set to the data element value from the customer account data set. In one embodiment, a wildcard mask field value in a mask field may specify that, when constructing a processing key value from the data element values in a customer account data set during processing of the customer account data set, the key element value in the processing key value corresponding to the mask field will be set to the low collating value for the data type of the key element.

One embodiment of a PCD table search process in an FSO system may use the search masks in a search mask table to construct processing key values from a customer account data set. In one embodiment, the search process may start at the first search mask in the search mask table, build a processing key value from the customer account data set using the first search mask, and search the PCD table for a key value that matches the processing key value. If a matching key value is found, the search process may return the processing parameter value for the key value to a program that requested the processing parameter value for the customer account data set. If a matching key value is not found, the search process go to the second search mask in the search mask table, build a processing key value from the customer account data set using the second search mask, and search the PCD table for a key value that matches the processing key value. The search process may iterate through the search masks in the search mask table until a matching key value is found or until there are no more search masks. When no matching key value is found and all search masks have been used, a message may be returned to the requesting program that no processing parameter value exists for the customer account data set.

Search mask table 180 illustrated in FIG. F-6 includes four search masks 183 that may be used with key definition 150 illustrated in FIG. F-4 to construct a processing key value from a customer account data set during a search of PCD table 170 illustrated in FIG. F-5. In FIG. F-6, the search masks are in a search order 184 from search mask 1 to search mask 4. In search mask 1, mask fields X, W, and Z are all assigned equal mask field values, represented by an equal sign ("="). Search mask 2 has mask fields X and Z assigned equal mask field values, and mask field W assigned a wildcard mask field value represented by an asterisk ("*"). Search mask 3 has mask field X assigned an equal mask field value and mask fields W and Z assigned wildcard mask field values. Finally, in search mask 4, mask fields X, W and Z are all assigned wildcard mask field values.

Search mask table 180 illustrated in FIG. F-6 includes a search mask where all of the mask fields are set to the equal mask field value, and also includes a search mask where all of the mask fields are set to the wildcard mask field value. In one embodiment, search mask tables may not be required to include search masks where all mask fields are set to equal mask field values. In one embodiment, search mask tables may not be required to include search masks where all mask fields are set to wildcard mask field values.

FIG. F-7—One Embodiment of a Structure for a Database Table for Storing Key Definitions FIG. F-7 illustrates one embodiment of a database table that may be used to store key definitions defined by a user in an FSO system. Key definition table 200 may include PCD table identifiers 202 and user-defined key definitions 204. In one embodiment of an FSO system using user-defined key definitions, there is one key definition table 200 in an FSO system database. In one embodiment of an FSO system using user-defined key definitions, there is one row in key definition table 200 for each PCD table in the FSO system database, with each row including one PCD table identifier 202 that references the PCD table and one key definition 204 that defines the key format for the PCD table.

In an FSO system, key definition table 200 may be used during configuration of the FSO system to store key definitions 204 defined by a user of the system. Key definition table 200 may also be used during configuration to present a display screen to the user of the FSO system for defining key values and their associated processing parameter values in a PCD table. Key definition table 200 may also be used during configuration to format the key values defined by the user as the key values are stored in the key value fields of the PCD table. Key definition table 200 may also be used during configuration to present a display screen to the user for defining search masks for key definitions, and to format the search masks defined by the user as they are stored in a search mask table.

In an FSO system, the user-defined key definitions 204 in key definition table 200 may be used during the processing of FSO business data, including the processing of customer account data sets. A computer program running on the FSO system may request a processing parameter value from a PCD table during the processing of a customer account data set. In response to the request, the user-defined key definition 204 for the PCD table may be read from key definition table 200 and used with a user-defined search mask for the key definition to construct a processing key value from the customer account data set. The processing key value may be used to search the PCD table for the PCD key value that matches the processing key constructed from the customer account data set. If a matching PCD key value is found, the processing parameter value for the matching PCD key value is returned to the calling program.

FIG. F-8—One Embodiment of a Database Structure for Referencing Search Masks FIG. F-8 illustrates one embodiment of a database structure that may be used to store and reference search masks defined by a user in an FSO system. A table 205 may include PCD table identifiers 206 and references to search mask tables 208. In one embodiment of an FSO system using user-defined key definitions and search masks, there is one table 205 in an FSO system database. In one embodiment of an FSO system using user-defined key definitions and search masks, there is one row in table 205 for each PCD table in the FSO system database, with each row including one PCD table identifier 206 that references the PCD table and one reference to a search mask table 204. In another embodiment of table 205, all of the search mask tables may be merged into table 205, with one row in table 205 for each search mask for each PCD table.

In an FSO system, the search mask tables 208 in table 205 may be used during the processing of FSO business data, including the processing of customer account data sets. A computer program running on the FSO system may request a processing parameter value from a PCD table during the processing of a customer account data set. In response to the request, the user-defined key definition for the PCD table may be read from a key definition table. A first user-defined search mask may be read from search mask table 208 for the PCD table and may be used with the key definition to construct a first processing key value from the customer account data set. The first processing key value may be used to search the PCD table for a PCD key value that matches the first processing key value constructed from the customer account data set. If a matching PCD key value is found, the processing parameter value for the matching PCD key value is returned to the calling program. If a matching PCD key value is not found, a second user-defined search mask may be read from search mask table 208 and used with the key definition to construct a second processing key value. The second processing key value may be used to search the PCD table for a PCD key value that matches the second processing key value. The process of reading a next search mask, building a processing key, and searching the PCD table may continue until a matching PCD key value is found or until all search masks have been used and no matching PCD key value is found.

FIG. F-9—One Embodiment of a Structure for a User-Defined PCD Table with Key Values and Data Values FIG. F-9 illustrates one embodiment of a PCD table for storing key values and associated PCD data values defined by a user of the FSO system using a process as illustrated in FIG. F-5. Referring to FIG. F-9, PCD table 210 may include cells 216 for storing user-defined key values 217 in one column 212 and cells 218 for storing user-defined PCD data values 218 in a second column 216. One row in the table may include one cell 216 for storing a user-defined key value 217 and one cell 218 for storing the user-defined PCD data value 219 associated with the key value. In this example, user-defined key values (1, 2, ..., n) correlate to user-defined processing parameter values (1, 2, ..., n). A user-defined key value 217 may include one or more key value fields. A user-defined PCD data value 219 may include one or more processing parameter values.

FIG. F-10—One Embodiment of Several PCD Tables in an FSO System

FIG. F-10 illustrates one embodiment of a plurality of PCD tables 210 in an FSO system database. PCD tables 210 may include cells 216 for storing user-defined key values 217 in one column 212 and cells 218 for storing user-defined PCD data values 218 in a second column 216. One row in each table may include one cell 216 for storing a user-defined key value 217 and one cell 218 for storing the user-defined PCD data value 219 associated with the key value. In this example, in PCD table 1, key values (1, 2, n) correlate to processing parameters (1, 2, ..., n). A user-defined key value 217 may include one or more key value fields. A user-defined PCD data value 219 may include one or more processing parameter values.

In one embodiment, cells 216 for storing key values 217 may be of a pre-configured fixed size that is identical for all PCD tables 210. In this embodiment, the fixed size of cells 216 may be pre-configured large enough to store key values 217 of the maximum size anticipated by the user of the system. In one embodiment, if the pre-configured size of cells 216 is not large enough, the PCD tables may be re-configured with a larger fixed size for cells 216.

PCD tables (1, 2, ..., x) as illustrated in FIG. F-10 may be used in an embodiment of a production FSO system to store user-defined processing parameter values and their associated user-defined key values. A program running on the FSO system may require a particular processing parameter value to process a customer account data set. The FSO system may determine which PCD table contains the processing parameter value, use the key definition and search mask table for the PCD table to construct a processing key value, and use the processing key value to search the PCD table key values for a matching key value. The matching key value is stored with the particular processing parameter value best suited for processing of the customer account data set.

FIG. F-11—Examples of Inputs to and Results from One Embodiment of a Search Process that May be Applied to PCD Tables as Depicted in FIG. F-5 Using Search Mask Tables Such as the Search Mask Table Depicted in FIG. F-6

FIG. F-11 illustrates several examples of processing key value inputs to, and processing parameter outputs from, one embodiment of a PCD table search process as applied to PCD table 170 illustrated in FIG. F-5, using key definition 150 illustrated in FIG. F-4 and search mask table 180 illustrated in FIG. F-6 to construct the processing key values. A PCD table search process may be initiated in response to a request for a processing parameter for use in processing a customer account data set in an FSO system.

In search 1, the PCD table search process uses key definition 150 and the first search mask in search mask table 180 to construct processing key values for a first customer account data set. In the first search mask, all mask values are set to the equal mask field value. A first processing key value is constructed using the first search mask. Key element X is set to the value 12 read from the customer account data set, key element W is set to the value DIS read from the customer account data set, and key element Z is set to the value Y read from the customer account data set. PCD table 170 is searched for the key value (12, DIS, Y). The key value for the second row in PCD table 170 matches the first processing key value. The search is completed when the match is found, and the corresponding processing parameter, 8, is returned to the requesting process in the FSO system.

In search 2, the PCD table search process uses key definition 150 and the first search mask in search mask table 180 to construct processing key values for a second customer account data set. A first processing key value is constructed using the first search mask. Key element X is set to the value 12 read from the customer account data set, key element W is set to the value MSC read from the customer account data set, and key element Z is set to the value Y read from the customer account data set. PCD table 170 is searched for the key value (12, MSC, Y). No exact match for the key value is found in PCD table 170. A second processing key value is constructed using the second search mask. Key element X is set to the value 12 read from the customer account data set, key element W is set to the wildcard key element value, and key element Z is set to the value Y read from the customer account data set. PCD table 170 is searched for the key value (12, *, Y). The key value for the fourth row in PCD table 170 matches the second processing key value. The search is completed when the match is found, and the corresponding processing parameter, 13, is returned to the requesting process in the FSO system.

In search 3, the PCD table search process uses key definition 150 and the first search mask in search mask table 180 to construct processing key values for a third customer account data set. A first processing key value is constructed using the first search mask. Key element X is set to the value 12 read from the customer account data set, key element W is set to the value MSC read from the customer account data set, and key element Z is set to the value N read from the customer account data set. PCD table 170 is searched for the key value (12, MSC, N). No exact match for the key value is found in PCD table 170. A second processing key value is constructed using the second search mask. Key element X is set to the value 12 read from the customer account data set, key element W is set to the wildcard key element value, and key element Z is set to the value N read from the customer account data set. PCD table 170 is searched for the key value (12, *, N). Again, no exact match for the key value is found in PCD table 170. A third processing key value is constructed using the third search mask. Key element X is set to the value 12 read from the customer account data set, key element W is set to the wildcard key element value, and key element Z is set to the wildcard key element value. PCD table 170 is searched for the key value (12, *, *). The key value for the third row in PCD table 170 matches the third processing key value. The search is completed when the match is found, and the corresponding processing parameter, 12, is returned to the requesting process in the FSO system.

In search 4, the PCD table search process uses key definition 150 and the first search mask in search mask table 180 to construct processing key values for a fourth customer account data set. A first processing key value is constructed using the first search mask. Key element X is set to the value 14 read from the customer account data set, key element W is set to the value MSC read from the customer account data set, and key element Z is set to the value N read from the customer account data set. PCD table 170 is searched for the key value (14, MSC, N). No exact match for the key value is found in PCD table 170. A second processing key value is constructed using the second search mask. Key element X is set to the value 14 read from the customer account data set, key element W is set to the wildcard key element value, and key element Z is set to the value N read from the customer account data set. PCD table 170 is searched for the key value (14, *, N). Again, no exact match for the key value is found in PCD table 170. A third processing key value is constructed using the third search mask. Key element X is set to the value 14 read from the customer account data set, key element W is set to the wildcard key element value, and key element Z is set to the wildcard key element value. PCD table 170 is searched for the key value (14, *, *). Again, no exact match for the key value is found in PCD table 170. A fourth processing key value is constructed using the fourth search mask. Key element X is set to the wildcard key element value, key element W is set to the wildcard key element value, and key element Z is set to the wildcard key element value. PCD table 170 is searched for the key value (*, *, *). The key value for the seventh row in PCD table 170 is set to all wildcard values, and thus matches the fourth processing key value. The search is completed when the match is found, and the corresponding processing parameter, 14, is returned to the requesting process in the FSO system.

FIG. F-12a—A Flow Diagram Illustrating One Embodiment of a Process for Processing Business Data in an FSO Computer System Using User-Configured Key Definitions, Search Masks, Key Values and Processing Values FIG. F-12a is a flowchart illustrating one embodiment of a process using user-configured key definitions, search masks, key values and processing values to perform processing on business data in an FSO computer system. In one embodiment, steps 400 and 402 may be performed in a business transaction processing program in the FSO system. In step 400, a computer program in the FSO computer system may receive an FSO business transaction for processing. The transaction may be related to an account of a customer of the FSO. For example, the transaction may be a record of a credit card purchase made by a customer of the FSO at a client business of the FSO; the credit card used in the purchase may have been issued by the FSO. In step 402, the computer program may require one or more processing parameter values, or PCD values, to perform processing on the transaction. For example, the computer program may require a merchant transaction price for a credit card transaction originating at a client business of the FSO. In one embodiment, one or more PCD values may be stored in a PCD table. For example, the FSO system may include a merchant transaction price PCD table. The merchant transaction price PCD table may include multiple rows. Each row may include one merchant transaction price value and a key value useable to identify and locate the merchant transaction price value. In one embodiment, each key value in a PCD table is unique. One row in the table may include one PCD value, or a set of related PCD values, and a key value used to locate the PCD value. The computer program may generate a request for the required PCD value. In one embodiment, the request may be forwarded to a key building program in the FSO computer system.

In one embodiment, steps 404 and 406 in FIG. F-12a may be performed by a key building program. In step 404, a key definition for the key values in the PCD table for the requested PCD value may be read by the key building program. In one embodiment, the key definition may be read from a key definition table in the FSO system. In step 406, the key building program may locate the search mask table for the key definition.

FIG. F-12b—A Continuation of the Flow Diagram of FIG. F-12a

FIG. F-12b is a continuation of the flowchart begun in FIG. F-12a, and illustrates one embodiment of a process that uses user-configured key definitions, search masks, key values and processing values to perform processing on business data in an FSO computer system. In one embodiment, steps 410, 416, 418 and 420 in FIG. F-12b may be performed by the key building program that performed steps 404 and 406 in FIG. F-12a. In one embodiment, steps 412, 414, and 422 may be performed by a PCD program configured to locate PCD tables and search PCD tables for matching key values.

Referring to FIG. F-12b, a processing key value may be constructed using the key definition read in step 404 of FIG. F-12a and a first search mask from the search mask table read in step 406 of FIG. F-12a. Referring to step 410 of FIG. F-12b, the key definition may include one or more data elements, where each data element includes information describing the location, type and format of data element values. Data element values may be located in the data set for the transaction being processed, or in database files associated with the transaction in one or more databases in the FSO system. The search mask read from the search mask table may include one search mask field for each of the data elements in the key definition. Each search mask field in the search mask may be set to a search mask field value. In one embodiment, search mask field values may include wildcard mask field values and equal mask field values. In one embodiment, an equal mask field value in a search mask field may specify that, when constructing a processing key value from data element values in the transaction data set and related databases, the key element value in the processing key value corresponding to the mask field may be set to the data element value. In one embodiment, a wildcard mask field value in a mask field may specify that the key element value in the processing key value corresponding to the mask field may be set to the low collating value for the data type of the corresponding data element in the key definition.

Continuing with step 410, each data element in the key definition may have a corresponding field in the search mask and in the processing key value. Each data element may also include information for locating and formatting a data element value in the transaction data or other database in the FSO system. Starting with a first data element from the key definition, the corresponding search mask field may be examined. If the search mask field value is an equal search mask field value, the data element value may be read from the location in the transaction data or other database in the FSO system and written to the corresponding processing key element value. If the search mask field value is a wildcard search mask field value, the low collating value for the data element may be written to the corresponding processing key element value. This process may be repeated for each key element in the key definition. When all processing key value fields have been assigned values, the processing key value is complete. In one embodiment, the processing key value is then passed to a PCD program.

In step 412, the PCD table may be searched for an occurrence of the processing key value constructed in step 410. In one embodiment, the PCD table may include one row for each combination of key value and PCD value. In one embodiment, each key value in the PCD table is unique among the key values in the PCD table. The key values in the PCD table may include one key element for each data element in the key definition associated with the PCD table. Each key element in the key value is set to a key element value. The format of the key value and key elements may be the same as the processing key value constructed in step 410. In step 412, each key value in the PCD table may be compared to the processing key value. Comparing the processing key value to a key value may include comparing each processing key element value to each corresponding key field value. In one embodiment, one or more key element values in the key value may be set to low collating values for the data element type for the key element. Key values may be compared to the processing key value until a key value that matches the processing key value is found, or until all of the key values have been compared without finding a match.

In step 414, if no matching key value was found for the processing key value in the PCD table, the search process may continue with step 416. In step 416, the search mask table is examined to see if there is another search mask. If there is another search mask, the process may go to the next search mask table row in step 418 and repeats steps 410-414. If there are no more rows in the search mask table, the business transaction processing program that requested the PCD value in step 402 of FIG. F-12a may be notified that no PCD value has been found for the transaction.

If a matching key value is found for the processing key value in the PCD table in the processing loop described by steps 410-418, the processing loop may exit from step 414 to step 422. In step 422, the PCD value associated with the matched key value from the PCD table may be returned to the business transaction processing program that requested the PCD value for the transaction in step 402.

FIG. F-13—A Flow Diagram Illustrating One Embodiment of a Process for Building a Processing Key Value from Data Element Values Using a Search Mask FIG. F-13 is a flow diagram illustrating one embodiment of a process for building a processing key value from data element values using a search mask. FIG. F-13 is a detailed flow diagram expanding on step 410 from FIG. F-12b. Referring to FIG. F-13, a first data element may be read from the key definition in step 500. In step 502, a search mask field value may be read from the search mask field corresponding to the data element in the key definition. In step 502, the search mask field value may be examined. If the search mask field value is an equal search mask field value, the processing key element value corresponding to the current data element may be set to a data element value in step 504. The data element value may be read from transaction data or a database in the FSO system using location and formatting information from the data element. If the search mask field value is a wildcard search mask field value, the processing key element value corresponding to the current data element may be set to a low collating value for the data type of the data element in step 506. After the search mask field value has been set, step 508 may check to see if there are more data elements in the data definition. If there are more data elements in the data definition, processing may return to step 500.

Section Seven

FIG. G-1—A Block Diagram Illustrating One Embodiment of a Computer System for Configuring Key Definitions In FIG. G-1, an embodiment of a key configuration system 10 may include a computer system 20, a display screen 40 connected to the computer system, and one or more databases 52 residing on external storage. Computer system 20 includes memory 30 configured to store computer programs for execution on computer system 20, and a central processing unit (not shown) configured to execute instructions of computer programs residing on computer system 20. Key configuration program 50 may be stored in memory 20. System 10 may also include one or more input devices 42 such as a keyboard for entering data and commands into program 50 and one or more cursor control devices 44 such as a mouse.

FIG. G-2—A Flowchart Illustrating One Embodiment of a Method for User Configuration or Reconfiguration of Key Definitions, PCD Tables, and Search Mask Tables in an FSO System FIG. G-2 illustrates an embodiment of a method that may be followed by a user of an FSO system for configuration of the key definitions, Process Control Data (PCD) tables, and search mask tables for use in the dynamic location of processing parameters during processing of customer account data sets in the FSO system. PCD tables may also be referred to as processing parameter tables. In step 400, the user may define the dictionary of data elements to be used in the FSO system database. In step 402, the user may select from the dictionary of data elements a subset of data elements that are available for use in key definitions. In one embodiment, some data elements may be pre-defined in the data dictionary, and a portion of the data elements in the data dictionary may be pre-selected to be available for use in key definitions.

Steps 404 through 420 are an iterative process that may be repeated for each PCD table to be configured by the user. These steps may also be followed to reconFigure G-a PCD table to reflect changing transaction-processing requirements. In step 404, the user may select a first processing parameter to configure, and may select from the data dictionary a subset of data elements to be key elements from which the key elements in the key definition will be selected. In step 406, the user may select the key elements to be used in the key definition from the key elements selected in step 404. In step 408, the user may specify the sequence the selected key elements will appear in the key definition.

Steps 410 through 414 are an iterative process that may be repeated for each row to be added to the PCD table by the user. In step 410, the user may first add a new row to the PCD table, and may define the key value for the row. In step 412, the user may define the processing parameters value(s) for the row. In step 414, if there are more rows to be added to the PCD table, the user returns to step 410. If there are no more rows to be added, the user may proceed to step 416.

In step 416, the user may define one or more search masks for the key values in the PCD table. In one embodiment, the search masks may be arranged by the user in a sequence in which the masks will be used in building or constructing processing key values for searching the PCD table for a best matching key value. In step 418, the user may have completed the configuration of this PCD table, key definition, and search mask table, and the tables and key definition may be stored in the database. In step 420, if there are more PCD tables to be configured, the user may return to step 404 to conFigure G—the next PCD table. If the user has configured all of the PCD tables to be configured, the process ends.

FIGS. 3 through 13 illustrate the steps in the process illustrated in FIG. G-2 in more detail, and include examples of embodiments of structures and tables that may be configured using the process.

FIG. G-3—One Embodiment of a Data Dictionary with the Data Elements in the Data Dictionary Divided into Subsets Available for Inclusion in Key Definitions FIG. G-3 illustrates one embodiment of a data dictionary for a database configured for use in an FSO system, with the data elements in the data dictionary divided into subsets available for inclusion in key definitions. In this illustration, by way of example, the letters A through Z are used to represent all the data elements in the universe of data elements in data dictionary 100. From the universe of data elements in the data dictionary, a data element set 102 of data elements available for use in all key definitions may be selected by a user of the FSO system. In this example, data elements N through Z have been selected for inclusion in data element set 102. The user may divide data element set 102 into data element subsets available for particular key definitions. Data element subsets may overlap. In this example, data element subset 104 includes Q, R, and S, data element subset 108 includes T, U, V, X, and Z, and data element subset 112 includes V, W, X, Y and Z. Data element subsets 108 and 112 both include V, X, and Z. For each key definition, the user may select the data elements to be used in the key definition. In this example, key definition 106 includes Q and R from data element subset 104, key definition 110 includes T and X from data element subset 108, and key definition 114 includes W, X and Z from data element subset 112. More than one key definition may include a data element. In this example, key definitions 110 and 114 both include data element X.

FIG. G-4—One Embodiment of a Method for Selecting Data Dictionary Data Elements as Key Elements Available for Inclusion in Key Definitions FIG. G-4 illustrates one embodiment of a method for a user of an FSO system to select data dictionary data elements as key elements available for inclusion in key definitions in an FSO system. In this illustration, by way of example, the letters A through Z are used to represent the data elements in the universe of data elements in the data dictionary. In one embodiment, the database may include a table including references to all data elements in the data dictionary that are "useable in keys." In another embodiment, each data element in the data dictionary may have a useable in keys parameter associated with it. In one embodiment, the useable in keys parameter may be a binary parameter, and may be set to either allow the data element to be used in key definitions or to exclude the data element from use in key definitions. In one embodiment, a particular data element in the data dictionary may be selected, and information about the selected data element including the useable in keys parameter may be presented on a computer display screen. In one embodiment, a list 122 of all data elements in the data dictionary may be presented on a computer display screen 120 to a user of the FSO system. In one embodiment, a current state 124 of the useable in keys parameter may be displayed with each data element. The state of the useable in keys parameter may be displayed in any form suitable to represent a binary parameter. Examples of forms of displaying states of binary parameters include, but are not limited to: textual binary displays such as YES/NO, Y/N, TRUE/FALSE, T/F, I/O and ON/OFF, and; graphic binary displays, such as check boxes and radio buttons. In this example, YES/NO is used, with YES representing a useable in keys parameter set to allow the data element to be used in key definitions, and NO representing a useable in keys parameter set to exclude the data element from use in key definitions. A user may change the state of a useable in keys parameter for a data element by changing the displayed state of the useable in keys parameter. In one embodiment, the user may select the useable in keys parameter using a cursor control device and enter the textual representation of the desired state of the useable in keys parameter using an input device.

FIG. G-5—One Embodiment of a Method for Selecting Key Elements to be Available for Inclusion in a Particular Key Definition from a List of Key Elements Available for Inclusion in all Key Definitions FIG. G-5 illustrates one embodiment of a method for a user of an FSO system to select a group of key elements available for inclusion as key elements in a particular key definition in the FSO system. In this illustration, by way of example, the letters A through Z are used to represent the data elements in the universe of data elements in the data dictionary. In one embodiment, a list 132 of all key elements available for inclusion in key definitions may be presented on a computer display screen 130 to a user of the FSO system. In this example, list 132 includes key elements N through Z. Each key element in list 132 may have a useable in key parameter 134 associated with it. In one embodiment, a current state 134 of the useable in key parameter may be displayed with each key element. The state of the useable in key parameter may be displayed in any form suitable to represent a binary parameter. In this example, YES/NO is used, with YES representing a useable in key parameter set to allow the key element to be used in this key definition, and NO representing a useable in key parameter set to exclude the data element from use in this key definition. A user may change the state of a useable in key parameter for a key element by changing the displayed state of the useable in key parameter. In one embodiment, the user may select the useable in key parameter using a cursor control device and enter the textual representation of the desired state of the useable in key parameter using an input device.

FIG. G-6—One Embodiment of a Method for Selecting Key Elements for Inclusion in a Key Definition from a List of Key Elements Available for Inclusion in the Key Definition FIG. G-6 illustrates one embodiment of a method for a user of an FSO system to select key elements for inclusion in a key definition from a list of available key elements for the key definition in the FSO system. In this illustration, by way of example, the letters A through Z are used to represent the data elements in the universe of data elements in the data dictionary. In one embodiment, a list 142 of all key elements available for inclusion in a particular key definition may be presented on a computer display screen 140 to a user of the FSO system. In this example, list 142 includes key elements V through Z. Computer display screen 140 may also display a "use in this key" parameter 144 and a key element sequence parameter 146 for each key element displayed. The state of the "use in this key" parameter 144 may be displayed in any form suitable to represent a binary parameter. In this example, YES/NO is used, with YES representing a key element selected to be used as a key element in this key definition, and NO representing a key element not selected to be used as a key element in this key definition. A user may change the state of the "use in this key" parameter for a key element by changing the displayed state of the "use in this key" parameter. In one embodiment, the user may select the "use in this key" parameter using a cursor control device and enter the textual representation of the desired state of the "use in this key" parameter using an input device. In this example, the "use in this key" parameter for key elements W, X and Z are set to YES to indicate that W, X and Z are to be used as key elements in the key definition. The key element sequence parameter may be used to specify the order in which the key elements will appear in the key definition. In this example, key element X is set to appear as the first key element, key element W is set to appear as the second key element, and key element Z is set to appear as the third key element.

FIG. G-7—One Embodiment of a Key Definition with Examples of Parameters that May be Included in the Key Element Definitions FIG. G-7 illustrates an embodiment of a key definition that may have been defined by a user of an FSO system, with key elements displayed on a key definition screen 150. Each key element may include several parameters that define the key element. In one embodiment, the key elements may be displayed as rows on computer display screen 150, with the columns displaying key element parameters. This example shows key elements X, W, and Z. Key element column 152 displays the key element name. Key element sequence column 154 displays the order in which the key elements may appear in the key definition. In this example, key element X is the first key element, key element W is the second key element, and key element Z is the third key element. Element name column 156 may display a data element name. In this example, key element X is Company ID, key element W is the Credit Card Type, and key element Z is ON US/NOT ON US. Field length column 158 may display a length in units for the key element. In one embodiment, the units are 8-*bit* bytes. In this example, key element X is 2 bytes long, key element W is 3 bytes long, and key element Z is one byte long. Data type column 160 may display a data type for the key element. In this example, key element X is of data type numeric, and key elements W and Z are of data type character.

FIG. G-8—One Embodiment of a PCD Table for the Key Definition of FIG. G-7 with Examples of Key Values and Processing Parameters FIG. G-8 illustrates an embodiment of a PCD table 170 from a database used in an FSO system, with rows including key values 174 and processing parameters 178 associated with the key values. A PCD table may be used to store key values and the processing, or PCD, values associated with the key values. The key values and processing parameters may be entered by a user of the FSO system. In one embodiment, a PCD table may include pre-defined key values and processing parameters, and the user of the FSO system may add key values and processing parameters to the PCD table.

A PCD table may be searched for a particular key value to find the processing parameter associated with the key value. In this example, PCD table 170 may be used to access credit card merchant transaction charges 179 for different key values. In the credit card business, an Acquirer is an FSO that manages credit card accounts, processes credit card transactions, and collects credit card payments as an agent of one or more organizations, or companies. The FSO may charge a merchant transaction charge for each credit card transaction processed. The ability for a user of the FSO system to con-Figure G-key definitions and PCD tables at configuration time allows the FSO to define merchant transaction charges for a particular transaction based upon attributes of the transaction. For example, a bank may manage the Visa and Discovery credit card transactions for Store 12 and Store 14. The user may include one or more attributes (data elements) of the transaction as key elements in the key definition, and may define one or more permutations of key values and associated merchant transaction prices for the permutations in the merchant transaction pricing PCD table. In this example, the bank may define different transaction prices for processing Discovery transactions for Store 12 than it charges for processing Discovery transactions for Store 14.

In one embodiment, each row 172 in table 170 holds one key value and its associated processing parameter. In one embodiment, each key value is unique among the key values in the PCD table. Each key definition is associated with one PCD table. A key value may be constructed from the key element values stored in the one or more key elements defined in the key definition for this PCD table. In this example, the key values are constructed from key elements X (175), W (176), and Z (177), as defined in key description 150 illustrated in FIG. G-7. In FIG. G-8, row 1's key value is (12, VIS, Y). The processing parameter corresponding to the key value of (12, VIS, Y) is 10. Searching PCD table 170 for the key value of (12, VIS, Y) will return the transaction charge of 10.

In one embodiment of PCD tables, wildcard values may also be entered as key element values in a PCD table. In FIG. G-8, key element with wildcard values are represented by asterisks ("*"). In one embodiment of PCD tables, low collating values for the data type of the key element may be used as wildcard key element values. For example, key elements of numeric data type may use zero (0) as a low collating value, and character fields may use spaces, or blank characters, as low collating values. Other key element types may have low collating values specific to the type. Any or all of the key element values in a row of a PCD table may be set to a wildcard value. In FIG. G-8, row 3 has key elements W and Z set to wildcard values, row 4 has key element W set to a wildcard value, and row 7 has all of its key elements (X, W, and Z) set to wildcard values. In one embodiment, to specify a wildcard value for a key element value, the user may enter a wildcard display value (for example, "*") in the PCD table entry display screen, and the FSO system may then substitute the low collating value for the data type of the key element set to the wildcard display value when storing the key value in the PCD table.

FIG. G-9—One Embodiment of a Search Mask Table with Examples of Search Masks that may be Applied to the PCD Table of FIG. G-8

In one embodiment of an FSO system using PCD tables to store key values and associated processing parameters, each PCD table and corresponding key definition may have an associated search mask table. A user of the FSO system may enter the search masks in the search mask table. A search mask table may include one or more rows for storing search masks entered by the user, with each row including one column, or mask field, for each of the key elements in the key definition. In the example illustrated in FIG. G-9, search mask table 180 may be defined for key definition 150 illustrated in FIG. G-7 and PCD table 170 illustrated in FIG. G-8. Thus, search mask table 180 may include mask fields corresponding to key elements X, W, and Z in key definition 150. The user of the FSO system may enter a mask field value for each mask field in each search mask in a search mask table.

In one embodiment of a search mask table, mask field values may include an equal mask field values and a wildcard mask field value. In one embodiment, an equal mask field value may be entered by the user and displayed on the search mask entry display screen as an equal sign ("="), as illustrated in FIG. G-9. In one embodiment, a wildcard mask field value may be entered by the user and displayed on the search mask entry display screen as an asterisk ("*"), as illustrated in FIG. G-9. In one embodiment, an equal mask field value in a mask field may specify that, when constructing a processing key value from the data element values in a customer account data set during processing of the customer account data set, the key element value in the processing key value corresponding to the mask field will be set to the data element value from the customer account data set. In one embodiment, a wildcard mask field value in a mask field may specify that, when constructing a processing key value from the data element values in a customer account data set during processing of the customer account data set, the key element value in the processing key value corresponding to the mask field will be set to the low collating value for the data type of the key element.

One embodiment of a PCD table search process in an FSO system may use the search masks in a search mask table to construct processing key values from a customer account data set. In one embodiment, the search process may start at the first search mask in the search mask table, build a processing key value from the customer account data set using the first search mask, and search the PCD table for a key value that matches the processing key value. If a matching key value is found, the search process may return the processing parameter for the key value to a program that requested the processing parameter for the customer account data set. If a matching key value is not found, the search process go to the second search mask in the search mask table, build a processing key value from the customer account data set using the second search mask, and search the PCD table for a key value that matches the processing key value. The search process may iterate through the search masks in the search mask table until a matching key value is found or until there are no more search masks. When no matching key value is found and all search masks have been used, a message may be returned to the requesting program that no processing parameter exists for the customer account data set.

Search mask table 180 illustrated in FIG. G-9 includes four search masks 183 that may be used with key definition 150 illustrated in FIG. G-7 to construct a processing key value from a customer account data set during a search of PCD table 170 illustrated in FIG. G-8. In FIG. G-9, the search masks are in a search order 184 from search mask 1 to search mask 4. In search mask 1, mask fields X, W, and Z are all assigned equal mask field values, represented by an equal sign ("="). Search mask 2 has mask fields X and Z assigned equal mask field values, and mask field W assigned a wildcard mask field value represented by an asterisk ("*"). Search mask 3 has mask field X assigned an equal mask field value and mask fields W and Z assigned wildcard mask field values. Finally, in search mask 4, mask fields X, W and Z are all assigned wildcard mask field values.

Search mask table 180 illustrated in FIG. G-9 includes a search mask where all of the mask fields are set to the equal mask field value, and also includes a search mask where all of the mask fields are set to the wildcard mask field value. In one embodiment, search mask tables may not be required to include search masks where all mask fields are set to equal mask field values. In one embodiment, search mask tables may not be required to include search masks where all mask fields are set to wildcard mask field values.

FIG. G-10—One Embodiment of a Structure for a Database Table for Storing Key Definitions FIG. G-10 illustrates one embodiment of a database table that may be used to store key definitions defined by a user in an FSO system. Key definition table 200 may include PCD table identifiers 202 and user-defined key definitions 204. In one embodiment of an FSO system using user-defined key definitions, there is one key definition table 200 in an FSO system database. In one embodiment of an FSO system using user-defined key definitions, there is one row in key definition table 200 for each PCD table in the FSO system database, with each row including one PCD table identifier 202 that references the PCD table and one key definition 204 that defines the key format for the PCD table.

In an FSO system, key definition table 200 may be used during configuration of the FSO system to store key definitions 204 defined by a user of the system. Key definition table 200 may also be used during configuration to present a display screen to the user of the FSO system for defining key values and their associated processing parameters in a PCD table. Key definition table 200 may also be used during configuration to format the key values defined by the user as the key values are stored in the key value fields of the PCD table. Key definition table 200 may also be used during configuration to present a display screen to the user for defining search masks for key definitions, and to format the search masks defined by the user as they are stored in a search mask table.

In an FSO system, the user-defined key definitions 204 in key definition table 200 may be used during the processing of FSO business data, including the processing of customer account data sets. A computer program running on the FSO system may request a processing parameter from a PCD table during the processing of a customer account data set. In response to the request, the user-defined key definition 204 for the PCD table may be read from key definition table 200 and used with a user-defined search mask for the key definition to construct a processing key value from the customer account data set. The processing key value may be used to search the PCD table for the PCD key value that matches the processing key constructed from the customer account data set. If a matching PCD key value is found, the processing parameter for the matching PCD key value is returned to the calling program.

FIG. G-11—One Embodiment of a Database Structure for Referencing Search Masks

FIG. G-11 illustrates one embodiment of a database structure that may be used to store and reference search masks defined by a user in an FSO system. A table 205 may include PCD table identifiers 206 and references to search mask tables 208. In one embodiment of an FSO system using user-defined key definitions and search masks, there is one table 205 in an FSO system database. In one embodiment of an FSO system using user-defined key definitions and search masks, there is one row in table 205 for each PCD table in the FSO system database, with each row including one PCD table identifier 206 that references the PCD table and one reference to a search mask table 204. In another embodiment of table 205, all of the search mask tables may be merged into table 205, with one row in table 205 for each search mask for each PCD table.

In an FSO system, the search mask tables 208 in table 205 may be used during the processing of FSO business data, including the processing of customer account data sets. A computer program running on the FSO system may request a processing parameter from a PCD table during the processing of a customer account data set. In response to the request, the user-defined key definition for the PCD table may be read from a key definition table. A first user-defined search mask may be read from search mask table 208 for the PCD table and may be used with the key definition to construct a first processing key value from the customer account data set. The first processing key value may be used to search the PCD table for a PCD key value that matches the first processing key value constructed from the customer account data set. If a matching PCD key value is found, the processing parameter for the matching PCD key value is returned to the calling program. If a matching PCD key value is not found, a second user-defined search mask may be read from search mask table 208 and used with the key definition to construct a second processing key value. The second processing key value may be used to search the PCD table for a PCD key value that matches the second processing key value. The process of reading a next search mask, building a processing key, and searching the PCD table may continue until a matching PCD key value is found or until all search masks have been used and no matching PCD key value is found.

FIG. G-12—One Embodiment of a Structure for a User-Defined PCD Table with Key Values and Data Values FIG. G-12 illustrates one embodiment of a PCD table for storing key values and associated PCD data values defined by a user of the FSO system using a process as illustrated in FIG. G-8. Referring to FIG. G-12, PCD table 210 may include cells 216 for storing user-defined key values 217 in one column 212 and cells 218 for storing user-defined PCD data values 218 in a second column 216. One row in the table may include one cell 216 for storing a user-defined key value 217 and one cell 218 for storing the user-defined PCD data value 219 associated with the key value. In this example, user-defined key values (1, 2, . . . , n) correlate to user-defined processing parameters (1, 2, . . . , n). A user-defined key value 217 may include one or more key element values. A user-defined PCD data value 219 may include one or more processing parameter values.

FIG. G-13—One Embodiment of Several PCD Tables in an FSO System

FIG. G-13 illustrates one embodiment of a plurality of PCD tables 210 in an FSO system database. PCD tables 210 may include cells 216 for storing user-defined key values 217 in one column 212 and cells 218 for storing user-defined PCD data values 218 in a second column 216. One row in each table may include one cell 216 for storing a user-defined key value 217 and one cell 218 for storing the user-defined PCD data value 219 associated with the key value. In this example, in PCD table 1, key values (1, 2, . . . n) correlate to processing parameters (1, 2, . . . , n). A user-defined key value 217 may include one or more key element values. A user-defined PCD data value 219 may include one or more processing parameter values.

In one embodiment, cells 216 for storing key values 217 may be of a pre-configured fixed size that is identical for all PCD tables 210. In this embodiment, the fixed size of cells 216 may be pre-configured large enough to store key values 217 of the maximum size anticipated by the user of the system. In one embodiment, if the pre-configured size of cells 216 is not large enough, the PCD tables may be re-configured with a larger fixed size for cells 216.

PCD tables (1, 2, . . . , x) as illustrated in FIG. G-13 may be used in an embodiment of a production FSO system to store user-defined processing parameters and their associated user-defined key values. A program running on the FSO system may require a particular processing parameter to process a customer account data set. The FSO system may determine which PCD table holds the processing parameter, use the key definition and search mask table for the PCD table to construct a processing key value, and use the processing key value to search the PCD table key values and locate the particular processing parameter that matches the processing key value for the customer account data set.

FIG. G-14—Examples of Inputs to and Results from One Embodiment of a Search Process that May be Applied to PCD Tables as Depicted in FIG. G-8 Using Search Mask Tables Such as the Search Mask Table Depicted in FIG. G-9

FIG. G-14 illustrates several examples of processing key value inputs to, and processing parameter outputs from, one embodiment of a PCD table search process as applied to PCD table 170 illustrated in FIG. G-8, using key definition 150 illustrated in FIG. G-7 and search mask table 180 illustrated in FIG. G-9 to construct the processing key values. A PCD table search process may be initiated in response to a request for a processing parameter for use in processing a customer account data set in an FSO system.

In search 1, the PCD table search process uses key definition 150 and the first search mask in search mask table 180 to construct processing key values for a first customer account data set. In the first search mask, all mask values are set to the equal mask field value. A first processing key value is constructed using the first search mask. Key element X is set to the value 12 read from the customer account data set, key element W is set to the value DIS read from the customer account data set, and key element Z is set to the value Y read from the customer account data set. PCD table 170 is searched for the key value (12, DIS, Y). The key value for the second row in PCD table 170 matches the first processing key value. The search is completed when the match is found, and the corresponding processing parameter, 8, is returned to the requesting process in the FSO system.

In search 2, the PCD table search process uses key definition 150 and the first search mask in search mask table 180 to construct processing key values for a second customer account data set. A first processing key value is constructed using the first search mask. Key element X is set to the value 12 read from the customer account data set, key element W is set to the value MSC read from the customer account data set, and key element Z is set to the value Y read from the customer account data set. PCD table 170 is searched for the key value (12, MSC, Y). No exact match for the key value is found in PCD table 170. A second processing key value is constructed using the second search mask. Key element X is set to the value 12 read from the customer account data set, key element W is set to the wildcard key element value, and key element Z is set to the value Y read from the customer account data set. PCD table 170 is searched for the key value (12, *, Y). The key value for the fourth row in PCD table 170 matches the second processing key value. The search is completed when the match is found, and the corresponding processing parameter, 13, is returned to the requesting process in the FSO system.

In search 3, the PCD table search process uses key definition 150 and the first search mask in search mask table 180 to construct processing key values for a third customer account data set. A first processing key value is constructed using the first search mask. Key element X is set to the value 12 read from the customer account data set, key element W is set to the value MSC read from the customer account data set, and key element Z is set to the value N read from the customer account data set. PCD table 170 is searched for the key value (12, MSC, N). No exact match for the key value is found in PCD table 170. A second processing key value is constructed using the second search mask. Key element X is set to the value 12 read from the customer account data set, key element W is set to the wildcard key element value, and key element Z is set to the value N read from the customer account data set. PCD table 170 is searched for the key value (12, *, N). Again, no exact match for the key value is found in PCD table 170. A third processing key value is constructed using the third search mask. Key element X is set to the value 12 read from the customer account data set, key element W is set to the wildcard key element value, and key element Z is set to the wildcard key element value. PCD table 170 is searched for the key value (12, *, *). The key value for the third row in PCD table 170 matches the third processing key value. The search is completed when the match is found, and the corresponding processing parameter, 12, is returned to the requesting process in the FSO system.

In search 4, the PCD table search process uses key definition 150 and the first search mask in search mask table 180 to construct processing key values for a fourth customer account data set. A first processing key value is constructed using the first search mask. Key element X is set to the value 14 read from the customer account data set, key element W is set to the value MSC read from the customer account data set, and key element Z is set to the value N read from the customer account data set. PCD table 170 is searched for the key value (14, MSC, N). No exact match for the key value is found in PCD table 170. A second processing key value is constructed using the second search mask. Key element X is set to the value 14 read from the customer account data set, key element W is set to the wildcard key element value, and key element Z is set to the value N read from the customer account data set. PCD table 170 is searched for the key value (14, *, N). Again, no exact match for the key value is found in PCD table 170. A third processing key value is constructed using the third search mask. Key element X is set to the value 14 read from the customer account data set, key element W is set to the wildcard key element value, and key element Z is set to the wildcard key element value. PCD table 170 is searched for the key value (14, *, *). Again, no exact match for the key value is found in PCD table 170. A fourth processing key value is constructed using the fourth search mask. Key element X is set to the wildcard key element value, key element W is set to the wildcard key element value, and key element Z is set to the wildcard key element value. PCD table 170 is searched for the key value (*, *, *). The key value for the seventh row in PCD table 170 is set to all wildcard values, and thus matches the fourth processing key value. The search is completed when the match is found, and the corresponding processing parameter, 14, is returned to the requesting process in the FSO system.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of configuring an Financial Service Organization (FSO) production system, comprising:

constructing a multilevel processing relationship object structure representing processing relationships among two or more business entities of the Financial Service Organization (FSO), wherein constructing the multilevel processing relationship object structure comprises:

displaying two or more processing relationship object representations on a display screen in data communication with a FSO computer system comprising a database;

selecting two or more of the processing relationship object representations from the displayed processing relationship object representations; and preparing a processing relationship definition for at least two of the selected one-two or more processing relationship object representations, wherein preparing the processing relationship definitions comprises: creating a highest level processing relationship object representing the FSO; creating two or more lower level processing relationship objects descending from the highest level processing relationship object, wherein at least one of the two or more lower level processing relationship objects represents a business entity; and specifying values for two or more of the processing relationship objects, wherein the values for each of the lower level processing relationship objects comprises a level identifier, wherein the level identifier identifies a level of the lower level processing relationship object in the multilevel processing relationship object structure; and storing at least two of the processing relationship definitions in the database, wherein the at least two processing relationship definitions stored in the database are configured for use in preparing a processing relationship value from an FSO transaction-related data in the FSO computer system.

2. The method of claim 1, wherein the processing relationship value is configured for use in identifying an FSO business entity as an owner of the FSO transaction-related data.

3. The method of claim 2, wherein the FSO business entity is an FSO company or an FSO business unit or a bank branch office or a regional bank or a credit card line or an issuer or an acquirer.

4. The method of claim 1, wherein the selecting one or more processing relationship object representations is performed by a user of the FSO computer system.

5. The method of claim 1, wherein the selecting one or more processing relationship object representations is programmable or executable by an expert system.

6. The method of claim 1, wherein the storing the processing relationship definition in the database comprises transferring the processing relationship definition to a report record definition stored in the database.

7. The method of claim 1 further comprising expanding the processing relationship definition by inserting one or more processing relationship objects as descendants of the highest level processing relationship object.

8. The method of claim 1, further comprising editing the processing relationship definition by inserting or deleting one or more processing relationship objects, wherein each of the one or more processing relationship objects are descendants of the highest level processing relationship object.

9. The method of claim 1, wherein the displaying one or more processing relationship object representations on a display screen comprises displaying values associated with a sequence number and a level number.

10. The method of claim 9, wherein the level identifier comprises a level number.

11. The method of claim 1, wherein the displaying one or more processing relationship object representations on a display screen comprises displaying values associated with an object name, an object description and an object number for a displayed processing relationship object.

12. The method of claim 11, wherein the object name identifies a unique name assigned to an object.

13. The method of claim 1, wherein the selecting a first processing relationship object representation from one or more processing relationship object representations comprises
positioning a cursor of an user input device above the first processing relationship object representation and clicking a button of the user input device.

14. The method of claim 1, wherein preparing the processing relationship definitions comprises creating or editing an object associated with each of the selected processing relationship object representations.

15. The method of claim 14, wherein the creating the object comprises identifying a unique object identifier and identifying values for the object properties.

16. The method of claim 1, wherein the preparing a processing relationship definition comprises identifying one or more methods and one or more properties of an object associated with each of the selected processing relationship object representation.

17. The method of claim 1, wherein at least two of the two or more lower level processing relationship objects representations representing an FSO company or an FSO business unit or a bank branch office or a regional bank or a credit card line or an issuer or an acquirer.

18. The method of claim 1, wherein the processing relationship object representations
comprises an icon displayed on the display screen of the FSO computer system.

19. The method of claim 1, wherein a user of the FSO computer system executes a processing relationship configuration program to prepare the processing relationship definition.

20. The method of claim 1, wherein the user of FSO computer system executes a processing relationship configuration program to reconfigure and store in the database the processing relationship definition in response to changing business conditions.

21. The method of claim 1, wherein the multilevel processing object structure comprises a first lower level, wherein at least two of the lower level processing relationship objects represent business entities at the first lower level.

22. The method of claim 1, wherein the multilevel processing object structure comprises a first lower level, wherein at least two of the lower level processing relationship objects represent physical entities at the first lower level.

23. The method of claim 1, wherein the multilevel processing object structure comprises a first lower level, wherein at least two of the lower level processing relationship objects represent different business functions at the first lower level.

24. The method of claim 1, wherein the multilevel processing object structure comprises a first lower level, wherein at least one of the lower level processing relationship objects represents an issuer at the first lower level and at least one of the lower level processing relationship objects represents an acquirer at the first lower level.

25. The method of claim 24, wherein the first lower level is one level below the highest level processing relationship object.

26. The method of claim 1, wherein the multilevel processing object structure comprises a first lower level descending from the highest level and a second lower level descending from the first lower level, wherein at least one of the lower level processing relationship objects represents an issuer at the first lower level and at least one of the lower level processing relationship objects represents an FSO company at the second lower level.

27. A system for processing Financial Service Organization (FSO) transactions, the system comprising:
a computer program;
a computer system; wherein the computer program is executable on the computer system to execute:
constructing a multilevel processing relationship object structure representing processing relationships among two or more business entities of the Financial Service Organization (FSO), wherein constructing the multilevel processing relationship object structure comprises:
displaying two or more processing relationship object representations on a display screen in data communication with a FSO computer system comprising a database;
selecting two or more of the processing relationship object representations from the displayed processing relationship object representations; and
preparing a processing relationship definition for at least two of the selected one-two or more processing relationship object representations, wherein preparing the processing relationship definitions comprises:
creating a highest level processing relationship object representing the FSO; creating two or more lower level processing relationship objects descending
from the highest level processing relationship object, wherein at least one of the two or more lower level processing relationship objects represents a business entity; and
specifying values for two or more of the processing relationship objects, wherein the values for each of the lower level processing relationship objects comprises a level identifier, wherein the level identifier identifies a level of the lower level processing relationship object in the multilevel processing relationship object structure; and
storing at least two of the processing relationship definitions in the database, wherein at least two of the processing relationship definitions stored in the database are configured for use in preparing a processing relationship value from an FSO transaction-related data in the FSO computer system.

28. The system of claim 27, wherein the processing relationship value is configured for use in identifying an FSO business entity as an owner of the FSO transaction-related data.

29. The system of claim 28, wherein the FSO business entity is an FSO company or an FSO business unit or a bank branch office or a regional bank or a credit card line or an issuer or an acquirer.

30. The system of claim 27, wherein the selecting one or more processing relationship object representations is performed by a user of the FSO computer system.

31. The system of claim 27, wherein the selecting one or more processing relationship object representations is programmable or executable by an expert system.

32. The system of claim 27, wherein the storing the processing relationship definition in the database comprises transferring the processing relationship definition to a report record definition stored in the database.

33. The system of claim 27, wherein the processing relationship definition is expanded by inserting one or more processing relationship objects as descendents of the highest level processing relationship object.

34. The system of claim 27, wherein the processing relationship definition is edited by inserting or deleting one or more processing relationship objects, wherein each of the one or more processing relationship objects are descendents of the highest level processing relationship object.

35. The system of claim 27, wherein the displaying one or more processing relationship object representations on a display screen comprises displaying values associated with a sequence number and a level number.

36. The system of claim 35, wherein the level identifier comprises a level number.

37. The system of claim 27, wherein the displaying one or more processing relationship object representations on a display screen comprises displaying values associated with an object name, an object description and an object number for a displayed processing relationship object.

38. The system of claim 37, wherein the object name identifies a unique name assigned to an object.

39. The system of claim 27, wherein the database is relational or object oriented.

40. The system of claim 27, wherein the selecting a first processing relationship object representation from one or more processing relationship object representations comprises positioning a cursor of an user input device above the first processing relationship object representation and clicking a button of the user input device.

41. The system of claim 27, wherein preparing the processing relationship definitions comprises creating or editing an object associated with each of the selected processing relationship object representations.

42. The system of claim 41, wherein the creating the object comprises identifying a unique object identifier and identifying values for the object properties.

43. The system of claim 27, wherein preparing a processing relationship definition comprises identifying one or more methods and one or more properties of an object associated with each of the selected processing relationship object representations.

44. The system of claim 27, wherein at least two of the two or more lower level processing relationship objects representations representing an FSO company or an FSO business unit or a bank branch office or a regional bank or a credit card line or an issuer or an acquirer.

45. The system of claim 27, wherein the processing relationship object representations comprises an icon displayed on the display screen of the FSO computer system.

46. The system of claim 27, wherein a user of the FSO computer system executes a processing relationship configuration program to prepare the processing relationship definition.

47. The system of claim 27, wherein the user of FSO computer system executes a processing relationship configuration program to reconfigure and store in the database the processing relationship definition in response to changing business conditions.

48. The system of claim 27, wherein the computer system comprises a display device coupled to the computer system to display data.

49. The system of claim 48, wherein the display device is a display screen.

50. The system of claim 27, wherein the computer system comprises a user input device coupled to the computer system to enter data.

51. The system of claim 50, wherein the user input device is a mouse or a keyboard.

52. A carrier medium comprising program instructions, wherein the program instructions are executable by a computer system to implement:
constructing a multilevel processing relationship object structure representing processing relationships among two or more business entities of the Financial Service Organization (FSO), wherein constructing the multilevel processing relationship object structure comprises:
displaying two or more processing relationship object representations on a display screen in data communication with a FSO computer system comprising a database;
selecting two or more of the processing relationship object representations from the displayed processing relationship object representations; and
preparing a processing relationship definition for at least two of the selected one-two or more processing relationship object representations, wherein preparing the processing relationship definitions comprises: creating a highest level processing relationship object representing the FSO; creating two or more lower level processing relationship objects descending from the highest level processing relationship object, wherein at least one of the two or more lower level processing relationship objects represents a business entity;
and specifying values for two or more of the processing relationship objects, wherein the values for each of the lower level processing relationship objects comprises a level identifier, wherein the level identifier identifies a level of the lower level processing relationship object in the multilevel processing relationship object structure; and storing at least two of the processing relationship definitions in the database, wherein at least two of the processing relationship definitions stored in the database are configured for use in preparing a processing relationship value from an FSO transaction-related data in the FSO computer system.

53. The carrier medium of claim 52, wherein the processing relationship value is configured for use in identifying an FSO business entity as an owner of the FSO transaction-related data.

54. The carrier medium of claim 52, wherein the selecting one or more processing relationship object representations is performed by a user of the FSO computer system.

55. The carrier medium of claim 52, wherein the selecting one or more processing relationship object representations is programmable or executable by an expert system.

56. The carrier medium of claim 52, wherein the storing the processing relationship definition in the database comprises transferring the processing relationship definition to a report record definition stored in the database.

57. The carrier medium of claim 52, wherein the processing relationship definition is expanded by inserting one or more processing relationship objects as descendents of the highest level processing relationship object.

58. The carrier medium of claim 52, wherein the processing relationship definition is edited by inserting or deleting one or more processing relationship objects, wherein each of the one or more processing relationship objects are descendents of the highest level processing relationship object.

59. The carrier medium of claim 52, wherein the displaying one or more processing relationship object representations on a display screen comprises displaying values associated with a sequence number and a level number.

60. The carrier medium of claim 59, wherein the level identifier comprises a level number.

61. The carrier medium of claim 52, wherein the displaying one or more processing relationship object representations on a display screen comprises displaying values associated with an object name, an object description and an object number for a displayed processing relationship object.

62. The carrier medium of claim 61, wherein the object name identifies a unique name assigned to an object.

63. The carrier medium of claim 52, wherein the selecting a first processing relationship object representation from one or more processing relationship object representations comprises positioning a cursor of an user input device above the first processing relationship object representation and clicking a button of the user input device.

64. The carrier medium of claim 52, wherein the preparing a processing relationship definition comprises creating or editing an object associated with each of the selected processing relationship object representation.

65. The carrier medium of claim 64, wherein the creating the object comprises identifying a unique object identifier and identifying values for the object properties.

66. The carrier medium of claim 52, wherein t-he-preparing a the processing relationship definitions comprises identifying one or more methods and one or more properties of an object associated with each of the selected processing relationship object representations.

67. The carrier medium of claim 52, wherein at least two of the two or more lower level processing relationship object representations representing an FSO company or an FSO business unit or a bank branch office or a regional bank or a credit card line or an issuer or an acquirer.

68. The carrier medium of claim 52, wherein the processing relationship object representations comprises an icon displayed on the display screen of the FSO computer system.

69. The carrier medium of claim 52, wherein a user of the FSO computer system executes a processing relationship configuration program to prepare the processing relationship definition.

70. The carrier medium of claim 52, wherein the user of FSO computer system executes a processing relationship configuration program to reconfigure and store in the database the processing relationship definition in response to changing business conditions.

\* \* \* \* \*